United States Patent
Gintz et al.

(10) Patent No.: US 11,210,871 B2
(45) Date of Patent: Dec. 28, 2021

(54) SYSTEM AND METHOD FOR REMOTE EMISSIONS CONTROL UNIT MONITORING AND REPROGRAMMING

(71) Applicant: EZ Lynk SEZC, Grand Cayman (KY)

(72) Inventors: Brad Gintz, Grand Cayman (KY); Thomas Wood, Steamboat Springs, CO (US); Frederick Hershel Savage, Austin, TX (US)

(73) Assignee: EZ Lynk SEZC, Grand Cayman (KY)

( * ) Notice: Subject to any disclaimer, the term of this patent is extended or adjusted under 35 U.S.C. 154(b) by 90 days.

(21) Appl. No.: 16/824,256

(22) Filed: Mar. 19, 2020

(65) Prior Publication Data
US 2020/0219335 A1 Jul. 9, 2020

Related U.S. Application Data

(63) Continuation-in-part of application No. 16/805,454, filed on Feb. 28, 2020, which is a continuation-in-part
(Continued)

(51) Int. Cl.
*G07C 5/00* (2006.01)
*G06F 8/65* (2018.01)
(Continued)

(52) U.S. Cl.
CPC ............ *G07C 5/008* (2013.01); *G06F 8/65* (2013.01); *G06F 8/71* (2013.01); *G06F 9/541* (2013.01); *G07C 5/0841* (2013.01); *H04W 4/40* (2018.02)

(58) Field of Classification Search
CPC .......... G07C 5/08; G07C 5/0841; G06F 8/65; G06F 8/71; G06F 9/541
See application file for complete search history.

(56) References Cited

U.S. PATENT DOCUMENTS 6,636,790 B1 10/2003 Lightner et al.
6,732,031 B1 5/2004 Lightner et al.
(Continued)

FOREIGN PATENT DOCUMENTS

| GN | 203084712 U | 7/2013 |
| GN | 103838231 A | 6/2014 |
| JP | 2002-44742 | 2/2002 |

OTHER PUBLICATIONS

GT Platinum Diesel Manual, Bully Dog by Derive, Doc. 40420-99 v4.0, available at https://www.bullydog.com/Products/unfiltered-product/bd/BDGTPD/bully-dog-gt-diesel, last accessed Apr. 9, 2018.
(Continued)

*Primary Examiner* — Christopher B Robinson
(74) *Attorney, Agent, or Firm* — Schultz & Associates, P.C.

(57) ABSTRACT

Disclosed are methods, systems, and apparatus for remote reprogramming of an automotive controller using J2534 communications protocol, a local device, a client device, a technician device and a system server. The local device is connected to the automotive controller and is wirelessly connected to the client device. The client device is connected to the technician device through a system server. Programming configurations, including firmware, settings, and parameter updates, are selected from a technician device, sent to the system server, and uploaded to local device using J2534 communication protocol. The client device receives reprogramming data from the system server and sends the reprogramming data to the local device.

22 Claims, 120 Drawing Sheets

Related U.S. Application Data of application No. 16/673,907, filed on Nov. 4, 2019, which is a continuation-in-part of application No. 16/673,873, filed on Nov. 4, 2019, which is a continuation-in-part of application No. 16/049,670, filed on Jul. 30, 2018, now Pat. No. 10,614,640, which is a continuation-in-part of application No. 15/884,246, filed on Jan. 30, 2018, now Pat. No. 10,037,633, which is a continuation-in-part of application No. 15/228,926, filed on Aug. 4, 2016, now Pat. No. 10,621,796.

(60) Provisional application No. 62/201,462, filed on Aug. 5, 2015.

(51) Int. Cl.
| | |
|---|---|
| G06F 8/71 | (2018.01) |
| G06F 9/54 | (2006.01) |
| G07C 5/08 | (2006.01) |
| H04W 4/40 | (2018.01) |

(56) References Cited

U.S. PATENT DOCUMENTS

| | | | |
|---|---|---|---|
| 6,732,032 B1 | 5/2004 | Banet et al. | |
| 6,738,697 B2 | 5/2004 | Breed | |
| 6,745,151 B2 | 6/2004 | Marko et al. | |
| 6,879,894 B1 | 4/2005 | Lightner et al. | |
| 6,928,348 B1 | 8/2005 | Lightner et al. | |
| 7,050,897 B2 | 5/2006 | Breed et al. | |
| 7,082,359 B2 | 7/2006 | Breed | |
| 7,162,339 B2 | 1/2007 | Nguyen | |
| 7,225,065 B1 | 5/2007 | Hunt et al. | |
| 7,228,211 B1 | 6/2007 | Lowrey et al. | |
| 7,363,129 B1 | 4/2008 | Barnicle et al. | |
| 7,421,321 B2 | 9/2008 | Breed et al. | |
| 7,447,574 B1 | 11/2008 | Washicko et al. | |
| 7,454,473 B2 | 11/2008 | Suzuki | |
| 7,480,551 B1 | 1/2009 | Lowrey et al. | |
| 7,554,441 B2 | 6/2009 | Viegers et al. | |
| 7,620,484 B1 | 11/2009 | Chen | |
| 7,629,876 B2 | 12/2009 | Nagai et al. | |
| 7,630,801 B2 | 12/2009 | Giles et al. | |
| 7,650,210 B2 | 1/2010 | Breed | |
| 7,747,365 B1 | 6/2010 | Lowrey et al. | |
| 7,792,618 B2 | 9/2010 | Quigley et al. | |
| 7,904,219 B1 | 3/2011 | Lowrey et al. | |
| 7,917,253 B2 | 3/2011 | Inbarajan et al. | |
| 8,014,789 B2 | 9/2011 | Breed | |
| 8,019,501 B2 | 9/2011 | Breed | |
| 8,024,084 B2 | 9/2011 | Breed | |
| 8,035,508 B2 | 10/2011 | Breed | |
| 8,036,788 B2 | 10/2011 | Breed | |
| 8,055,403 B2 | 11/2011 | Lowrey et al. | |
| 8,108,231 B2 | 1/2012 | Belanger et al. | |
| 8,296,007 B2 * | 10/2012 | Swaminathan | G07C 5/0858 |
| | | | 701/29.1 |
| 8,406,951 B2 | 3/2013 | Suganuma et al. | |
| 8,447,459 B2 | 5/2013 | Lowrey et al. | |
| 8,527,135 B2 | 9/2013 | Lowrey et al. | |
| 8,559,937 B2 | 10/2013 | Ram et al. | |
| 8,781,442 B1 | 7/2014 | Link, II | |
| 8,825,271 B2 | 9/2014 | Chen | |
| 8,855,621 B2 | 10/2014 | Chen | |
| 8,914,187 B2 | 12/2014 | Wang et al. | |
| 9,002,554 B2 | 4/2015 | Chen | |
| 9,014,908 B2 | 4/2015 | Chen et al. | |
| 9,031,710 B2 | 5/2015 | Barrett | |
| 9,050,862 B2 | 6/2015 | Mouchet | |
| 9,083,581 B1 | 7/2015 | Addepalli et al. | |
| 9,120,357 B2 | 9/2015 | Deniau et al. | |
| 9,126,483 B2 | 9/2015 | Aoki et al. | |
| 9,135,759 B2 | 9/2015 | Baer et al. | |
| 9,141,503 B1 | 9/2015 | Chen | |
| 9,142,065 B2 | 9/2015 | Rude et al. | |
| 9,142,066 B2 | 9/2015 | Chen et al. | |
| 9,224,249 B2 | 12/2015 | Lowery et al. | |
| 9,224,251 B2 | 12/2015 | Harata et al. | |
| 9,233,655 B2 | 1/2016 | Barrett | |
| 9,248,807 B2 | 2/2016 | Lee et al. | |
| 9,269,169 B2 | 2/2016 | Morimoto et al. | |
| 9,280,859 B2 | 3/2016 | Itatsu et al. | |
| 9,286,264 B2 | 3/2016 | Johnson et al. | |
| 9,292,984 B2 | 3/2016 | Kitahara et al. | |
| 9,324,195 B2 | 4/2016 | Koenig et al. | |
| 9,342,934 B2 | 5/2016 | Chen | |
| 9,418,492 B2 | 8/2016 | Sinner et al. | |
| 9,483,884 B2 | 11/2016 | Chen et al. | |
| 9,489,544 B2 | 11/2016 | Naitou et al. | |
| 9,747,254 B2 | 8/2017 | McQuade et al. | |
| 9,841,965 B2 | 12/2017 | Moeller et al. | |
| 2002/0007237 A1 | 1/2002 | Phung et al. | |
| 2003/0187556 A1 | 10/2003 | Suzuki | |
| 2004/0111505 A1 | 6/2004 | Callahan et al. | |
| 2005/0256614 A1 | 11/2005 | Habermas | |
| 2006/0129691 A1 | 6/2006 | Coffee et al. | |
| 2009/0178986 A1 | 7/2009 | Coglitore et al. | |
| 2009/0318121 A1 | 12/2009 | Marumoto | |
| 2010/0070107 A1 | 3/2010 | Berkobin et al. | |
| 2010/0292890 A1 | 11/2010 | Morris | |
| 2011/0276218 A1 * | 11/2011 | Dwan | G07C 5/008 |
| | | | 701/29.5 |
| 2011/0296037 A1 * | 12/2011 | Westra | H04L 69/18 |
| | | | 709/228 |
| 2012/0136827 A1 | 5/2012 | Wang et al. | |
| 2012/0288016 A1 | 11/2012 | Ichikawa | |
| 2013/0212659 A1 | 8/2013 | Maher et al. | |
| 2013/0246135 A1 | 9/2013 | Wang | |
| 2013/0261907 A1 | 10/2013 | McQuade et al. | |
| 2013/0261914 A1 | 10/2013 | Ingram et al. | |
| 2013/0268754 A1 | 10/2013 | Baltes | |
| 2013/0275214 A1 | 10/2013 | Kote et al. | |
| 2013/0317694 A1 | 11/2013 | Merg et al. | |
| 2014/0081481 A1 | 3/2014 | Nishida | |
| 2014/0100716 A1 | 4/2014 | Kawai et al. | |
| 2014/0133662 A1 * | 5/2014 | Boll | H04R 29/00 |
| | | | 381/56 |
| 2014/0282470 A1 | 9/2014 | Buga et al. | |
| 2014/0294180 A1 | 10/2014 | Link, II | |
| 2014/0379171 A1 | 12/2014 | Kim et al. | |
| 2015/0007155 A1 | 1/2015 | Hoffman et al. | |
| 2015/0120606 A1 | 4/2015 | Hashimoto et al. | |
| 2015/0180840 A1 | 6/2015 | Jung et al. | |
| 2015/0298653 A1 | 10/2015 | Schwartz | |
| 2015/0317594 A1 | 11/2015 | Reznik et al. | |
| 2016/0189447 A1 | 6/2016 | Valenzuela | |
| 2016/0203652 A1 | 7/2016 | Throop et al. | |
| 2016/0239937 A1 | 8/2016 | Kim et al. | |
| 2016/0274160 A1 | 9/2016 | Lee et al. | |
| 2016/0330284 A1 | 11/2016 | Hoick et al. | |
| 2016/0347328 A1 | 12/2016 | Takehara et al. | |
| 2020/0174780 A1 * | 6/2020 | Gintz | G06F 8/66 |

OTHER PUBLICATIONS

GT Quick Start Guide, Bully Dog by Derive, available at https://www.bullydog.com/Products/unfiltered-product/bd/BDGTPD/bully-dog-gt-diesel, last accessed Apr. 9, 2018.

H&S Performance Mini Maxx Street Tuner Installation/Operation Manual, available at https://www.dieselops.com/h-s-performance-mini maxx-race tuner-programmer, last accessed Apr. 9, 2018.

H&S Performance Black Maxx Installation Manual, available at http://4wheelonline.com/.253598.0?search=h%26s%20performance%20black%20maxx, last accessed Apr. 9, 2018.

* cited by examiner

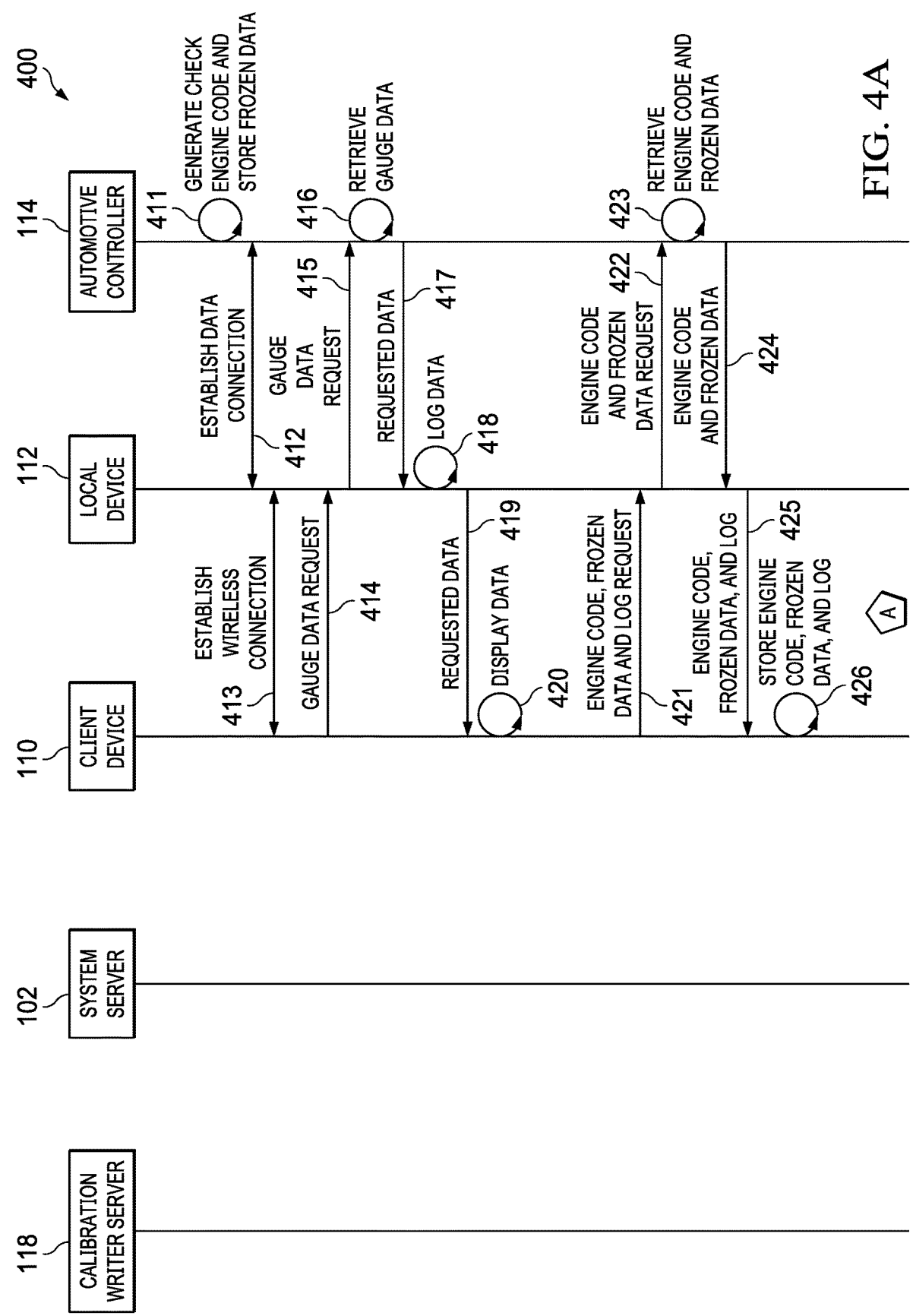

GAUGE SCREEN — 502

| Eng. Coolant Temp | Speed | RPM | Battery Voltage |
|---|---|---|---|
| 542 — 156.0 | 544 — 31.0 | 746 — 546 | 2.00 — 548 |
| 558 — °F | 560 — MPH | RPM — 562 | V — 564 |
| Transmission Temp. | Throttle Position Sensor — 536 | Calculated Load 538 | Injector Pressure 540 |
| 534 / 550 — 219.0 | 552 — 35 | 35 — 554 | 25.0 — 556 |
| 566 — °F | 568 — % | % — 570 | kPSI — 572 |

518  520  FIG. 5A  522  524

DRAG AND DROP

≡ Z LYNK   524

| Eng. Coolant Temp | Speed | Injector Pressure | Battery Voltage |
|---|---|---|---|
| -16.0 | 70.0 | 22.0 | 1.00 |
| °F | MPH | kPSI | RPM |
| Transmission Temp. | Throttle Position Sensor | Calculated L | 1031 RPM |
| 83.0 | 74 | 74 | |
| °F | % | % | 514 |

FIG. 5B

SELECT UNITS

| | | TRANSMISSION TE... ✕ |
|---|---|---|
| RPM | Battery Voltage | GAUGE STYLE |
| 3799 | 12.00 | [gauge icons] |
| RPM | V | LEVELS |
| Transmission Temp. | Throttle Position Sensor | Adjust parameters > |
| 88.9 | 55 | Units |
| 566 ⌐ °C | % | °C  —1302    °F —1304 |

SLIDE FOR ALTERNATE DISPLAY

| | | | 508 |
|---|---|---|---|
| °F | MPH | RPM | V |
| Transmission Temp. | Throttle Position Sensor | Calculated Load | Injector Pressure |
| 127.0 | 96 | 96 | 46.0 |
| °F | % | % | kPSI |

| RPM, RPM | 87.5   130.0   172.5 | Eng. Coolant Temp, °F |
|---|---|---|
| 4144 | 45.0   Transmission Temp.   215.0 | 149.0 |

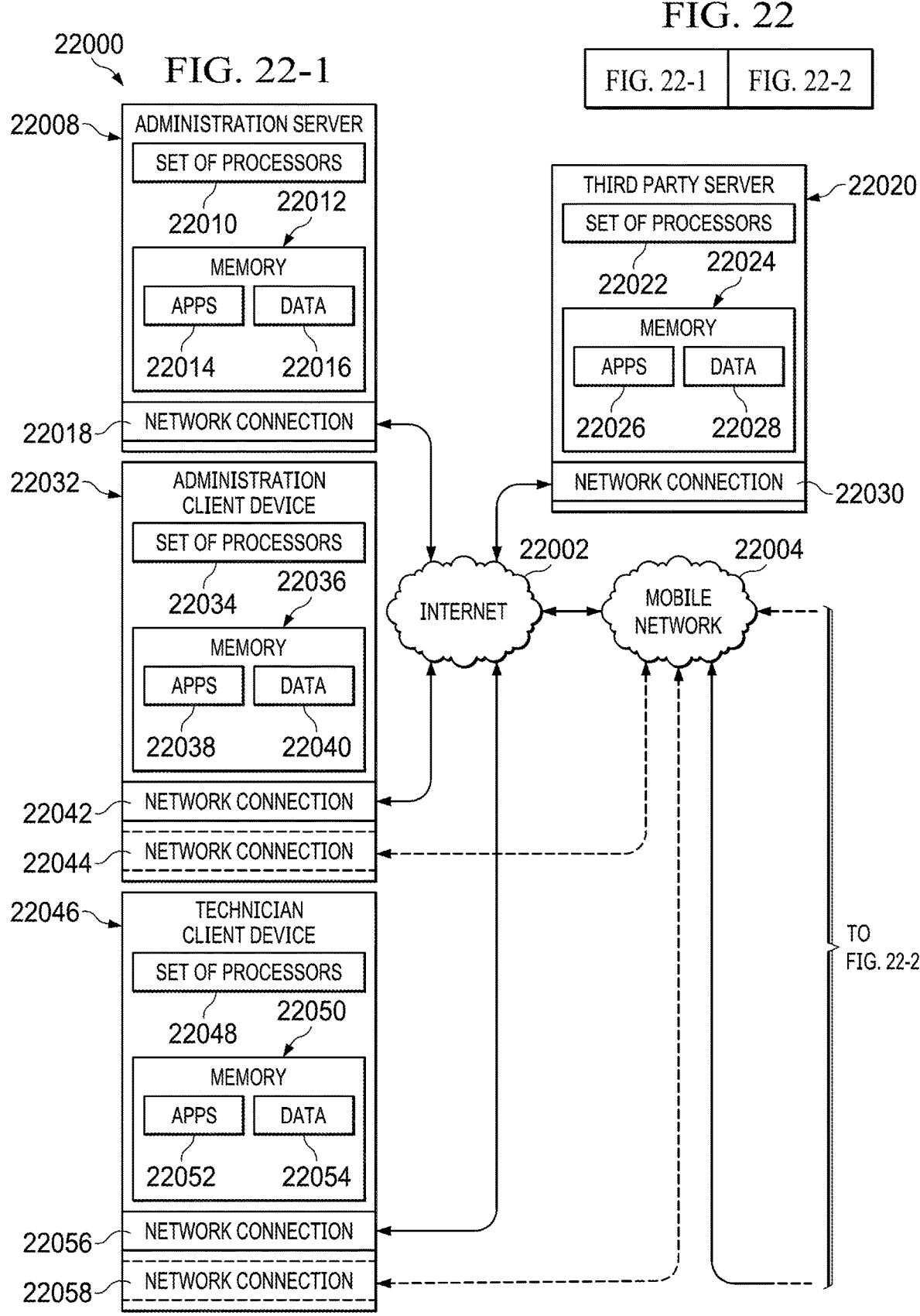

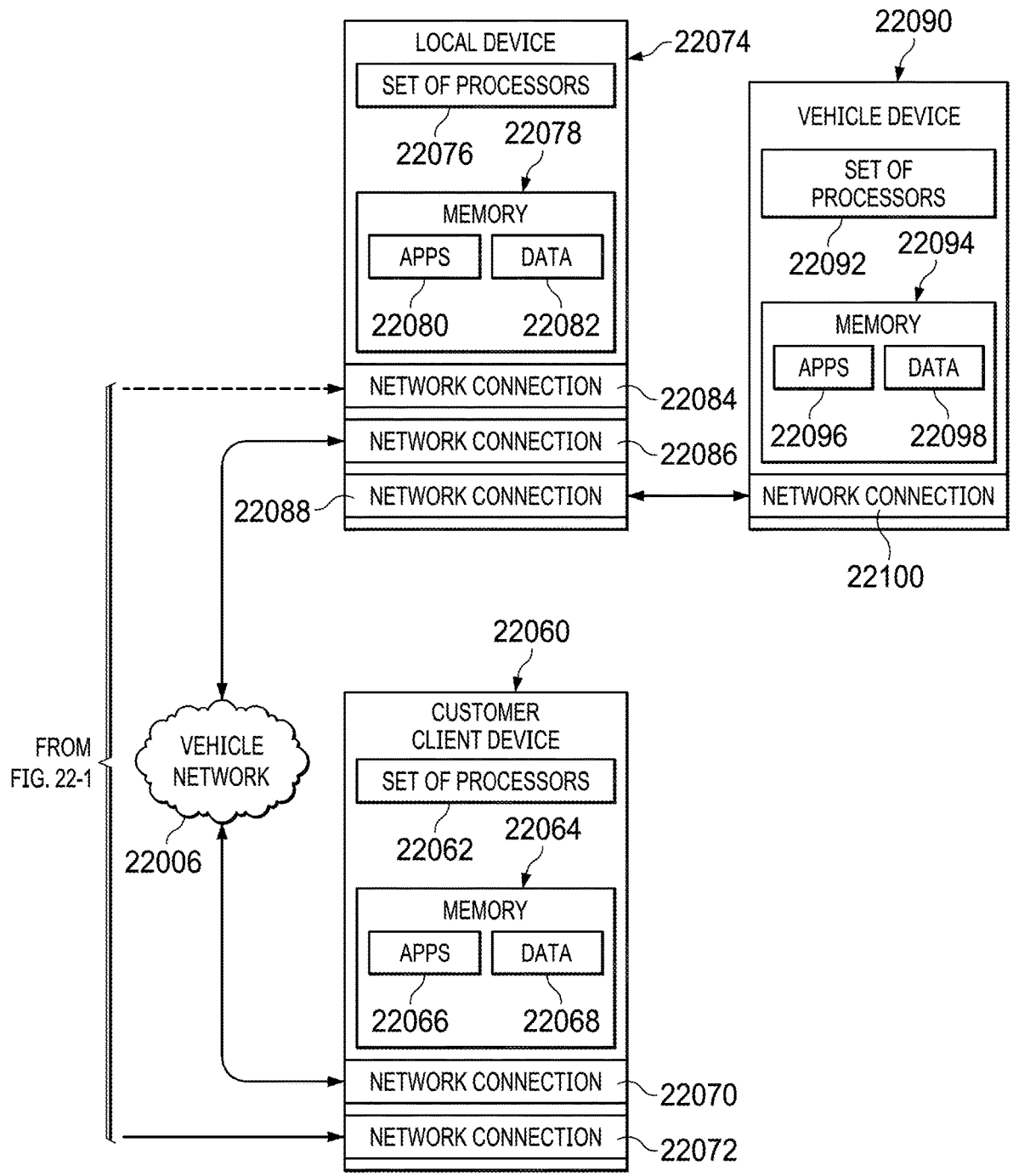

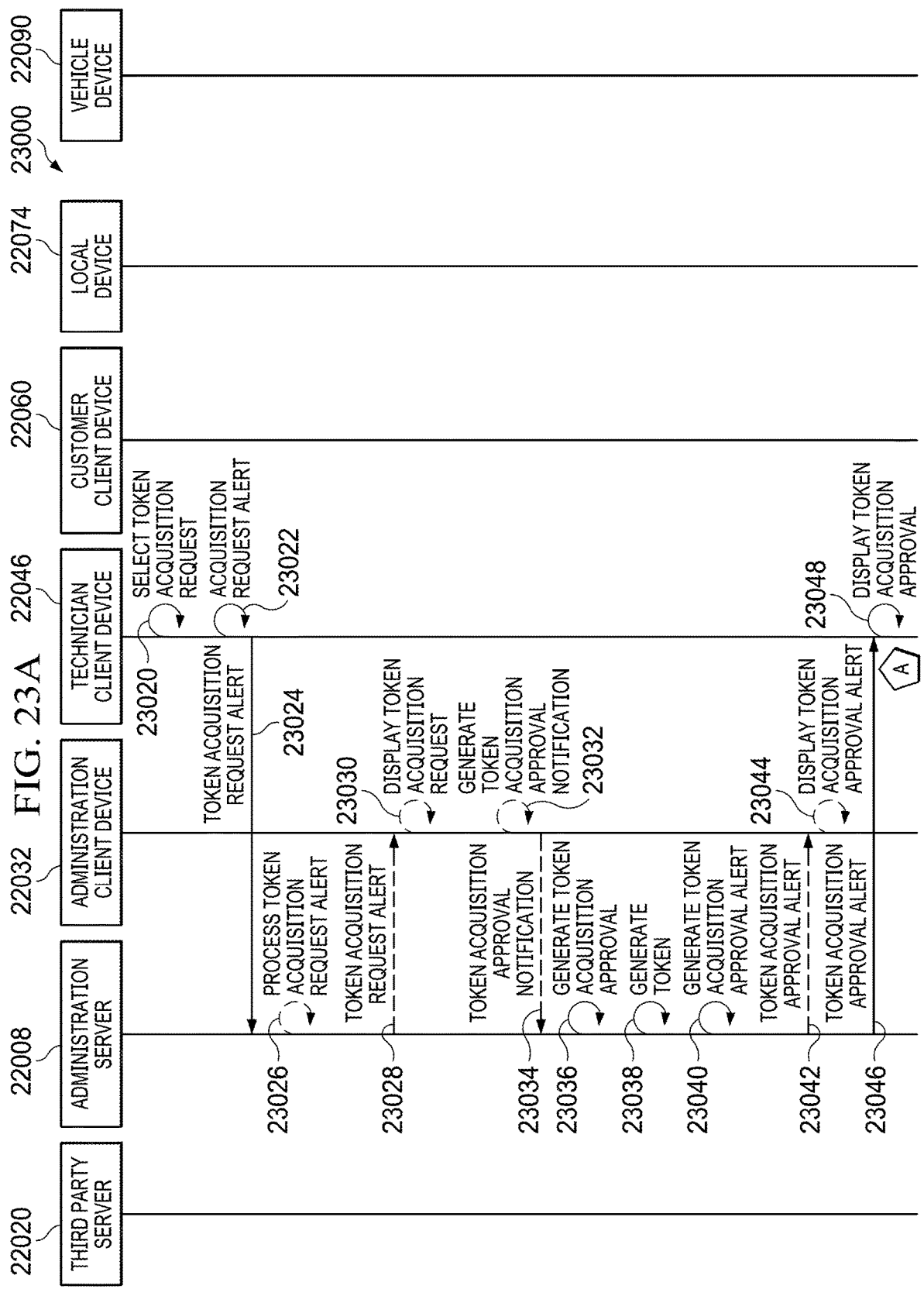

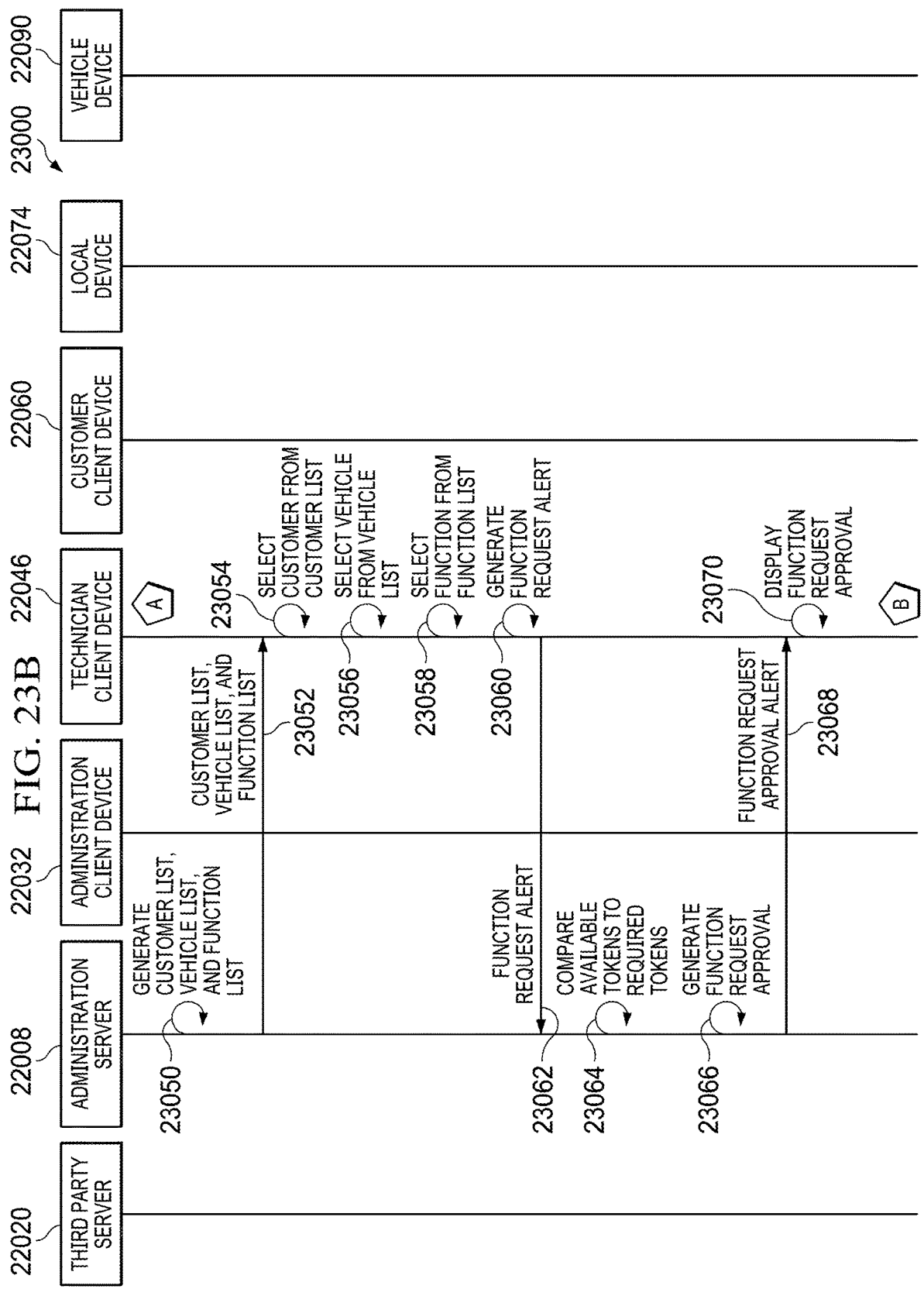

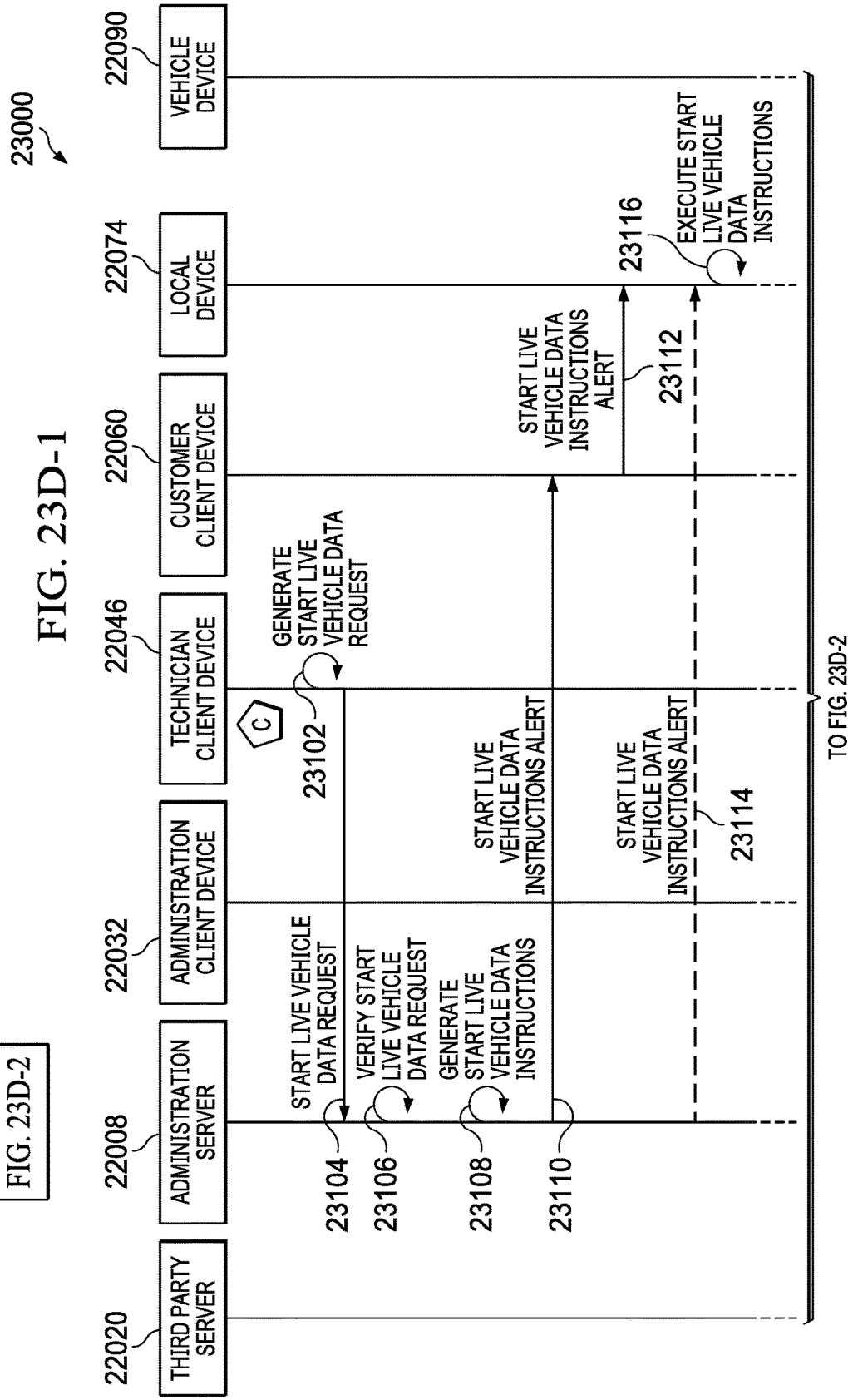

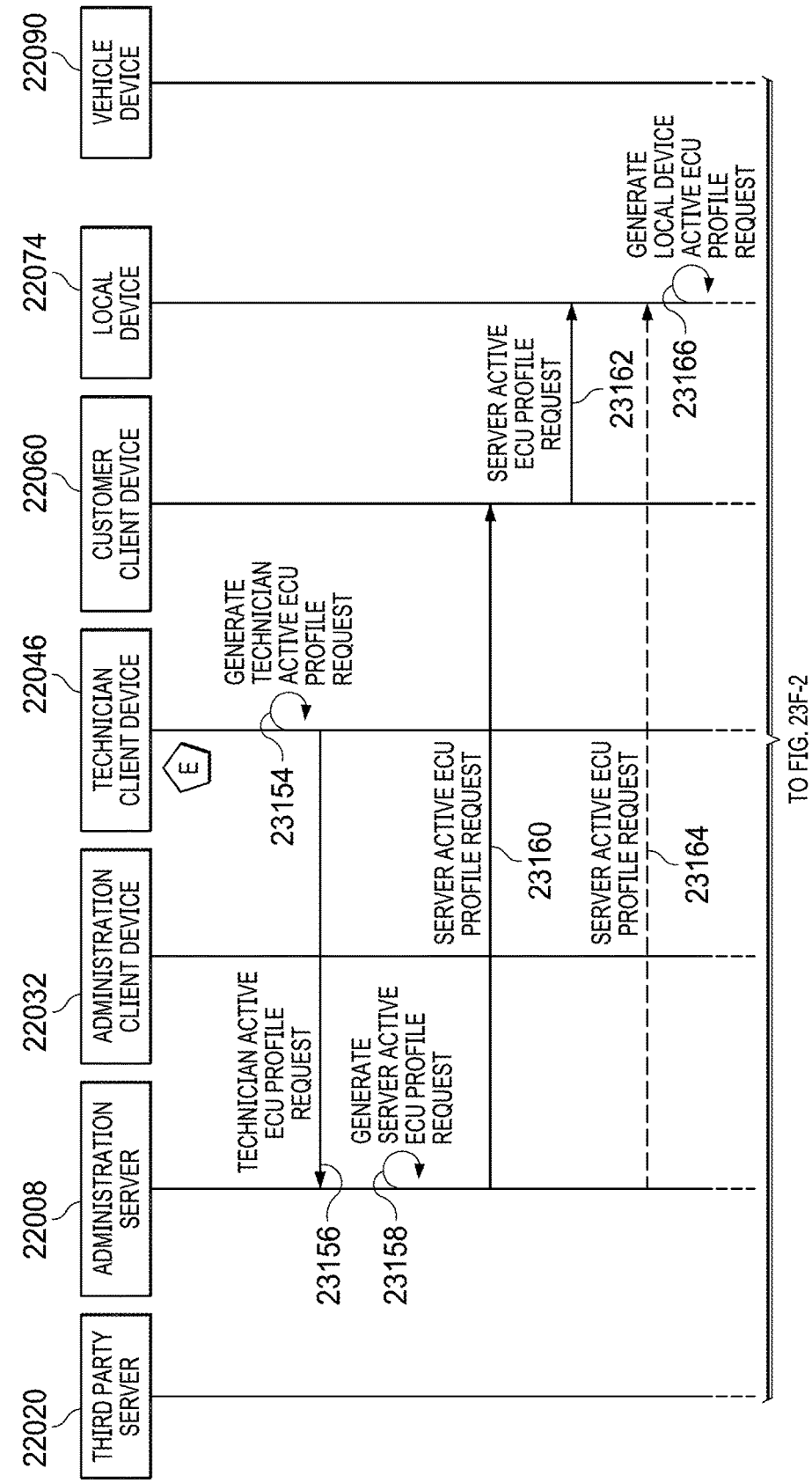

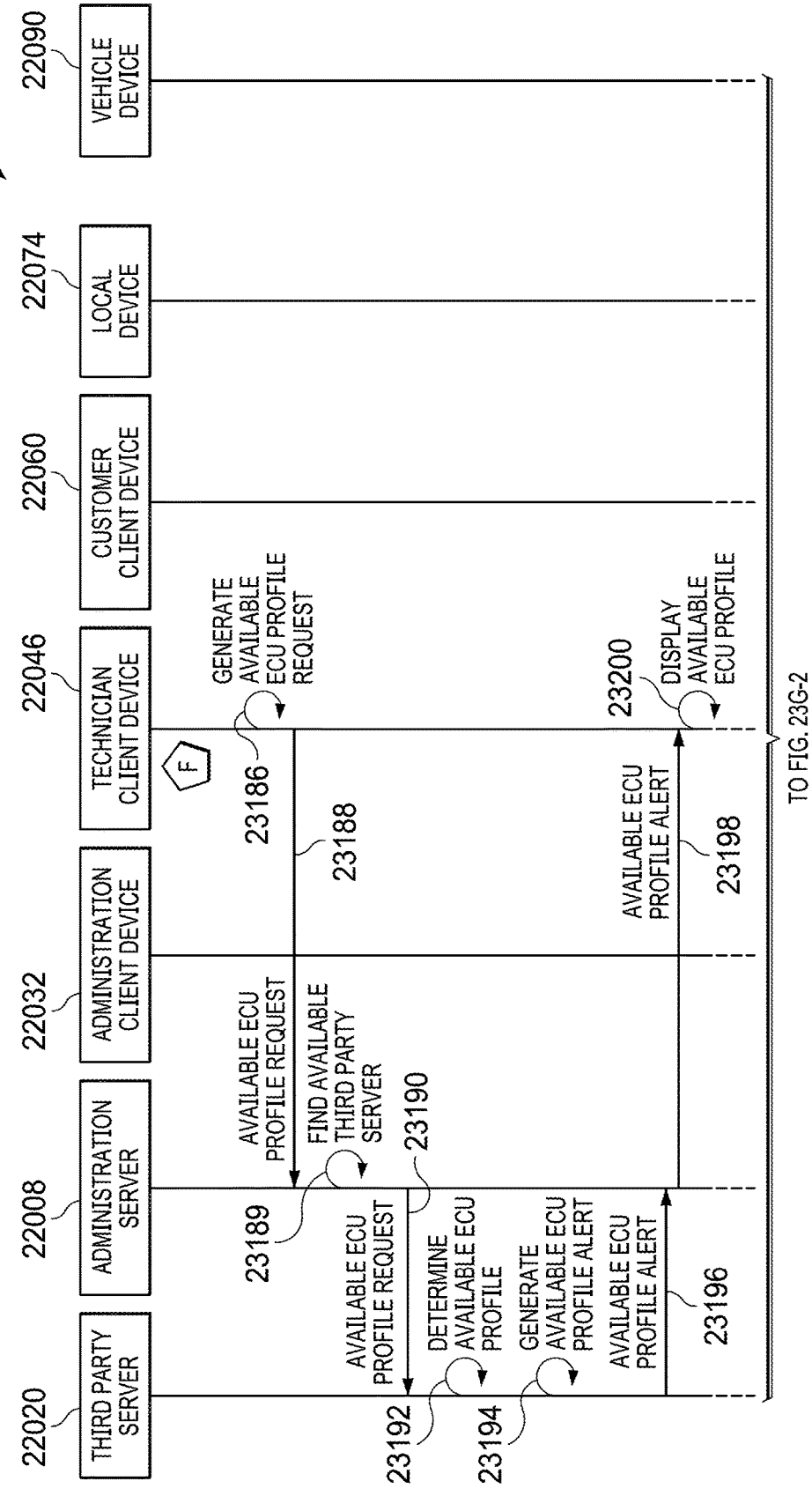

| ◇ ≡ZLYNK ECU EDITOR | | | | First Profile ⌄ |
|---|---|---|---|---|
| Favorites | Diagnostics ☆ | | | |
| Q Search | Tiers: Full access  2712 | | | |
| Line press. reverse engagements | Parameter | Value | INFO | |
| Line press. during shift | | | ENABLE/DISABLE FOR DTC  2714 | |
| Solenoid Control ⌄ | P0605 diagnostics | Enable ⌄ | | |
| PC1 solenoid translation table | P0607 diagnostics | Enable ⌄ | | |
| PC2 solenoid translation table | P0884 diagnostics | Enable ⌄ | | |
| PC3 solenoid translation table | P06B8 diagnostics | Enable ⌄ | | |
| PC4 solenoid translation table | P1001 diagnostics | Enable ⌄ | NOTES | |
| PC5 solenoid translation table | P1397 diagnostics | Enable ⌄ | Click here to edit notes about P0605 | |
| CPC solenoid translation table | P1501 diagnostics | Enable ⌄ | diagnostics. Notes are viewable by you only. | |
| LPC solenoid translation table | P1635 diagnostics | Enable ⌄ | | |
| Torque Management | | | | |
| Transmission Failure Prevention | | | | |
| Cooling Reduction Mode ⌄ | | | | |
| Line press. during CRM | | | | |
| Max. line press. during CRM | | | | |
| Closed Loop Adaptive Control ⌄ | | | | |
| Min. adaptive torque stored | | | | |
| Max. adaptive torque stored | | | | |
| Custom Options | | | | |
| Diagnostics ↲ | | | | |

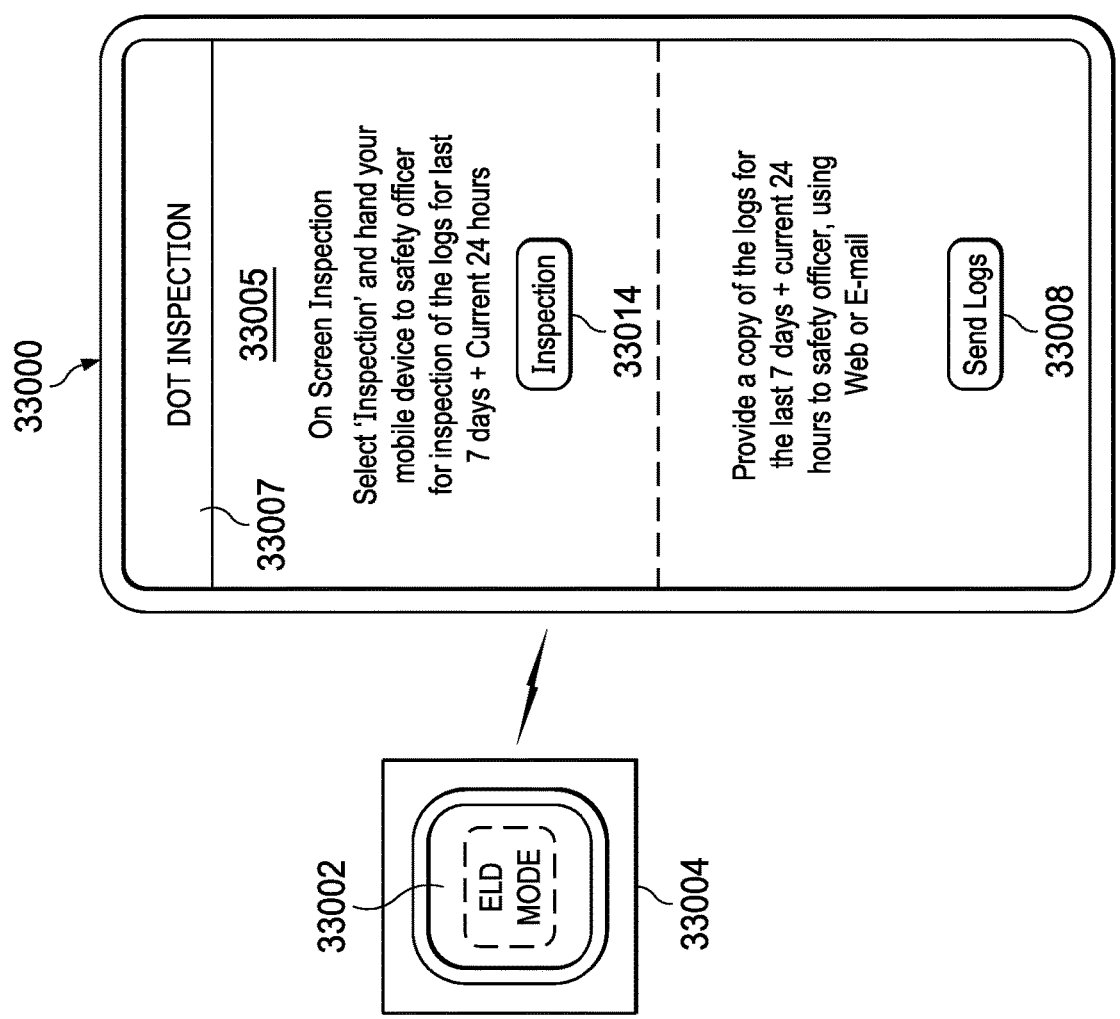

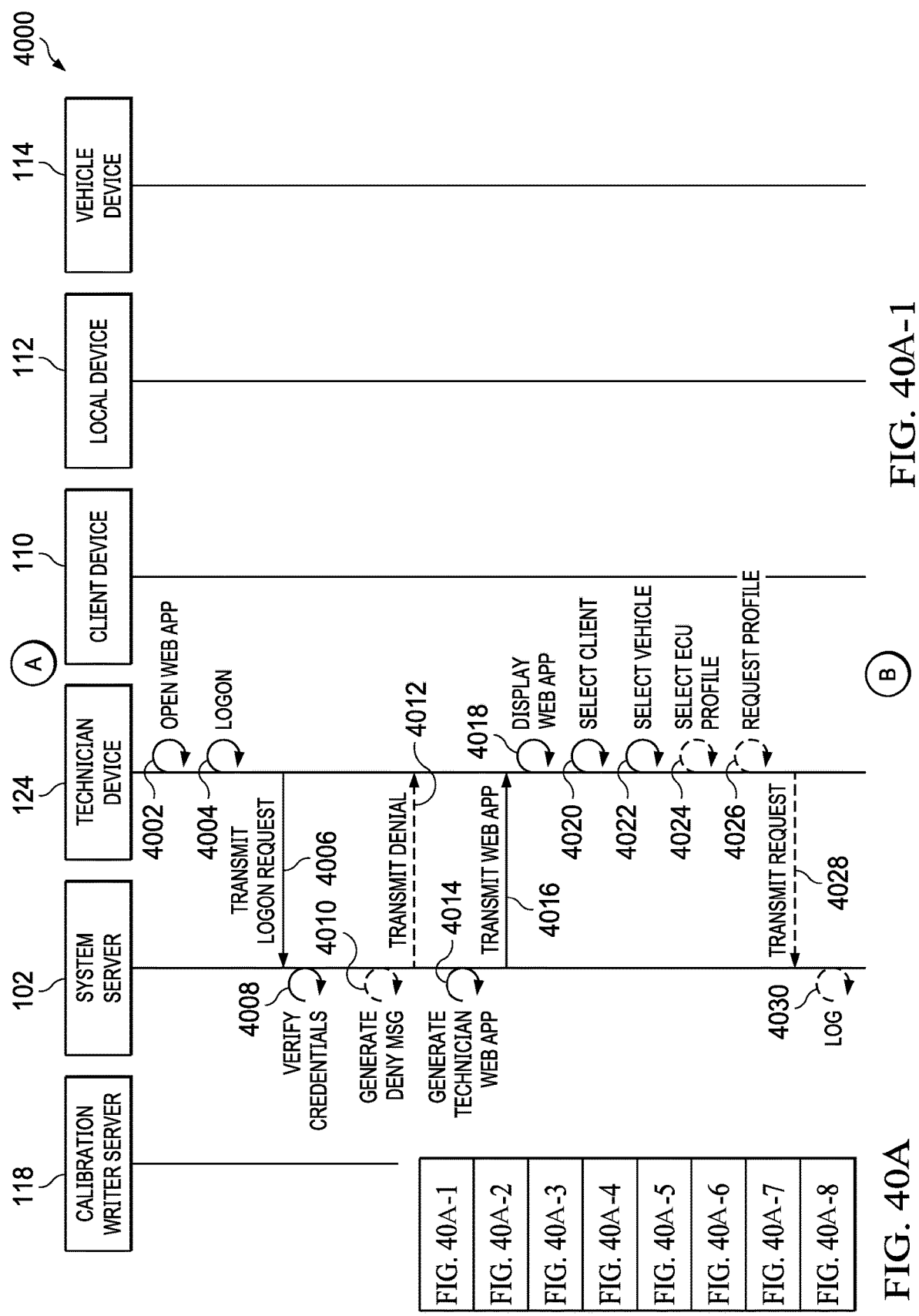

FIG. 41B

≡Z LYNK

ECU Profiles  PUBLIC (27)  DRAFT (12)  Test Technician 1234

QUICK FILTERS  [ Ford ]  [ GMC/Chevrolet ]  [ Dodge Ram ]  [ Nissan ] ← 4328  [+ New]

Cal ID ▼ ← 4322  Applicable Vehicles ← 4324  ECU Profiles ← 4326

| | | |
|---|---|---|
| 📁 IMPORTED | Imported proprietary ECU Profiles | 1 profile |
| 📁 F1314T67 | 2013-2014 Ford Superduty F-250/F-350 6.7L Diesel | 16 profiles |
| 📁 F1516T67 | 2015-2016 Ford Superduty F-250/F-350 6.7L Diesel | 8 profiles |

Supported Vehicles
Custom ECU Configurations Guide
J2534 Reprogramming Guide ← 4330

| | | |
|---|---|---|
| 📁 F1314C67 | 2013-2014 Ford Superduty F-250/F-550 6.7L Diesel | 16 profiles |
| 📁 F1516C67 | 2015-2016 Ford Superduty F-250/F-550 6.7L Diesel | 18 profiles |
| 📁 F1718C67 | 2017-2018 Ford Superduty F-250/F-550 6.7L Diesel | 0 profiles |
| 📁 F1920C67 | 2019-2020 Ford Superduty F-250/F-550 6.7L Diesel | 0 profiles |

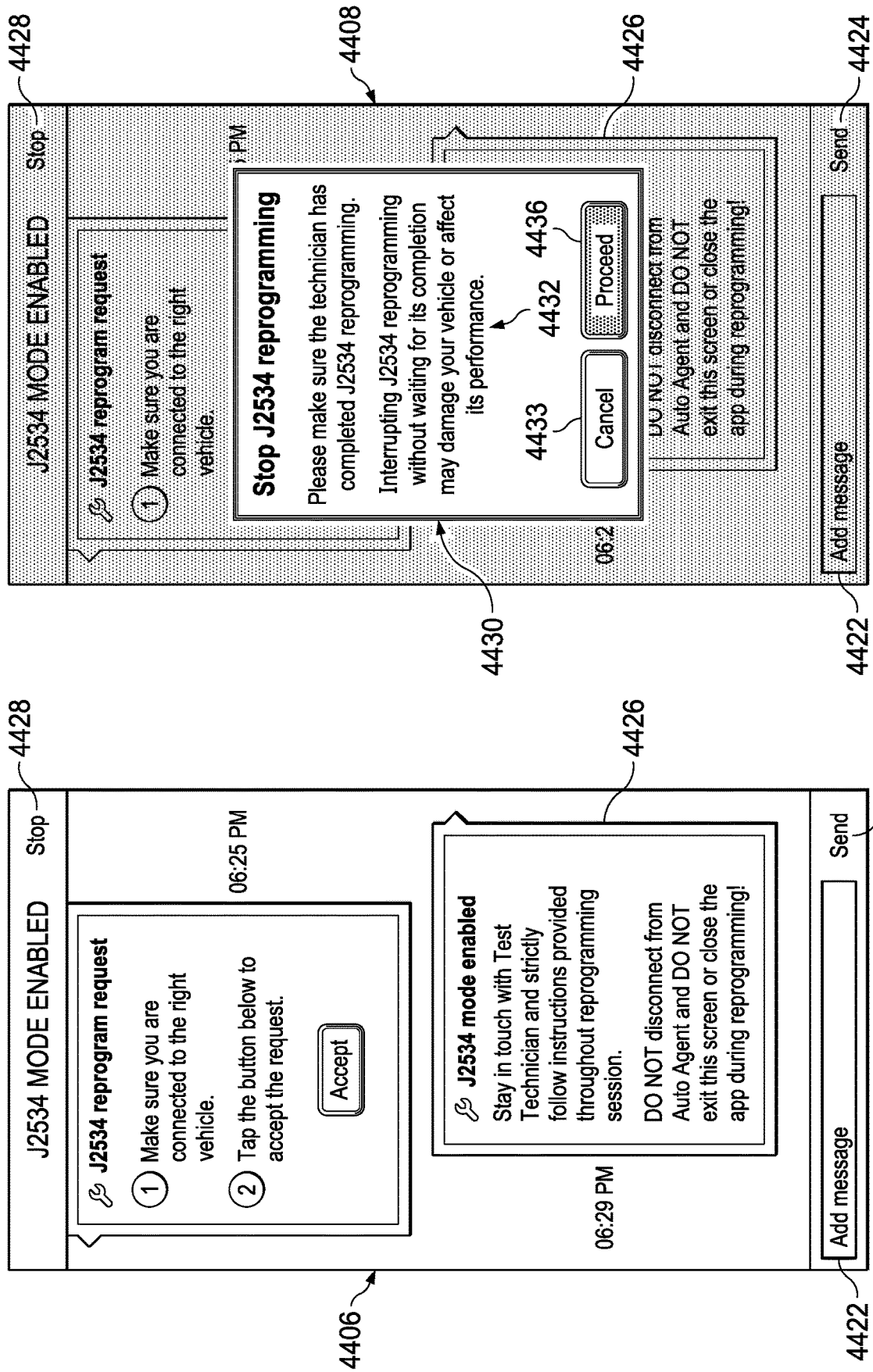

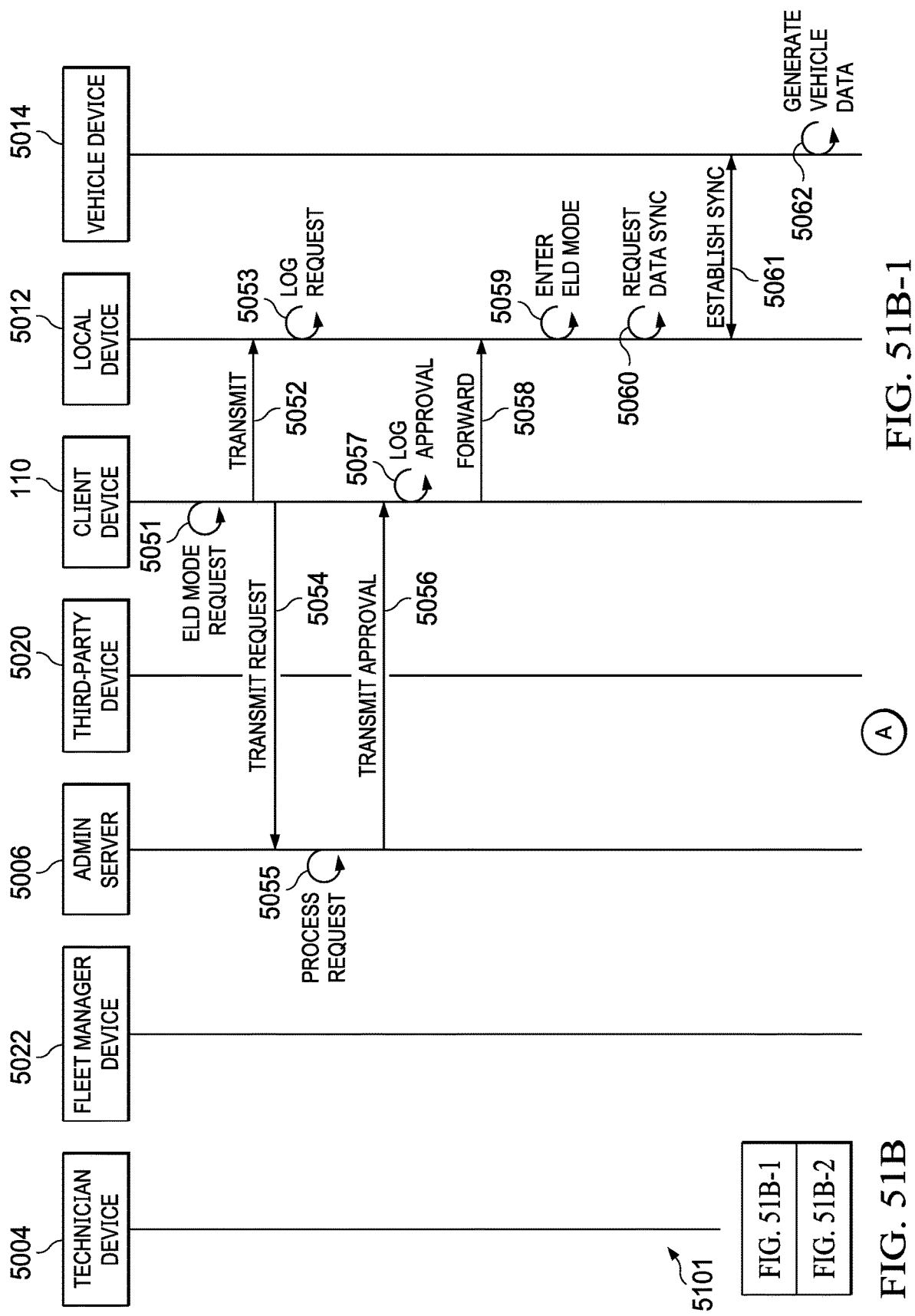

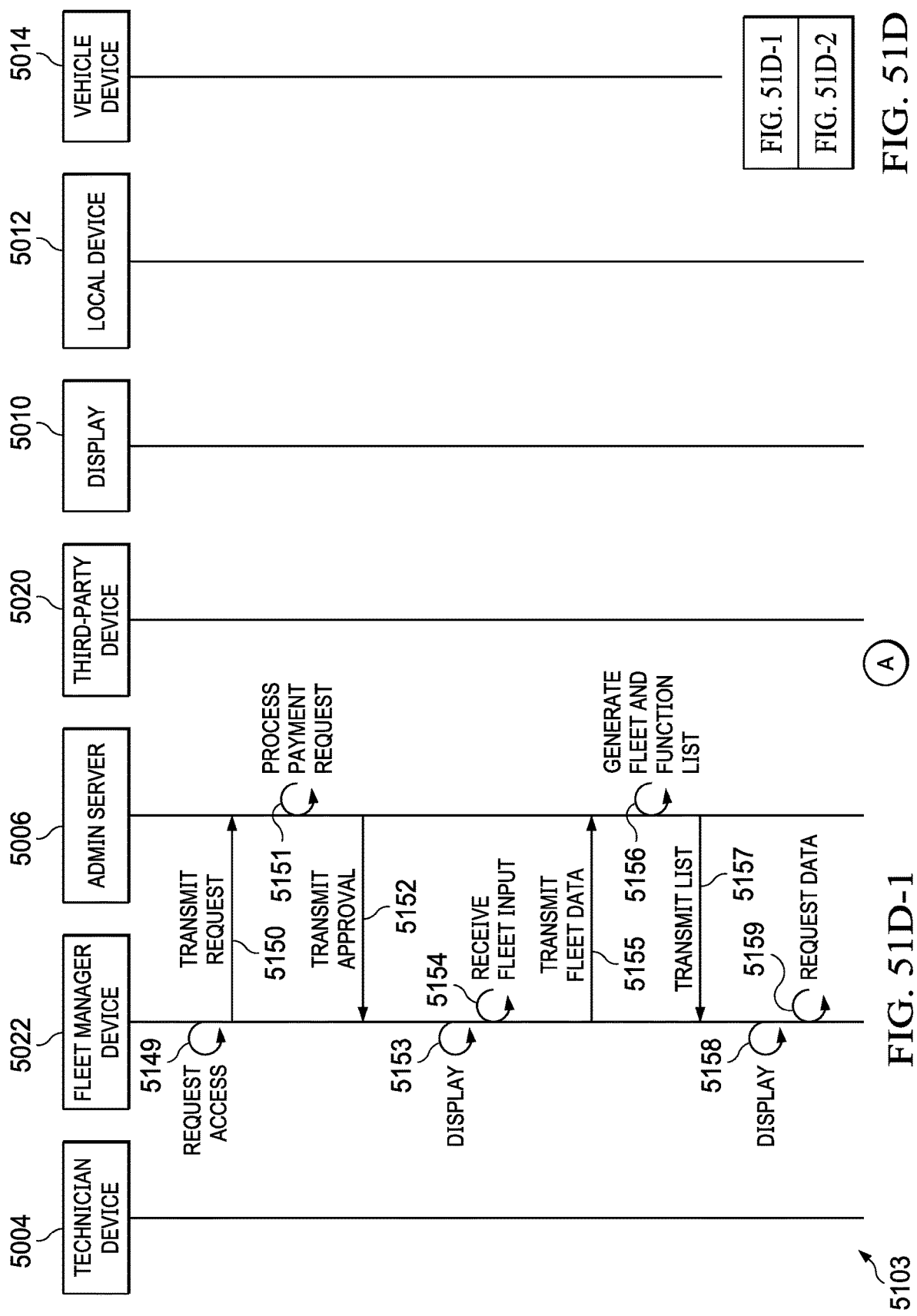

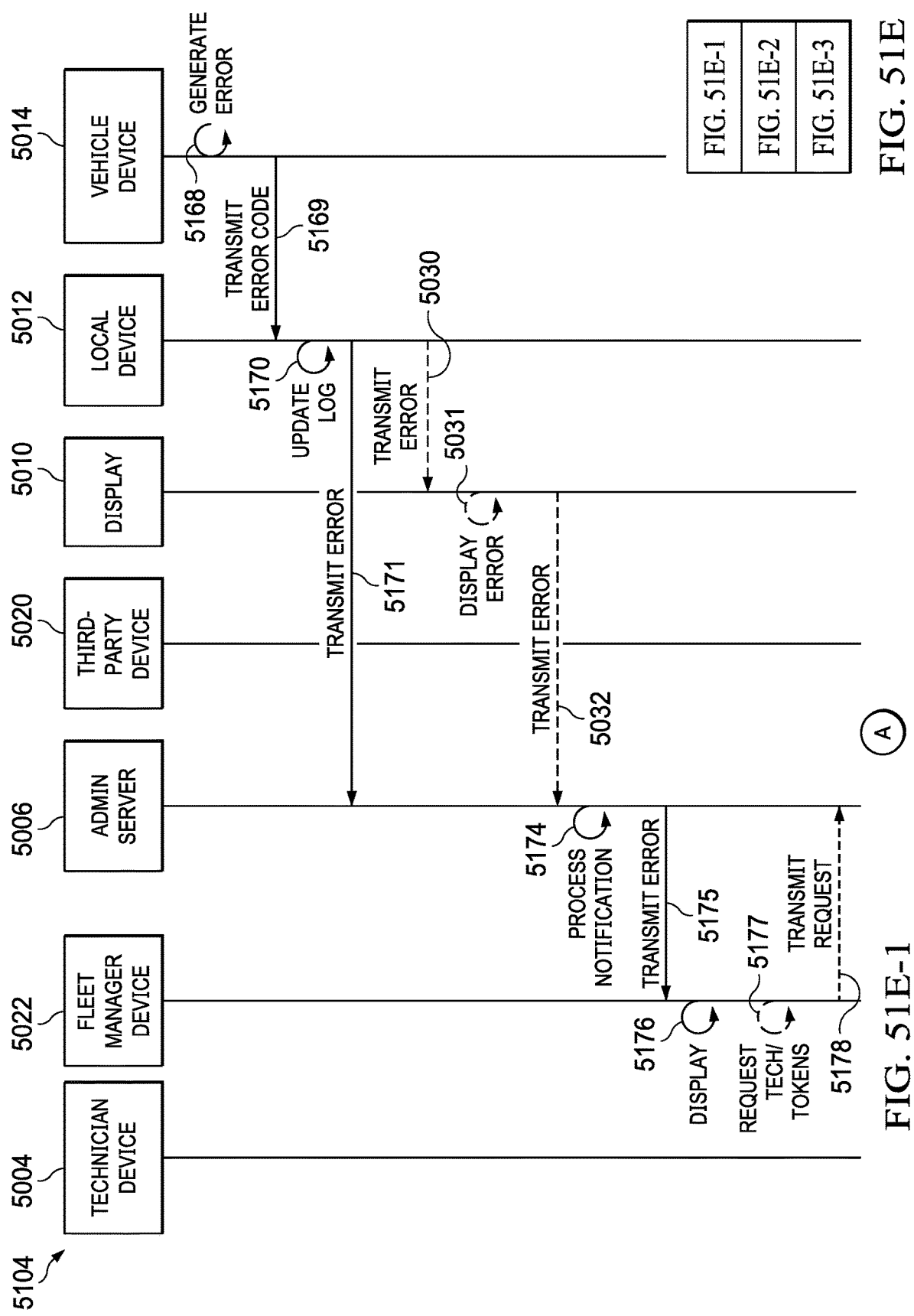

SYSTEM AND METHOD FOR REMOTE EMISSIONS CONTROL UNIT MONITORING AND REPROGRAMMING

CROSS REFERENCE TO RELATED APPLICATIONS

This application is a continuation in part of U.S. application Ser. No. 16/805,454 filed Feb. 28, 2020, which is a continuation in part of U.S. application Ser. No. 16/673,907 filed Nov. 4, 2019, which is a continuation in part of U.S. application Ser. No. 16/673,873 filed Nov. 4, 2019, which is a continuation in part of U.S. application Ser. No. 16/049,670 filed Jul. 30, 2018, which is a continuation in part of U.S. application Ser. No. 15/884,246 filed Jan. 30, 2018, now U.S. Pat. No. 10,037,633, granted on Jul. 31, 2018, which is a continuation in part of U.S. application Ser. No. 15/228,926 filed Aug. 4, 2016, which claims priority to U.S. Provisional Application No. 62/201,462 filed Aug. 5, 2015. Each of the applications listed above is incorporated herein by reference in their entirety.

BACKGROUND OF THE INVENTION

An engine control unit or an "ECU" is a widely used type of electronic controller that monitors sensor output and controls a series of actuators on an internal combustion engine to ensure optimal engine performance. It does this by reading values of a multitude of sensors in the vehicle and storing and interpreting the data it receives using data structures, such as lookup tables. These lookup tables may be used to monitor the accuracy of the sensors or to adjust engine actuators appropriately.

The ECU monitors various sensors on the automobile such as the odometer and sensors for oxygen level, coolant temperature, mass air flow, air intake temperature, crank shaft angle, throttle position, cam shaft angle, and engine knock. Communicated packets include information from the odometer, while lookup tables provide feedback information for adjustment and control of ignition timing, cam shaft position, fuel injector input, fuel pump input, fuel pump pressure, cooling fan speed, admission control systems, forced air induction controls, traction controls, and transmission gear selections. In many situations, ECUs also send error codes to the vehicle dashboard to indicate immediate problems, such as overheating, or maintenance requirements, like oil changes. In some cases, the error codes activate warning lights which are deactivated after repair.

Certain classes of ECUs are programmable. Modern ECUs incorporate a microprocessor which can process inputs from engine sensors in real time. The microprocessor stores its programming in memory or e-proms attached to the CPU of the microprocessor.

Programmable ECUs are used, for example, where significant aftermarket performance enhancing modifications have been made. Such modifications often include the addition of a turbo charger, intercooler or modified exhaust system. Programmable ECU's are also used for several vehicle systems, such as engine control module (ECM), transmission control module (TCM), body control module, anti-lock brake system (ABS), airbag control module, and so on, that each receive routine updates from the manufacturer of the vehicle. Each ECU is remapped or reprogrammed to adapt the performance of the involved system to match the required modifications and/or to update the software and parameters of the ECU. Other changes for high performance engines which can be remapped or reprogrammed in an ECU include ignition position, timing, RPM, coolant temperature, transient fueling, low fuel pressure modifiers and a closed loop lambda (in order to modify a target air/fuel ratio), turbo charger waste gate control, staged fuel injection, variable cam timing, gear control, and turbo charger anti-lag.

The ECU may be integrated and synchronized with one or more additional electronic devices to perform one or more additional functions. One such device is the electronic logging device (ELD), which may be used together with the ECU to record driving time, for easier, more accurate hours of service (HOS) recording.

Vehicle manufacturers utilize a number of different communications protocols for diagnosing and reprograming a vehicle's ECU. Until recent years a different diagnostic/service device was required for each communication protocol. As a result, third-party automotive technicians would either need to have a device for every communication protocol in order to service all vehicles, or turn away clientele. In 2002 the Society of Automotive Engineers (SAE) developed the J2534 standard in an effort to standardize aftermarket emissions related services, and comply with EPA, California Air Resources Board (CARE) mandates geared towards reducing harmful emissions.

The SAE J2534 standard allows for aftermarket flash re-programming of emissions related modules (ECM/TCM). J2534 standard requires a compliant J2534 hardware device with SAE J1962 OBDII connector, J2534 Application and DLL file, and a J2534 compliant OEM API. The standard utilizes a number of universal communication functions that allow a computer to communicate with any vehicle ECU regardless of the communications protocol used by the vehicle, such as: PassThruConnect; PassThruDisconnect; PassThruReadMsgs; PassThruWriteMsgs; PassThruStartPeriodicMsg; PassThruStopPeriodicMsg; PassThruStartMsgFilter; PassThruStopMsgFilter; PassThuSetProgrammingVoltage; PassThruReadVersion; PassThruGetLastError; and PassThruloctl. The communication protocols supported by the J2534 standard are; ISO9141, ISO14230 (KWP2000), J1850, CAN (ISO11898), ISO15765, SAE J2610, and J1939.

The EPA, CARB and a number of other environmental agencies encourage the reduction of carbon emissions by changing population behavior. For example, activities such as walking, biking, driving fuel efficient or electric vehicles, and keeping tires inflated are encouraged. An alternative means of reducing carbon emissions is participation in a carbon offset program. In theory, a carbon offset program balances carbon emissions by funding renewable energy and energy efficient projects. For instance, planting trees theoretically offsets vehicle emissions. To encourage participation in carbon emission reduction and offset programs many local agencies provide incentives in the form of tax reduction. In order to benefit from carbon offsets, carbon emissions must be calculated and certified by a third-party agency that meets certain standards such as, the Quality Assurance Standard (QAS), Verified Carbon Standard (VCS), the Gold Standard Voluntary Emission Reductions (VER), and the Certified Emission Reductions (CER) standard.

Generally, "heavy-duty" vehicles, such as commercial trucks (e.g. 18 wheelers, garbage trucks, delivery trucks) and buses, are required to comply with a larger number of regulations and reporting requirements than consumer vehicles, For instance, as part of the Cleaner Trucks Initiative, the EPA regulates heavy-duty vehicles in an effort to reduce carbon emissions. Generally, these vehicles tend to operate on diesel engines, however other gasoline or spark ignition vehicles are regulated as well. The EPA regulates all vehicles with a gross vehicle weight over 14,000 pounds, and certain vehicles with a gross vehicle weight between 8,500 and 14,000 pounds. A vehicle's ECU and emissions control system must meet certain functional and operational requirements to be compliant with EPA regulations. As yet another example, the Federal Motor Carrier Safety Administration (FMCSA) has strict regulations which require heavy-duty vehicles to utilize an electronic logging device (ELD) to logs hours of service (HOS). These logs, or records of duty (RODs) must be accessible during any safety audit, and reported to motor carriers for every 24-hour period.

BRIEF DESCRIPTION OF THE DRAWINGS

FIGS. 4A and 4B are a sequence diagrams of a method for updating an automotive controller based on data from the automotive controller.

FIG. 5A is a diagram of a user interface of a preferred embodiment for a multiple gauge view with eight gauges.

FIG. 5B is a diagram of a user interface of a preferred embodiment for dragging and dropping a gauge.

FIGS. 13A and 13B are diagrams of a user interface of a preferred embodiment for selecting units of a gauge.

FIGS. 14A through 14E are diagrams of a user interface of a preferred embodiment for a multiple gauge view with five gauges.

FIGS. 18A and 18B are diagrams of a user interface of a preferred embodiment for data log management.

FIG. 22 is a diagram of a system for cloud based technician access to vehicle data.

FIGS. 23A through 23G is a sequence diagram of a method for cloud based technician access to vehicle data.

FIGS. 27A through 27K are diagrams of user interfaces for cloud based updates to ECU profiles.

FIGS. 33A through 33E are diagrams of graphic user interfaces of a preferred embodiment.

FIG. 34 is a flowchart of a method of generating a certified log of a preferred embodiment.

FIGS. 41B and 41C are screenshots of a user interface for cloud based technician access to vehicle data and software updates.

FIG. 42 is a screenshot of a user interface for cloud based administrator access to upload software of a preferred embodiment.

FIGS. 44A through 44E are screenshots of a technician user interface of a preferred embodiment.

DETAILED DESCRIPTION OF THE INVENTION

Figure 1:
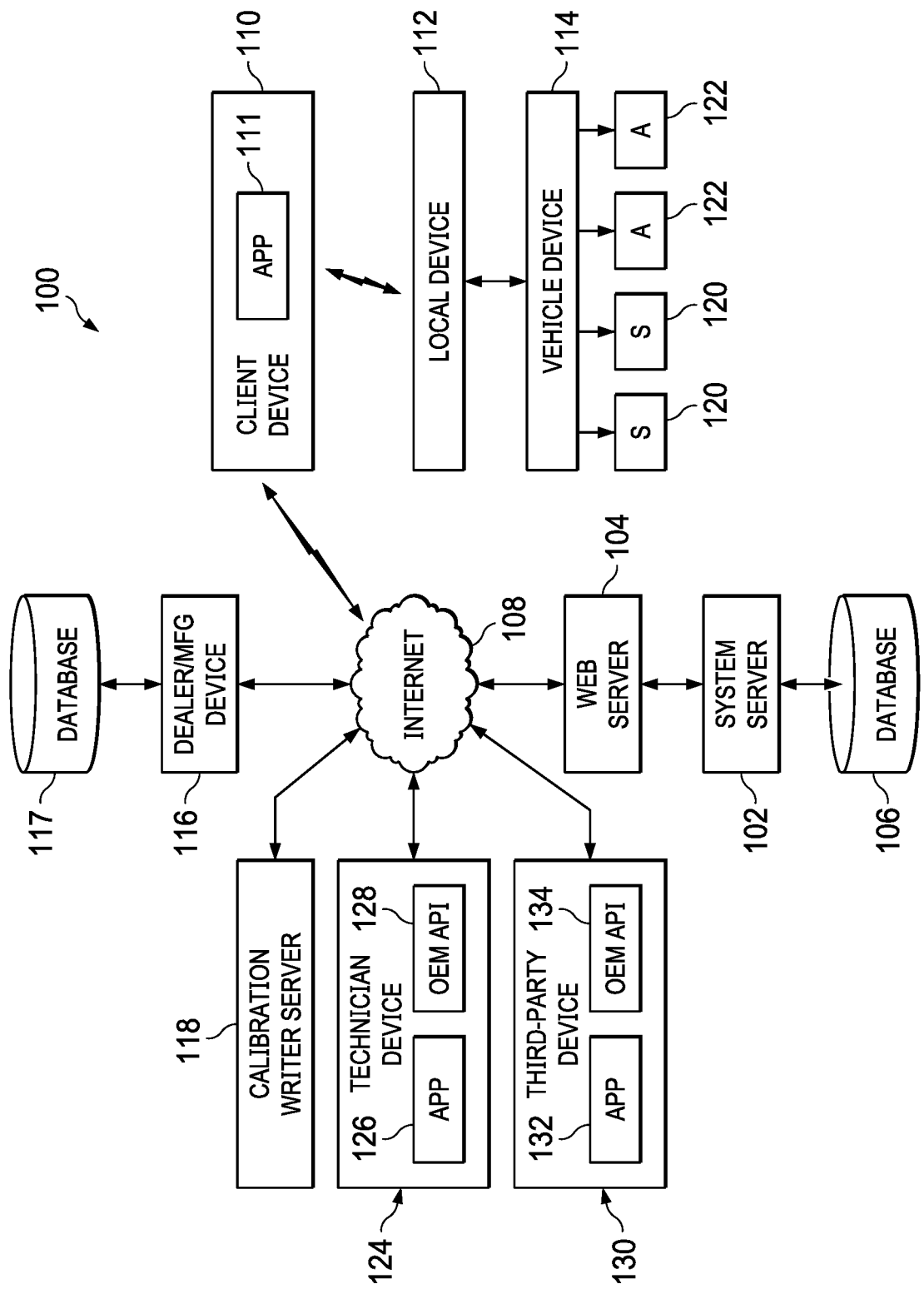
FIG. 1 is a system diagram of a cloud based automotive technician system.

Referring to FIG. 1, system 100 is provided. System 100 includes system server 102 connected to internet 108 through web server 104. The system server also includes database 106.

Client device 110 is connected through a mobile network to internet 108 and contains application 111. Client device 110 is also connected to local device 112. Local device 112 is a J2534 compliant hardware device and can be fitted with a SAE J1962 OBDII connector. In a preferred embodiment the local device establishes a Wi-Fi or Bluetooth connection between the client device and the automobile. Local device 112 is hardwired to an automotive controller, such as vehicle device 114. Vehicle device 114 is connected to sensors 120 and actuators 122 resident on the vehicle. The sensors and actuators communicate with the onboard controller through a CAN BUS (also known as a controller area network (CAN) bus) as is known in the art.

Client device 110, acts as a client of system server 102, and as a client of local device 112. Embodiments of client device 110 include any handheld wireless device, such as, a smart phone, a tablet computer, a notebook computer, a netbook computer, and so on.

Technician device 124 and third-party device 130 are connected to internet 108 and communicate through the internet to system server 102, and dealer device 116. Technician Device 124 contains J2534 application 126 and OEM API 128. Third-party device 130 contains J2534 application 132, and OEM API 134. Embodiments of OEM API 128 and 134 include a J2534 compliant vehicle manufacturer application program for the analysis and reprogramming of vehicle device 114. J2534 application 126 and 132 include a J2534 DLL file with J2534 compliant functions and routines for communication between local device 112 and client device 110, technician device 124, and third-party device 130.

Dealer device 116 is also connected to internet 108 and communicates through the internet to technician device 124 and third-party device 130. Dealer device 116 is contains database 117. In a preferred embodiment dealer device 116 stores application files for OEM API 128 and 134. Similarly, calibration writer server 118 is connected through the internet to system server 102 and client device 110.

Figure 2A:
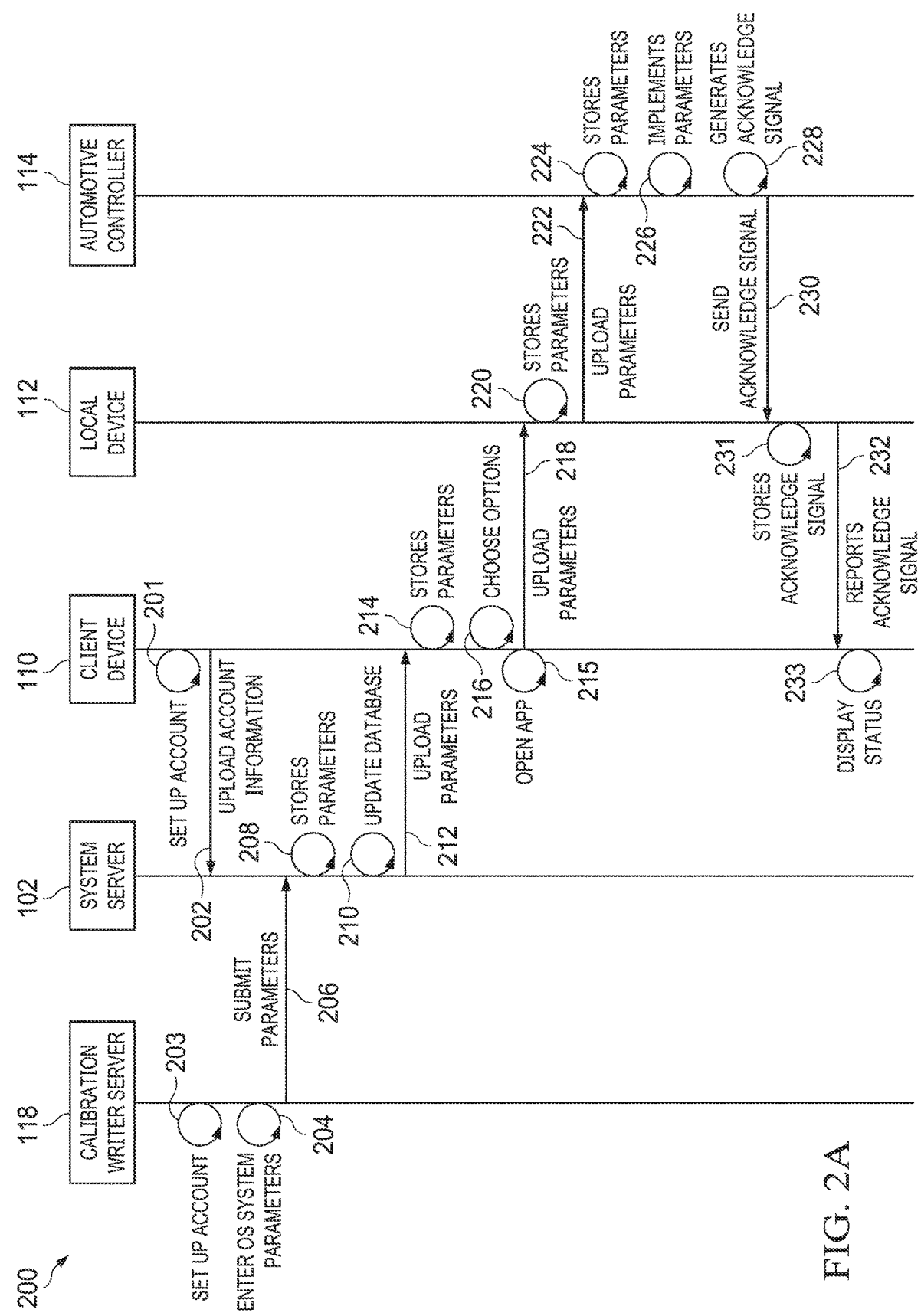
FIG. 2A is a sequence diagram of a method for updating parameters on an automotive controller.

Referring to FIG. 2A, operation of a preferred embodiment 200 will be described. In use, the device allows recording and viewing of automobile information, diagnostics, automobile updates for onboard computers, and data logging to allow study of driving habits to research fuel economy.

At step 201, the client device opens the application and sets up an account by entering certain demographic information. At step 202, the application uploads the account information to system server 102.

At step 203, the calibration writer server sets up an account through a form served up through the internet from the system server. The calibration writer server includes account information such as name, address, email address, and submit computer Cal/Pid. At step 204, calibration writer server inputs a set of operating system parameters which include programming information and look up tables for the onboard controller. At step 206, the parameters are submitted to system server 102. At step 208, system server 102 stores the parameters and the account implementation. At step 210, the database is updated by the system server with the new parameters and associated with the calibration writer server. At step 212, the system server uploads the parameters to client device 110 via a wireless network.

In an alternative embodiment, a technician downloads the parameters or firmware from calibration writer server 118 via a web browser. The technician then uses system server 102 to download the updated parameters or firmware to client device 110.

At step 214, a client device stores the parameters. At step 215, client device opens an application (or "App") which displays the parameters and certain options to the user. At step 216, the client device receives options from the user as to which parameters to implement. At step 218, the chosen parameters are uploaded to the local device via a Wi-Fi or Bluetooth connection. At step 220, the local device stores the parameters and initiates certain timing functions such as onboard recording and storage of data.

At step 222, the chosen parameters are uploaded to the vehicle device. Step 222, may further include local device 112 using Socket_CAN, or an open source driver and network stack that is compatible with the vehicle device. For example, vehicle device 114 may be configured to use a communication protocol including, but not limited to, SAE J/1979, SAE 2190, ISO-14230-3, ISO-14229.2006, a CAN protocol, and combinations thereof. Local device 112 is configured to receive communications in a first communication protocol (e.g., JavaScript Object Notation JSON message), and then forward them, or data from them, in the proper communication protocol for vehicle device 114.

At step 224, the vehicle device stores the new parameters and lookup tables. At step 226 the vehicle device implements the new parameters and lookup tables. Step 226 further includes reprogramming or remapping the firmware of the vehicle using a bootfile. Step 226 may also include a check to see if previous updates or programming operations failed. If the updates or operations failed, then a reflash recovery operation is performed. The reflash recovery operation may include sending or re-sending a seed or key for a diagnostics login, getting the failed update file, reading data from the file, downloading a bootfile, erasing a sector, downloading sector data to the appropriate module (e.g., ECM), iterating the erasing and downloading of sector data for multiple sectors of the appropriate module, and resetting the module. Upon completion of the reflash recovery operation, the downloading of the new configuration file and installing of the customer modifications proceeds.

At step 228, the vehicle device generates an acknowledge signal. At step 230, the acknowledge signal is sent to the local device. At step 231, the local device stores the acknowledge signal. At step 232, the local device reports the acknowledge signal to client device 110 via the WiFi or Bluetooth connection. At step 233, the client device stores the acknowledge signal and the App displays the status of the local device and the uploaded parameters.

Figure 2B:
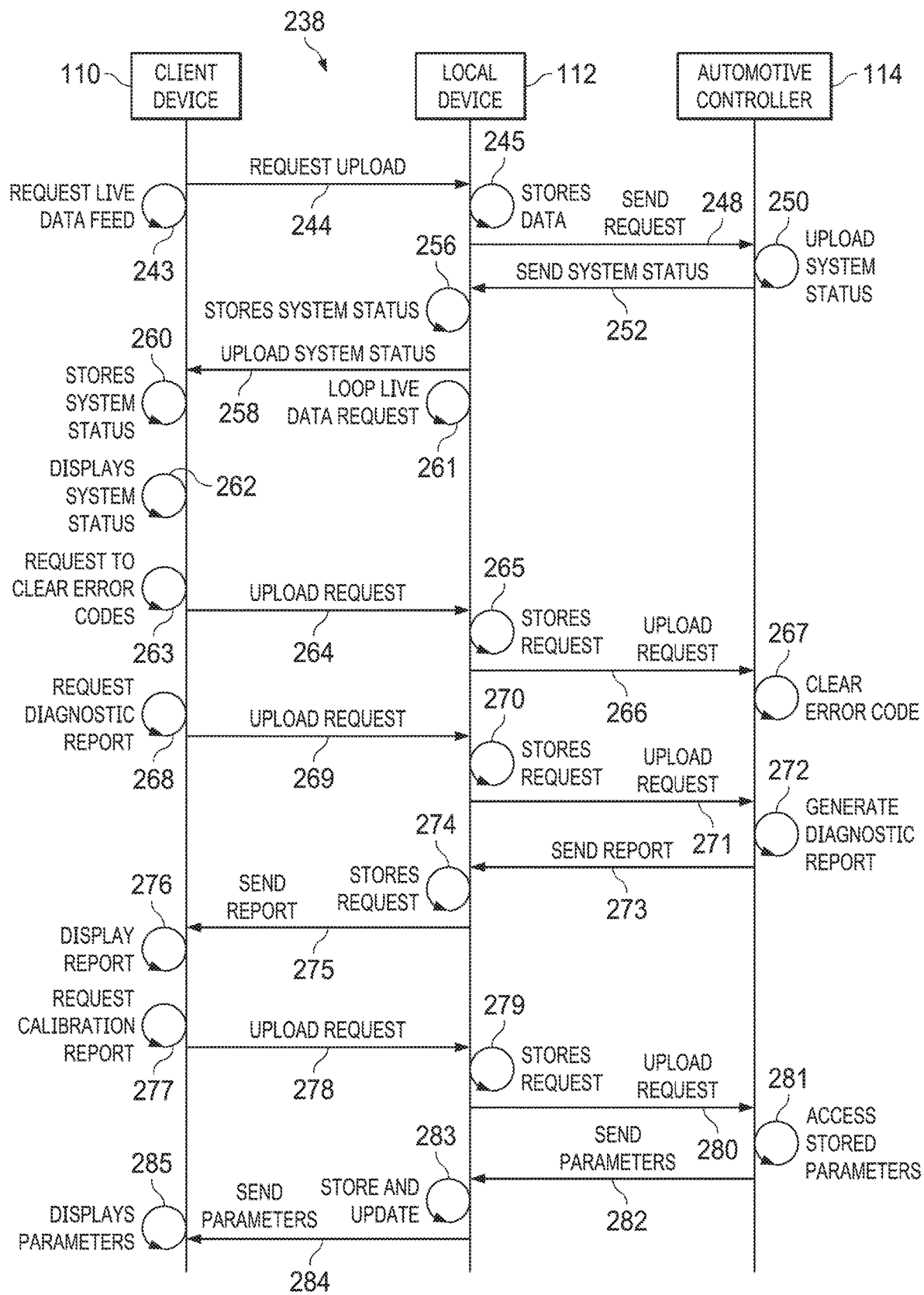
FIG. 2B is a sequence diagram of a method for interaction with an automotive controller and a client device.

Referring to FIG. 2B, an alternate preferred embodiment 238 is described. At step 243, the client device requests a target for a feed of live data from the vehicle device. Step 244, the client device transmits the upload request to the local device. At step 245, the local device stores live data request. At step 248, the local device sends a request for live data to vehicle device 114. At step 250, the vehicle device uploads the system status from the automobile to the local device. At step 252, the system status is sent to the local device. At step 256, the local device stores the system status. At step 258, the local device uploads the system status to client device 110. At step 260, client device stores the system status. At step 261, the local device enters a loop to repeatedly request system status ("live data") from the vehicle device. At step 262, the App displays the system status. The display is refreshed as updated system status is received from the local device.

At step 263, client device 110 chooses an option on the application to clear error codes. At step 264, the request is uploaded to the local device. At step 265, the request is stored in memory on the local device. At step 266, the request is uploaded to the vehicle device. At step 267, the vehicle device acknowledges the request and clears the error code.

At step 268, the client device chooses an option on the application to request a diagnostic report. At step 269, the request is uploaded to the local device. At step 270, the local device stores the request. At step 271, the local device uploads the request to the vehicle device. At step 272, the vehicle device generates the diagnostic report. At step 273, the diagnostic report is sent to the local device. At step 274, the local device stores the diagnostic report, according to date and time, in memory. At step 275, the diagnostic report is sent to the client device. At step 276, the diagnostic report is displayed according to the request of the user.

At step 277, the client device, through use of the application requests a calibration report. At step 278, the calibration request is uploaded to the local device. At step 279, the local device stores the request for calibration. At step 280, the local device forwards the request to the vehicle device. At step 281, the vehicle device accesses the currently stored parameters and the calibration. At step 282, the parameters are sent to the local device. At step 283, the local device stores the current set of parameters according a date and time stamp. At step 284, the local device sends the parameters to the client device. At step 285, the application on the client device displays the requested calibration parameters.

Figure 2C:
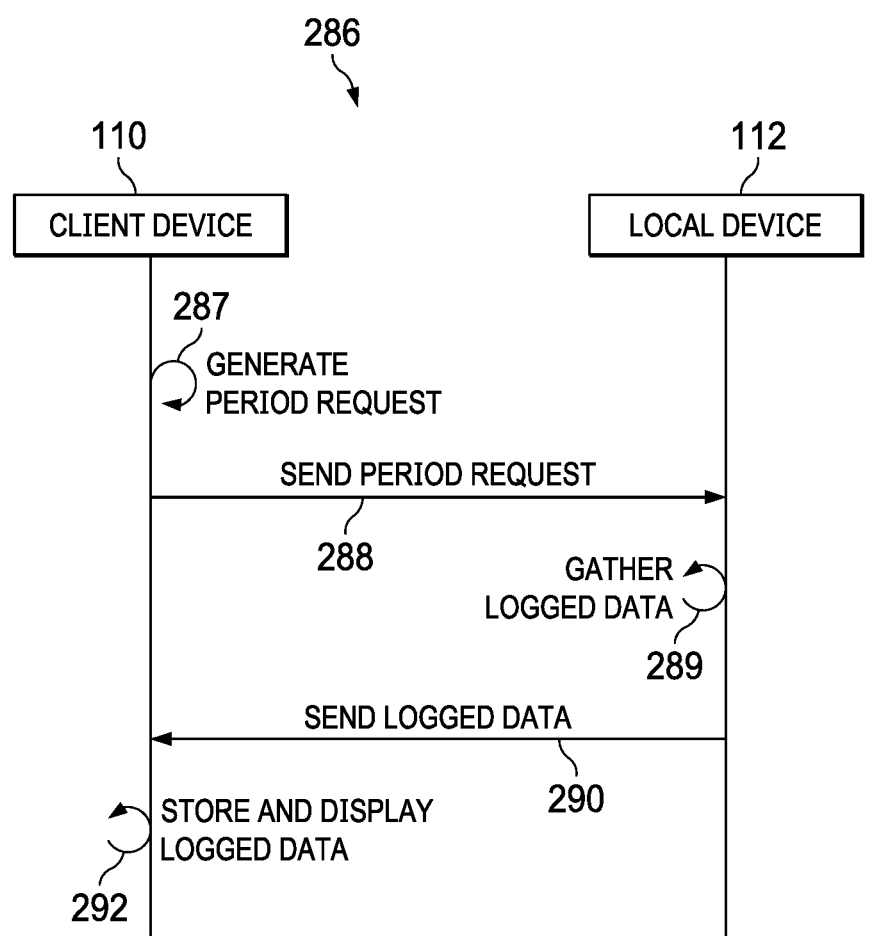
FIG. 2C is a sequence diagram of a method for interaction with a local device and a client device.

Referring to FIG. 2C, a third embodiment 286 is described. At step 287, client device 110 generates a period request. A period request is a request for a feed of logged data from the vehicle device for a specified period of time via local device 112. The period request for the logged data may be generated from customer client device 110. At step 288, the client device transmits the period request to local device 112. At step 289, local device 112 gathers logged data stored on the device sufficient to fulfill the amount of logged data required for the period request. At step 290, the local device performs a logged data transfer to client device 110.

At step 292, the client device stores and displays the logged data.

Figure 3:
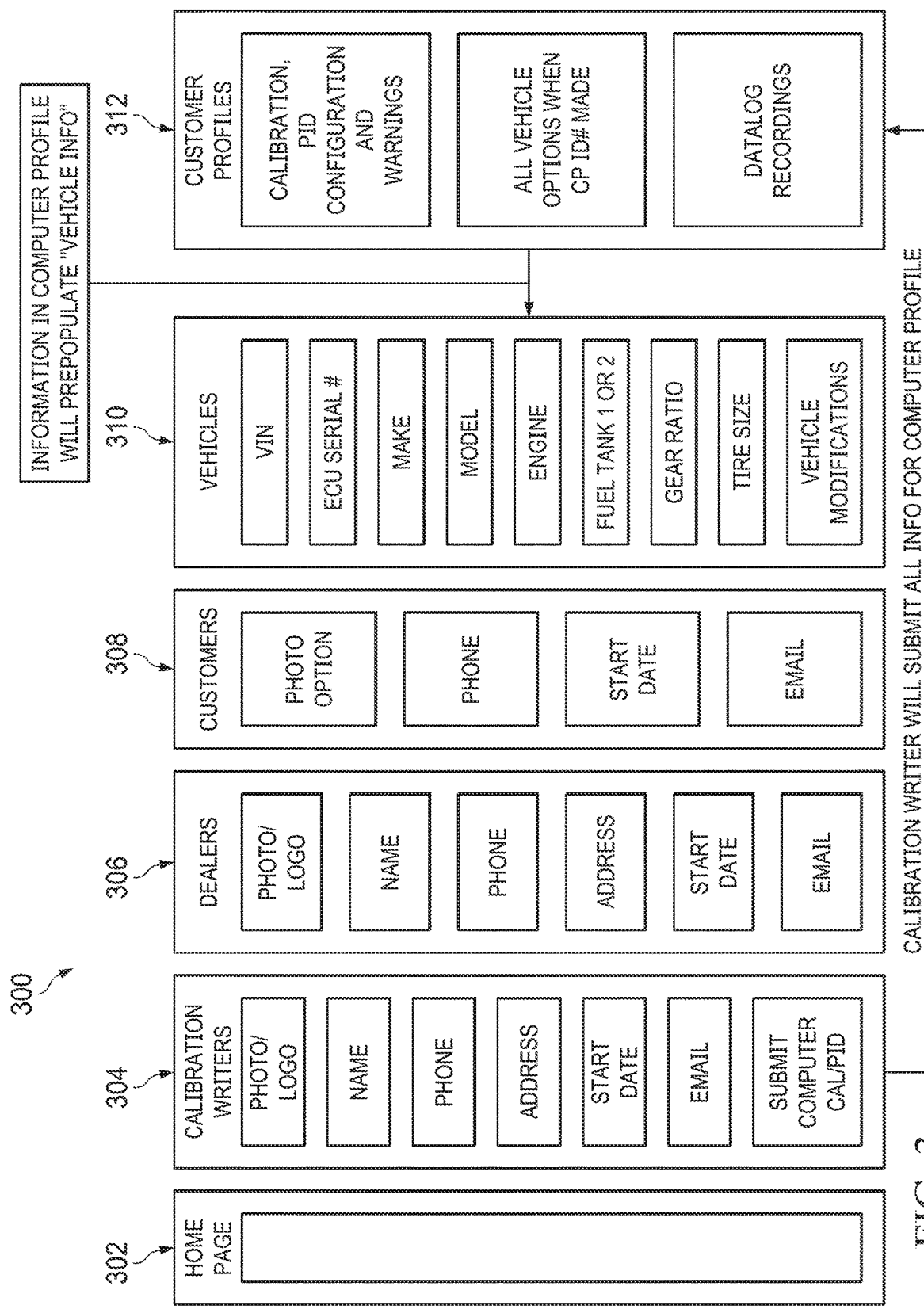
FIG. 3 is a block diagram of a cloud based automotive technician system.

Referring to FIG. 3, a schematic map 300 of the setup of system server 102 and certain functions of a preferred embodiment will be described.

System server 102 presents a set of webpages for the various users of the system through web server 104 using a user/password interface. At 302, 304, and 306 a schematic of the local home page is shown. Local home page provides options for a choice of a user type for each of calibration writer server, a dealer, and a customer or "end user." The database includes records for each vehicle 310 and each computer profile ID number 312. Each vehicle 310 includes vehicle identification number, ECU serial number, make, model, engine, fuel tank number, gear ratio, tire size and vehicle modification categories. Each record is associated with a particular vehicle entered into the system. Computer profile ID number 312 is a database entry including vehicle, calibration, PID configuration, and warning type. Computer profile ID number 312 also includes vehicle options and datalog recordings for each vehicle.

Calibration writers webpage 304 includes forms for entry of a data record for users who input engine control parameters. Each data record includes entries for photos or logos, name, phone, address, start date, email and computer Cal/Pid. When the form is complete, upon entry, system server 102 enters the data from the data form into a record into the database (e.g., logged data). The system server then copies the data record into one or more computer profiles having an ID number. Accordingly, the data records are associated with computer profile ID number 312. All reports generated by the automotive controller at the request of the local device are associated with current calibration of the vehicle when stored in memory. In some embodiments, the data in the record is then copied directly into memory at vehicles 310.

The dealers webpage 306 serves up a form for data entry including data related to photo/logo, name, phone, address, start date and email address. The "dealers" in some embodiments are maintenance shops which service vehicles but do not write calibrations. In other embodiments, the "dealers" include manufacturers or dealerships that write calibrations and service vehicles. For example, a customer may take their vehicle to a manufacturer or dealership for repairs, and may already have access to the web-based application. In this case, the manufacturer or dealership may choose to use, or have the customer use, the web-based application and supply its own calibration files.

The customers webpage 308 includes a form for entry of data including but not limited to, photo, phone number, start date and email address. The web form also enables the customer to request download of an application to be locally installed. The APP GUI provides access to the functions of the local device. In a preferred embodiment, the functions include but are not limited to, requesting a report of a current calibration, requesting a live report of engine status, requesting a diagnosis report, requesting that an error code be cleared, uploading a calibration update from a dealer or manufacturer, volume control, and combinations thereof.

The APP GUI also allows for vehicle modifications. The vehicle modifications may include one or more of: tuning parameters (i.e., a tune) for the vehicle; firmware updates for the vehicle; live vehicle data as received by a controller (e.g., vehicle device 114) of the vehicle; logged vehicle data as stored by local device 112, as stored by system server 102, or as stored by a database of system server 102; diagnostic reports, trouble codes, and parameter IDs; driver's records of duty (RODS); and combinations thereof. The vehicle modifications may be communicated using a communication protocol including, but not limited to, a telematics protocol (e.g., Ethernet, Wi-Fi, Post Office Protocol 3 (POP3), Internet Message Access Protocol (IMAP), Simple Mail Transfer Protocol (SMTP), Hyper Text Transfer Protocol (HTTP), etc.), or a local protocol (e.g., Bluetooth, USB 2.0, infrared, etc.).

Figure 4B:
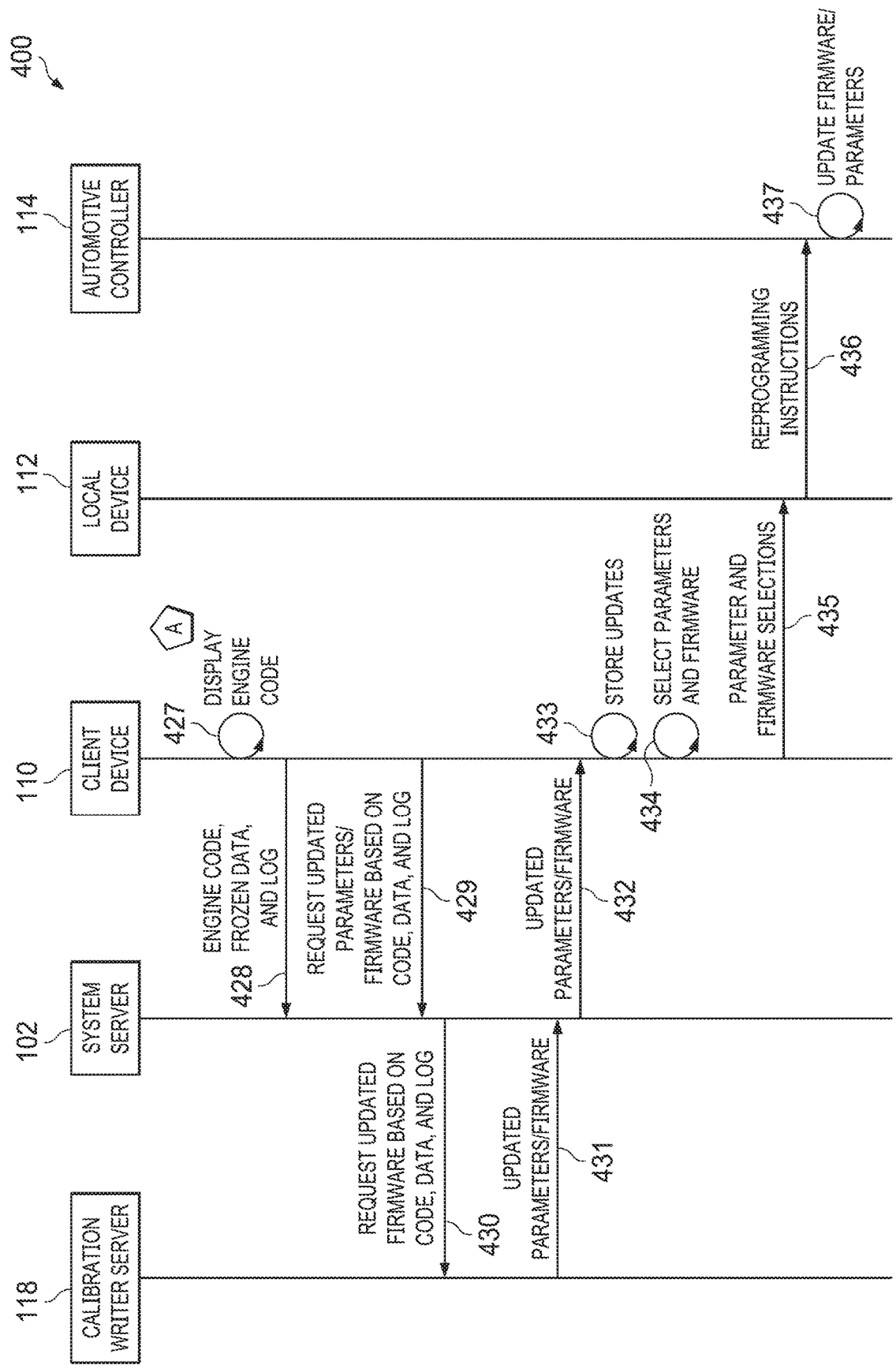

Referring to FIGS. 4A and 4B, method 400 updates engine parameters in response to a check engine code (also referred to as a diagnostic trouble code (DTC)) being generated by vehicle device 114. The method includes one or more messages passed between calibration writer server 118, system server 102, client device 110, local device 112, and vehicle device 114.

At step 411, vehicle device 114 generates a check engine code and freezes a frame of data. The check engine code identifies a problem with the vehicle. The frozen data indicates the status of the vehicle at the time when the problem that caused the check engine code to be generated occurred.

At step 412, a data connection is established between local device 112 and vehicle device 114. In one embodiment, the data connection is established by connecting local device 112 to an onboard diagnostics port that is connected to a CAN BUS to which vehicle device 114 is connected.

At step 413, a wireless connection is established between client device 110 and local device 112. In one embodiment, local device 112 acts as a wireless local area network (WLAN) access point to which client device 110 can connect. In establishing the wireless connection, a transmission control protocol (TCP) socket is opened between client device 110 and local device 112 so that data can be passed back and forth between client device 110 and local device 112 using JSON messages.

At step 414, a request for gauge data is sent from client device 110 and is received by local device 112. In one embodiment, the request is sent using JSON using the TCP socket. For each of the one or more gauges displayed by client device 110, a gauge data request is sent. After receiving the request from client device 110 by local device 112, client device 110 is subscribed to and receives notifications from local device 112 that include updated data to be displayed on the gauge associated with the gauge data request.

At step 415, a data request is sent from local device 112 and is received by vehicle device 114.

At step 416, vehicle device 114 retrieves the gauge data. In one embodiment, vehicle device 114 retrieves parameter identifier (PID) data that is associated with the gauge data.

At step 417, the data is sent from vehicle device 114 and is received by local device 112.

Optionally at step 418, local device 112 records the data received from vehicle device 114 in a log file on local device 112.

At step 419, the requested data is sent from local device 112 and is received by client device 110. In one embodiment, client device 110 is subscribed to local device 112 so as to receive a notification from local device 112 each time local device 112 receives updated data from vehicle device 114.

At step 420, the data is displayed by client device 110. The layout settings that describe the "look and feel" of the gauge are stored on client device 110 and the data is displayed in accordance to the layout settings.

At step 421, a request for the engine code, the frozen data, and optionally the log data is sent from client device 110 and is received by local device 112.

At step 422, a request for the engine code and the frozen data is sent from local device 112 and is received by vehicle device 114.

At step 423, vehicle device 114 retrieves the engine code and frozen data that were generated in step 411.

At step 424, the engine code and frozen data are sent from vehicle device 114 and are received by local device 112.

At step 425, the engine code, frozen data, and optional log are sent from local device 112 and are received by client device 110.

At step 426, client device 110 stores the engine code, frozen data, and optional log.

Moving to FIG. 4B, at step 427, client device 110 displays the engine code.

At step 428, the engine code, frozen data, and optional log data is sent from client device 110 and is received by system server 102.

At step 429, a request for updated engine parameters is sent from client device 110 and is received by system server 102.

At step 430, a request for updated engine parameters is sent from system server 102 and is received by calibration writer server 118.

At step 431, updated parameters and/or firmware are sent from calibration writer server 118, and are received by system server 102.

At step 432, the updated parameters and firmware are sent from system server 102 and are received by client device 110.

At step 433, the updated parameters and firmware are stored on client device 110.

At step 434, the technician selects one or more parameters and firmware with which to update the vehicle.

At step 435, the selected parameters and firmware are sent from client device 110 and are received by local device 112. One or more parameters and the firmware may be selected to be updated and are sent.

At step 436, reprogramming instructions are sent from local device 112 and are received by vehicle device 114. In one embodiment, the instructions cause vehicle device 114 to be flashed with the updated firmware when the firmware is selected to be updated. Additionally, parameters can be changed beyond what was included with the updated firmware. The updated firmware may be the latest default firmware from the vehicle manufacturer that does not have every parameter tuned for the specific configuration of the vehicle. In one embodiment, the reprogramming instructions of local device 112 first reflashes vehicle device 114 with the updated firmware and then updates specific engine tuning parameters.

At step 437, vehicle device 114 updates the firmware and parameters to the values received from local device 112.

Referring to FIGS. 5A and 5B, user interface 502 includes menu button 504 on title bar 506, which is above eight gauge view 508. Eight gauge view 508 includes eight (8) mini gauge views 510, 512, 514, 516, 518, 520, 522, and 524.

User interface 502 is displayed on a client device via an app running on the client device. The name, value, and units of each respective mini gauge views 510, 512, 514, 516, 518, 520, 522, and 524 are displayed on user interface 502 on a client device. Values 542, 544, 546, 548, 550, 552, 554, and 556 respectively of each mini gauge views 510, 512, 514, 516, 518, 520, 522, and 524 are continuously updated as new PID values are received from the automotive controller. In the embodiment of FIG. 5A, ten (10) PIDs are named with the units indicated in the table below. PID values, names, and units may be different for different vehicles and the table below is merely one example.

TABLE 1

| PID | Mini Gauge View | Name | Units |
|---|---|---|---|
| 0 | 510 | Engine Coolant Temperature | Degrees Fahrenheit (° F.) |

TABLE 1-continued

| PID | Mini Gauge View | Name | Units |
|---|---|---|---|
| 1 | 512 | Speed | Miles per Hour (MPH) |
| 2 | 530 | Revolutions per Minute | Revolutions per Minute (RPM) |
| 3 | 532 | Battery Voltage | Voltage (V) |
| 4 | 518 | Transmission Temperature | Degrees Fahrenheit (° F.) |
| 5 | (not shown) | Boost | Pounds per Square Inch (PSI) |
| 6 | 522 | Calculated Load | Percent of Max (%) |
| 7 | 524 | Injector Pressure | Thousand Pounds per Square Inch (kPSI) |
| 8 | (not shown) | Injector Pulse Width | Milliseconds (ms) |
| 9 | 520 | Throttle Position Sensor | Percent of Max (%) |

Mini gauge view 510 includes name 526, value 542, and units 558 and is associated with a PID. Name 526 indicates that mini gauge view 510 displays the engine coolant temperature, which value 542 indicates is at 156.0, which units 558 indicates are in degrees Fahrenheit. Mini gauge view 510 is shaded in a green color to indicate that value 542 is within a desired range for the engine coolant temperature.

Mini gauge view 512 includes name 528, value 544, and units 560 and is associated with a PID. Name 528 indicates that mini gauge view 512 displays the speed, which value 544 indicates is at 31.0, which units 560 indicates are in miles per hour. Mini gauge view 512 is not shaded green, which would indicate that value 544 is in a desired range, and is not shaded red, which would indicate that value 544 is in a warning range.

Mini gauge view 514 includes name 530, value 546, and units 562 and is associated with a PID. Name 530 indicates that mini gauge view 514 displays the revolutions per minute (RPM) of the engine, which value 546 indicates is at 746, which units 562 indicates are in revolutions per minute. Mini gauge view 514 is not shaded green, which would indicate that value 546 is in a desired range, and is not shaded red, which would indicate that value 546 is in a warning range.

Mini gauge view 516 includes name 532, value 548, and units 564 and is associated with a PID. Name 532 indicates that mini gauge view 516 displays the battery voltage of the engine, which value 548 indicates is at 2.00, which units 564 indicates are in Volts (V). Mini gauge view 516 is shaded red to indicate that value 548 is within a warning range for the battery voltage.

Mini gauge view 518 includes name 534, value 550, and units 566 and is associated with a PID. Name 534 indicates that mini gauge view 518 displays the transmission temperature of the engine, which value 550 indicates is at 219.0, which units 566 indicates are in degrees Fahrenheit. Mini gauge view 518 is shaded red to indicate that value 550 is within a warning range for the transmission temperature.

Mini gauge view 520 includes name 536, value 552, and units 568 and is associated with a PID. Name 536 indicates that mini gauge view 520 displays the throttle position sensor, which value 552 indicates is at 35, which units 568 indicates is a percentage value. Mini gauge view 520 is not shaded green, which would indicate that value 552 is in a desired range, and is not shaded red, which would indicate that value 552 is in a warning range.

Mini gauge view 522 includes name 538, value 554, and units 570 and is associated with a PID. Name 538 indicates that mini gauge view 522 displays the calculated load on the engine, which value 554 indicates is at 35, which units 570 indicates is a percentage value. Mini gauge view 522 is not shaded green, which would indicate that value 554 is in a desired range, and is not shaded red, which would indicate that value 554 is in a warning range.

Mini gauge view 524 includes name 540, value 556, and units 572 and is associated with a PID. Name 540 indicates that mini gauge view 524 displays the injector pressure of the engine, which value 556 indicates is at 25.0, which units 572 indicates is in thousand pounds per square inch (kPSI). Mini gauge view 524 is shaded green to indicate that value 556 is in a desired range.

FIG. 5B shows a drag and drop operation used to swap the location of two mini gauges on eight gauge view 508. The location of mini gauge view 514 is swapped with the location of mini gauge view 524 within eight gauge view 508 by dragging mini gauge view 514 from its original location towards the original location of mini gauge view 524.

Figure 6A:
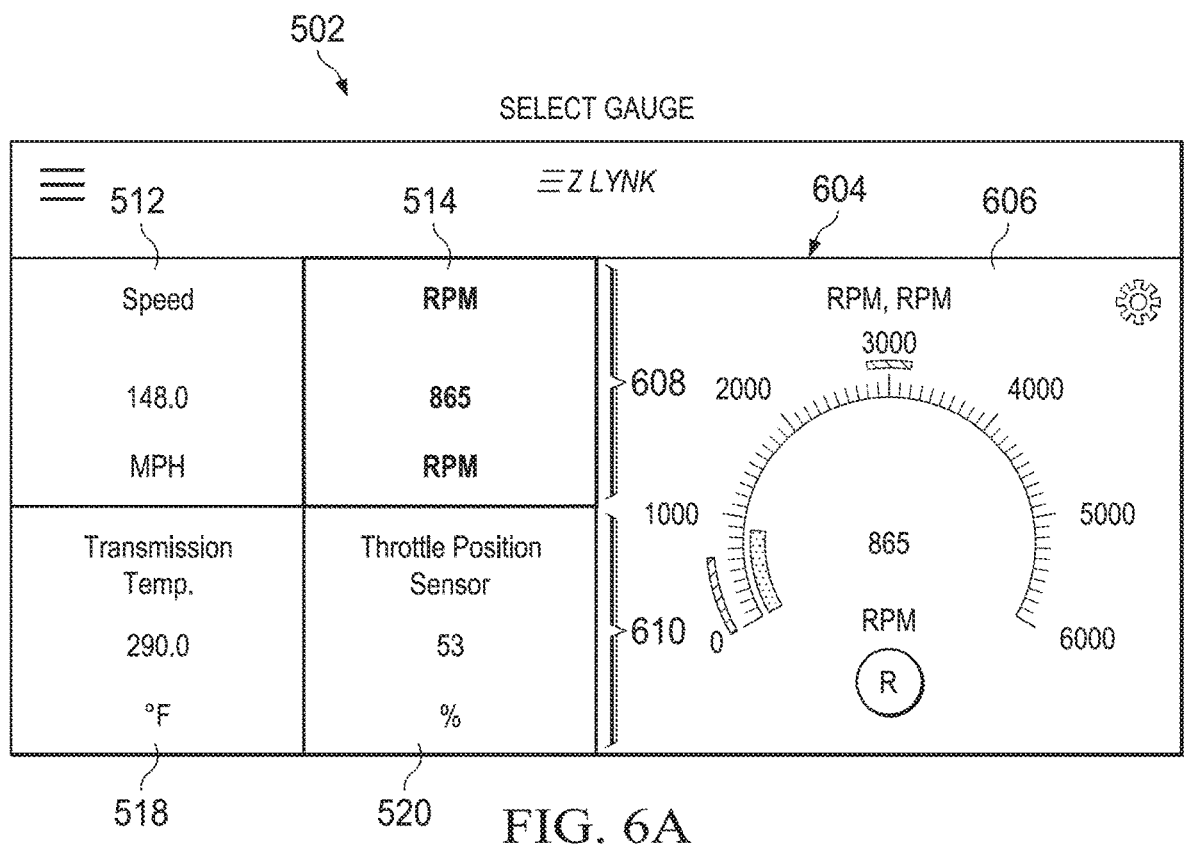
FIGS. 6A, 6B, and 6C are diagrams of a user interface of a preferred embodiment for a multiple gauge view with four sliding gauges.

Referring to FIG. 6A, user interface 502 is updated to display four gauge view 604. Four gauge view 604 includes four (4) mini gauge views (512, 514, 518, and 520) and one selected gauge view 606. Mini gauge view 514 is updated to have its display be highlighted to indicate that mini gauge view 514 is associated with, and has the same PID as, selected gauge view 606. User interface 502 transitions from eight gauge view 508 to four gauge view 604 when mini gauge view 514 is selected from eight gauge view 508 via a touch or click event.

Upper row 608 includes mini gauge views 512 and 514. Lower row 610 includes mini gauge views 518 and 520.

Figure 6B:
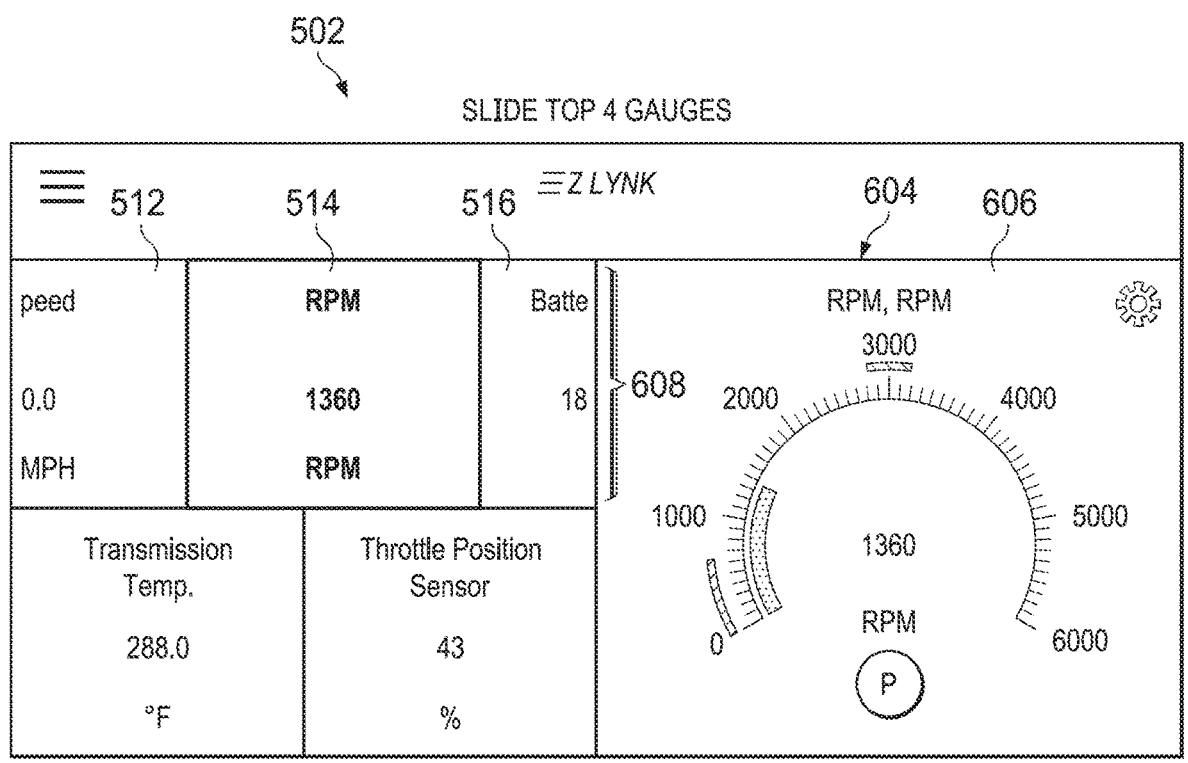

Referring to FIG. 6B, upper row 608 is slid or dragged to the left to reveal mini gauge view 516. Any two adjacent mini gauge views 510, 512, 514, and 516 can be displayed in upper row 608 by sliding or dragging upper row 608 left or right. During a drag or slide event, up to three mini gauge views may be displayed. After the drag or slide event, two mini gauge views are displayed, which need not include the mini gauge that has been selected (which in FIG. 6B is mini gauge view 512).

Figure 6C:
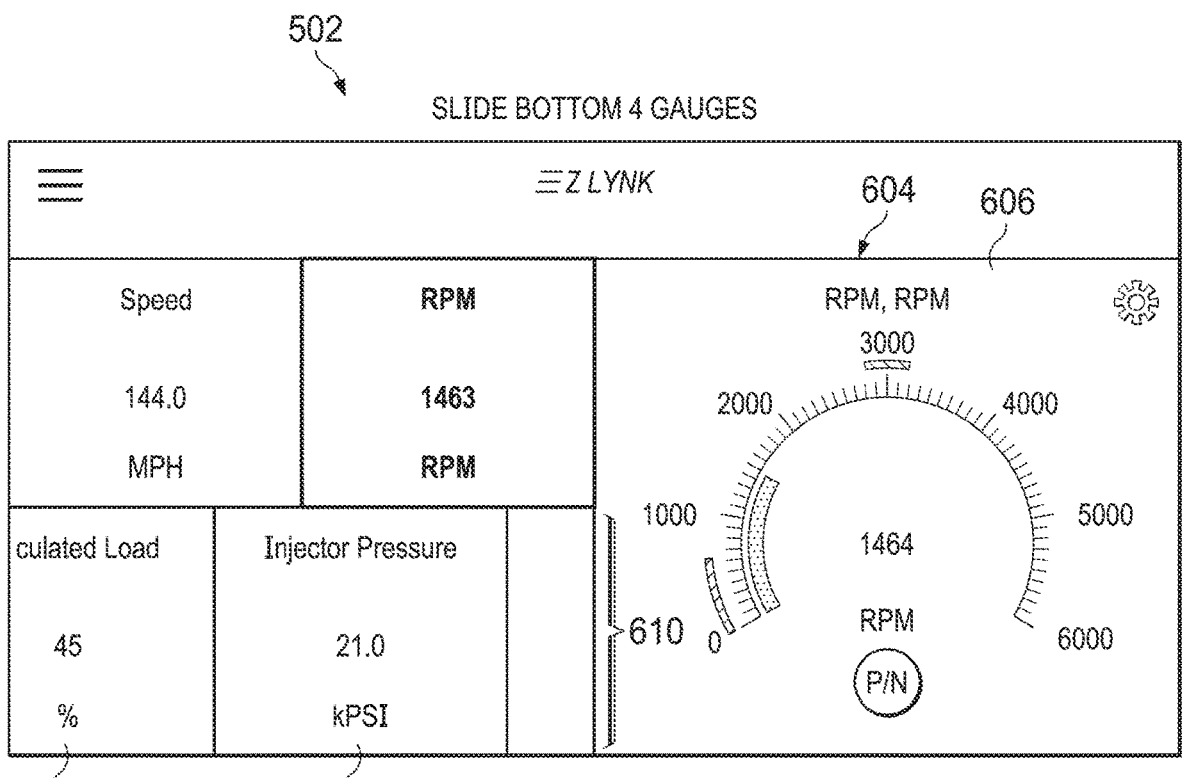

Referring to FIG. 6C, lower row 610 is slid or dragged to the left. Any two adjacent mini gauge views 518, 520, 522, and 524 can be displayed in lower row 610 by sliding or dragging lower row 610 left or right. During a drag or slide event, up to three mini gauge views may be displayed. After the drag or slide event, two mini gauge views are displayed, which need not include the mini gauge that has been selected.

Figure 7A:
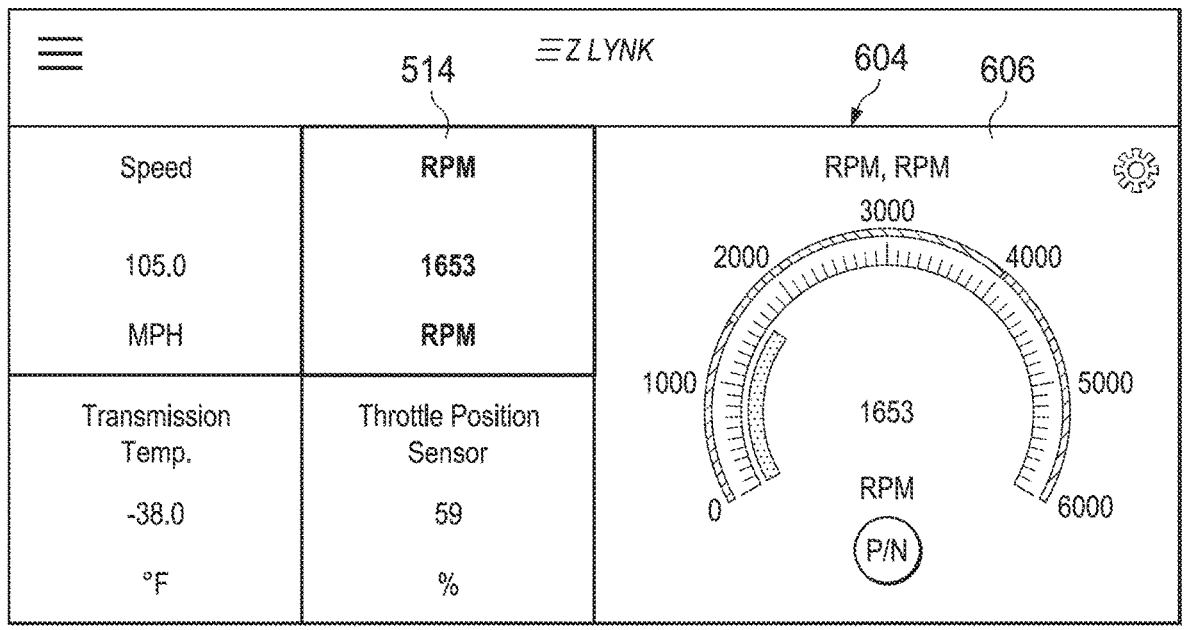
FIGS. 7A, 7B, and 7C are diagrams of a user interface of a preferred embodiment for selecting a gauge.
Figure 7B:
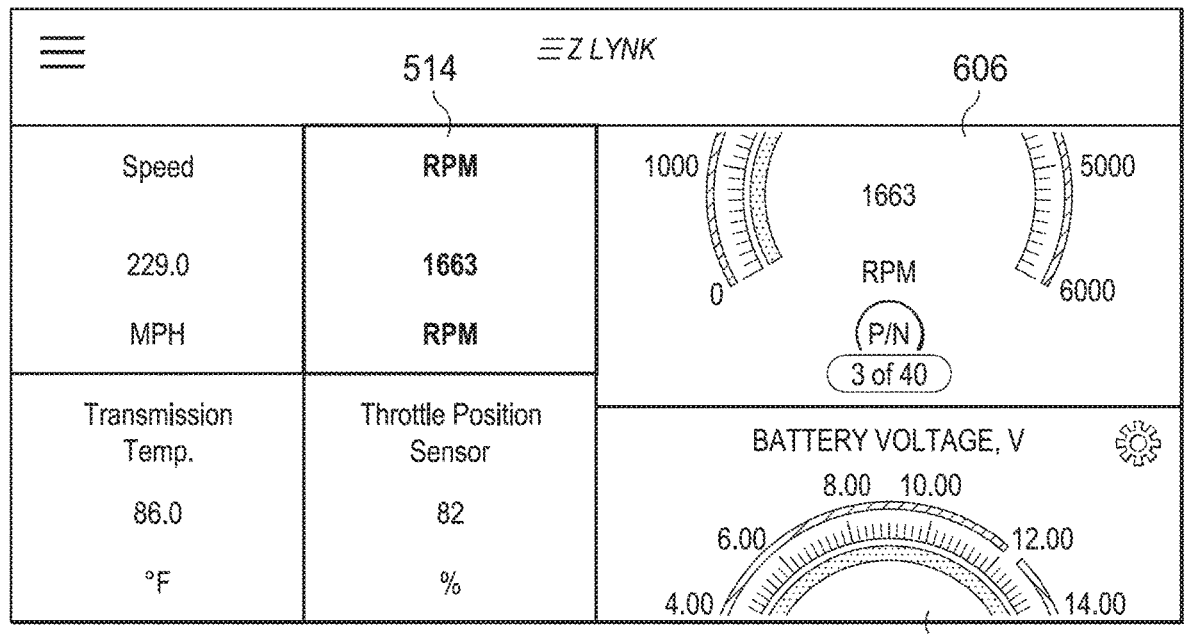
Figure 7C:
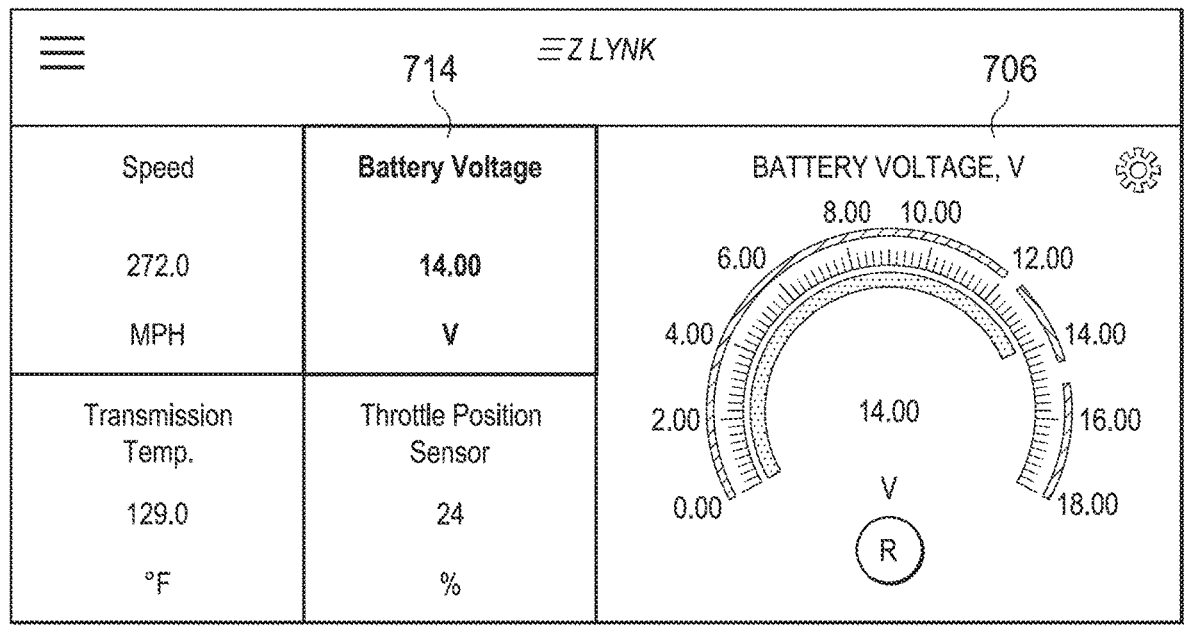

Referring to FIGS. 7A, 7B, and 7C, user interface 502 is manipulated to change the PID of mini gauge view 514.

At FIG. 7A, four gauge view 604 is displayed on user interface 502. Mini gauge view 514 has been selected and selected gauge view 606 is shown on user interface 502.

At FIG. 7B, selected gauge view is slid or dragged up to reveal second selected gauge view 706.

At FIG. 7C, mini gauge view 514 is updated to become mini gauge view 714. In one embodiment, mini gauge view 714 duplicates the information from mini gauge view 516 so that when mini gauge view 714 is unselected and user interface 502 transitions back to eight gauge view 508, both mini gauge view 516 and mini gauge view 714 are displayed and both show the battery voltage.

Figure 8A:
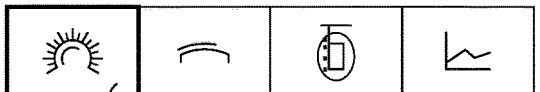
FIGS. 8A and 8B are diagrams of a user interface of a preferred embodiment for selecting a first gauge style.
Figure 8B:
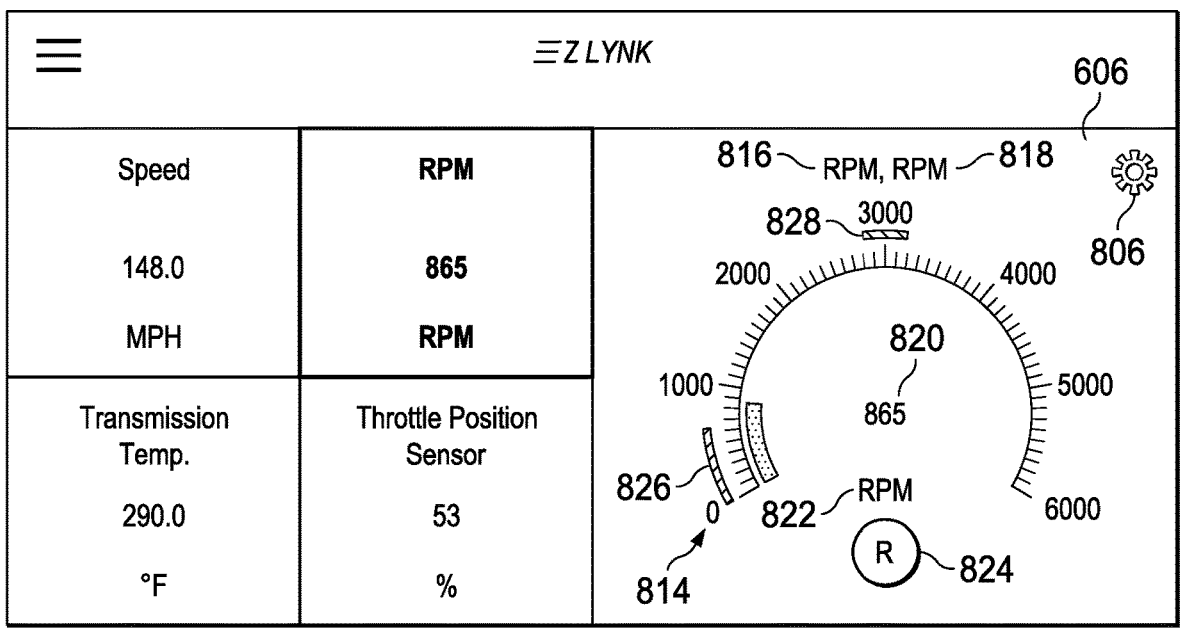

Referring to FIGS. 8A and 8B, circular gauge style 802 from settings view 804 is selected for selected gauge view 606. Settings view 804 of FIG. 8A is displayed after user interface element 806 is selected from selected gauge view 606 of FIG. 8B.

Settings view 804 includes name 808 and units 810 that identify the name and units of the PID that is associated with selected gauge view 606. Settings view 804 includes user interface element 812 that, when selected, transitions user interface 502 from displaying settings view 804 (FIG. 8A) to displaying gauge view 606 (FIG. 8B). With the selection of circular gauge style 802, circular gauge view 814 will be shown on selected gauge view 606.

On selected gauge view 606, name 816 and units 818 that identify the name and units of the PID that is associated with selected gauge view 606. Value 820 indicates the current value of the PID associated with selected gauge view 606. Units 822 indicates the current value of the PID associated with selected gauge view 606. User interface element 824 indicates what gear is being reported by the automotive controller as the current gear of the vehicle.

Circular gauge view 814 includes warning section 826. In one embodiment, warning section 826 is shaded in red and indicates that the RPM level is too low.

Circular gauge view 814 includes desired section 828. In one embodiment, desired section 828 is shaded in green and indicates that the RPM level is in a desired operating range for the vehicle.

Figure 9A:
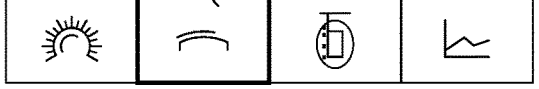
FIGS. 9A and 9B are diagrams of a user interface of a preferred embodiment for selecting a second gauge style.
Figure 9B:
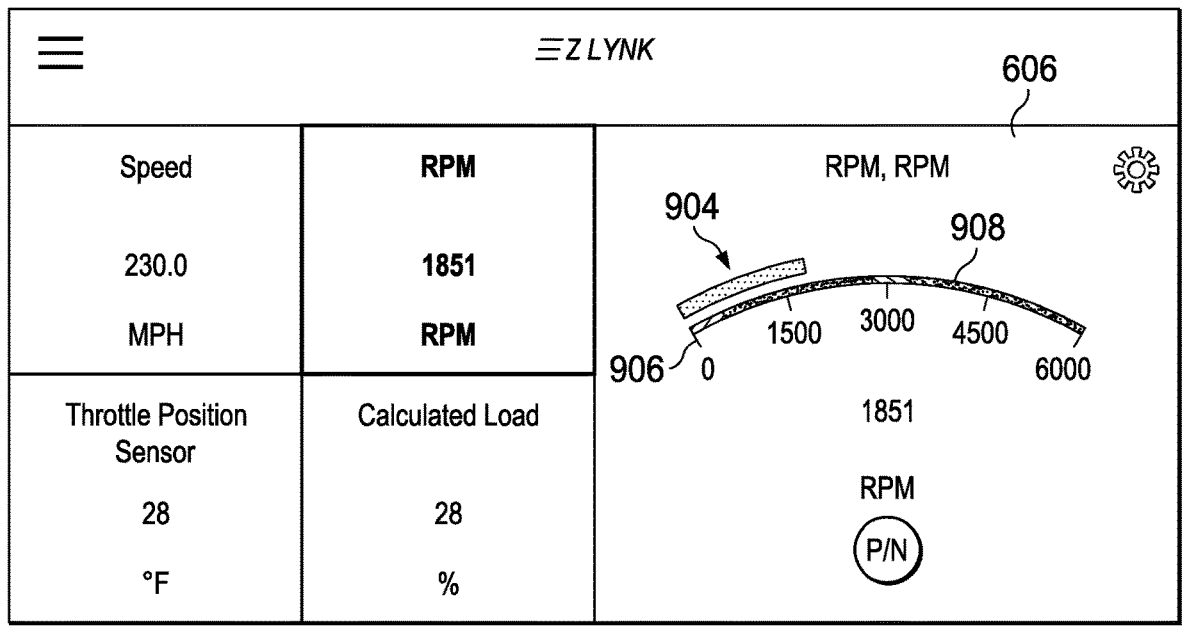

Referring to FIGS. 9A and 9B, arc gauge style 902 from settings view 804 is selected for selected gauge view 606. When arc gauge style 902 is selected, selected gauge view 606 shows arc gauge view 904. Arc gauge view 904 includes warning section 906. In one embodiment, warning section 906 is shaded in red and indicates that PID values that are within warning section 906 are too low.

Arc gauge view 904 includes desired section 908. In one embodiment, desired section 908 is shaded in green and indicates that PID values that are within desired section 908 are in a preferred range for one of maximum torque or horsepower.

Figure 10A:
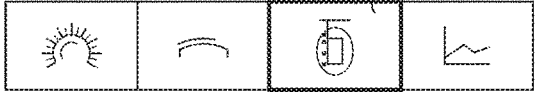
FIGS. 10A and 10B are diagrams of a user interface of a preferred embodiment for selecting a third gauge style.
Figure 10B:
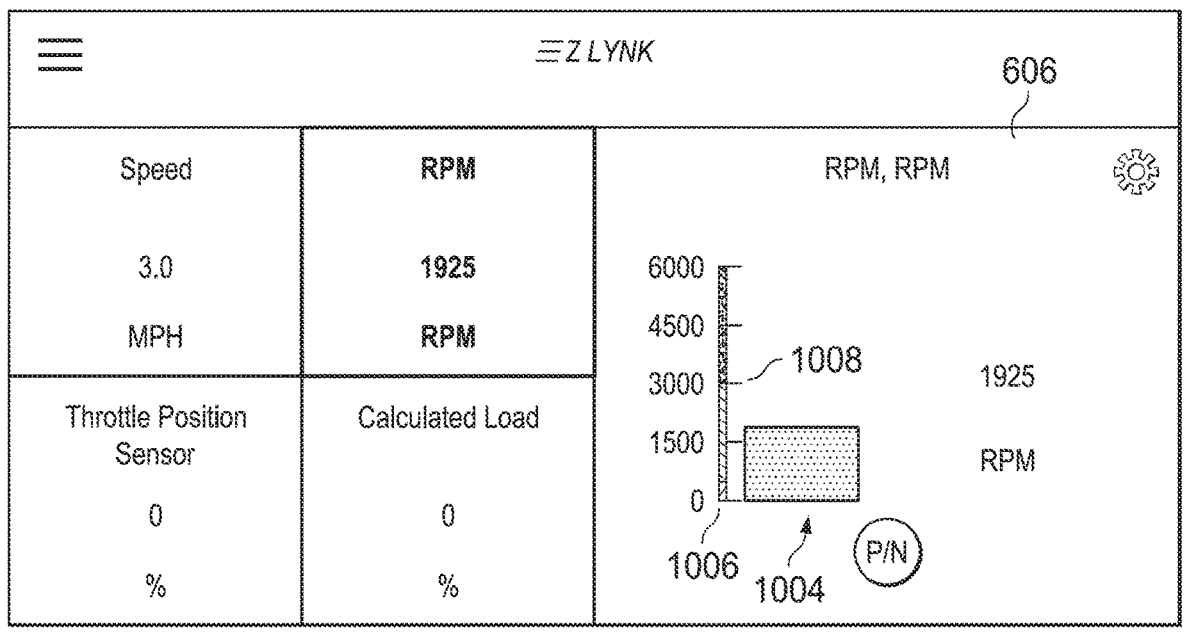

Referring to FIGS. 10A and 10B, bar gauge style 1002 from settings view 804 is selected for selected gauge view 606. When bar gauge style 1002 is selected, selected gauge view 606 shows bar gauge view 1004. Bar gauge view 1004 includes warning section 1006. In one embodiment, warning section 1006 is shaded in red and indicates that PID values that are within warning section 1006 are too low.

Bar gauge view 1004 includes desired section 1008. In one embodiment, desired section 1008 is shaded in green and indicates that PID values that are within desired section 1008 are in a preferred range for one of maximum torque or horsepower.

Figure 11A:
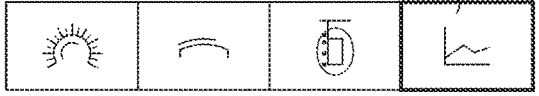
FIGS. 11A and 11B are diagrams of a user interface of a preferred embodiment for selecting a fourth gauge style.
Figure 11B:
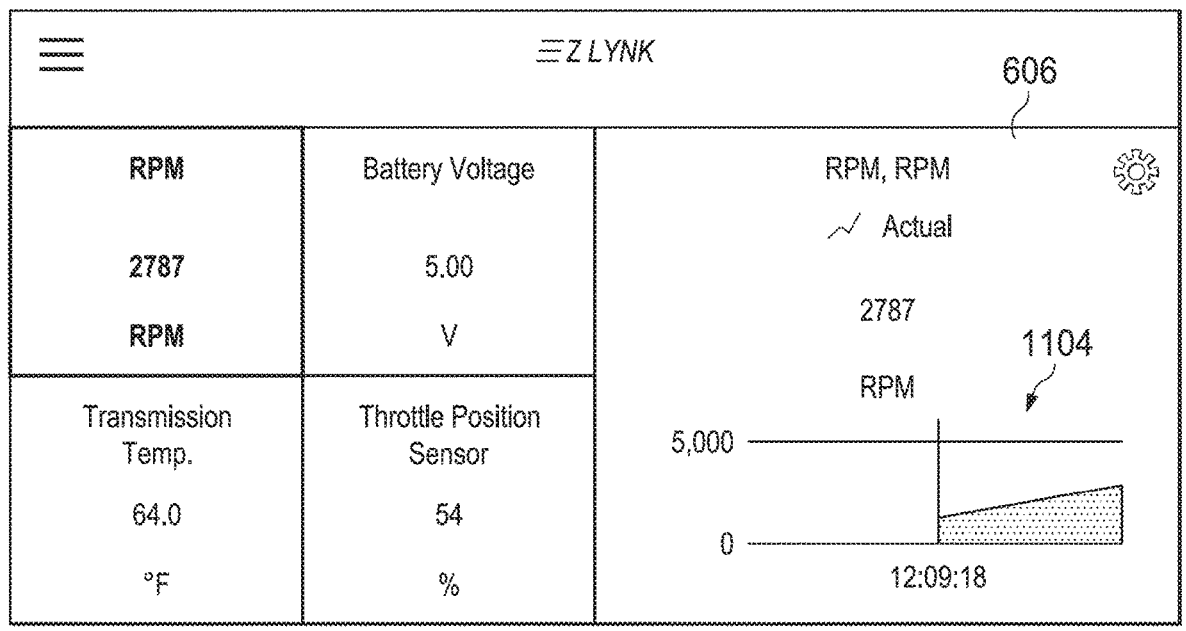

Referring to FIGS. 11A and 11B, line history gauge style 1102 from settings view 804 is selected for selected gauge view 606. When line history gauge style 1102 is selected, selected gauge view 606 shows line history gauge view 1104. Line history gauge view 1104 is a graph that shows recent values for the selected gauge as a function of time. The recent values are stored on the client device. Line history gauge view 1104 shows the most recent data on the right-hand-side of the chart.

Referring to FIGS. 12A through 12I, user interface 502 comprises four gauge view 604 with selected gauge view 606. Selected gauge view 606 includes warning section 826, desired section 828, and warning section 1202 that are each adjustable. Warning section 826 identifies when the PID value is too low and warning section 1202 identifies when the PID value is too high.

To adjust the settings for warning section 826, desired section 828, and warning section 1202, user interface element 806 is selected to display settings view 804 (FIG. 12B) and then user interface element 1204 is selected from settings view 804 to display view 1206 (FIG. 12C) on user interface 502. View 1206 is also referred to as parameter adjustment view 1206.

Parameter adjustment view 1206 includes user interface element 1208, user interface element 1210, name 1212, and units 1214

User interface element 1208 is a cancel button that, when selected, undoes changes that were made in parameter adjustment view 1206. After selecting user interface element 1208, user interface 502 returns to four gauge view 604 with settings view 804, as in FIG. 12B.

User interface element 1210 is a button that, when selected, accepts changes that were made in parameter adjustment view 1206. After selecting user interface element 1210, user interface 502 returns to four gauge view 604 with settings view 804, as in FIG. 12B.

Name 1212 and units 1214 identify the type and units of the PID information that is displayed on view 1206. In one embodiment, name 1212 is revolutions per minute (RPM) and units 1214 are RPM.

User interface element 1216 is a checkbox that indicates whether desired section 828 is shown on selected gauge view 606. The range of desired section 828 is controlled by the range between minimum desired threshold 1218 and maximum desired threshold 1220. When the PID value is between minimum desired threshold 1218 and maximum desired threshold 1220, then the PID value is in a desired or preferred range.

The display of warning section 826 and warning section 1202 are controlled by user interface element 1222. The range of the gap between warning section 826 and warning section 1202 is controlled by the range between minimum warning threshold 1224 and maximum warning threshold 1226. When the PID value is below minimum warning threshold 1224 or above maximum warning threshold 1226, then the PID value is in a warning range that could lead to engine fault, damage, or failure.

User interface element 1228 identifies whether the defuel settings are active. When the PID value is below minimum defuel threshold 1230 or above maximum defuel threshold 1232, then the PID value is in a defuel range where the fuel supply to the engine is reduced in order to protect the engine.

In one embodiment, the relationships shown below are maintained by the thresholds displayed on parameter adjustment view 1206.

minimum defuel threshold 1230≤minimum warning threshold 1224     Rel.1 minimum warning threshold 1224≤minimum desired threshold 1218     Rel.2 minimum desired threshold 1218≤maximum desired threshold 1220     Rel.3 maximum desired threshold 1220≤maximum warning threshold 1226     Rel.4 maximum warning threshold 1226≤maximum defuel threshold 1232     Rel.5

Figure 12A:
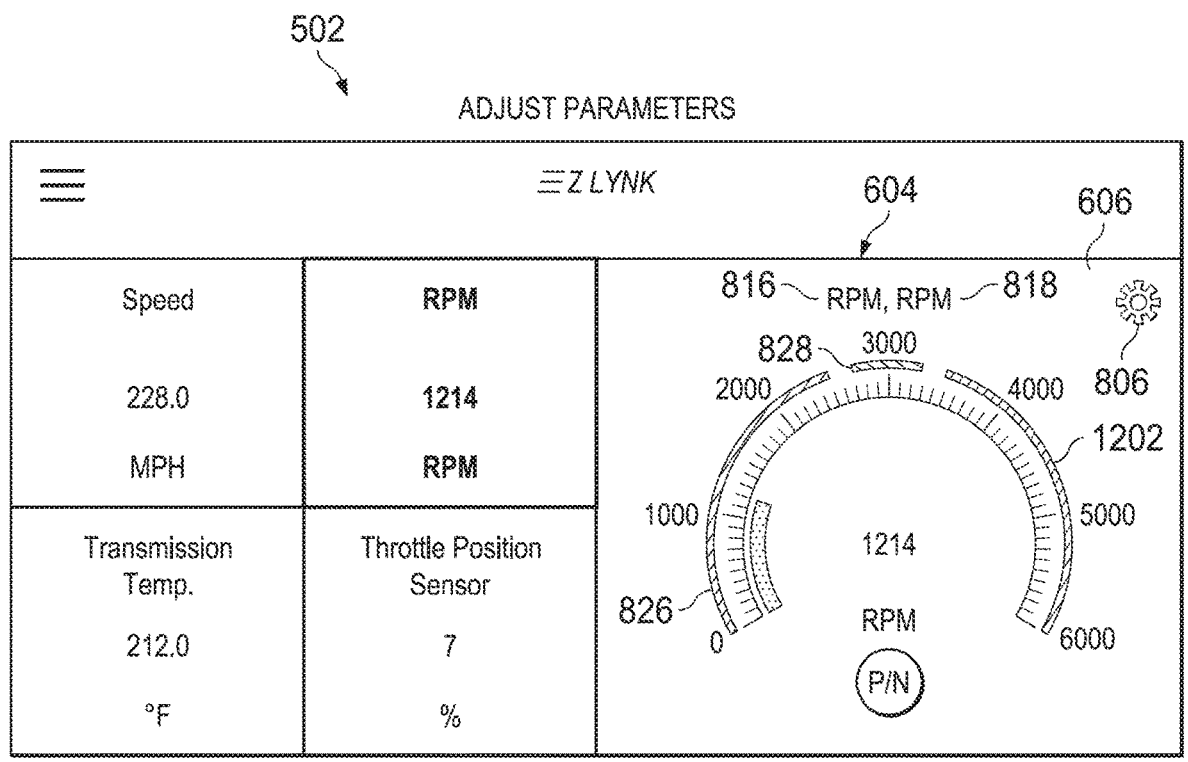
FIGS. 12A through 12I are diagrams of a user interface of a preferred embodiment for adjusting parameters.
Figure 12B:
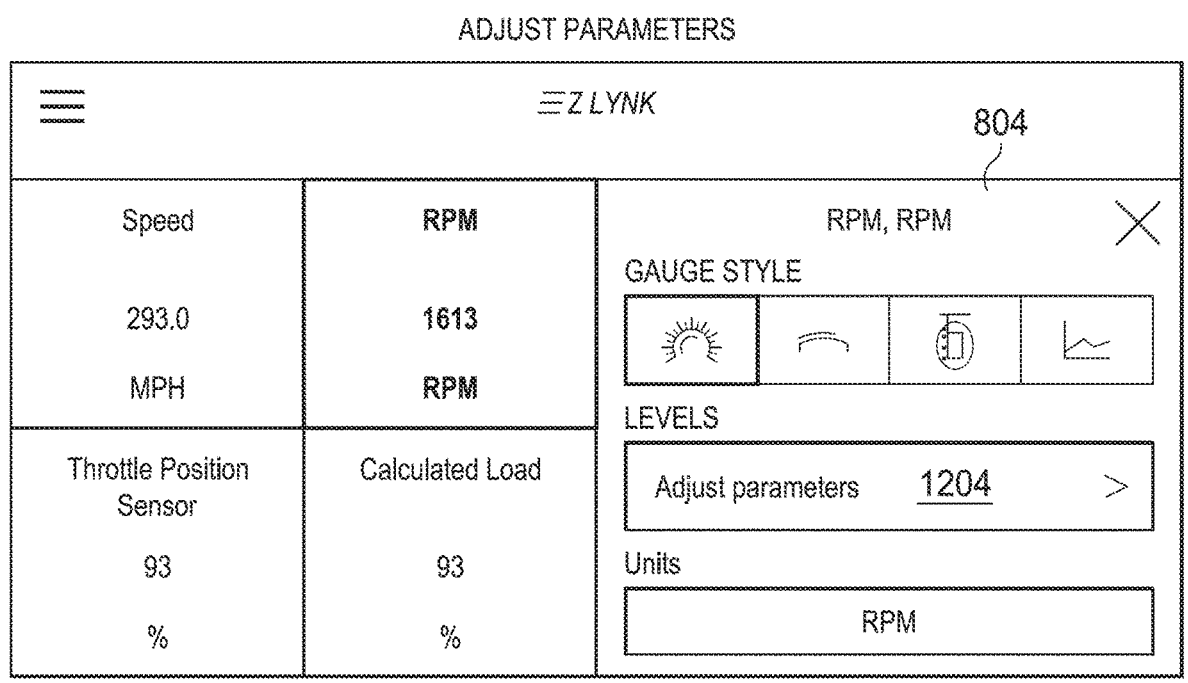
Figure 12C:
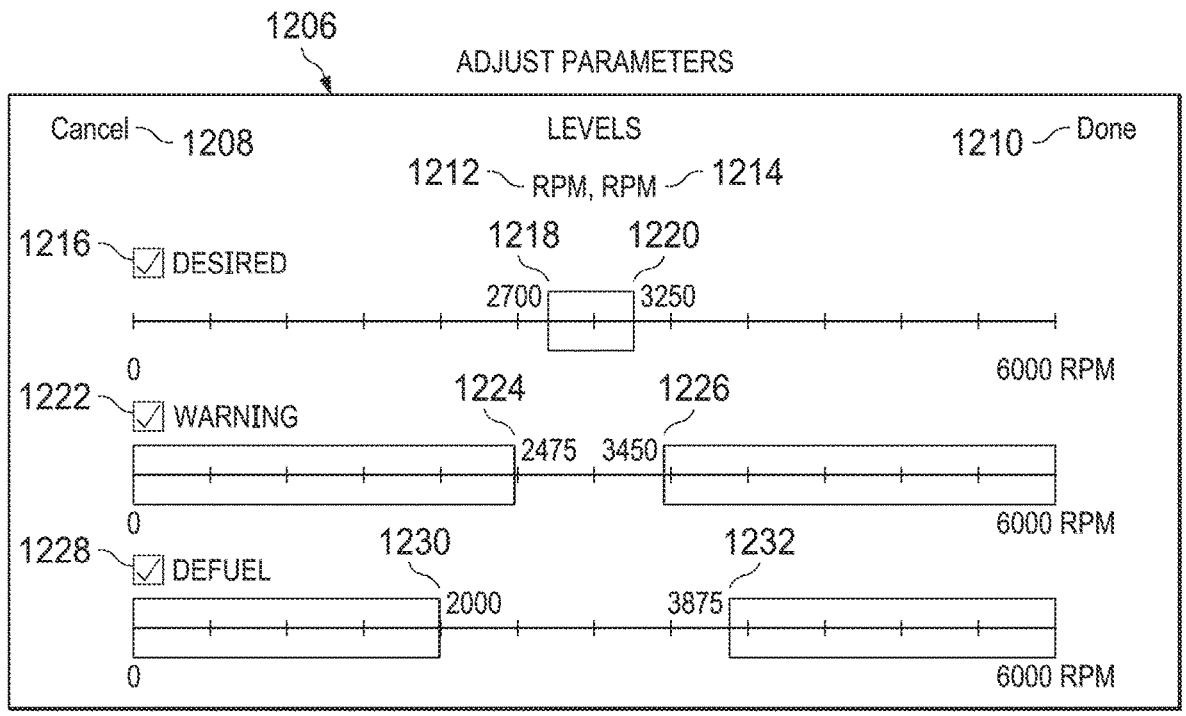
Figure 12D:
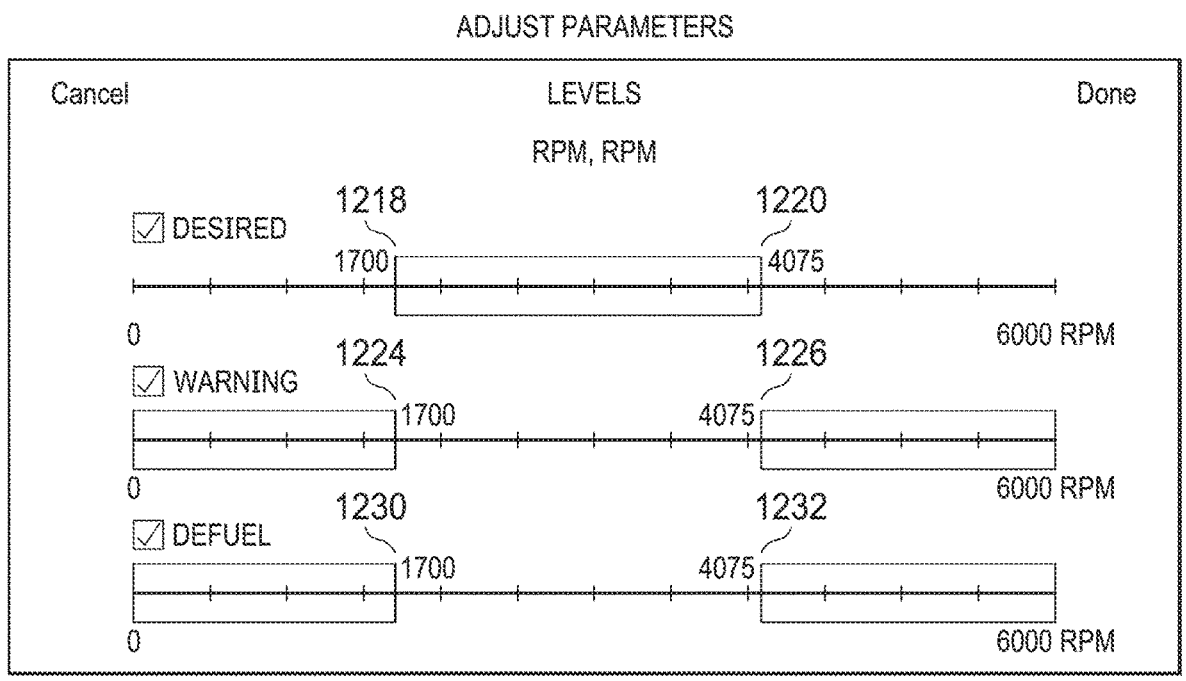

Referring to FIG. 12D, when minimum desired threshold 1218 is dragged to the left, minimum warning threshold 1224 and minimum defuel threshold 1230 may also move to the left so that both minimum warning threshold 1224 and minimum defuel threshold 1230 remain less than or equal to minimum desired threshold 1218.

When maximum desired threshold 1220 is dragged to the right, maximum warning threshold 1226 and maximum defuel threshold 1232 may also move to the right so that both maximum warning threshold 1226 and maximum defuel threshold 1232 remain greater than or equal to maximum desired threshold 1220.

Figure 12E:
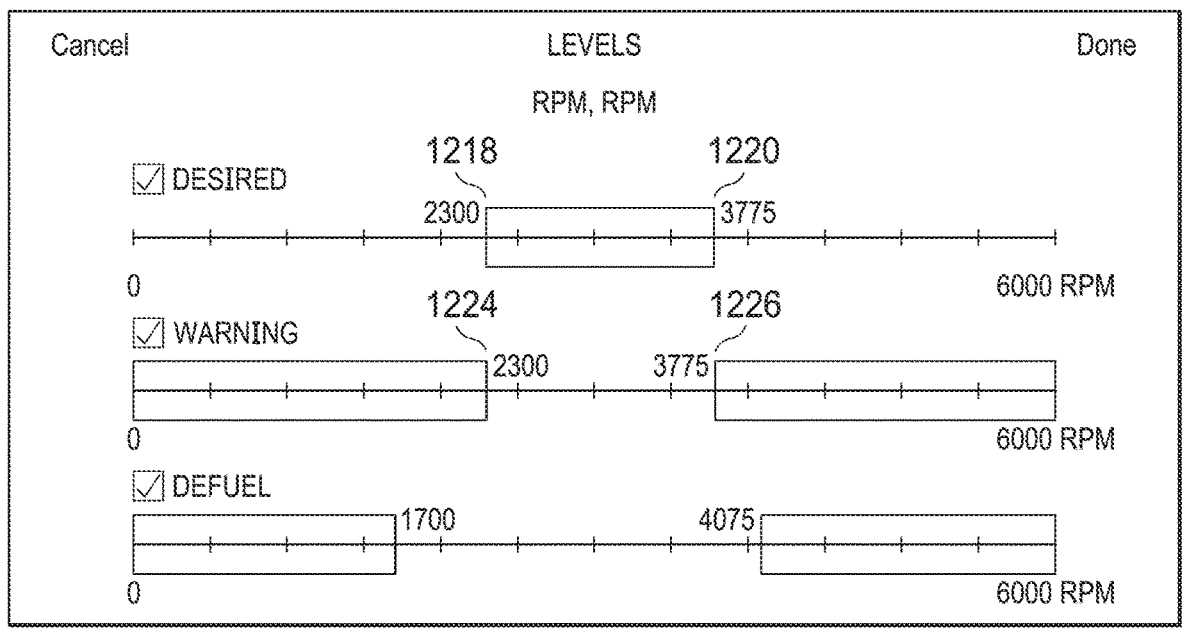

Referring to FIG. 12E, when minimum warning threshold 1224 is dragged to the right, minimum desired threshold 1218 may also move to the right so that minimum desired threshold 1218 remains greater than or equal to minimum warning threshold 1224.

When maximum warning threshold 1226 is dragged to the left, maximum desired threshold 1220 may also move to the left so that maximum desired threshold 1220 remains less than or equal to maximum warning threshold 1226.

Figure 12F:
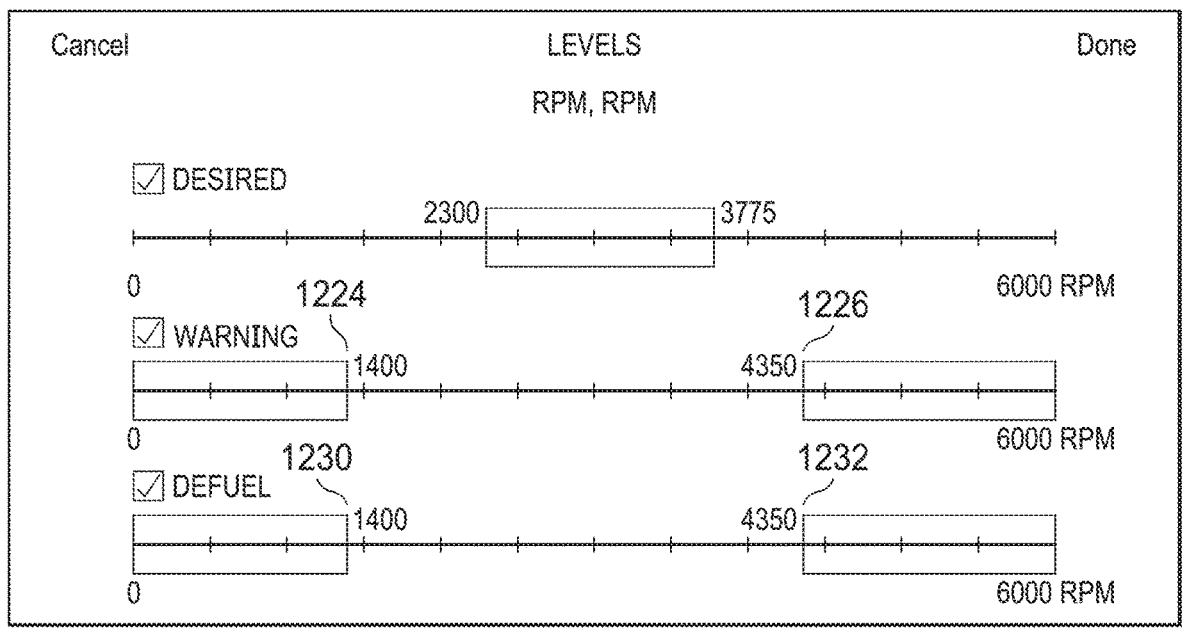

Referring to FIG. 12F, when minimum warning threshold 1224 is dragged to the left, minimum defuel threshold 1230 may also move to the left so that minimum defuel threshold 1230 remains less than or equal to minimum warning threshold 1224.

When maximum warning threshold 1226 is dragged to the right, maximum defuel threshold 1232 may also move to the right so that maximum defuel threshold 1232 remains greater than or equal to maximum warning threshold 1226.

Figure 12G:
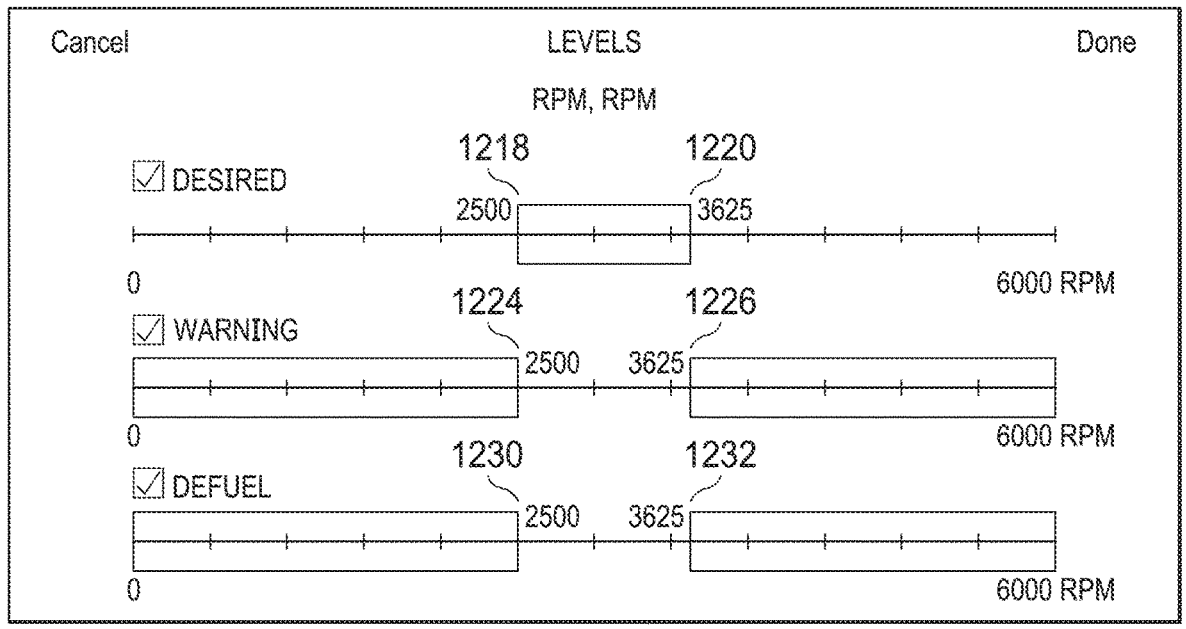

Referring to FIG. 12G, when minimum defuel threshold 1230 is dragged to the right, minimum warning threshold 1224 and minimum desired threshold 1218 may also move to the right so that both minimum warning threshold 1224 and minimum desired threshold 1218 remain greater than or equal to minimum defuel threshold 1230.

When maximum defuel threshold 1232 is dragged to the left, maximum warning threshold 1226 and maximum desired threshold 1220 may also move to the left so that both maximum warning threshold 1226 and maximum desired threshold 1220 remain less than or equal to maximum defuel threshold 1232.

Figure 12H:
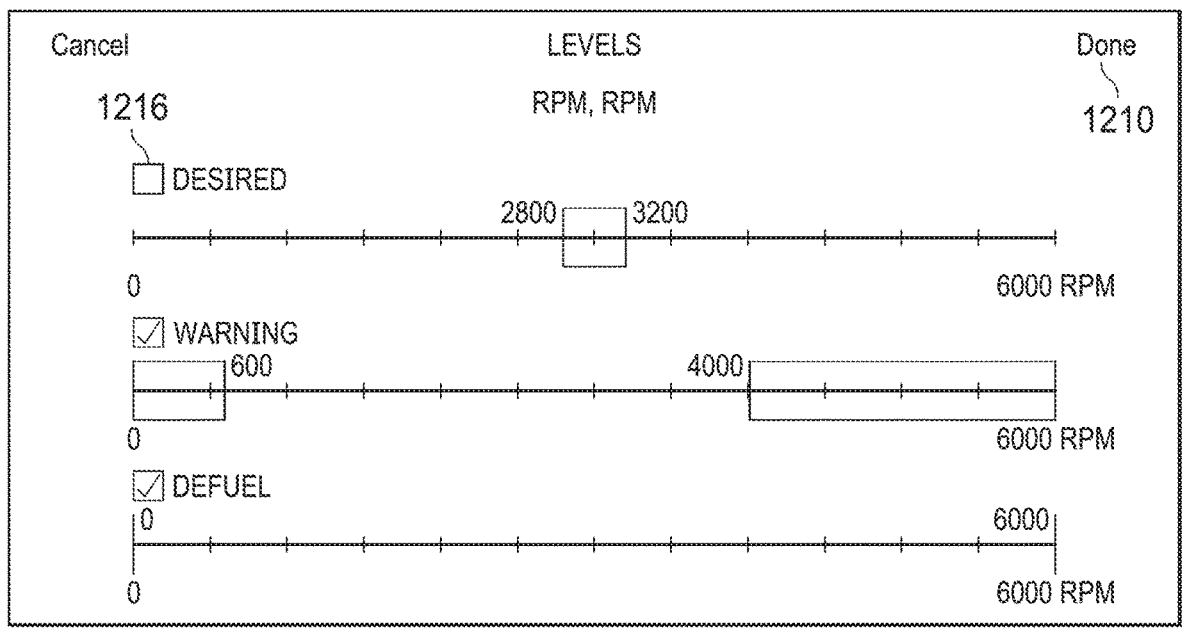
Figure 12I:
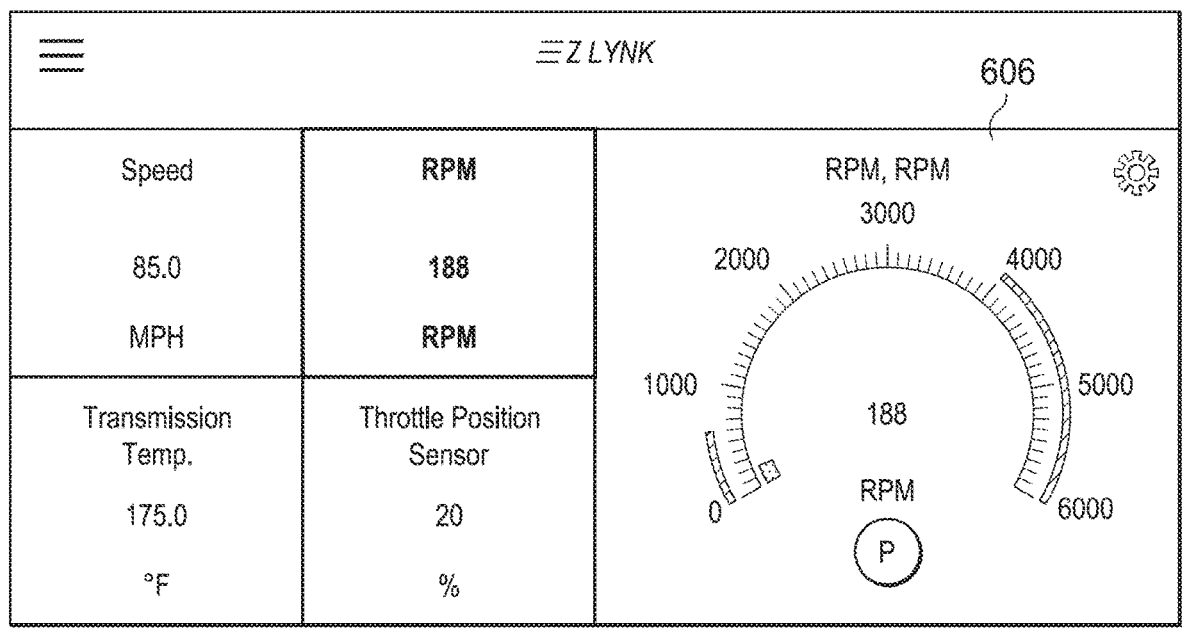

Referring to FIGS. 12H and 12I, when user interface element (checkbox) 1216 is unselected and user interface element (done button) 1210 is selected, then the desired section is not displayed on the selected gauge view 606, as shown in FIG. 12I.

Figure 13A:
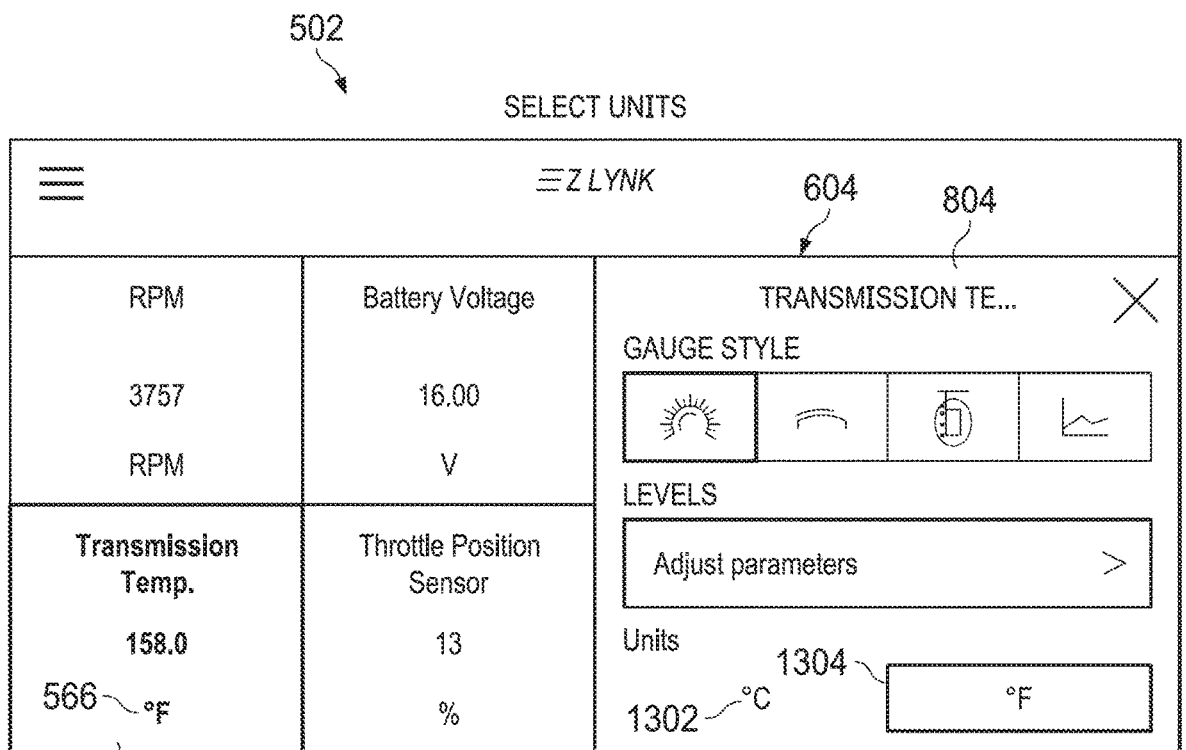

Referring to FIGS. 13A and 13B, user interface 502 displays four gauge view 604, mini gauge view 518 has been selected, and settings view 804 is displayed. Settings view 804 includes user interface element 1302 and user interface element 1304.

User interface element 1302 and user interface element 1304 allow for the selection between different units for the PID values associated with mini gauge view 518. In one embodiment, mini gauge view 518 is associated with transmission temperature and can be displayed in degrees Celsius (° C.) upon the selection of user interface element 1302 or in degrees Fahrenheit (° F.) upon the selection of user interface element 1304.

Referring to FIGS. 14A through 14E, user interface 502 transitions from eight gauge view 508 to five gauge view 14101. Five gauge view 14101 may also be referred to as view 14101. The transition from eight gauge view 508 to five gauge view 14101 occurs when there is a slide or drag event that drags eight gauge view 508 up to reveal five gauge view 14101. Additionally, the transition from five gauge view 14101 to eight gauge view 508 occurs when there is a slide or drag event that drags five gauge view 14101 down to reveal eight gauge view 508.

Figure 14B:
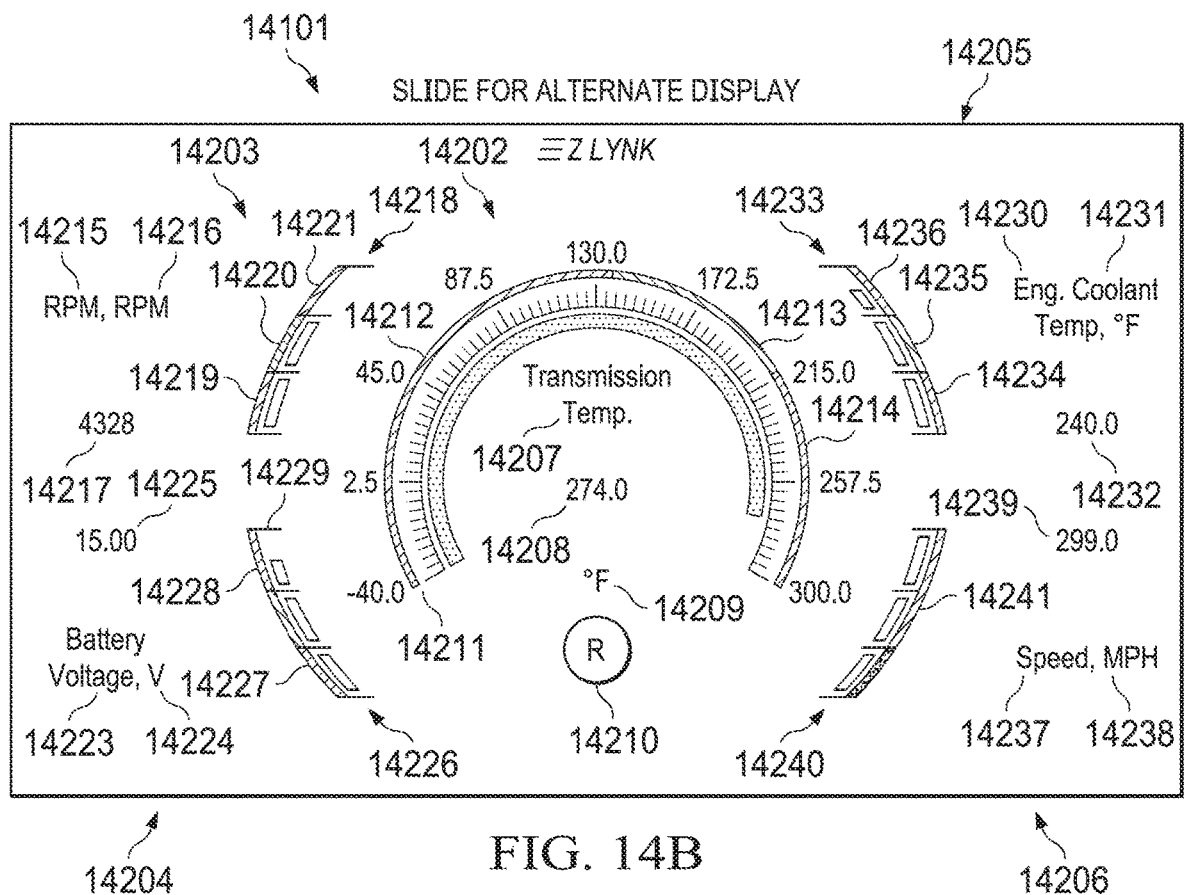

Referring to FIG. 14B, five gauge view 14101 includes gauge views 14202, 14203, 14204, 14205, and 14206, which may be referred to as large center gauge view 14202, top left gauge view 14203, bottom left gauge view 14204, top right gauge view 14205, and bottom right gauge view 14206.

Large center gauge view 14202 includes name 14207, value 14208, units 14209, gear 14210, and circular gauge view 14211. Circular gauge view 14211 includes lower warning section 14212, desired section 14213, and upper warning section 14214. Large center gauge view 14202 indicates that the vehicle is in reverse and that the transmission temperature is 274.0° F. and is in a warning range that is above the desired range.

Top left gauge view 14203 includes name 14215, units 14216, value 14217, and arc gauge view 14218. Arc gauge view 14218 includes lower warning section 14219, desired section 14220, and upper warning section 14221. Top left gauge view 14203 indicates that the RPM of the motor is 4328 RPM, which is just above the desired range an in the upper warning range.

Bottom left gauge view 14204 includes name 14223, units 14224, value 14225, and arc gauge view 14226. Arc gauge view 14226 includes lower warning section 14227, desired section 14228, and upper warning section 14229. Bottom left gauge view 14204 indicates that the battery voltage is 15.00 V and is in the upper warning range.

Top right gauge view 14205 includes name 14230, units 14231, value 14232, and arc gauge view 14233. Arc gauge view 14233 includes lower warning section 14234, desired section 14235, and upper section 14236. Top right gauge view 14205 indicates that the engine coolant temperature is 240.0° F. and is in the upper warning section above the desired level.

Bottom right gauge view 14206 includes name 14237, units 14238, value 14239, and arc gauge view 14240. Arc gauge view 14240 includes warning section 14241 that indicates which values are too high. Bottom right gauge view 14206 indicates that the speed of the vehicle is 299.0 MPH and is in the upper warning range.

Figure 14C:
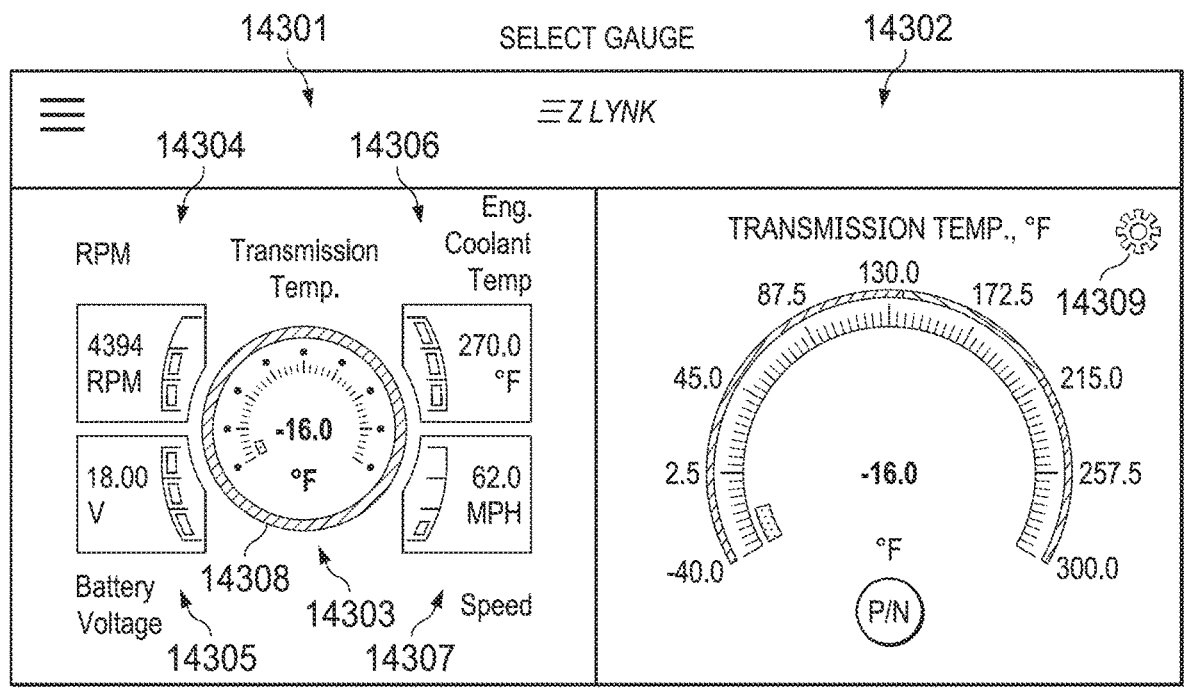

The names, units, and values displayed on the gauges in five gauge view 14101 are each shaded in red to indicate that each of the values of each of the gauges is in a warning section When any one of gauge views 14202, 14203, 14204, 14205, and 14206 are selected from five gauge view 14101, user interface 502 transitions from displaying five gauge view 14101 to small five gauge view 14301 and selected gauge view 14302, shown in FIG. 14C. Small five gauge view 14301 may also be referred to as view 14301.

Referring to FIG. 14C, small five gauge view 14301 includes gauge views 14303, 14304, 14305, 14306, and 14307, which may be referred to as small center gauge view 14303, top left gauge view 14304, bottom left gauge view 14305, top right gauge view 14306 and bottom right gauge view 14307. Gauge views 14303, 14304, 14305, 14306, and 14307 from small five gauge view 14301 are associated with the same PIDs as gauge views 14202, 14203, 14204, 14205, and 14206 from five gauge view 14101 of FIG. 14B respectively. The values for gauge views 14303, 14304, 14305, 14306, and 14307 are continuously updated to reflect the current state of the engine.

Figures 2, 40A:
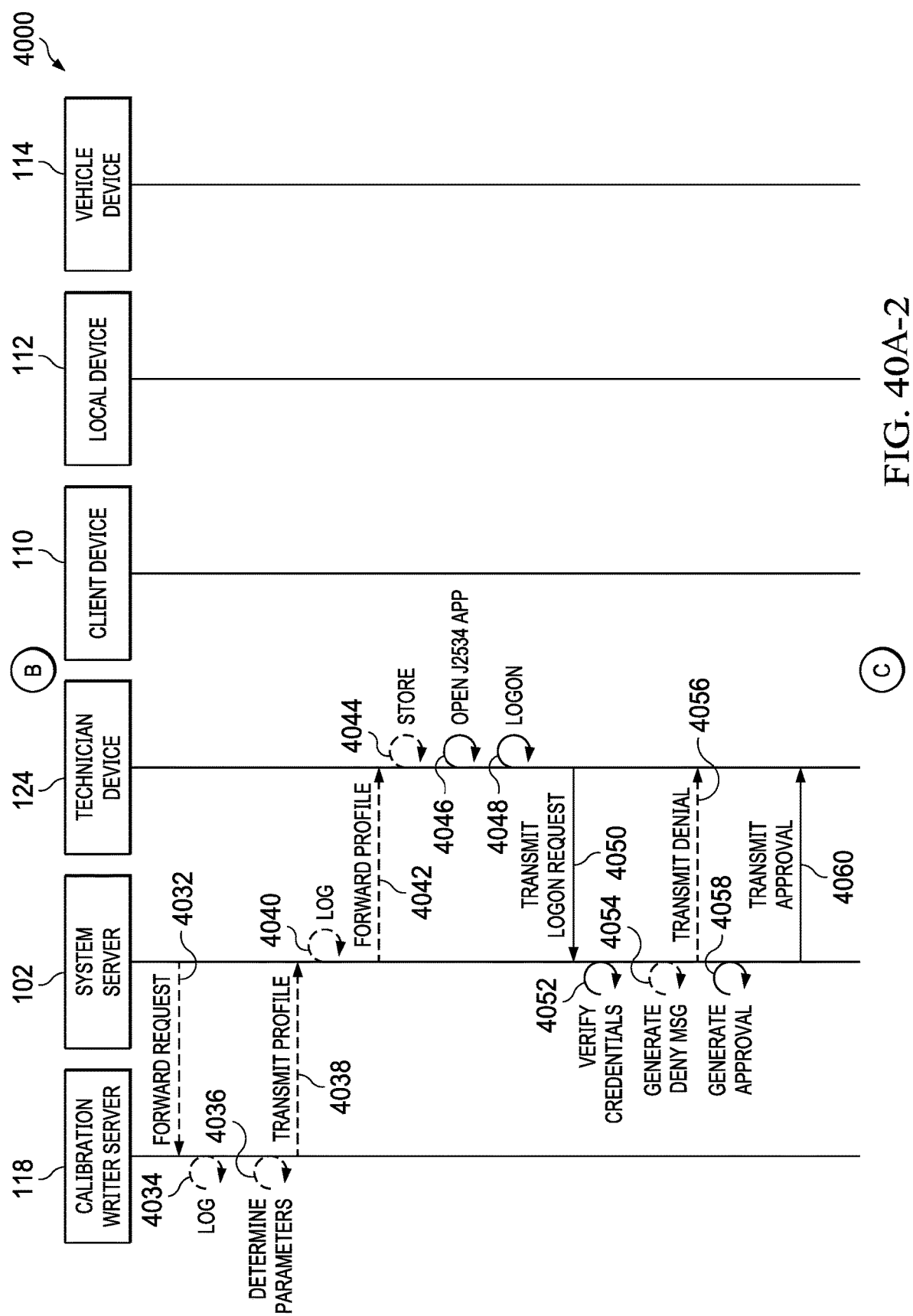
FIG. 40A is a network flow diagram of a system for updating an automotive controller in a preferred embodiment.
Figures 3, 40A:
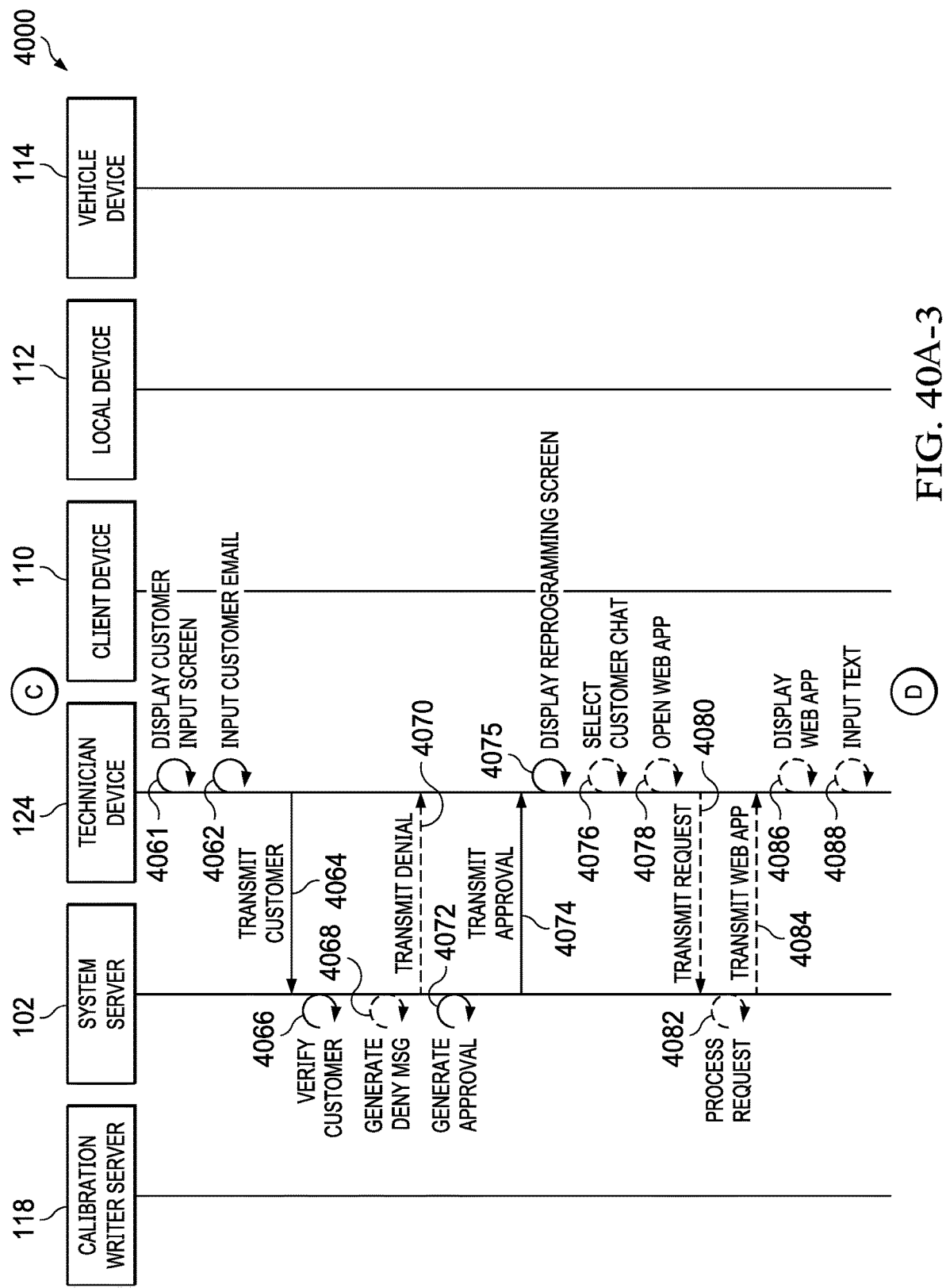
Figures 4, 40A:
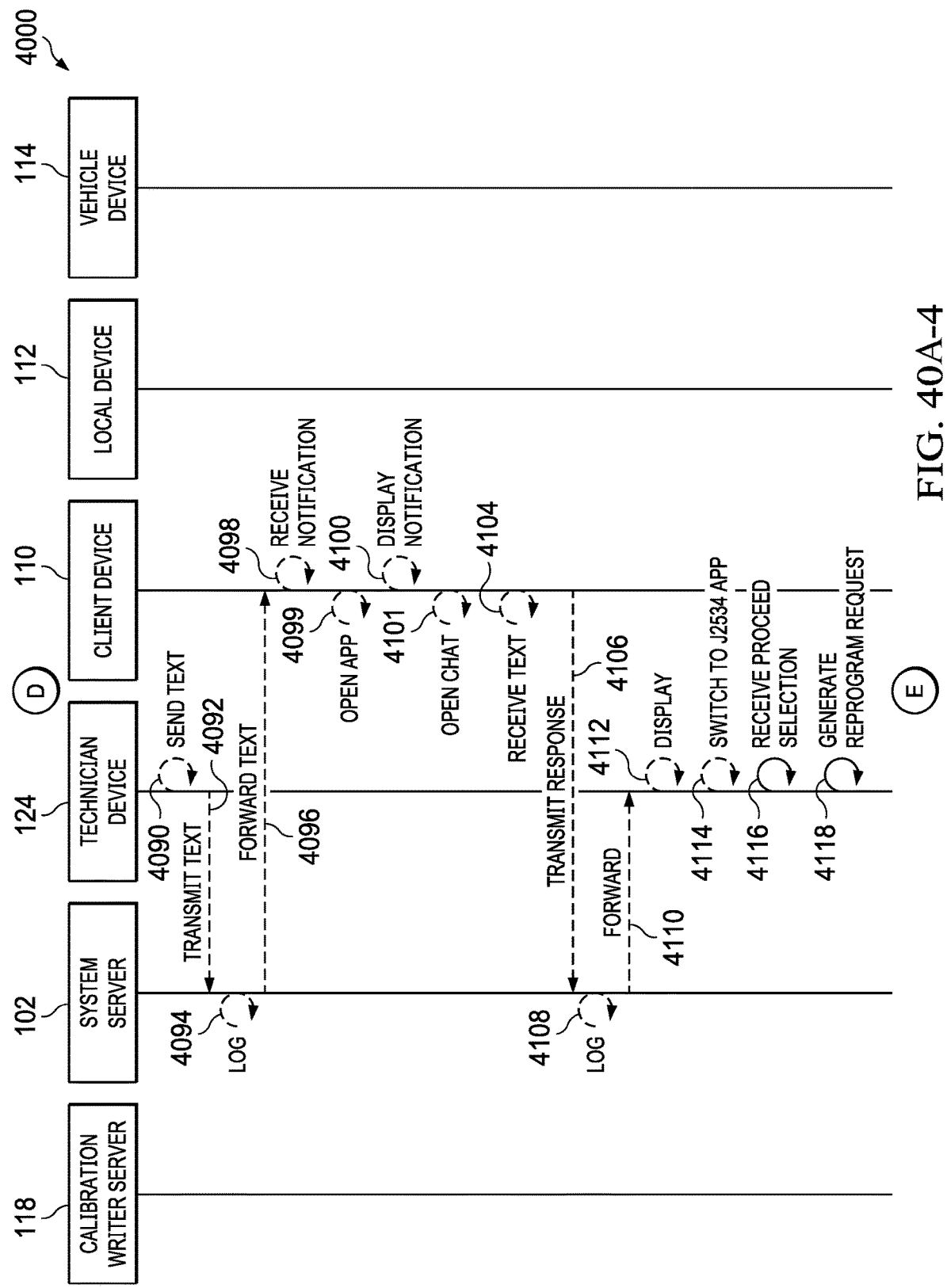
Figures 5, 40A:
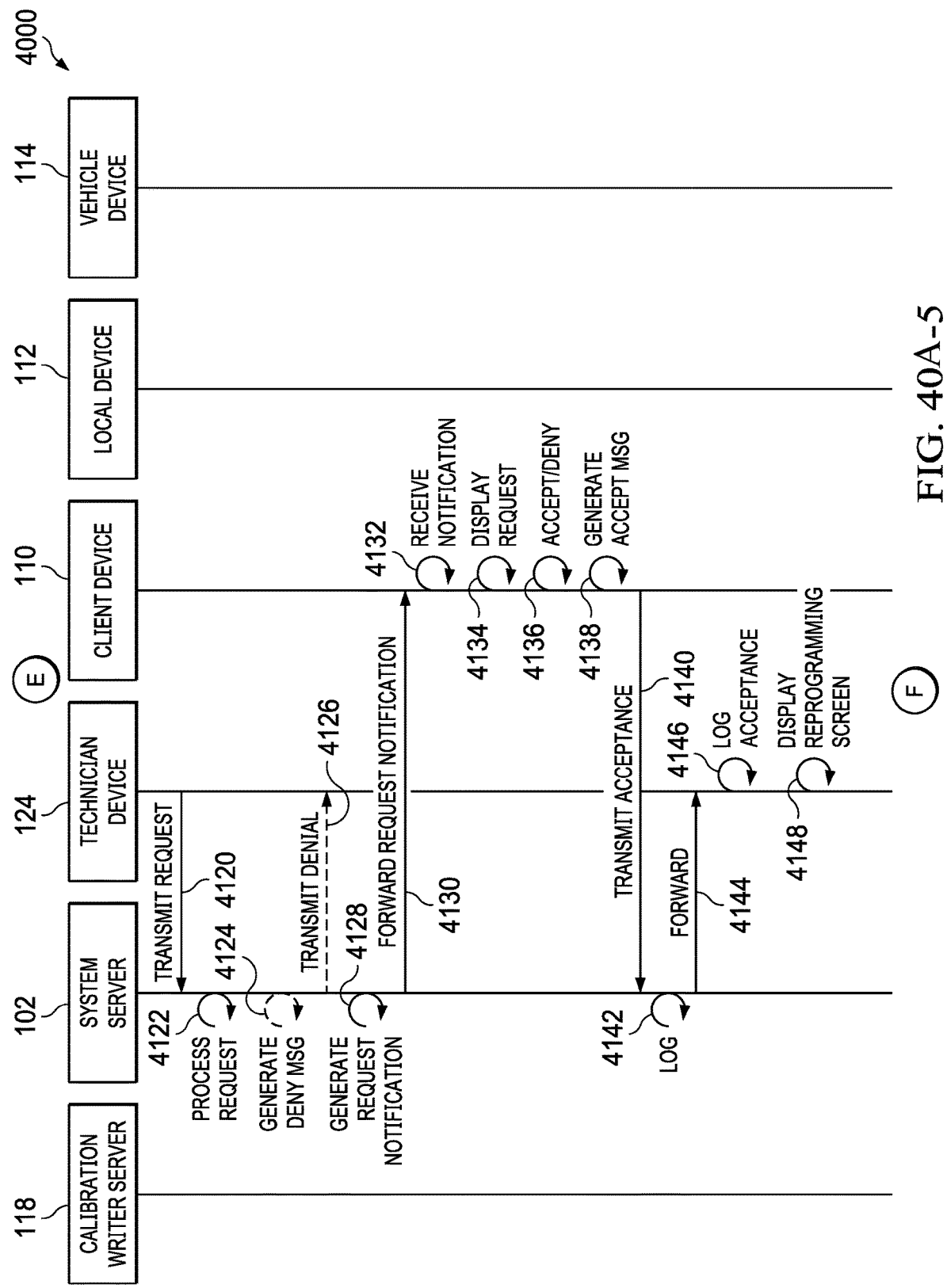
Figures 6, 40A:
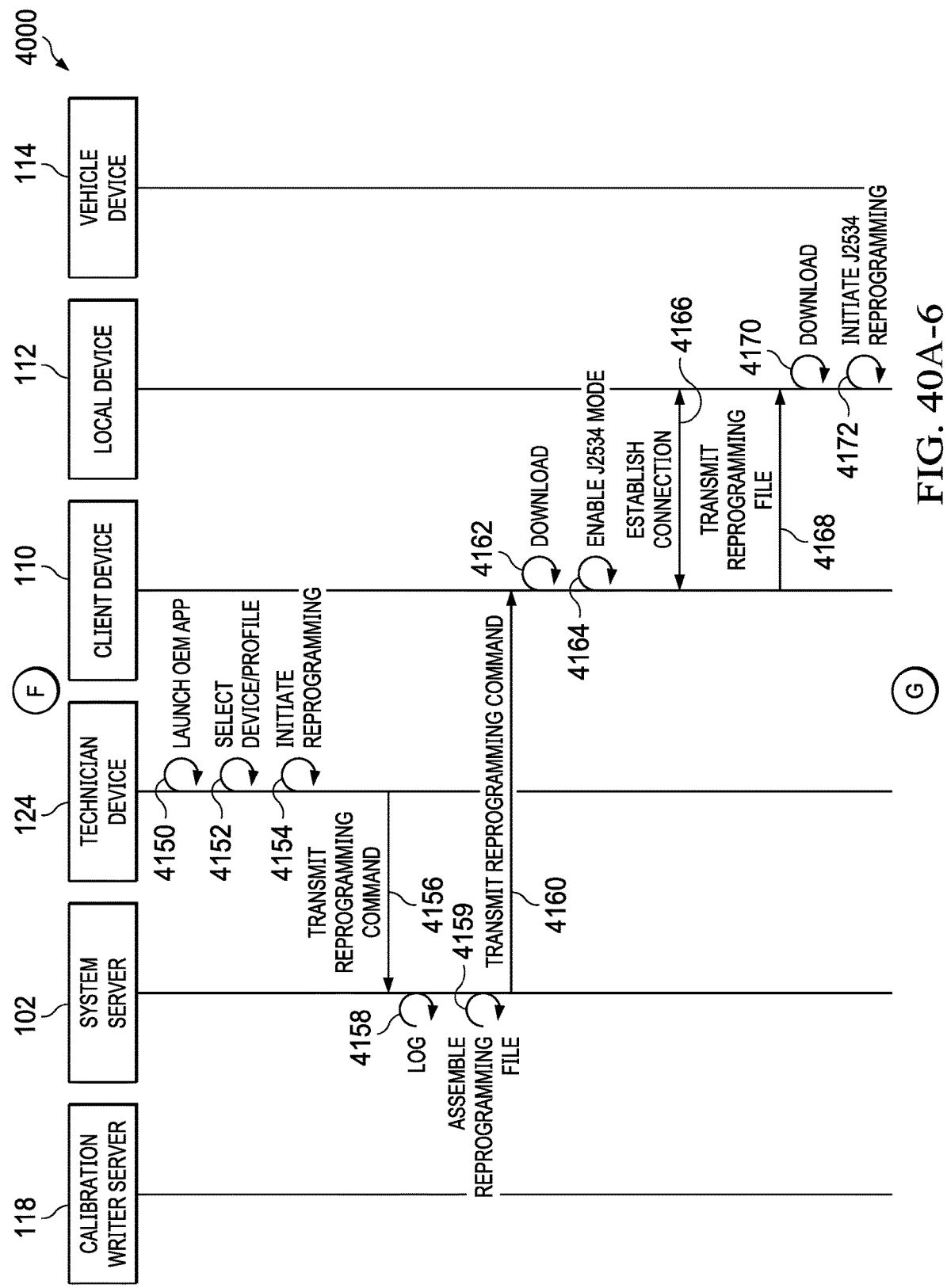
Figures 7, 40A:
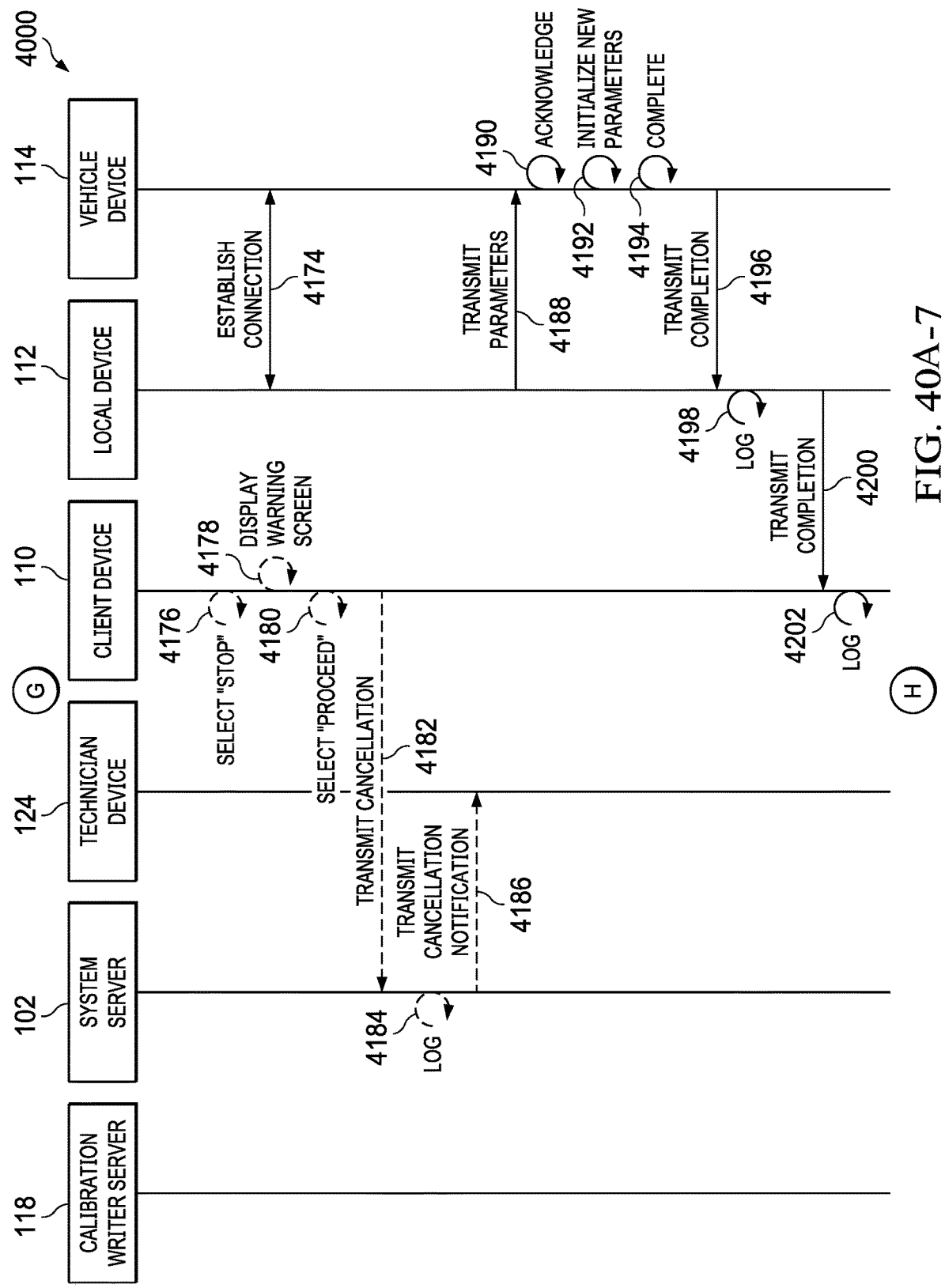

Selected gauge view 14302 of FIG. 14C is similar to selected gauge view 606 of FIG. 6 and is associated with small center gauge view 14303. Small center gauge view 14303 includes outline 14308 to indicate that small center gauge view 14303 is the gauge view that is linked to or associated with selected gauge view 14302 and that large center gauge view 14202 may have been selected from small five gauge view 14101 of FIG. 14B.

Figure 14D:
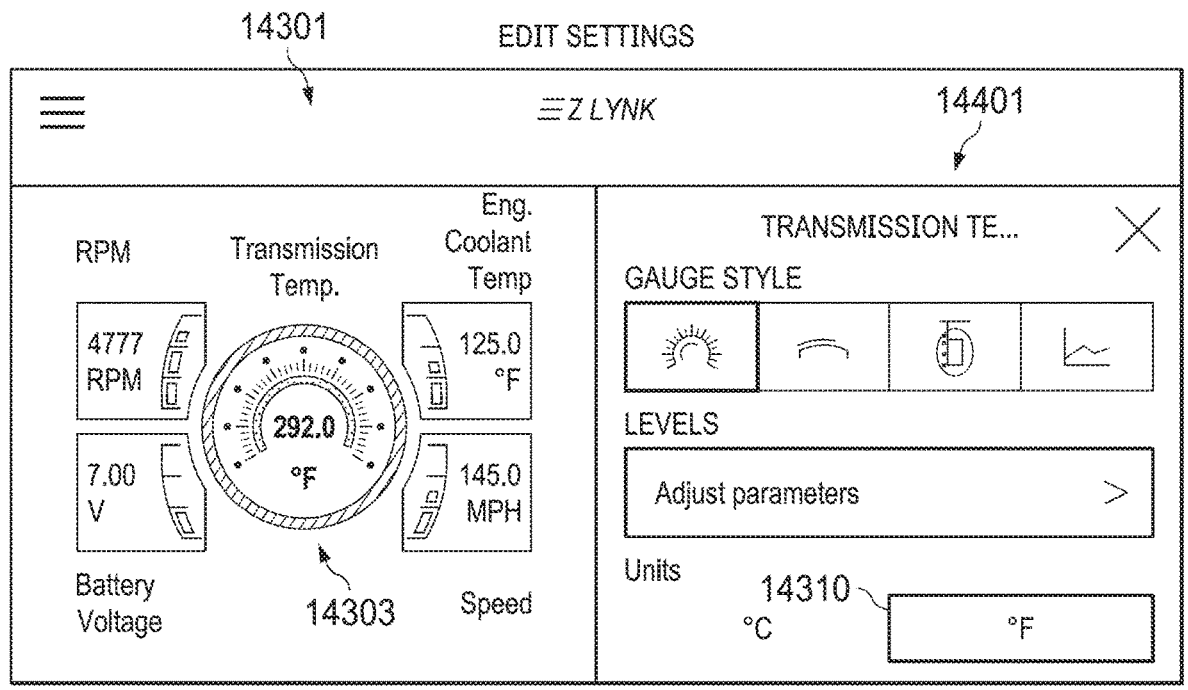
Figure 14E:
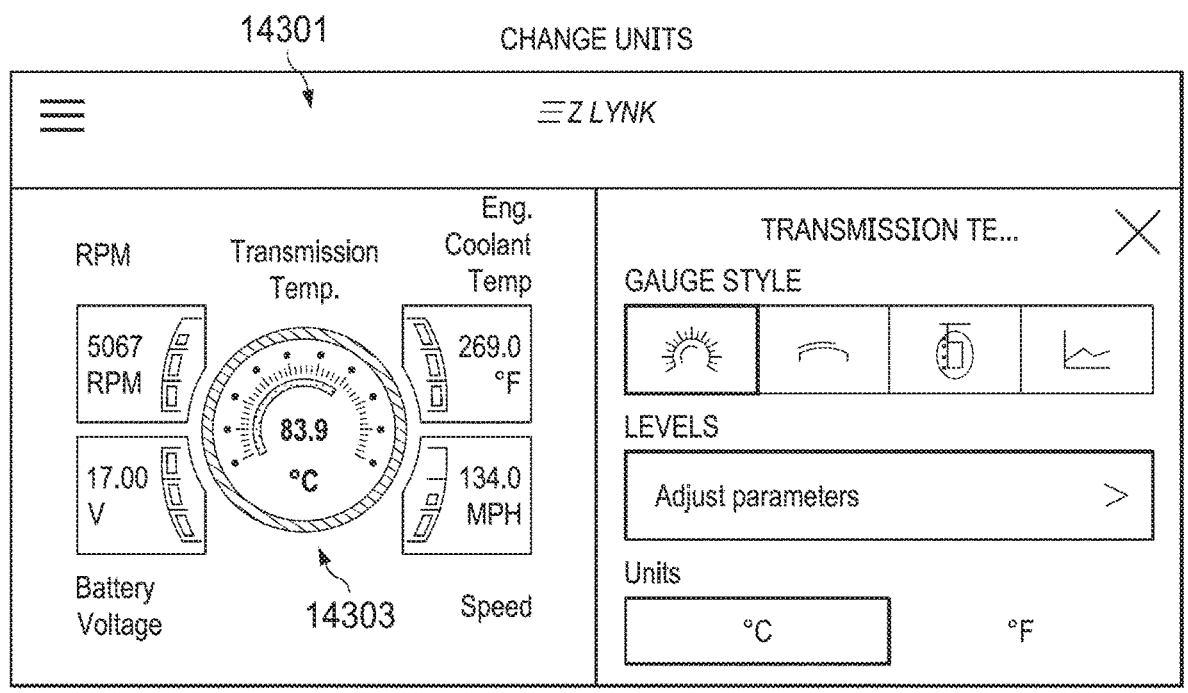
Figures 8, 40A:
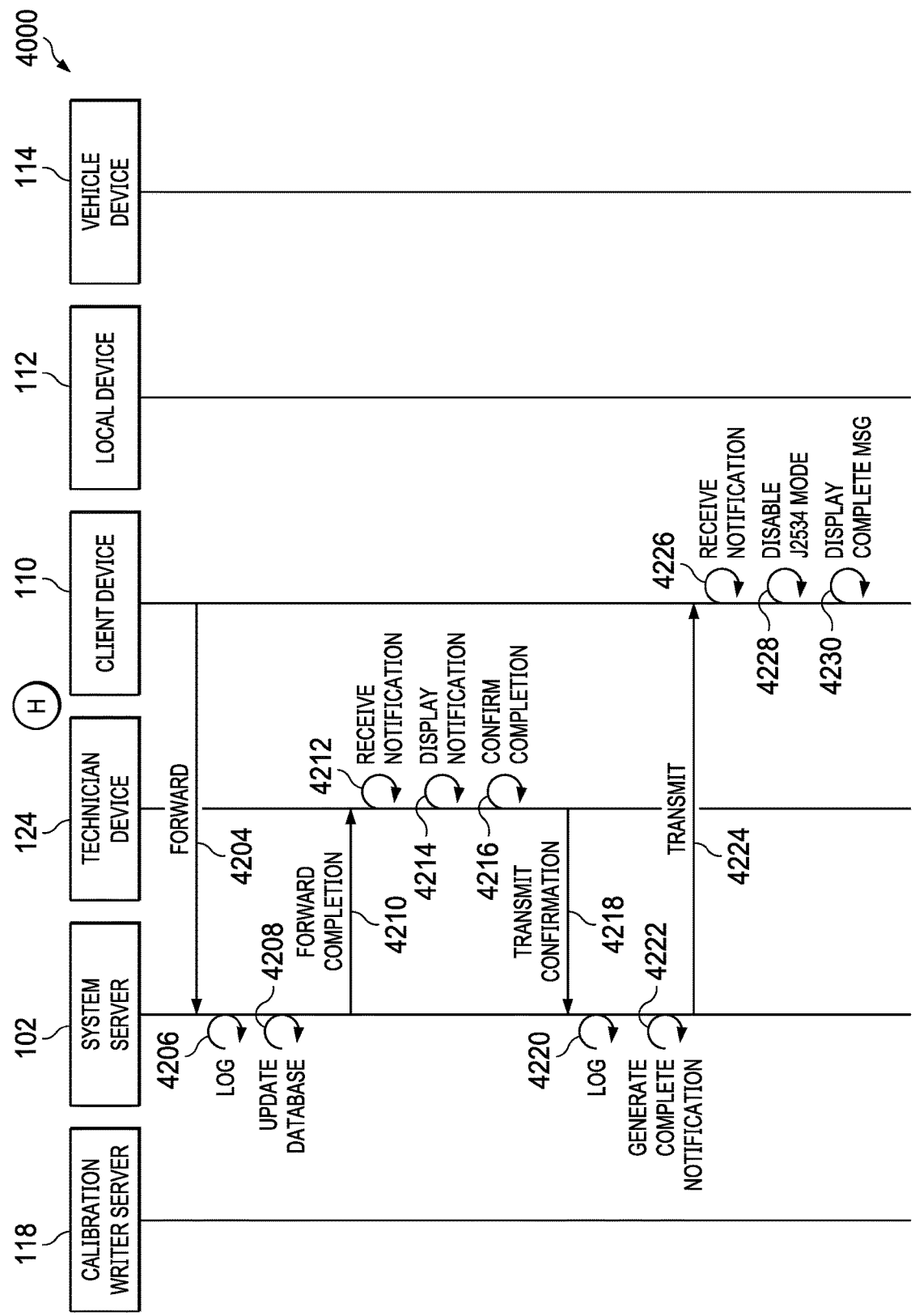

When user interface element 14309 of FIG. 14C is selected, user interface 502 transitions from displaying selected gauge view 14302 of FIG. 14C to displaying settings view 14401 of FIG. 14D. Settings view 14401 of FIG. 14D is similar to settings view 804 of FIG. 8.

Referring to FIG. 14D, degrees Fahrenheit (° F.) were originally selected and displayed on small center gauge view 14303. Upon selection of user interface element 14310, degrees Celsius (° C.) are selected and displayed on small center gauge view 14303.

Referring to FIGS. 15A to 15D, when selected gauge view 14302 is slid or dragged up, second selected gauge view 1502 is revealed. Additionally, small center gauge view 14303 that is associated with transmission temperature is updated to second small center gauge view 1504. Second small center gauge view 1504 is a Boost value that is 29.0 pounds per square inch (PSI).

Figure 15A:
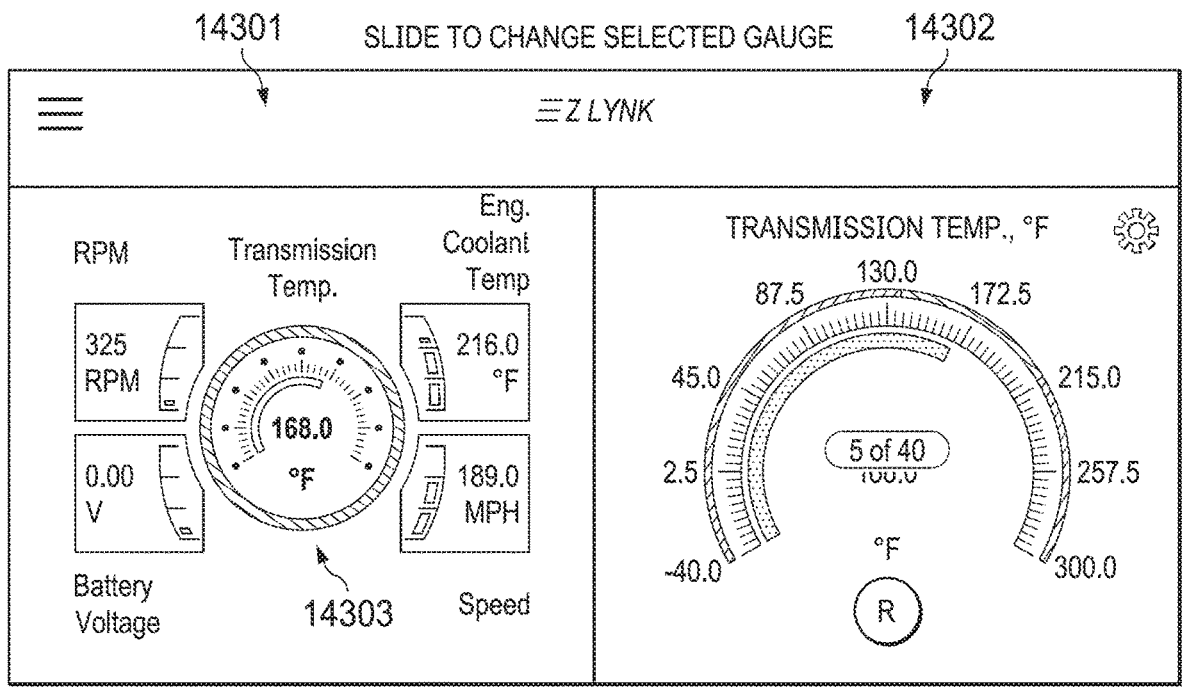
FIGS. 15A through 15D are diagrams of a user interface of a preferred embodiment for selecting gauges for a multiple gauge view.
Figure 15B:
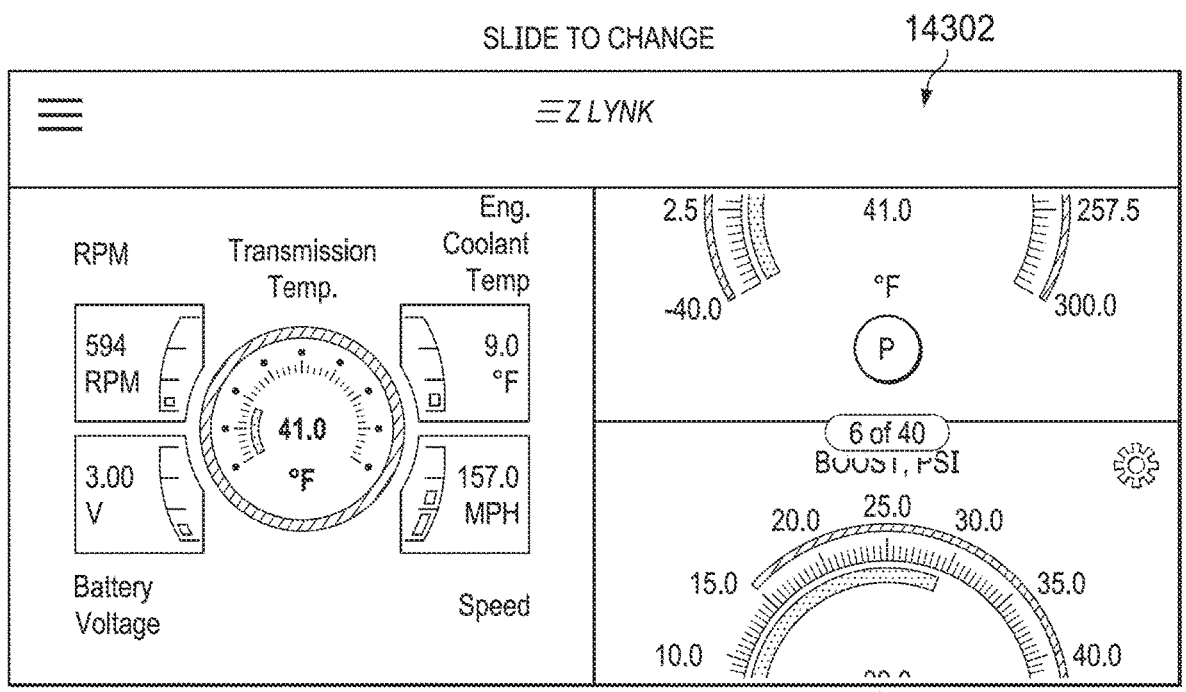
Figure 15C:
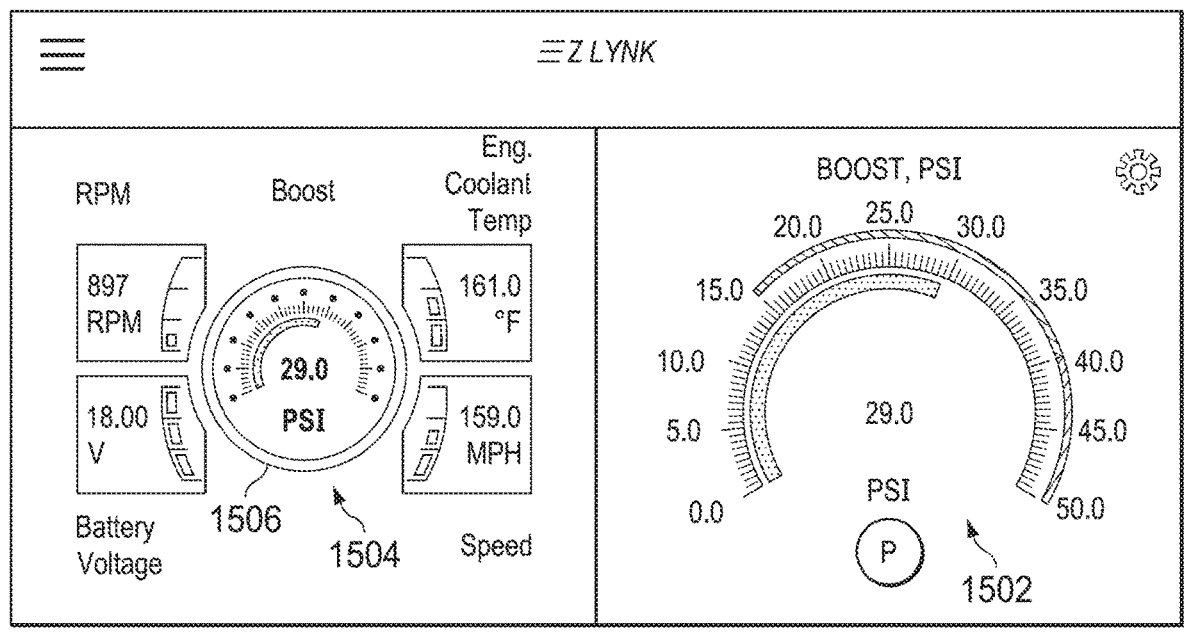
Figure 15D:
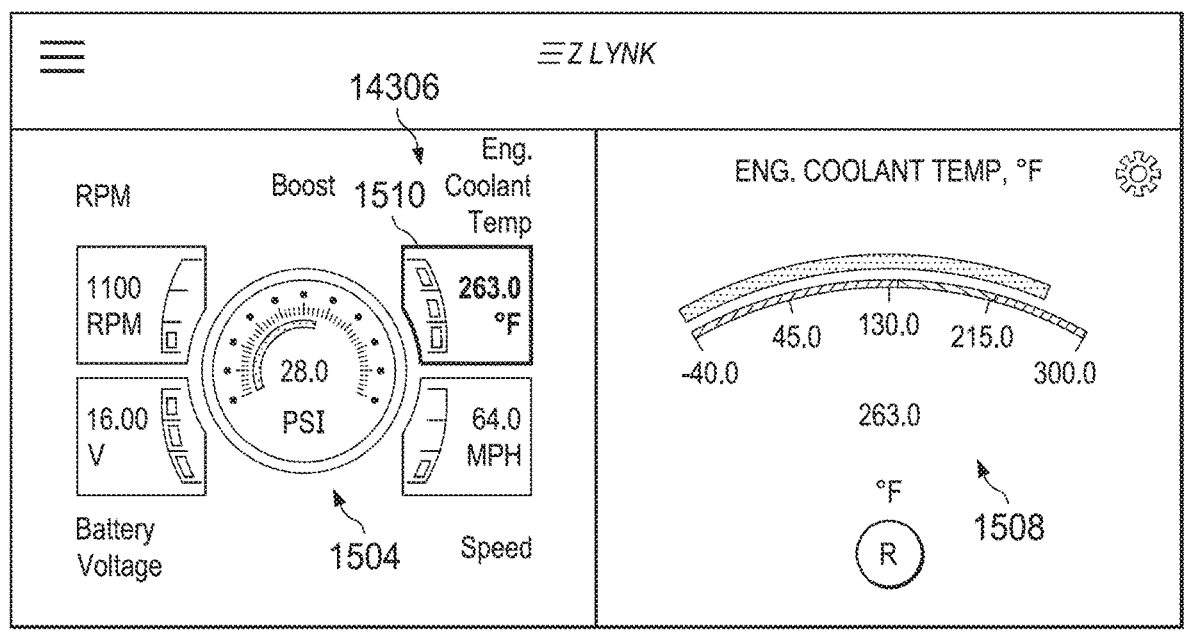

Upon selection of small top right gauge view 14306 in FIG. 15D, second selected gauge view 1502 of FIG. 15C is updated to third selected gauge view 1508 of FIG. 15D, which show the same PID information as small top right gauge view 14306. Small top right gauge view 14306 is updated to include outline 1510 and outline 1506 around second small center gauge view 1504 is removed.

Figure 16A:
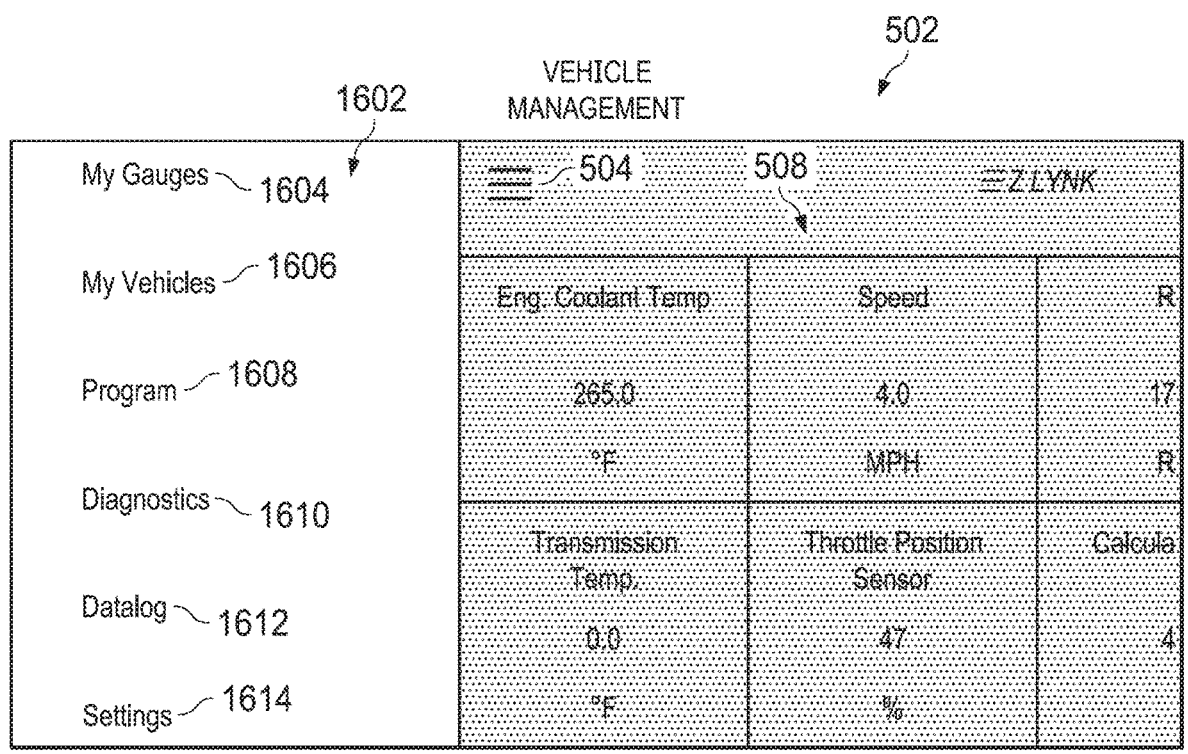
FIGS. 16A through 16E are diagrams of a user interface of a preferred embodiment for vehicle management.

Referring to FIG. 16A, menu button 504 is selected. Eight gauge view 508 slides partially to the right and down and is made more transparent to enhance the display of menu 1602. Menu 1602 includes user interface elements 1604, 1606, 1608, 1610, 1612, and 1614, which may also be referred to as "My Gauges" button 1604, "My Vehicles" button 1606, "Program" button 1608, "Diagnostics" button 1610, "Datalog" button 1612, and "Settings" button 1614.

Selecting button 1604 removes menu 1602 and brings back the most recent gauge view, which in FIG. 16A is eight gauge view 508.

Figure 16B:
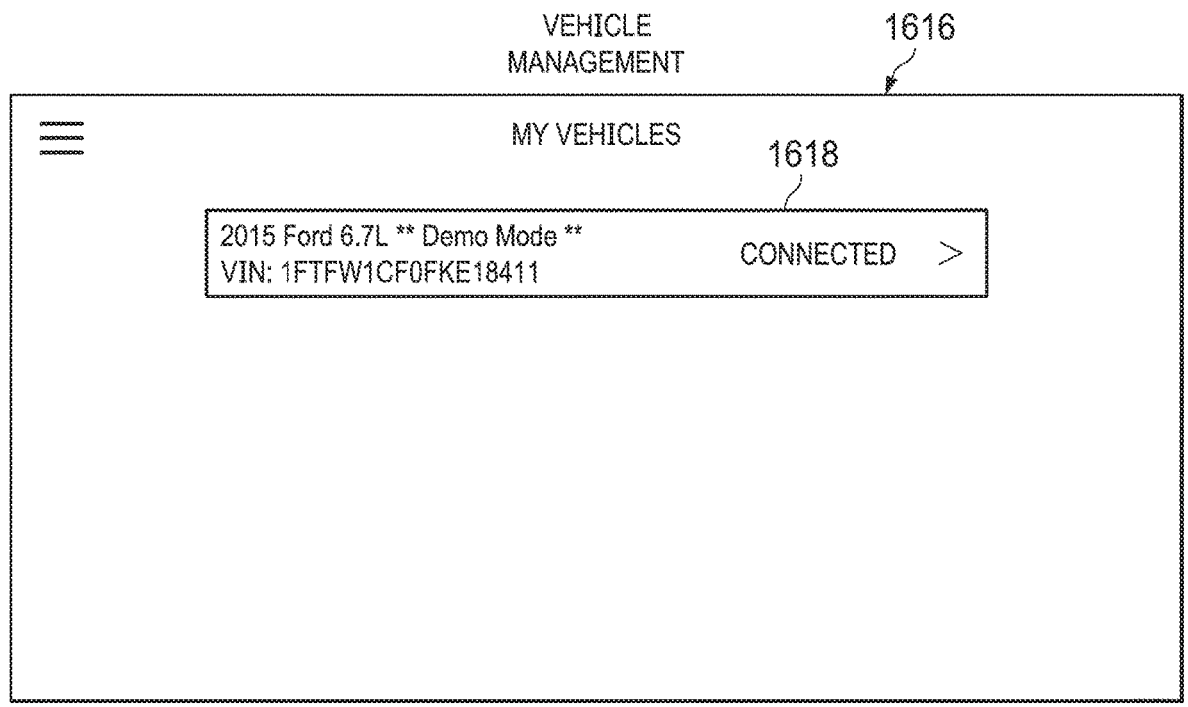
Figure 16C:
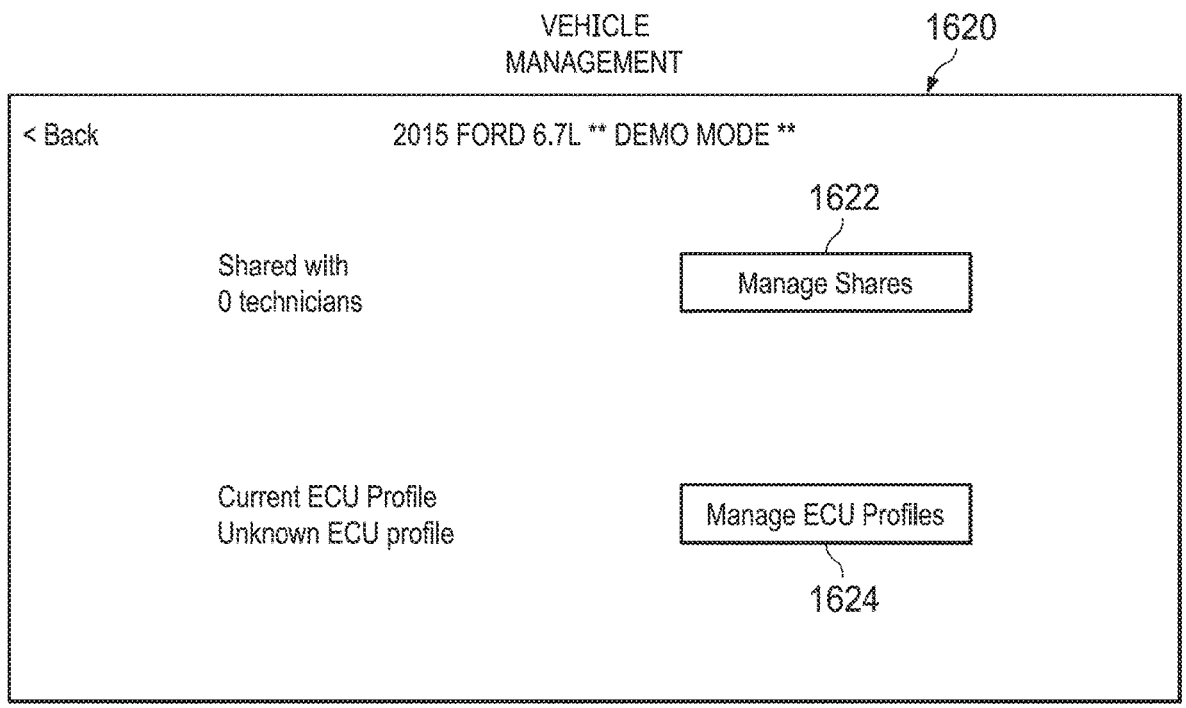

Selecting button 1606 removes menu 1602 and transitions user interface 502 to view 1616 of FIG. 16B. View 1616 may also be referred to as "My Vehicles" view 1616, includes a user interface element for each vehicle that has been associated with the client device app. User interface element 1618 includes the year, make, and model of the vehicle and indicates that the local device is attached to the vehicle associated with user interface Upon selecting user interface element 1618, user interface 502 transitions to view 1620 of FIG. 16C. View 1620 may also be referred to as "Vehicle Management" view 1620, includes user interface elements 1622 and 1624, identifies the number of technicians to which the vehicle has been shared and identifies the current ECU profile.

Figure 16D:
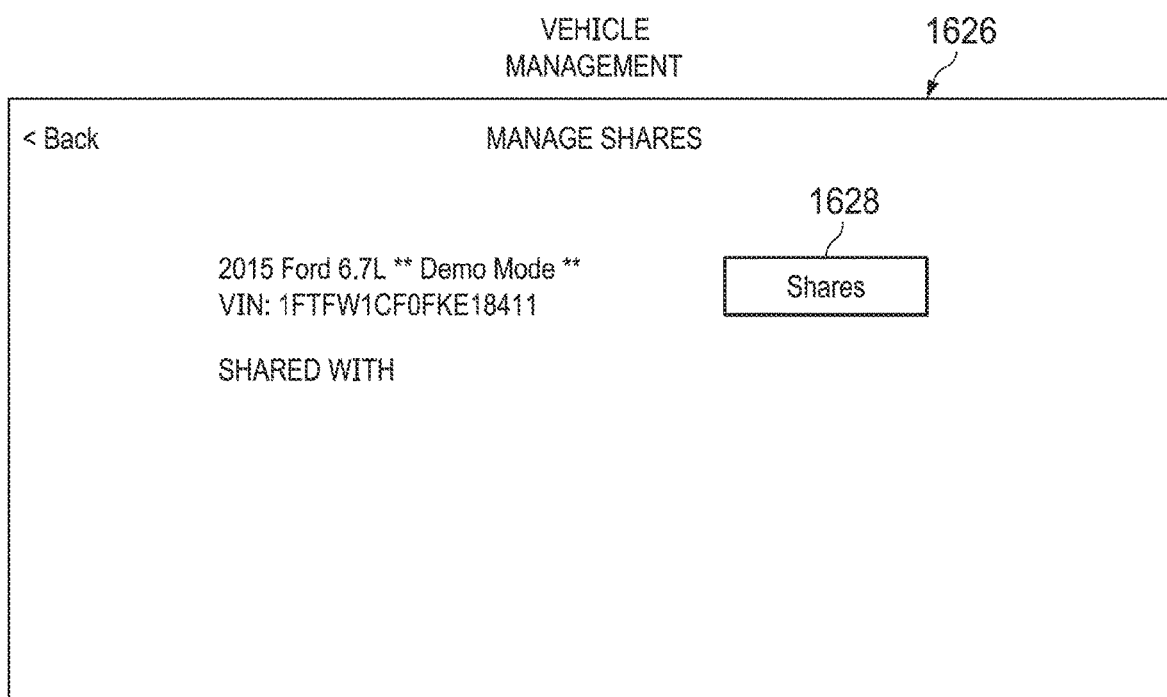

Upon selecting user interface element 1622, user interface 502 transitions to view 1626 of FIG. 16D. View 1626 may also be referred to as "Manage Shares" view 1626, includes user interface element 1628, and lists the technicians to which the vehicle has been shared in one or more user interface elements. As shown, in FIG. 16D, the vehicle has not been shared with any technicians.

Selecting user interface element 1624 brings up a different view (not shown) that allows for the management of ECU profiles. The management of ECU profiles includes: updating one or more parameters within a profile and deleting a profile from the client device.

Figure 16E:
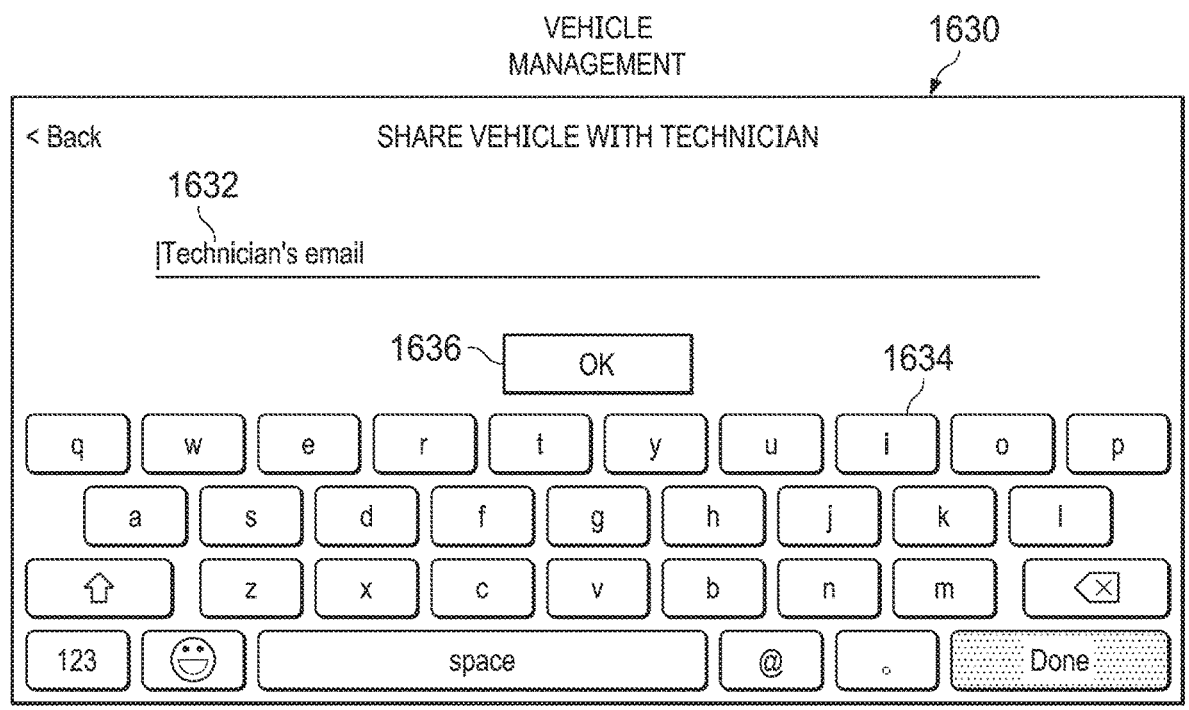

Upon selecting user interface element 1628, user interface 502 transitions to view 1630 of FIG. 16E. View 1630 may also be referred to as "Share Vehicle with Technician" view 1630, includes user interface element 1632, keyboard 1634, and user interface element 1636. User interface element 1632 is an edit box that receives a technician's email address that acts as the login information to access a system server, such as system server 102 of FIG. 1.

In one embodiment, view 1630 of user interface 502 is displayed on a client device that is used by a technician that is diagnosing the car to allow the technician to log into the server. Upon selection of the "Done" button on keyboard 1634 or user interface element 1636, the client device app will attempt to login to the system server and associated (or share) the vehicle with the technician's client device.

In an alternative embodiment, view 1630 of user interface 502 is displayed on a client device that is used by the owner of the vehicle that is being diagnosed. Upon selection of the "Done" button on keyboard 1634 or user interface element 1636, the client device app will send the technician's email address to the server, which will then allow the technician to log in and will then allow the vehicle information from the ODB2 port of the vehicle to be shared with a second client device that is operated by a technician. Sharing the vehicle information with the technician's client device allow the technician to diagnose the vehicle, even when the vehicle and the technician are remotely located.

Figure 17A:
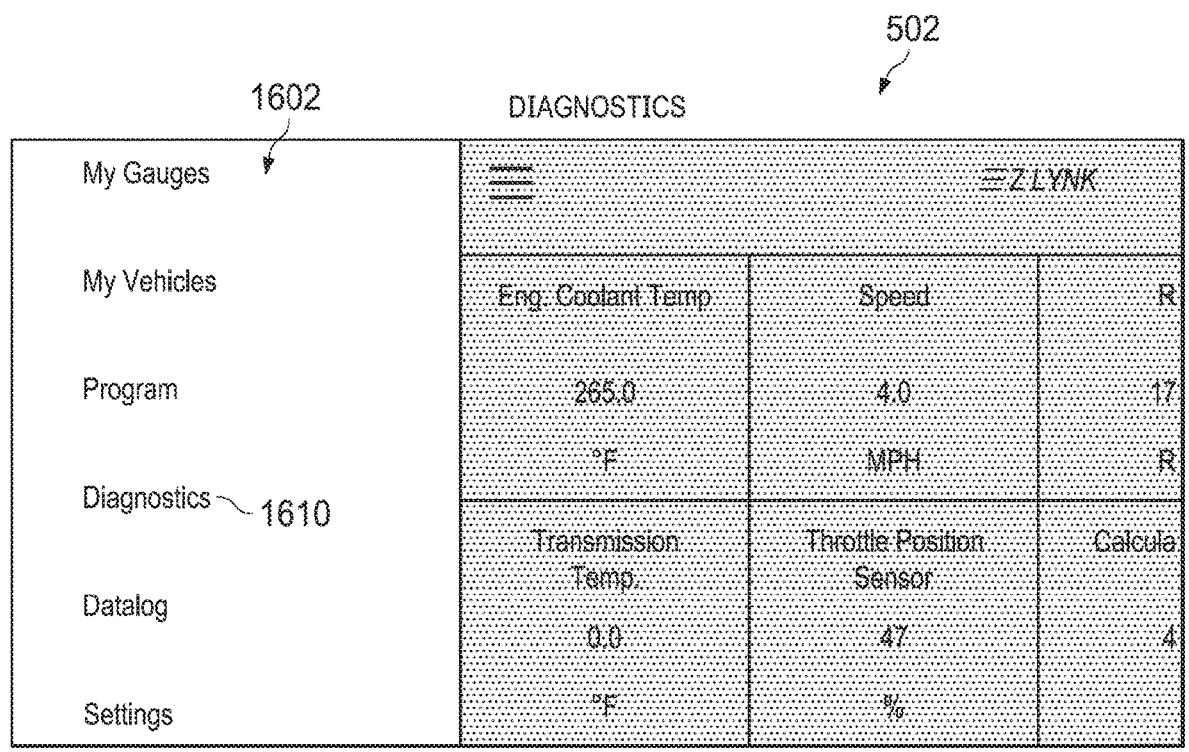
FIGS. 17A through 17C are diagrams of a user interface of a preferred embodiment for displaying diagnostics.
Figure 17B:
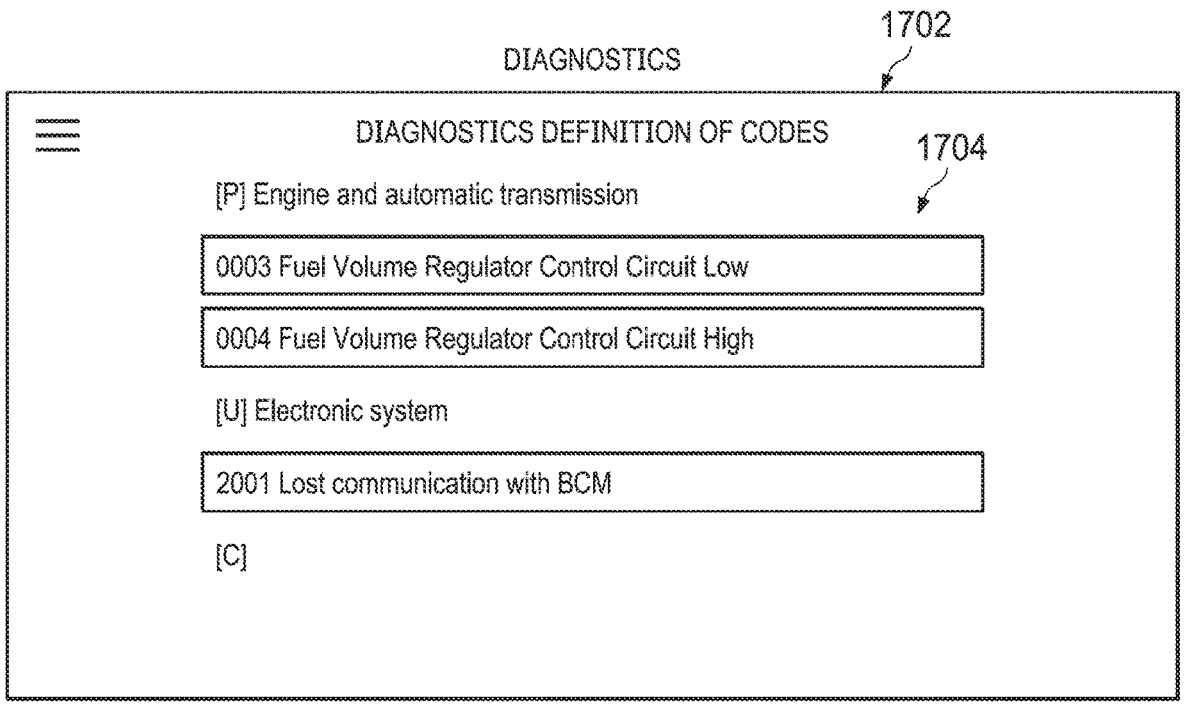
Figure 17C:
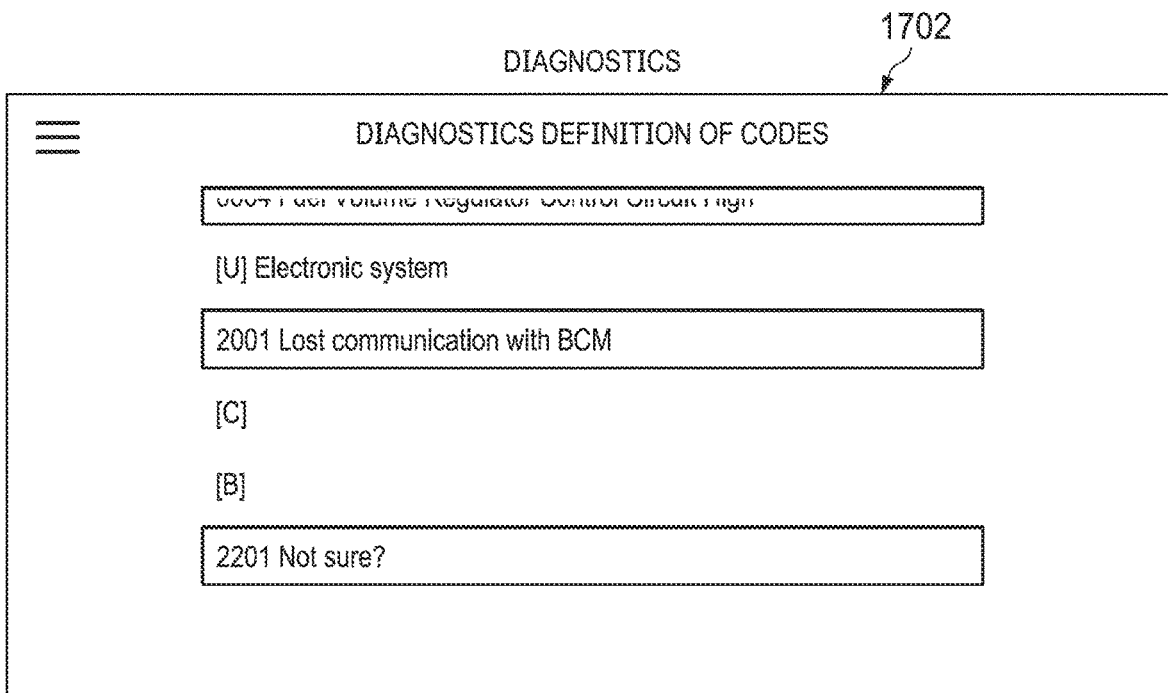
Figure 19A:
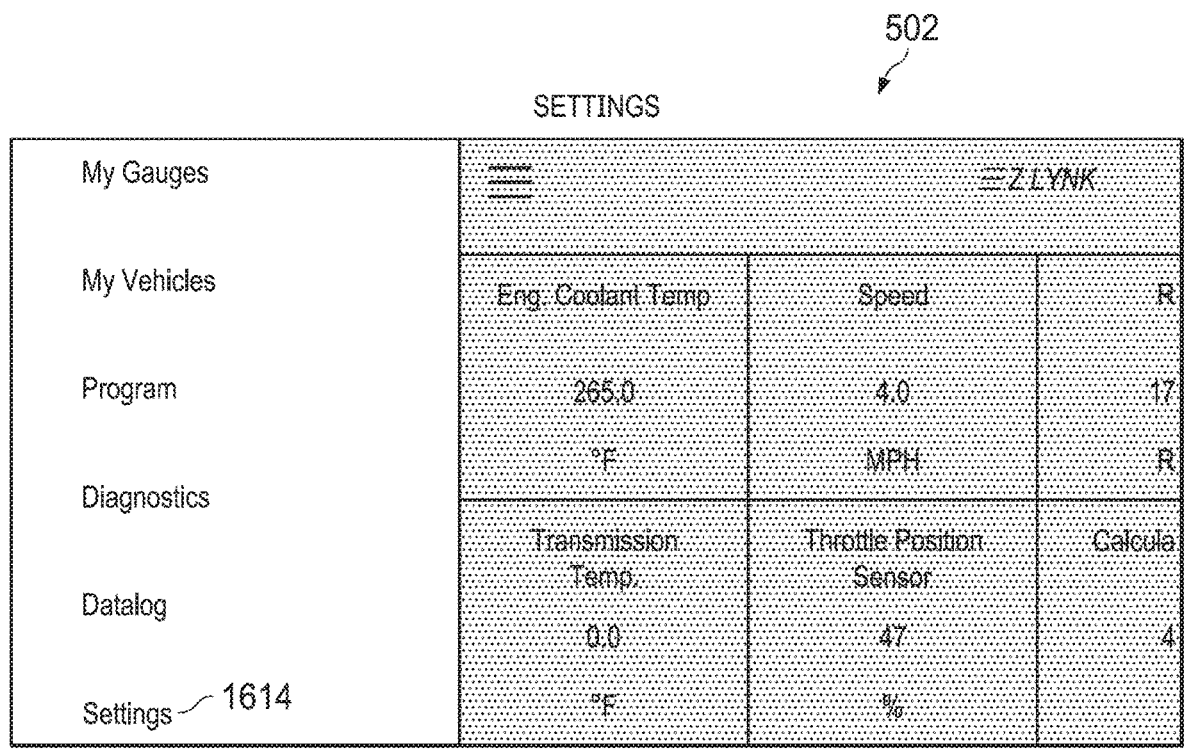
FIGS. 19A through 19D are diagrams of a user interface of a preferred embodiment for settings management.
Figure 19B:
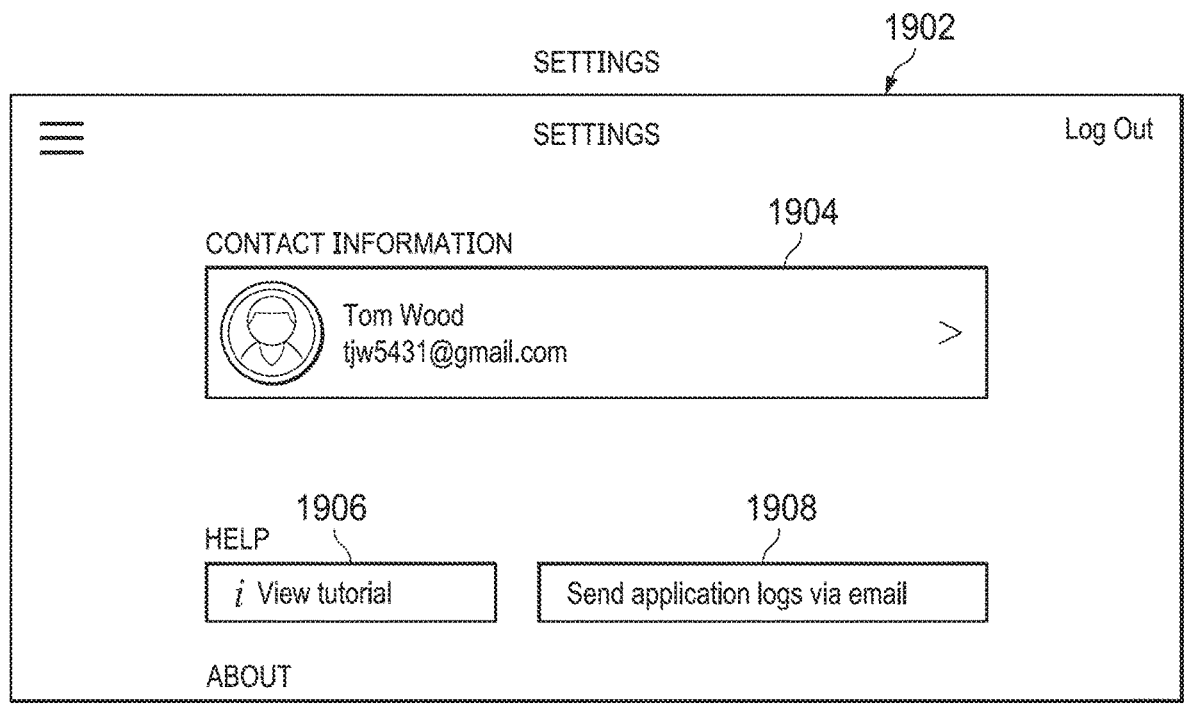
Figure 19C:
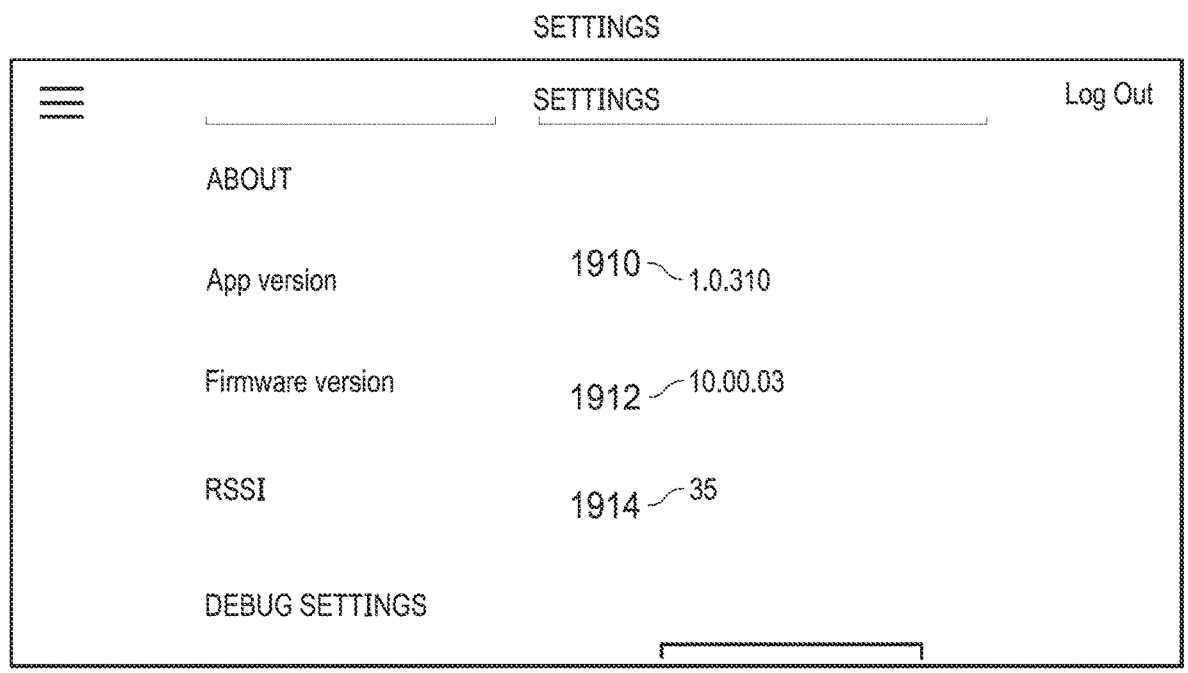
Figure 19D:
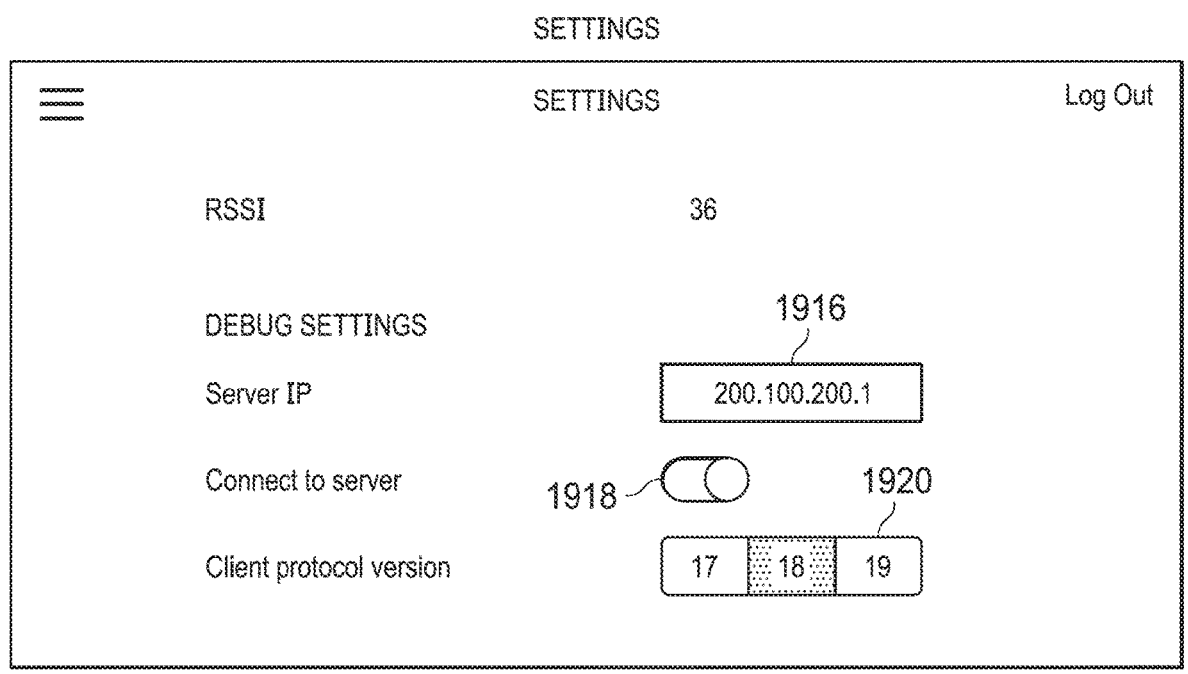

Referring to FIGS. 17A, 17B, 17C, upon selection of user interface element 1610 from menu 1602, user interface 502 displays view 1702. View 1702 may be referred to as "Diagnostics" view 1702 and displays list 1704 of diagnostic codes with a text description of the code. List 1704 is a list that can be scrolled up and down to show more than one page of information. FIG. 17B shows the top of list 1704 and FIG. 17C shows the bottom of list 1704.

Figures 18A, 18B:
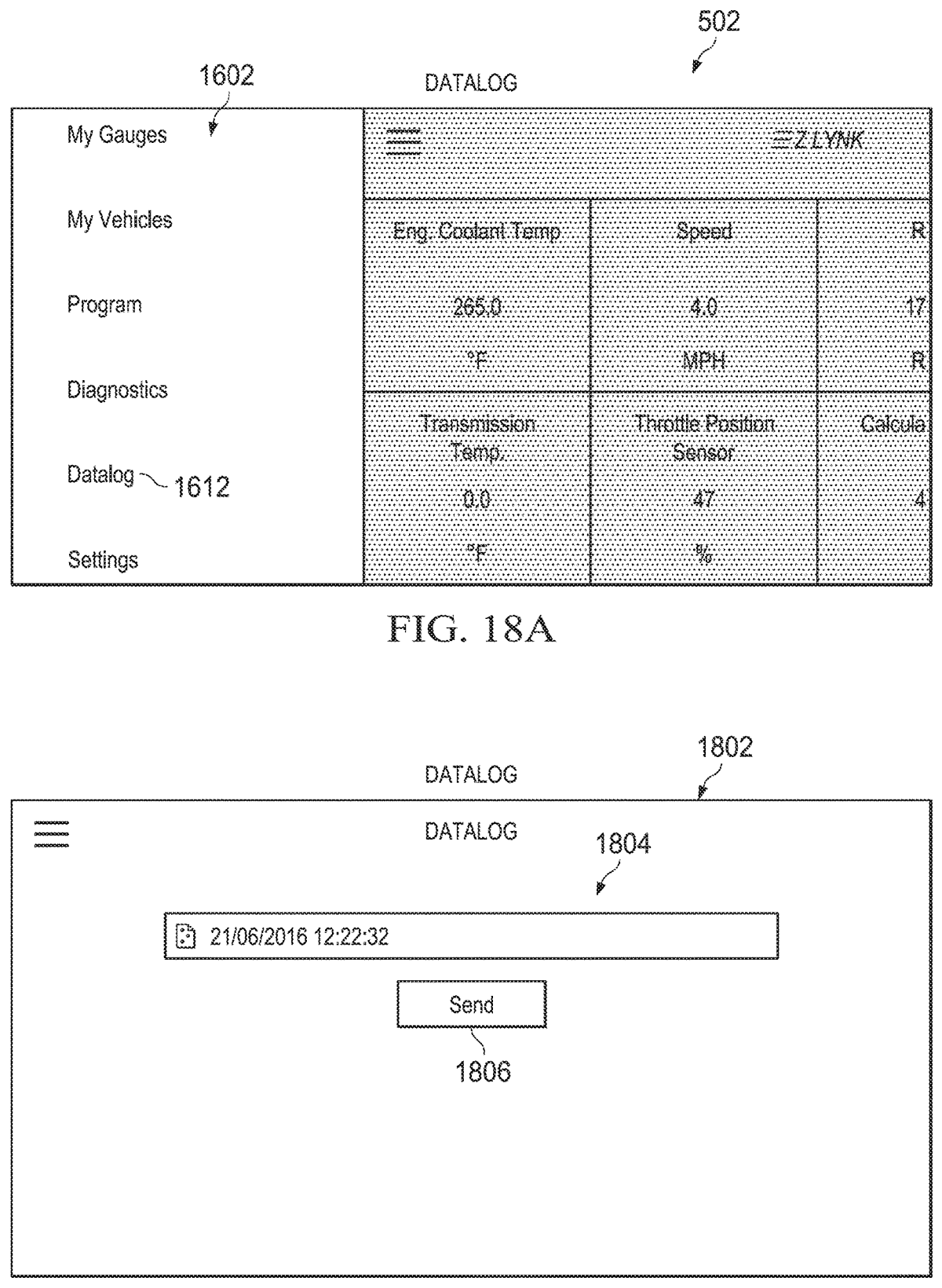

Referring to FIGS. 18A and 18B, upon selection of user interface element 1612 from menu 1602, user interface 502 displays view 1802. View 1802, which may be referred to as "Datalog" view 1802, displays list 1804 of data logs, below which is user interface element 1806. List 1804 is a scrollable list that shows the data logs that can be sent to the system server. The data logs store information received by the client device from the local device that the local device received from the automotive controller. Selecting user interface element 1806 sends a data log that has been selected from list 1804 to the system server.

Referring to FIGS. 19A, 19B, 19C, and 19D, upon selection of user interface element 1614, user interface 502 displays view 1902. View 1902, which may also be referred to as "Settings" view 1902, displays one or more user interface elements that allow the user of the app to view and control various settings related to the app.

User interface element 1904 displays contact information including a name and an email address. When user interface element 1904 is selected, user interface 502 displays another view (not shown) that allows the user to view and manipulate the contact information, which also includes a phone number and a birthday. The contact information is used by the technician to contact the owner of the vehicle that the local device is connected to.

When selected, user interface element 1906 displays one or more videos that show how to use the client device app.

User interface element 1908 is for the development of the client device application itself. When user interface element 1908 selected, the client device app will send the log of information recorded by the client device app via an email to the contact identified in user interface element 1904.

User interface element 1910 displays the version of the client device app that is currently running.

User interface element 1912 displays the version of the firmware running on the local device that is currently running.

User interface element 1914 displays a receive signal strength indicator (RSSI) that indicates the strength of the wireless signal that is sent by the local device and received by the client device.

User interface element 1916 is an edit box that contains the internet protocol (IP) address that the client device will use to connect to the server running on the local device.

User interface element 1918 is a binary selector switch that, when enabled, allows the app to connect to the server running on the local device.

User interface element 1920 is a multiple position single selector switch that is used to select which protocol version that the client device app will use to communicate with the server running on the local device.

Figure 20A:
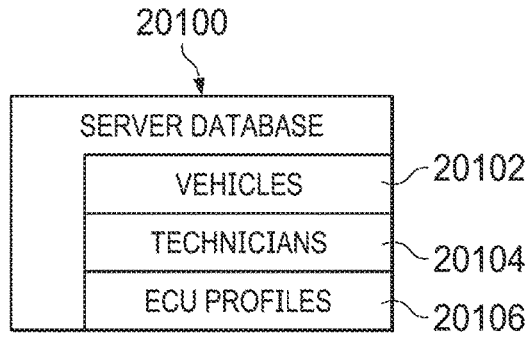
FIGS. 20A through 20D are diagrams of databases and records of a preferred embodiment.

Referring to FIG. 20A, server database 20100 is an embodiment of database 106 that is accessed by system server 102 of FIG. 1. Server database 20100 comprises one or more records, which may themselves be databases. The records can be stored on any device of the system. In one embodiment, server database 20100 includes records for vehicles 20102, technicians 20104, and ECU profiles 20106.

Figure 20B:
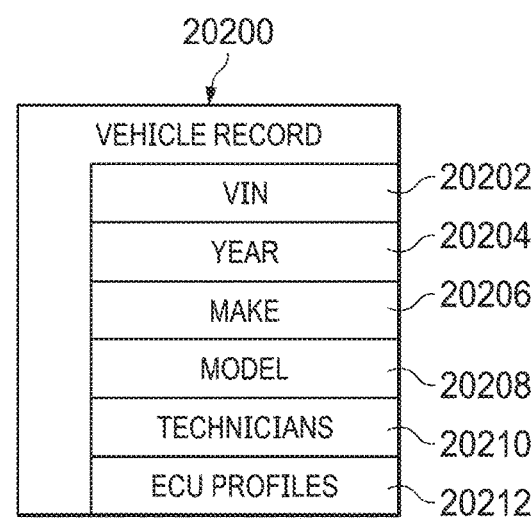

Vehicles 20102 comprise vehicle records 20200 of FIG. 20B that are each associated with a vehicle. Technicians 20104 comprise technician records 20300 that are each associated with a technician. ECU profiles 20106 comprise ECU profile records 20400 that are each associated with an ECU profile.

Referring to FIG. 20B, vehicle record 20200 comprises data and information related to a vehicle. Vehicle identification number (VIN) 20202 is a unique number that is assigned to the vehicle by the manufacturer of the vehicle in accordance with international standard ISO 3833. Year 20204 is the model year of the vehicle, which in one embodiment is stored as an unsigned integer. Make 20206 identifies the manufacturer of the vehicle, which in one embodiment is stored as a string of characters in accordance with either the American Standard Code for Information Interchange (ASCII) or Unicode. Model 20208 identifies the model of the vehicle, which in one embodiment is stored as a string of characters. Technicians 20210 are links to technician records 20300 for each technician that has been associated with the vehicle. ECU profiles 20212 are links to ECU profile records 20400 for each ECU profile that has been associated with the vehicle.

Figure 20C:
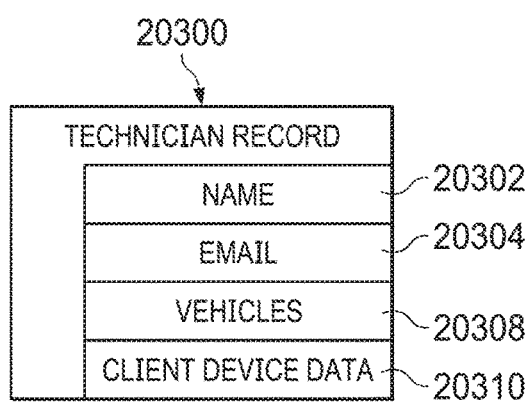

Referring to FIG. 20C, technician record 20300 comprises data and information associated with a technician. Name 20302 is the name of the technician, which in one embodiment is stored as a string of characters. Email 20304 is an email address of the technician that may also serve as a login identifier for the technician and which, in one embodiment, is stored as a string of characters. Vehicles 20308 are links to vehicle records 20200 that are associated with the technician. Client device data 20310 includes data and information about the device that the technician uses to access the system, including: a unique device identifier, operating system (OS) version, client application version, and so on.

Figure 20D:
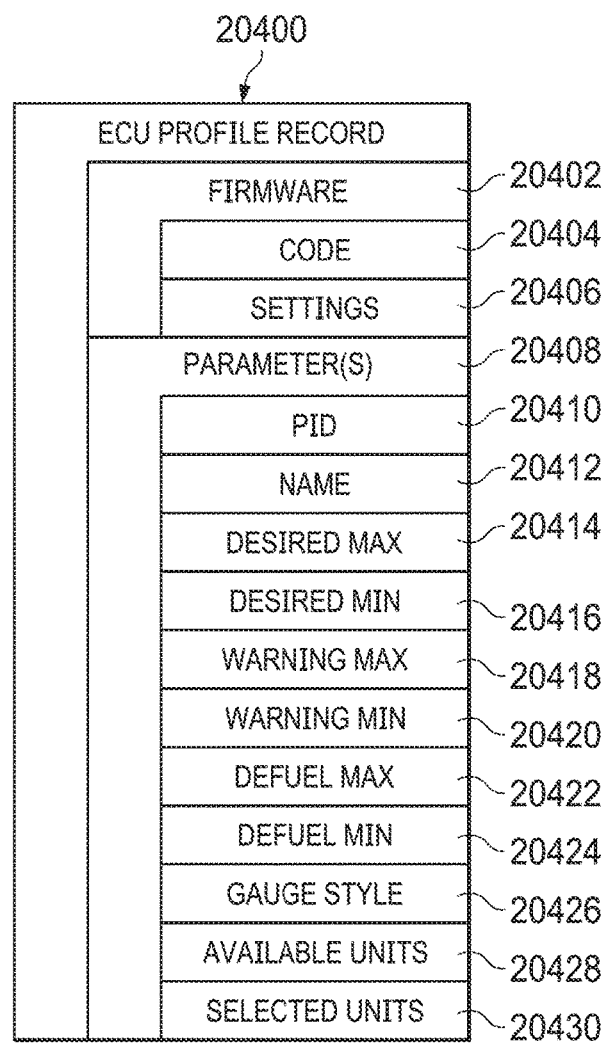

Referring to FIG. 20D, ECU profile record 20400 comprises data and information associated with an ECU profile. ECU profile record 20400 includes firmware 20402 and includes parameters 20408.

Firmware 20402 is the firmware that runs on an automotive controller, such as vehicle device 114 of FIG. 1. Firmware 20402 includes code 20404 and settings 20406. Code 20404 are the computer code instructions that allow the automotive controller to operate. Settings 20406 are the settings used to tune the engine for efficiency or performance, including settings for ignition timing advance, spark timing, fuel injection, electronic throttle control, poppet valve timing, boost control, an anti-lock braking system, an automatic transmission, a speed governor, an electronic stability control system, and so forth.

Parameters 20408 are the parameters for the gauges displayed on a client device, such as client device 110 of FIG. 1. Parameter identifier (PID) 20410 is a numeric identifier that uniquely identifies the type of data from the automotive controller associated with the parameter. Name 20412 identifies the name of the parameter, which can include: engine coolant temperature, speed, revolutions per minute, battery voltage, transmission temperature, boost, calculated load, injector pressure, injector pulse width, throttle position sensor, and so on. Desired max 20414 is a numerical value that indicates a maximum desired value for the parameter. Desired min 20416 is a numerical value that indicates a minimum desired value for the parameter.

Warning max 20418 is a numerical value that indicates the beginning of an upper warning range. Warning min 20420 is a numerical value that indicates the end of a lower warning range. Continued operation of the vehicle with the values associated with the parameter above warning max 20418 or below warning min 20420 could lead to a breakdown of the engine.

Defuel max 20422 is a numerical value that indicates the threshold above which the vehicle will be defueled to prevent a breakdown. Defuel min 20424 is a numerical value that indicates the threshold below which the vehicle will be defueled to prevent a breakdown.

Gauge style 20426 identifies the style of the gauge that will be used to display the parameter values on the client device.

Available units 20428 is a list of units that can be used to display the values related to parameter 20408. Selected units 20430 identifies which units of available units 20428 will be used to display the values of parameter 20408.

Figure 21:
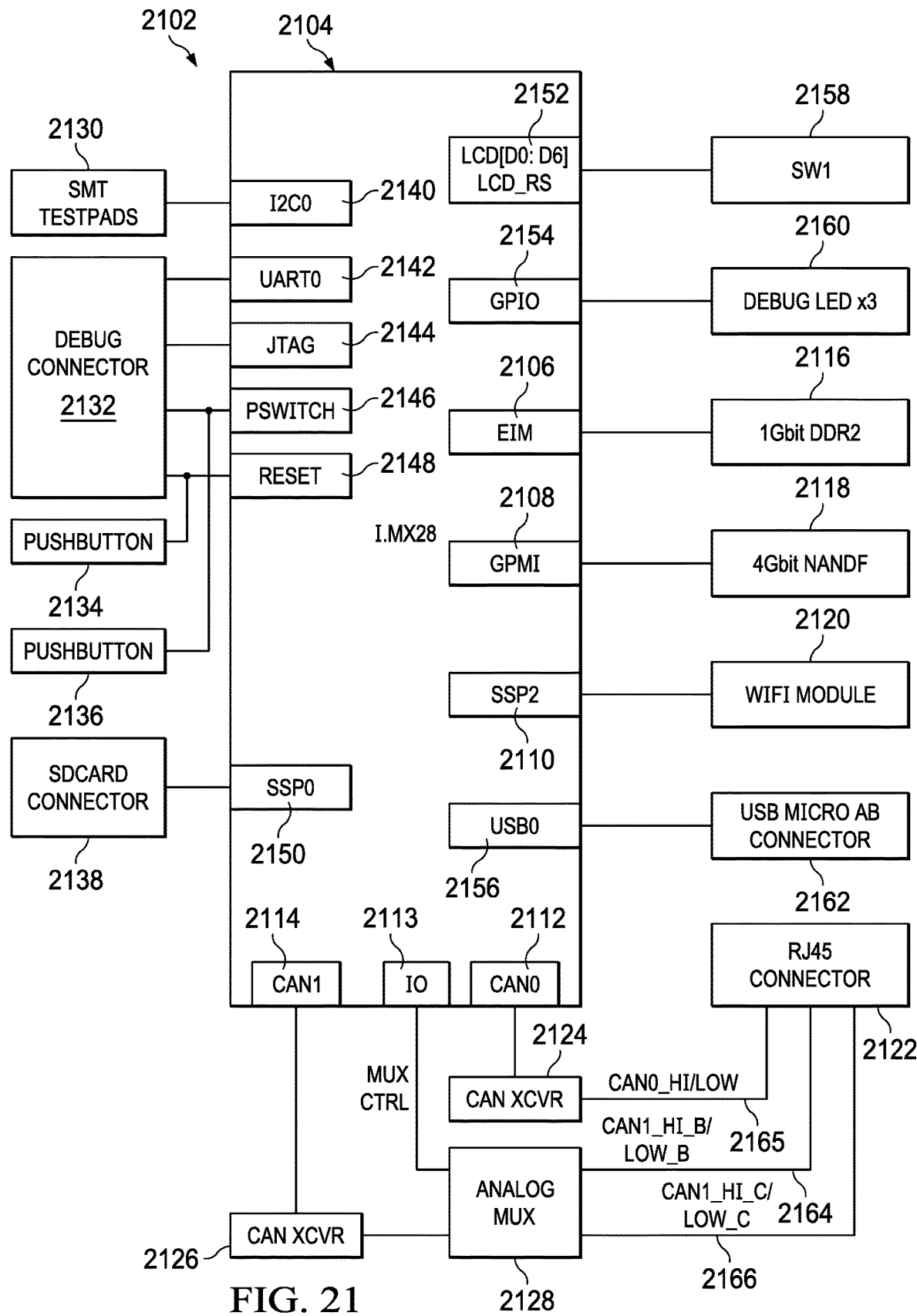
FIG. 21 is a block diagram of a local device of a preferred embodiment.

Referring to FIG. 21, system 2102 is a system within local device 112 of FIG. 1. A preferred embodiment of local device 112 includes the Freescale IMX28 Microcontroller, a UART for translation between parallel and serial data forms, Wi-Fi connectivity employing the IEEE 802.11 standard or other wireless protocol for communication between client device 110 and the local device 112 and provisions for a local interconnect network LIN for communication between vehicle components and a CAN BUS for communication between microcontrollers and other devices. System 2102 includes application processor 2104 that controls local device 112. System 2102 includes: external memory interface (EMI) 2106, general-purpose media interface (GPMI) 2108, synchronous serial port (SSP) 2110 and controller area network (CAN) interfaces 2112 and 2114.

EMI 2106 is connected to memory 2116 and GPMI 2108 is connected to memory 2118. In one embodiment, memory 2118 is lower speed persistent memory that stores the programs and data run by application processor 2104 using memory 2116.

SSP 2110 is connected to Wi-Fi module 2120 to allow for wireless communication. In one embodiment, program instructions stored one or more of memory 2116 and memory 2118 are executed by application processor 2104 so that local device 112 may function as an access point to which a client device can connect.

CAN0 interface 2112 is connected to a first CAN transceiver 2124 of a vehicle via the CAN0_HI/LOW link 2165 to connector 2122. CAN1 interface 2114 is connected to a second CAN transceiver 2126 through analog multiplexer 2128 and connector 2122. Analog multiplexer 2128 is connected to connecter 2122 through a CAN1_HI_B/LOW_B line 2164 and a CAN1_HI_C/LOW_C line 2166. Input/Output multiplexor control 2113 is also connected to analog multiplexor 2128. In one embodiment, connector 2122 is an RJ45 connector and an adapter (not shown) is connected between connector 2122 and the on-board diagnostics (OBD) port on the vehicle.

Analog multiplexer 2128 is controlled by an output signal from input/output multiplexor control 2113 of application processor 2104 to select between line 2164 and line 2166 for the CAN1 interface. This allows the system to be connected to different vehicles that use different pins on an OBD port for the second CAN interface (i.e., CAN1).

SMT (suface mount) test pads 2130 are the physical access points to I2C0 bus 2140. I2C0 bus 2140 allows for connecting application processor 2104 to external peripherals that operate in accordance with the I2C interface standard.

Debug connector 2132 is the physical access point for several debugging ports on application processor 2104 including UART0 2142, JTAG 2144, power switch pin 2146, and reset pin 2148. UART0 2142 (universal asynchronous receive transmit) is a serial port that allows for connecting application processor 2104 to external peripherals that use a serial bus interface. JTAG 2144 is a port that allows for access using with peripherals the Joint test Action Group standard for debugging ports. Power switch pin 2146 is an input to application processor 2104 that is used to indicate when application processor 2104 should power off and can be activated with push button 2136. Reset pin 2148 is an input to application processor 2104 that is used to reset application processor 2104 and which can be activated with push button 2134.

Push button 2134 is a physical button that can be used to reset application processor 2104. Activation of push button 2134 triggers reset pin 2148 of application processor 2104 to cause application processor 2104 to reset.

Push button 2136 is a physical button that can be used to power down processor 2104 upon the activation of push button 2136.

SD card connector 2138 is the physical interface used to connect an SD card to application processor 2104 through SSP0 2150. SSP0 2150 is a synchronous serial port interface used to connect application processor 2104 to external memory.

LCD pins 2152 are connected to switch 2158. Switch 2158 sets LCD pins 2152 to identify the memory from which processor 2104 will attempt to boot after powering on.

GPIO pins 2154 are connected to LEDs 2160. In a preferred embodiment, LEDs 2160 include a red LED that activates to indicate an error, a blue LED that provides the status of a wireless connection, and a green led to indicate that the system is powered on.

USB port 2156 is a universal serial bus (USB) port on processor 2104 that is used to connect processor 2104 to external devices that utilize the universal serial bus protocols and standards. USB port 2156 is attached to USB connector 2162, which provides the physical connection for external peripherals.

Referring to FIG. 22, system 22000 includes servers (22008 and 22020) and devices (22032, 22046, 22060, 22074, and 22090) that each contain at least one processor (22010, 22022, 22034, 22048, 22062, 22076, and 22092), at least one memory (22012, 22024, 22036, 22050, 22064, 22078, and 22094), and at least one network connection (22018, 22030, 22042, 22044, 22056, 22058, 22070, 22072, 22084, 22086, 22088, and 22100). The network connections are used to communicate messages, data, information, code, instructions, alerts, and notifications (22016, 22028, 22040, 22054, 22068, 22082, and 22098) through the system using one or more networks (22002, 22004, and 22006). The servers and devices execute programs, program code, instructions, and applications (22014, 22026, 22038, 22052, 22066, 22080, and 22096) stored in memory that cause the servers and devices to activate and execute programs in response to the messages passed through the system. In a preferred embodiment, the servers and devices are activated in response to messages that were transmitted over a wireless network and that include instructions to activate the user client device and execute one or more programs, instructions, and code. In a preferred embodiment, each message transmitted in the system includes a cryptographic hash value that is generated from the data within the message, a random number, and a cryptographic hash value provided by system 22000, where a number of contiguous bits with the cryptographic hash value that have the same value (0 or 1) is greater than a predetermined threshold.

Internet 22002, mobile network 22004, and vehicle network 22006 provide network access to the servers and devices of system 22000 so that data and information may be exchanged between the devices and servers of system 22000. Each of networks 22002, 22004, and 22006 include one or more routers, switches, wireless connections, and wired connections that are utilized by the servers and devices of system 22000 to communicate.

Administration server 22008 includes, or has access to, databases that store all of the data and information used by system 22000, which includes account information for technicians that use technician client device 22046, account information for customers that use customer client device 22060, local device information, and vehicle information related to vehicle device 22090. Administration server 22008 manages this information and provides access to this information through a website that is accessible by technician client device 22046, administrator device 22032, and customer client device 22060. Administration server 22008 also stores ECU profiles that are provided to technician client device 22046 on demand. Administration server 22008 is a cloud server that enables remote access to the data and information from vehicle device 22090 to technician client device 22046.

Third-party server 22020 provides access to one or more ECU profiles that can be accessed and retrieved upon request by administration server 22008. In some embodiments, the third-party server 22020 includes a motor authority server configured to receive ELD data such as RODS.

Administrator device 22032 is used to monitor, control, and manage administration server 22008. Administrator device 22032 is used to review, manage, and update the accounts controlled by administration server 22008.

Technician client device 22046 is used to diagnose the vehicle in which vehicle device 22090 is installed. Technician client device 22046 sends and receives messages, data, and information with administration server 22008 through one or more networks, such as internet 22002 and mobile network 22004. Technician client device 22046 displays live data, logged data, and ECU profiles that are related to vehicle device 22090 and have been received from vehicle device 22090 through system 22000. With technician client device 22046, a technician can review live data and logged data and then edit an ECU profile that is customized based on the live data and the log data and is sent to vehicle device 22090.

In some embodiments, system 22000 includes, instead of technician client device 22046, a motor authority or safety office client device that is communicationly coupled with the motor authority server.

Customer client device 22060 is used to create a connection between local device 22074 and the rest of system 22000, so that administration server 22008 can receive the live data, logged data, and ECU profile data from vehicle device 22090. Customer client device 22060 also allows for the display of the live and logged data generated by vehicle device 22090 and received through local device 22074 through vehicle network 22006. Customer client device 22060 stores ECU profiles that can be used by vehicle device 22090 and a user of customer client device 22060 can select one of the ECU profiles to be sent to local device 22074 to be loaded onto vehicle device 22090.

Local device 22074 operates to receive data from vehicle device 22090 so that the vehicle data may be published to administration server 22008 as well as to customer client device 22060. The connection between local device 22074 and administration server 22008 can be through vehicle network 22006 with network connection 22086 which utilizes customer client device 22060 as a pass-through to reach administration server 22008. Additionally, network connection 22084 can be utilized so that local device 22074 transmits the vehicle data to mobile network 22004 and is eventually received by administration server 22008 through internet 22002. Utilizing network connection 22084 to mobile network 22004, instead of network connection 22086 to vehicle network 22006 creates a more direct connection between local device 22074 and administration server 22008. In a preferred embodiment, network connection 22088 of local device 22074 is connected to network connection 22100 of vehicle device 22090, which is an OBD port.

Vehicle device 22090 manages the sensors, systems, and devices that are utilized to operate a vehicle. After a connection is established with local device 22074, vehicle device 22090 publishes data and information about the vehicle and receives commands from local device 22074. The commands received by vehicle device 22090 from local device 22074 are executed by vehicle device 22090 to operate the systems, sensors, and devices of the vehicle. Stored in memory 22094 of vehicle device 22090, is at least one ECU profile that contains one or more settings, parameters, codes, and instructions that are utilized by vehicle device 22090 to control operation of the vehicle into which vehicle device 22090 is installed. In a preferred embodiment, vehicle device 22090 is an engine control unit.

Referring to FIGS. 23A through 23G, method 23000 details the several steps utilized by system 22000 to perform the operations of acquiring tokens for a technician to use system 22000 with technician client device 22046, displaying logged data, displaying live data, and updating ECU profiles using cloud services provided by administration server 22008. For example, a customer can call a technician and ask for help with diagnosing their vehicle. The technician uses technician client device 22046 to connect to vehicle device 22090 through system 22000. The technician reviews logged vehicle data and live vehicle data that is provided through system 22000. System 22000 recommends, based on the vehicle data, updates to the ECU profile that is being used by vehicle device 22090. The technician customizes and updates the suggested ECU profile and instructs system 22000 to download the ECU profile to vehicle device 22090.

Referring to FIG. 23A, at step 23020, technician client device 22046 selects a token acquisition request. The selection is made by a technician using technician client device 22046. In a preferred embodiment, a technician must acquire tokens that are associated with a technician account that is maintained by administration server 22008. The tokens are used to enable the functionality and cloud services provided by administration server 22008 within system 22000.

At step 23022, technician client device 22046 generates a token acquisition request alert. The alert identifies the number of tokens that the technician has elected to acquire and includes data, code, and instructions that, after being received by administration server 22008, will activate administration server 22008 and cause administration server 22008 to process the acquisition request.

At step 23024, the token acquisition request alert is sent from technician client device 22046 to administration server 22008.

At optional step 23026, administration server 22008 processes the token acquisition request alert. The processing includes determining whether or not additional human interaction is needed to approve the token acquisition request, with the processing based on the account history of the technician, the current technician account status, technician client device 22046, and any comments received from customers that relates to the technician. In a preferred embodiment, human interaction will be needed when the account history indicates, that a previous token acquisition request was not approved, that the current technician account status indicates that there is incorrect contact information for the technician, that technician client device 22046 is not using the latest version of the cloud services application, and that the ratio of positive customer comments to negative customer comments is below a predefined threshold (e.g., 9 to 1). In a preferred embodiment, administration server 22008 also identifies a likelihood that the request will be granted and gathers additional information about the technician, the technician account, and technician client device 22046 that are consolidated and added to the token acquisition request alert to be reviewed by a user of administrator device 22032 to make a final determination as to whether the token acquisition request will be approved.

At optional step 23028, the token acquisition request alert is sent from administration server 22008 to administrator device 22032. In a preferred embodiment, the request alert includes the injected information of the likelihood of approval and the consolidated information about the technician.

At optional step 23030, the token acquisition request is displayed by administrator device 22032. The request alert received by administrator device 22032 from administration server 22008 includes one or more instructions, data, and code that, when processed by administrator device 22032, triggered the display of the information within the token acquisition request alert. The information within the token acquisition request alert includes the token acquisition request itself plus the injected information.

At optional step 23032, a token acquisition approval notification is generated by administrator device 22032. In a preferred embodiment, the approval notification is generated in response to interaction with a user that reviews all of the information related to the acquisition request. The notification identifies whether the acquisition request will be approved or denied.

At optional step 23034, the token acquisition approval notification is transmitted from administrator device 22032 and subsequently received by administration server 22008.

At step 23036, administration server 22008 generates a token acquisition approval. The final determination for the token acquisition request is based on one or more of several factors, including, the technician account history, the technician account status, the status of technician client device 22046, the status of the application running on technician client device 22046, and user input that was collected and supplied by administrator device 22032. The token acquisition approval includes an indication of whether the token acquisition request was approved or denied, and the number of tokens that were approved, if any. In a preferred embodiment, the approval also includes a cryptographic hash of all of the information used to generate the approval. In a preferred embodiment, the cryptographic hash is performed using one of the secure hash algorithms SHA-0, SHA-1, SHA-2, or SHA-3.

At step 23038, tokens are generated by administration server 22008. The generation of the tokens is based on the token acquisition approval to satisfy as much of the request that was approved. In a preferred embodiment, each token generated is a record in a database that is managed by administration sever 22008. Each token record is serialized and includes an indicator value which indicates whether or not the token has been used. In a preferred embodiment, the token is hashed and compressed to allow it to be efficiently communicated to the various nodes and which lessens the likelihood of data corruption. Each node is capable of opening and operating on the token in order to change its status from "not used" to "used" and to update parameters associated with the delivery of goods or services. Each token includes and is associated with the technician account associated with the acquisition request. Tokens that have not been used to enable functionality of system 22000 are indicated as available. Tokens are no longer valid after being used to enable a function requested by the technician using technician client device 22046.

Each record of a used token includes a graphic hash value created using technician information, technician account information, customer information, vehicle information, function information, and a date time stamp. In a preferred embodiment, the technician information identifies the technician that used the token one or more of a unique identifier for the technician, an email address of the technician, and the first and last name of the technician. The technician account information includes one or more of a unique identifier for the technician account, a unique database identifier for technician client device 22046, and a unique identifier and hash value for the application running on technician client device 22046. The customer information identifies the customer that is related to the vehicle upon which the function is used and includes one or more of a unique database identifier of the customer, an email address at the customer, a first and last name of the customer, and a telephone number of the customer. The vehicle information identifies the vehicle upon which the function was used and includes one or more of a vehicle identification number, unique database identifier of the vehicle, and a license plate number of the vehicle. The function information identifies the function for which the token was exchanged, such as the functions of receiving log vehicle data, receiving live vehicle data, receiving ECU profiles, and sending ECU profiles. The date time stamp indicates one or more of the date and time that the token was exchanged for the function and when the function was activated and used by the technician client device 22046.

At step 23040, administration server 22008 generates a token acquisition approval alert. The token acquisition approval alert includes the token acquisition approval or includes instructions, code, or data that can be used to locate the token acquisition approval by a client device.

At optional step 23042, the token acquisition approval alert is transmitted from administration server 22008 and subsequently received by administrator device 22032. In a preferred embodiment, the token acquisition approval alert is sent to administrator device 22032 when the technician account status requires the approval alert to be sent to administrator device 22032, or when a user of administrator device 22032 that approved the request indicated that the approval alert should be sent.

At optional step 23044, the token acquisition approval alert is displayed by administrator device 22032.

At step 23046, the token acquisition approval alert is transmitted from administration server 22008 and subsequently received by technician client device 22046.

At step 23048, the token acquisition approval is displayed by technician client device 22046. Display of the token acquisition approval includes display of the number of tokens that were approved, if any, which was either included in the token acquisition approval alert or was retrieved by technician client device 22046 from administration server 22008 using information included in the token acquisition approval alert.

Referring to FIG. 23B, at step 23050, a customer list, a vehicle list, and a function list are generated by administration server 22008. The entries for each list are customized based on technician client device 22046 and the technician account that is related to technician client device 22046.

At step 23052, administration server 22008 sends the customer list, the vehicle list, and the function list, which are received by technician client device 22046. Each of the lists and their entries may be sent on demand or in batch and in response to user interaction with technician client device 22046.

At step 23054, technician client device 22046 selects the customer from the customer list. In order for a customer to appear in the customer list, the customer must have identified the technician as an approved technician using the customer client application with customer client device 22060.

At step 23056, the vehicle from the vehicle list is selected by technician client device 22046. In a preferred embodiment, the vehicles in the vehicle list are highlighted and/or sorted to identify the vehicle that contains vehicle device 22090 and is connected to local device 22074.

At step 23058, the function from the function list is selected by technician client device 22046. Functions include: displaying live data from the vehicle, displaying logged data from the vehicle, displaying the current ECU profile that is being used by vehicle device 22090, and downloading a new ECU profile to vehicle device 22090. Each function includes a value of the number of tokens needed to access and utilize that function.

At step 23060, a function request alert is generated by technician client device 22046. The function request alert include data, information, and code that identifies one or more of technician client device 22046, the technician using technician client device 22046, the selected customer, the selected vehicle, and the selected function. In a preferred embodiment, the request alert also includes a cryptographic hash value created from (i) the selection data and (ii) a cryptographic hash value that was provided to technician client device 22046 by administration server 22008.

At step 23062, the function request alert is transmitted from technician client device 22046 and subsequently received by administration server 22008.

At step 23064, administration server 22008 compares the available tokens to the required tokens. Each function request requires a predefined number of tokens to enable that function. The predefined number of tokens for each function is determined based on one or more formulas. A first formula sets a constant number of tokens for the function. A second formula increases the number of tokens by the type of vehicle with each type, make, model, and brand of vehicle being associated with different numbers of tokens. A third formula increases the number of tokens by the type of function requested with each function being associated with a specific number of tokens. After determining the number of tokens that are required for the selected function, administration server 22008 determines if the technician account associated with technician client device 22046, which provided the function request, includes enough tokens to activate the requested function.

At step 23066, administration server 22008 generates the function request approval. When the comparison of the available tokens in the technician account to the tokens required for the function request indicate that there are enough available tokens in the technician account, the function request is approved. Otherwise the function request is denied. An indication of whether the request has been approved or denied is included with the functional request approval.

At step 23068, administration server 22008 sends the function request approval alert, which is received by technician client device 22046. The function request approval alert includes an indication of whether the function request was approved and, in a preferred embodiment, also include the function request approval generated by administration server 22008.

At step 23070, technician client device 22046 displays the function request approval. Display of the function request approval is after technician client device 22046 processes the function request approval alert that was received from administration server 22008 and extracts the function request approval from either the function request approval alert, which included the function request approval, or retrieves the function request approval from administration server 22008 based on information, data, and codes contained within the function request approval alert.

Figure 23C:
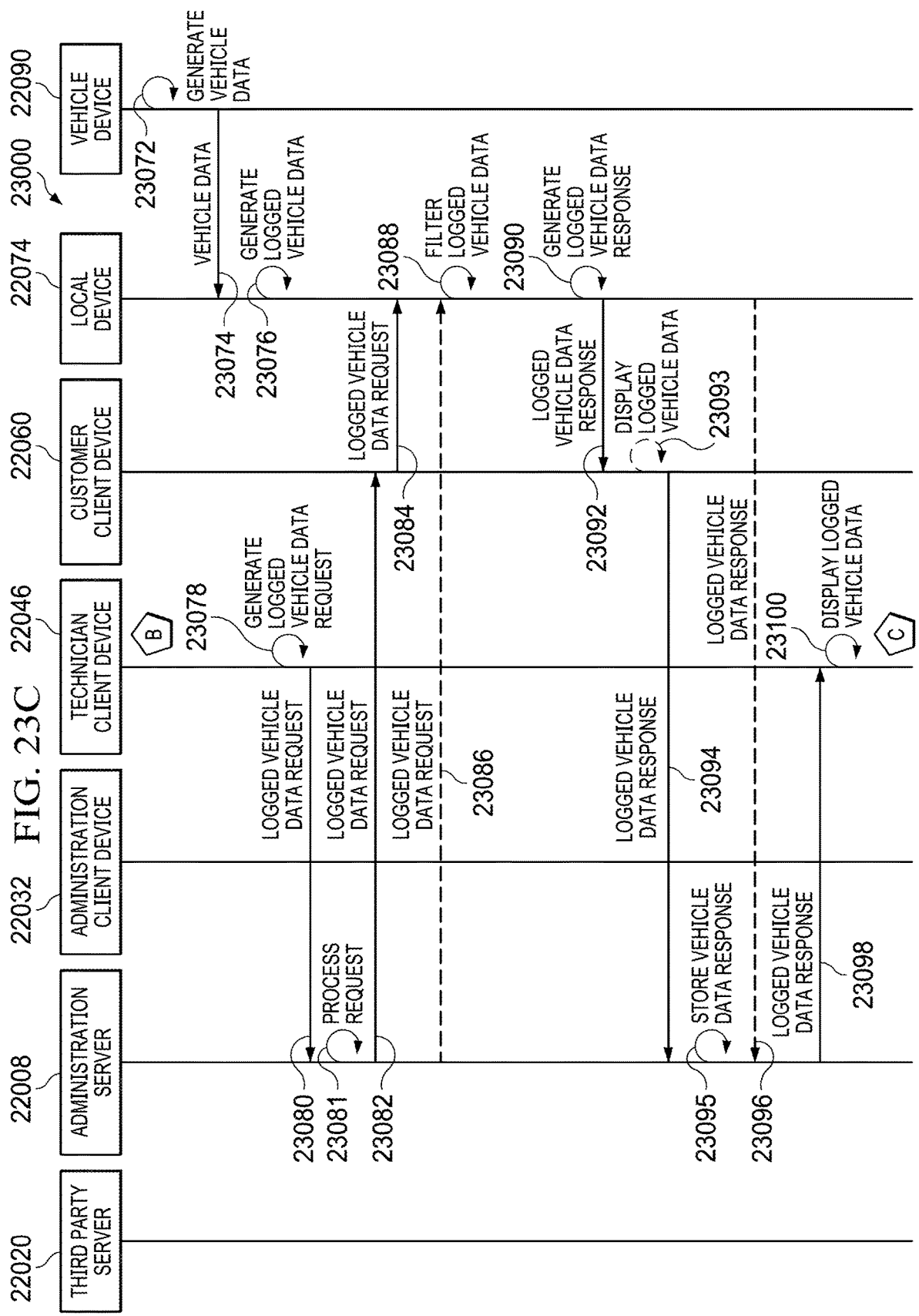

Referring to FIG. 23C, at step 23072, vehicle data is generated by vehicle device 22090. The vehicle data includes data, information, and code from one or more sensors, systems, and devices that are connected to vehicle device 22090. The sensors, systems, and devices are connected to vehicle device 22090 using a CAN bus in a preferred embodiment.

At step 23074, vehicle device 22090 sends vehicle data, which is received by local device 22074.

At step 23076, local device 22074 generates logged vehicle data. The logged vehicle data is a set of the data received by local device 22074 from vehicle device 22090 that includes the vehicle data that is output from vehicle device 22090 during the operation of the vehicle during a particular time that includes one or more of revolutions per minute of the engine, the speed of the vehicle in miles or kilometers per hour, engine temperature in degrees Fahrenheit or Celsius, injector pressure in thousand pounds per square inch, boost pressure in pounds per square inch, injector pulse width in milliseconds, calculated load percentage, and transmission temperature in degrees Fahrenheit or Celsius. To generate the logged vehicle data, local device 22074 filters the vehicle data that was received from vehicle device 22090. The filters that are applied to the vehicle data identify the types of vehicle data that are to be kept along with the time frame and duration for keeping the vehicle data. The timeframe identifies the length of a current window of time for vehicle data, such as the last 10 minutes of vehicle data. The duration identifies how long the logged data should be stored by local device 22074 before being discarded and includes, in a preferred embodiment, options for numbers of minutes, hours, days, weeks, and months.

At step 23078, a logged vehicle data request is generated by technician client device 22046. In a preferred embodiment, the logged vehicle data request is generated only after technician client device 22046 has used a valid token for that requested function from administration server 22008.

At step 23080, technician client device 22046 sends the logged vehicle data request, which is received by administration server 22008. At step 23081, administration server 22008 identifies the customer client device 22060 and local device 22074 that are associated with the request.

At step 23082, administration server 22008 sends the logged vehicle data request, which is received by customer client device 22060.

At step 23084, customer client device 22060 sends the logged vehicle data request, which is received by local device 22074.

At optional step 23086, the logged vehicle data request is sent directly from administration server 22008 to local device 22074.

At step 23088, the logged vehicle data is filtered by local device 22074. The logged vehicle data is filtered based upon the contents of the logged vehicle data request that was initiated with technician client device 22046.

At step 23090, a logged vehicle data response is generated by local device 22074. The logged vehicle data response includes the vehicle data that was filtered by local device 22074.

At step 23092, local device 22074 sends the logged vehicle data response, which is received by customer client device 22060.

At optional step 23093, customer client device 22060 displays the logged vehicle data from the logged vehicle data response.

At step 23094, customer client device 22060 sends the logged vehicle data response to administration server 22008.

At step 23095, the administration server records the logged vehicle data response, and associates it with the customer client device record.

At optional step 23096, local device 22074 sends the logged vehicle data response to administration server 22008.

At step 23098, administration server 22008 sends the logged vehicle data response, which is received by technician client device 22046. In a preferred embodiment, administration server 22008 receives the logged vehicle data from both customer client device 22060 and local device 22074 and compares the responses to ensure that the responses were not corrupted.

At step 23100, the logged vehicle data is displayed by technician client device 22046. After receiving the logged vehicle data in the response provided by local device 22074 through system 22000, technician client device 22046 filters the time and duration of the logged data. The time scale of the logged data can be zoomed in and out using technician client device 22046 to allow the technician to see the log data using different time scales and is further described in FIG. 26.

Figures 2, 23D:
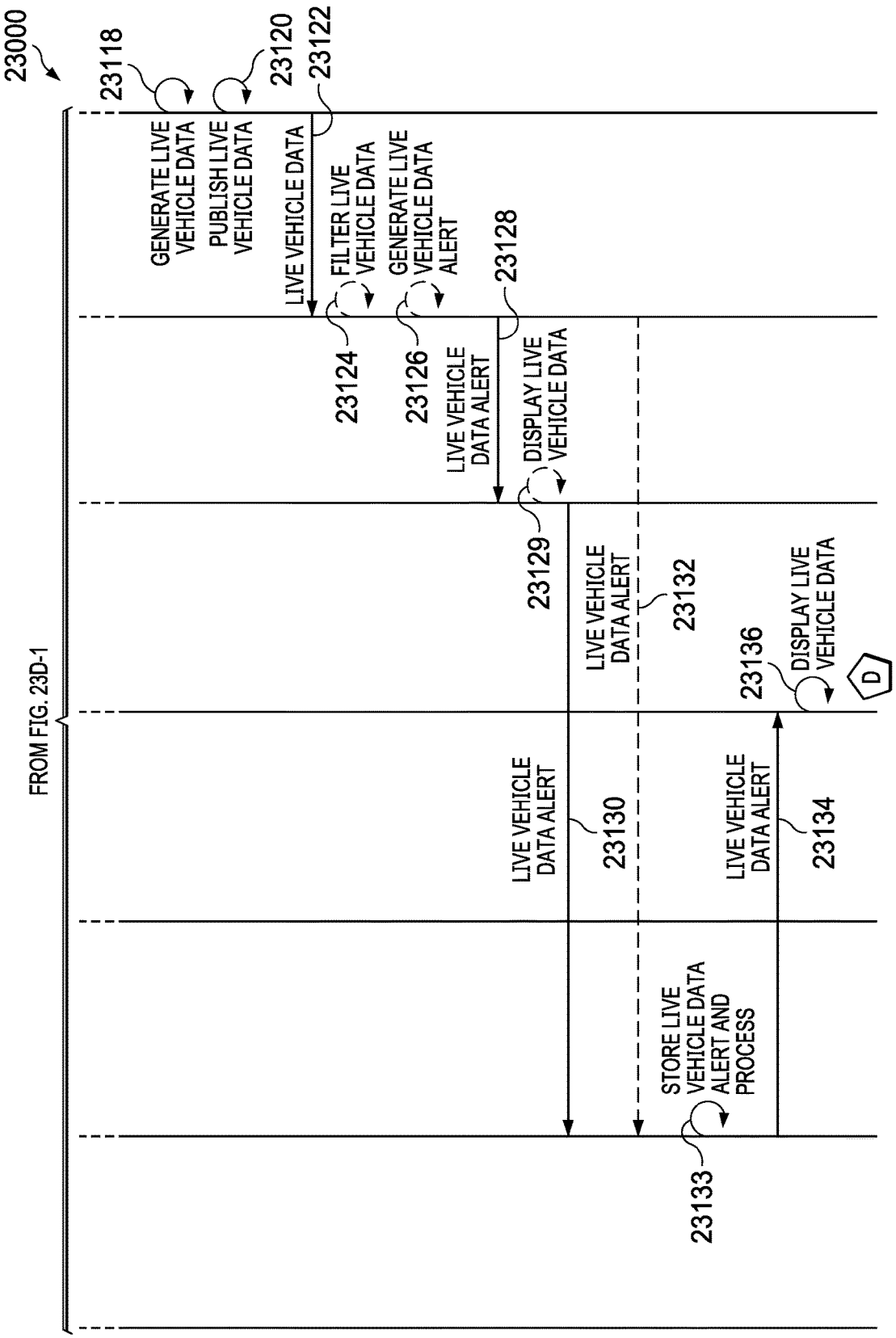

Referring to FIG. 23D, at step 23102, the start live vehicle data request is generated by technician client device 22046. The start live vehicle data request identifies the customer and vehicle for which live data is being requested. In a preferred embodiment, the request also includes a cryptographic hash value generated from the data in the request and from a cryptographic hash value received from administration server 22008. In a preferred embodiment, a valid token is required for this function.

At step 23104, the start live vehicle data request is transmitted from technician client device 22046 and subsequently received by administration server 22008.

At step 23106, administration server 22008 verifies the start live vehicle data request. The verification process used by administration server 22008 for the start live vehicle data request from technician client device 22046 checks the technician account and the customer account to make sure that the technician is authorized by the customer to access the vehicle associated with customer account and that the live data function has been enabled and approved for the technician account and technician client device 22046.

At step 23108, start live vehicle data instructions are generated by administration server 22008. After verification of the start live vehicle data request, administration server 22008 generates instructions for customer client device 22060, local device 22074, and/or vehicle device 22090 that, when respectively executed by these devices, trigger the transmission of live vehicle data from the vehicle through system 20000 to technician client device 22046. In a preferred embodiment, the instructions generated by administration server 22008 are included in an alert that is transmitted to and subsequently received by local device 22074.

At step 23110, administration server 22008 sends a start live vehicle data instructions alert to customer client device 22060.

At step 23112, customer client device 22060 sends the start live vehicle data instructions alert, which is received by local device 22074.

At optional step 23114, administration server 22008 sends a start live vehicle data instructions alert to local device 22074.

At step 23116, the start live vehicle data instructions are executed by local device 22074. The instructions include an identification of the vehicle data. In a preferred embodiment, the start live vehicle data instructions cause local device 22074 to begin listening to the data from vehicle device 22090.

At step 23118, vehicle device 22090 generates live vehicle data. The live vehicle data includes one or more of sensor data, device settings, and system outputs that are generated by the sensors, systems, and devices of the vehicle. In a preferred embodiment, vehicle device 22090 begins generating vehicle data as soon as the vehicle is turned on, and continuously broadcasts it over the OBD Port of vehicle while the vehicle is running.

At step 23120, the live vehicle data is published by vehicle device 22090. In a preferred embodiment, publication of the data is performed by encapsulating the vehicle data for transmission over an OBD port to which vehicle device 22090 is connected. Each type of vehicle data is encapsulated to a predefined number of bytes using a predetermined formula for that type of vehicle data. As an example, the absolute pressure of the intake manifold has a minimum possible value of 0, a maximum possible value of 255, is measured in kilopascals, and there is no formula to translate from the value of the intake manifold pressure to the single bite that is provided over the OBD port. In contrast, engine coolant temperature uses a single byte, has a minimum value of −40, a maximum value of 215, uses units of degrees Celsius, and uses formula of A−40, where A is the value of the byte transferred over the OBD port. As another example, engine RPM uses two bytes, has a minimum value of 0, has a maximum value of 16383.75, and uses the formula 256 A+B/4, where A is the first bite and B is the second bite provided over the OBD port.

At optional step 23122, the live vehicle data is sent from vehicle device 22090 to local device 22074.

At step 23124, local device 22074 filters the live vehicle data. The filters were specified in the start live vehicle data instructions alert.

At step 23126, local device 22074 generates the live vehicle data alert. The live vehicle data alert includes the vehicle data sent from vehicle device 22090 and filtered by local device 22074. Generation of the live vehicle data alert reformats the data that was received from vehicle device 22090 into a format that can be transmitted to one of customer client device 22060 and administration server 22008 by putting the data into one or more TCP/IP packets that are used by communication networks 22002, 22004, and 22006.

At step 23128, the live vehicle data alert is sent from local device 22074 to customer client device 22060. In a preferred embodiment, customer client device 22060 acts as a pass through so that the live vehicle data alert is only stored temporarily in the memory of customer client device 22060. In an additional embodiment, customer client device 22060 also extracts and stores the vehicle data from the live vehicle data alert to non-volatile memory of customer client device 22060 and displays it on a screen of customer client device 22060.

At optional step 23129, customer client device 22060 displays the live vehicle data from the live vehicle data alert.

At step 23130, the live vehicle data alert is sent from customer client device 22060 to administration server 22008.

At optional step 23132, the live vehicle data alert is transmitted from local device 22074 directly to administration server 22008.

At step 23133 the administration server stores the live vehicle data alert and associates it with the customer client device.

At step 23134, administration server 22008 sends the live vehicle data alert to technician client device 22046.

At step 23136, technician client device 22046 displays the live vehicle data. In a preferred embodiment, the live vehicle data is displayed in one or more graphs, tiles, and gauges in an application window of an application running on technician client device 22046.

Figure 23E:
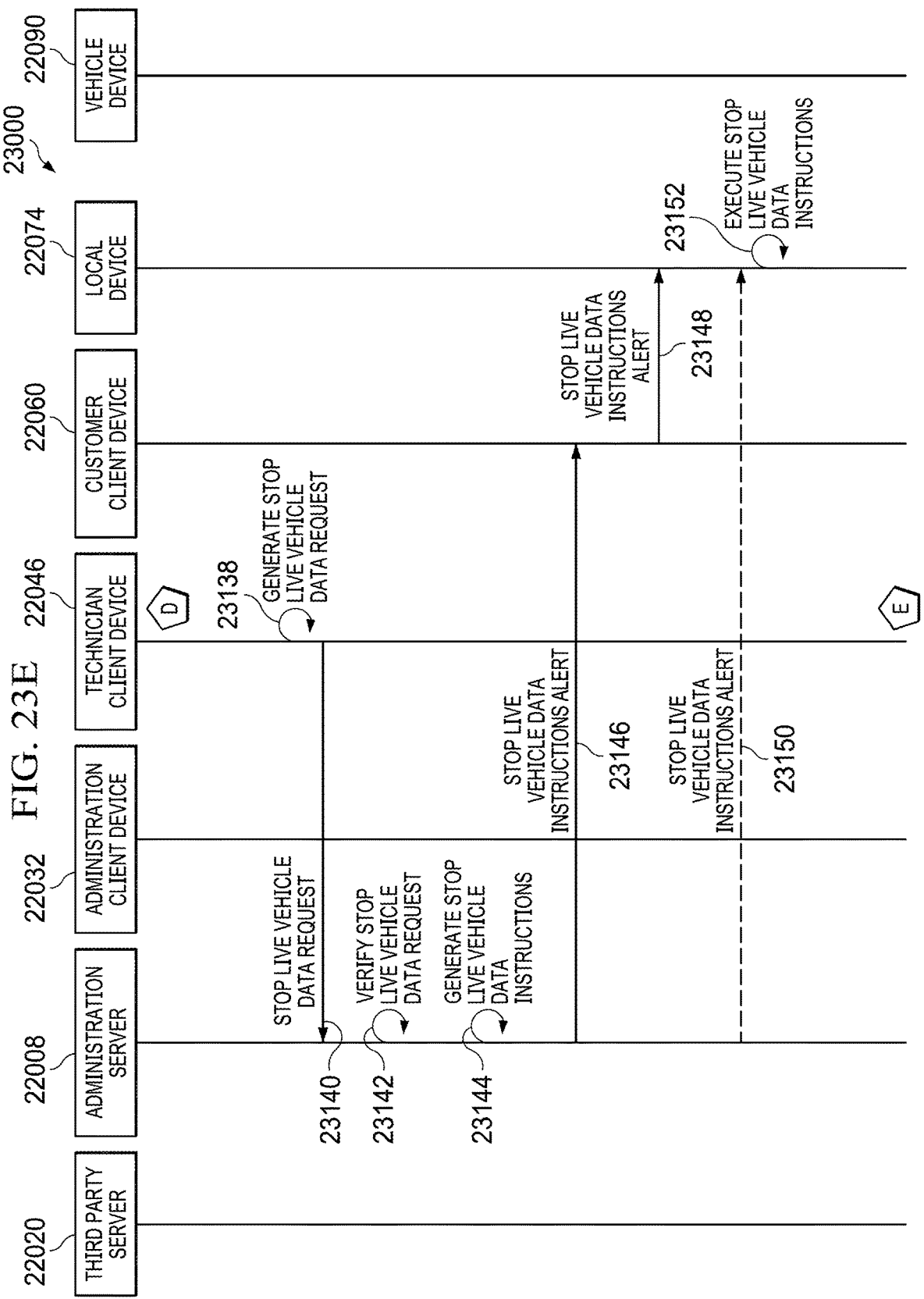

Referring to FIG. 23E, at step 23138, technician client device 22046 generates a stop live vehicle data request, as will be described further later. In a preferred embodiment, the stop live vehicle data request is generated in response to interaction with a technician using technician client device 22046 after the technician has viewed enough of the live vehicle data from the vehicle and triggers the generation of the stop live vehicle data request using one or more gesture inputs that are captured by technician client device 22046. The stop live vehicle data request includes one or more of code, data, information, and instructions that cause one or more of administration server 22008, customer client device 22060, local device 22074, and vehicle device 22090 to stop publishing live vehicle data.

At step 23140, technician client device 22046 sends the stop live vehicle data request, which is received by administration server 22008. In a preferred embodiment, administration server 22008 is activated in response to receipt of the stop live vehicle data request and executes code, data, and instructions within the stop live vehicle date of request to stop the transmission of live vehicle data, as described below.

At step 23142, administration server 22008 verifies the stop live vehicle data request. In a preferred embodiment, verification of the stop live vehicle data request includes verifying that live data is currently being published and that technician client device 22046 is the device that initiated the publication of the live vehicle data.

At step 23144, administration server 22008 generates stop live vehicle data instructions. When executed by at least one of customer client device 22060 and local device 22074, the instructions stop the publication of the live vehicle data that is being provided by the vehicle device 22090.

At step 23146, administration server 22008 sends the stop live vehicle data instructions alert, which is received by customer client device 22060.

At step 23148, customer client device 22060 sends the stop live vehicle data instructions alert, which is received by local device 22074.

At optional step 23150, administration server 22008 sends the stop live vehicle data instructions alert, which is received by local device 22074.

At step 23152, the stop live vehicle data instructions are executed by local device 22074. Execution of the instructions causes local device 22074 to stop publishing the live vehicle data that is continuously broadcast by vehicle device 22090.

Figures 2, 23F:
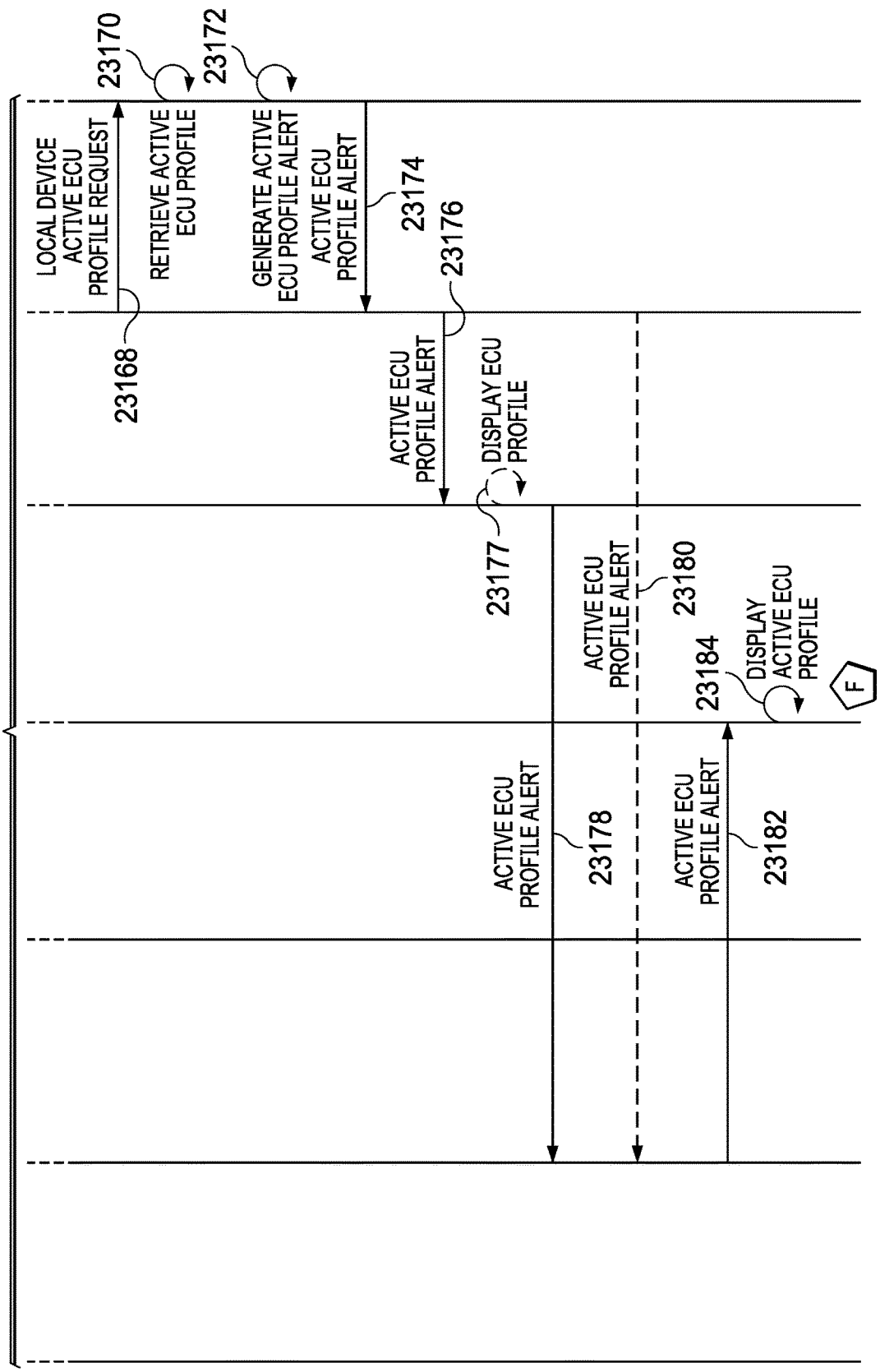

Referring to FIG. 23F, at step 23154, technician client device 22046 generates a technician active ECU profile request. For example, after viewing logged vehicle data and live vehicle data, the technician using technician client device 22046 decides to review the ECU profile that is being used by vehicle device 22090. The technician may view the current ECU profile at any time before or after viewing the logged vehicle data and live vehicle data by interacting with the user interface of the application running on technician client device 22046. In a preferred embodiment, technician client device 22046 detects a gesture that is associated with selecting a button that is displayed on the user interface of the application running on technician client device 22046.

At step 23156, technician client device 22046 sends the technician active ECU profile request, which is received by administration server 22008.

At step 23158, a server active ECU profile request is generated by administration server 22008. As a part of the request generation, administration server 22008 also verifies that technician client device 22046 and the technician account associated with technician client device 22046 is authorized to make the active ECU profile request for the vehicle into which vehicle device 22090 is installed and the customer associated with the vehicle. If unauthorized use is detected, administration server 22008 sends one or more control signals to the client device, which sends the signals to local device 22074 for implementation. In a preferred embodiment, the control signals can comprise an interrupt request, a POR_B reset signal, an OCOTP_CTRL signal including a volatile software-accessible signal that enables or disables software control of a hardware element, an ARM TrustZone signal, a cryptographic acceleration and assurance module (CAAM) signal, a central security unit (CSU) signal, an advanced high assurance boot (A-HAB) signal, a programmable polyfuse signal, a unique chip identifier signal, a mask revision number signal, a cryptographic key signal, a JTAG secure mode signal, a TZ WDOG security violation signal, or combinations thereof. In a preferred embodiment, the control signals are compatible with the i.MX 6SoloX chipset available from NXP Semiconductors, Netherlands B.V. If the use is authorized, in a preferred embodiment, administration server 22008 generates and includes in the request data, code, and instructions that are executed by local device 22074 to extract the ECU profile from vehicle device 22090.

At step 23160, administration server 22008 sends the server active ECU profile request to customer client device 22060.

At step 23162, the server active ECU profile request is transmitted from customer client device 22060 and subsequently received by local device 22074.

At optional step 23164, the server active ECU profile request is sent from administration server 22008 to local device 22074.

At step 23166, local device 22074 generates a local device active ECU profile request. The profile request is a set of instructions that causes vehicle device 22090 to transmit the active ECU profile back to local device 22074. In a preferred embodiment, instructions are machine language code executable by vehicle device 22090 which identifies parameter identifier (PID) values in accordance with the controller area networks (CAN) bus and OBD protocols.

At step 23168, local device 22074 sends the local device active ECU profile request to vehicle device 22090.

At step 23170, vehicle device 22090 retrieves the active ECU profile. Vehicle device 22090 retrieves all of the settings, parameters, codes, and instructions that are currently being utilized to operate the vehicle.

At step 23172, vehicle device 22090 generates an active ECU profile alert. In a preferred embodiment the active ECU profile alert includes the settings, parameters, and codes that were retrieved by vehicle device 22090.

At step 23174, vehicle device 22090 sends the active ECU profile alert to local device 22074.

At step 23176, local device 22074 forwards the active ECU profile alert to customer client device 22060. In a preferred embodiment, local device 22074 stores a cached copy of the active ECU profile that was received from vehicle device 22090. For subsequent ECU profile requests where local device 22074 has not issued any commands to vehicle device 22090 that would change the ECU profile and within a predetermined duration of time (e.g., ten minutes), local device 22074 sends the cached version of the ECU profile in response to the active ECU profile request.

At optional step 23177, customer client device 22060 displays the ECU profile from the active ECU profile alert.

At step 23178, customer client device 22060 sends the active ECU profile alert to administration server 22008. In a preferred embodiment, customer client device 22060 also stores a cached version of the current ECU profile being used by vehicle device 22090.

At optional step 23180, local device 22074 sends the active ECU profile alert, directly to administration server 22008.

At step 23182, the active ECU profile alert is sent from administration server 22008 to technician client device 22046. In a preferred embodiment, administration server 22008 stores a cached copy of the active ECU profile.

At step 23184, technician client device 22046 displays the active ECU profile.

Figures 2, 23G:
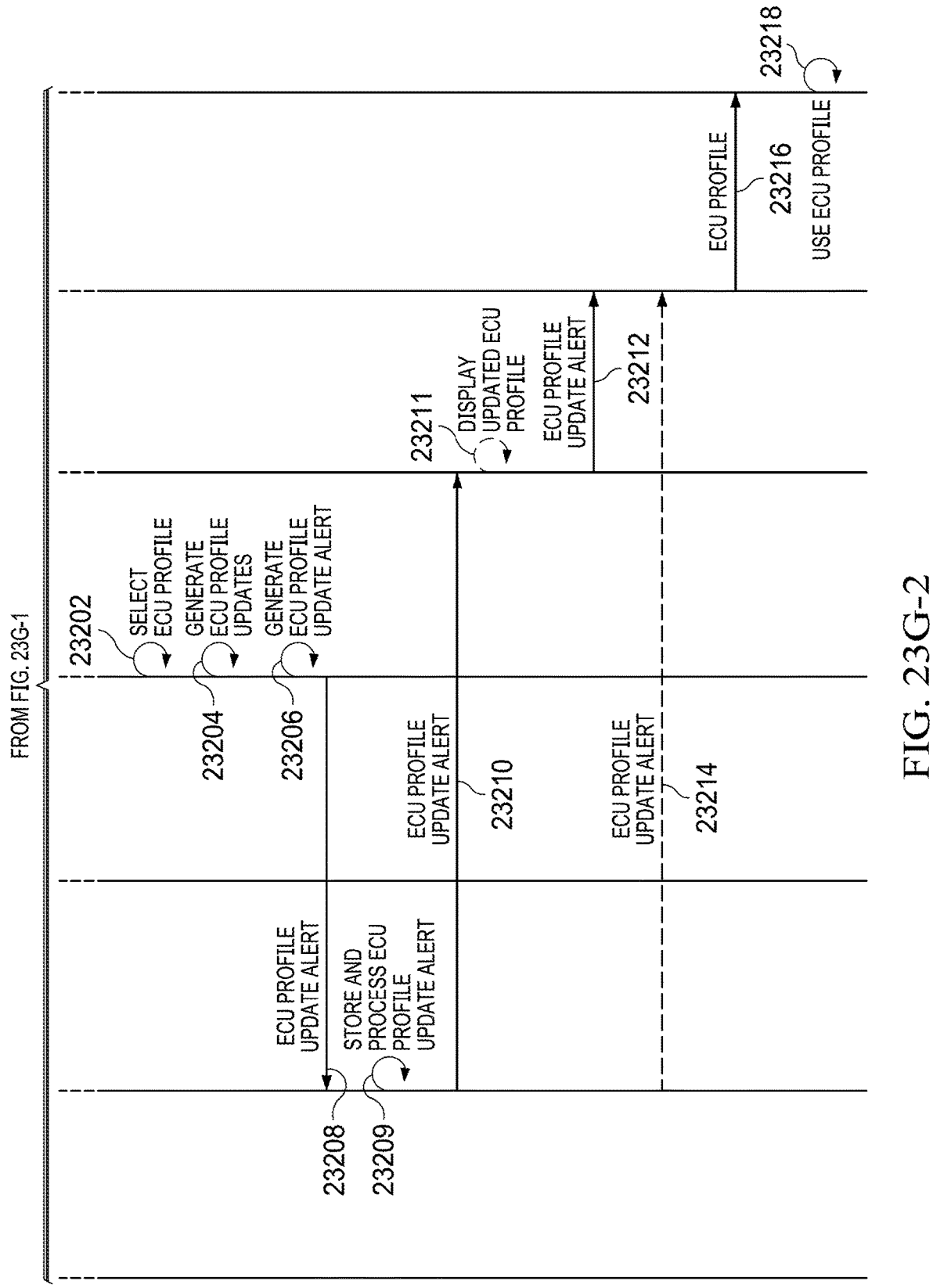

Referring to FIG. 23G, at step 23186, technician client device 22046 generates an available ECU profile request. The generation of the available ECU profile request is in response to interaction with the technician using technician client device 22046. The technician performs one or more gestures and actions that are detected by technician client device 22046 and are associated with one or more user interface elements that are displayed by the application that is running on technician client device 22046. In a preferred embodiment, the request for the available ECU profiles can be generated at any time during or after the process of diagnosing the vehicle, including before or after viewing the logged vehicle data or the live vehicle data, or before or after requesting the current ECU profile from vehicle device 22090. For example, a technician that is diagnosing the vehicle may view the logged vehicle data first, then view the live vehicle data, then request the current ECU profile, and then request the available ECU profiles that can be downloaded to the vehicle.

At step 23188, technician client device 22046 sends the available ECU profile request to administration server 22008. At step 23189, administration server 22008 locates at least one third-party server from which to request at least one available ECU profile. In a preferred embodiment, multiple third-party servers can provide ECU profiles for different vehicles. Examples of such third-party servers are servers at vehicle manufactures or OEM dealers.

At step 23190, the available ECU profile request is transmitted from administration server 22008 and subsequently received by third-party server 22020.

At step 23192, third-party server 22020 determines an available ECU profile. The available ECU profile is selected based upon the type of vehicle, make, model, manufacturer, and any other parameters included in the request. Other parameters included in the request identify a type of profile such as a high-performance profile and a high-mileage profile.

At step 23194, third-party server 22020 generates an available ECU profile alert. The available ECU profile alert includes the available ECU profile that was determined and selected by third-party server 22020. The available ECU profile alert may also include data, code, and instructions that when executed, downloads the available ECU profile directly from third-party server 22020.

At step 23196, an available ECU profile alert is sent from third-party server 22020 to administration server 22008. In a preferred embodiment, administration server 22008 also receives and caches the available ECU profile from third-party server 22020, either by copying the available ECU profile from within the available ECU profile alert or by using codes and instructions from the ECU profile alert to download the ECU profile from third-party server 22020.

At step 23198, the available ECU profile alert is transmitted from administration server 22008 to technician client device 22046.

At step 23200, the available ECU profile is displayed by technician client device 22046. Display of the ECU profile is further described in relation to FIG. 27.

At step 23202, an ECU profile is selected by technician client device 22046. The selected ECU profile is identified from a set of ECU profiles that are stored on administration server 22008 or technician client device 22046 and that are each configured to operate the vehicle into which vehicle device 22090 is installed.

At step 23204, ECU profile updates are generated by technician client device 22046. The updates to the selected ECU profile are generated in response to an analysis of the logged vehicle data, an analysis of the live vehicle data, or interaction between technician client device 22046 and the technician diagnosing the vehicle.

At step 23206, technician client device 22046 generates an ECU profile update alert. The ECU profile update alert includes all of the updates to the ECU profile that were determined by technician client device 22046 and the technician.

At step 23208, the ECU profile update alert is sent from technician client device 22046 to administration server 22008. At step 23209, administration server 22008 stores and caches the updates with a modified ECU profile that includes the ECU profile updates. Administration server 22008 then generates a subsequent ECU profile update alert that includes either the modified ECU profile or the updates to the selected ECU profile.

At step 23210, the ECU profile update alert is sent from administration server 22008 to customer client device 22060.

At optional step 23211, customer client device 22060 displays the updated ECU profile from the ECU profile update alert.

At step 23212, customer client device 22060 sends the ECU profile update alert, which is received by local device 22074.

At optional step 23214, administration server 22008 sends the ECU profile update alert to local device 22074.

At step 23216, the ECU profile is forwarded from local device 22074 to vehicle device 22090. In a preferred embodiment, the ECU profile is included in the ECU profile update alert.

At step 23218, vehicle device 22090 applies the ECU profile. Vehicle device 22090 applies the ECU profile by updating one or more engine settings and parameters based upon the ECU profile updates and operating the engine according to the updated settings and parameters. As an example, the updated settings and parameters, may provide for increased mileage or increase performance of the vehicle.

Figure 24A:
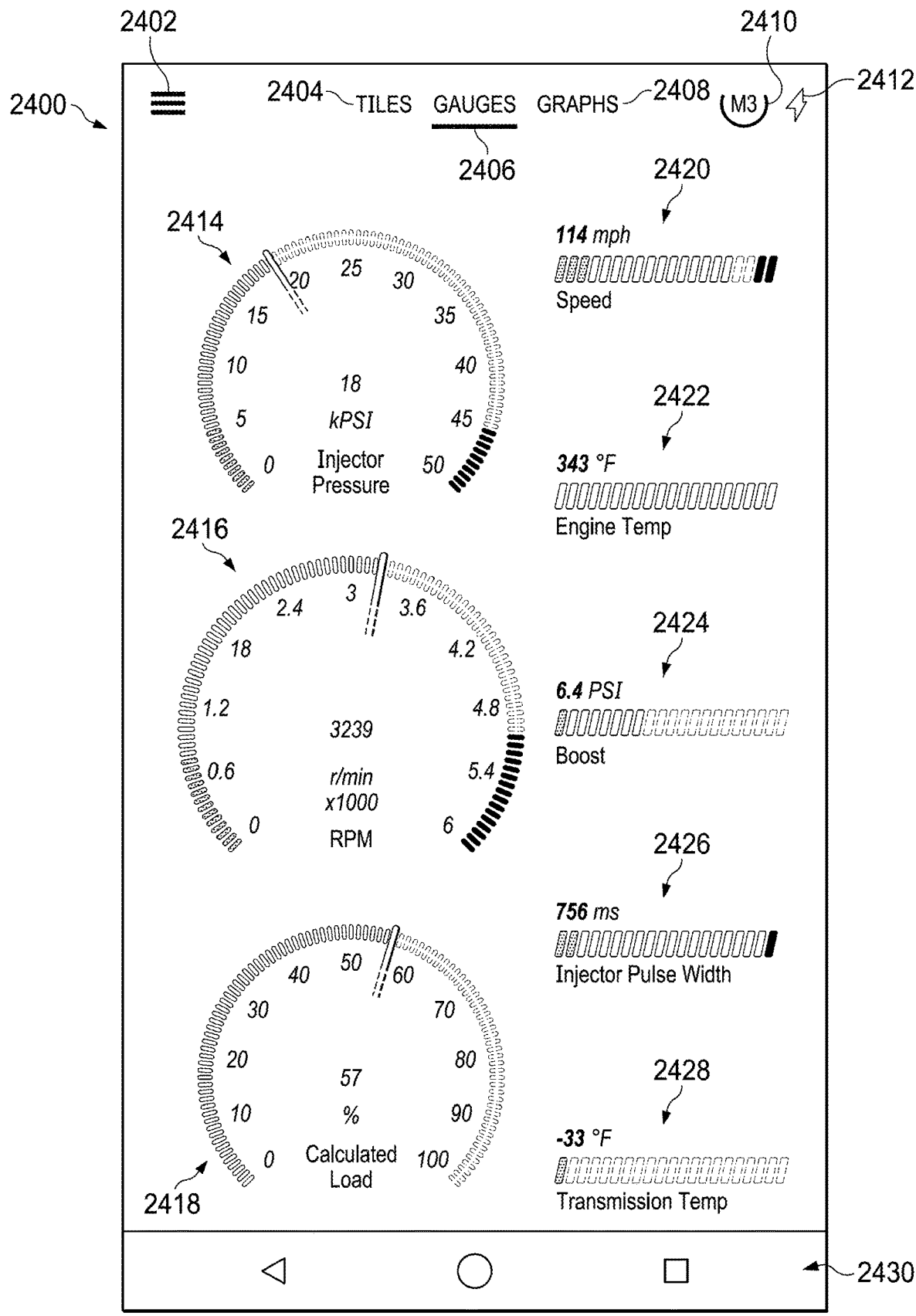
FIGS. 24A through 24D are diagrams of a user interface for displaying vehicle data on a client device.
Figure 24B:
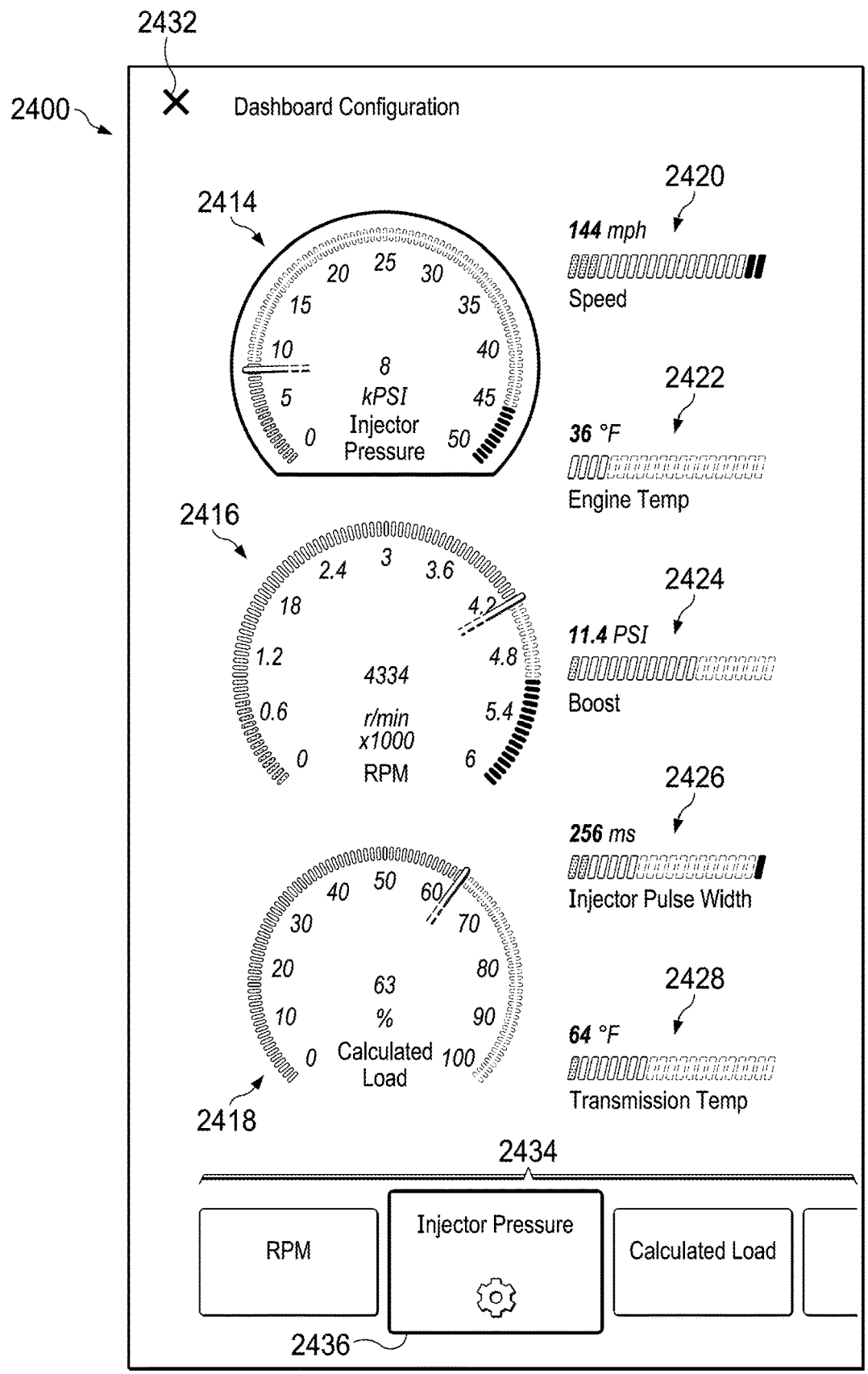

Referring to FIGS. 24A and 24B, user interface 2400 displays gauges and graphs based on live vehicle data that is received from a local device that received the live vehicle data from a vehicle device. User interface 2400 is part of an application that runs on one or more technician client devices and customer client devices. The data displayed with user interface 2400 can be directly from a local device, or from an administration server that received the data after the data was transmitted from a local device. User interface 2400 includes several user interface elements.

Referring to FIG. 24A, gauges button 2406 (further described below) has been selected to show vehicle data using gauges on user interface 2400.

Button 2402 is a menu button that, once selected, brings up a main menu. The main menu allows the user to select different functions within the application.

Button 2404 is a user interface elements that, upon being selected, shows vehicle data using tiles, such as that described in relation to FIGS. 5 through 13. Selection of gauges button 2406 displays vehicle information using gauges, as shown in FIG. 24A through 24D. Graphs button 2408 is a user interface that, when selected, shows vehicle data using graphs, as further described with FIGS. 25A through 25D.

Indicator 2410 displays a code that identifies the protocol being used to connect to a local device. Indicator 2412 indicates whether or not a connection is currently present with a local device.

Gauges 2414, 2416, 2418, 2420, 2422, 2424, 2426 and 2428 each show vehicle data that has been received from a local device. Gauges 2414, 2416, 2418, 2420, 2422, 2424, 2426 and 2428 are each updated with live vehicle data. Gauges 2414, 2416, and 2418, are shown as circular dials and gauges 2420, 2422, 2424, 2426 and 2428 are shown as linear gauges.

Button bar 2430 includes buttons that are used by the operating system running on a client device to manipulate the current application and to switch between other applications.

Referring to FIG. 24B, gauge 2414 has been selected and causes several updates to the user interface elements that are displayed on user interface 2400. The buttons and indicators at the top of the screen have been removed and replaced by control 2432, which indicates that the current screen being displayed is a dashboard configuration screen and that can be canceled from using the x button.

The display of all of gauges 2414, 2416, 2418, 2420, 2422, 2424, 2426 and 2428 has been scaled down to make room for selection bar 2434. Selection bar 2434 allows for the selection of the type of vehicle data that will be displayed with the currently selected gauge by selecting a button within selection bar 2434, such as button 2436 to display the injector pressure of the vehicle.

Gauge 2414 is outlined and highlighted to indicate that gauge 2414 has been selected. Button 2436 is oversized and highlighted to indicate that button 2436 is the button that has been selected from selection bar 2434.

Figure 24C:
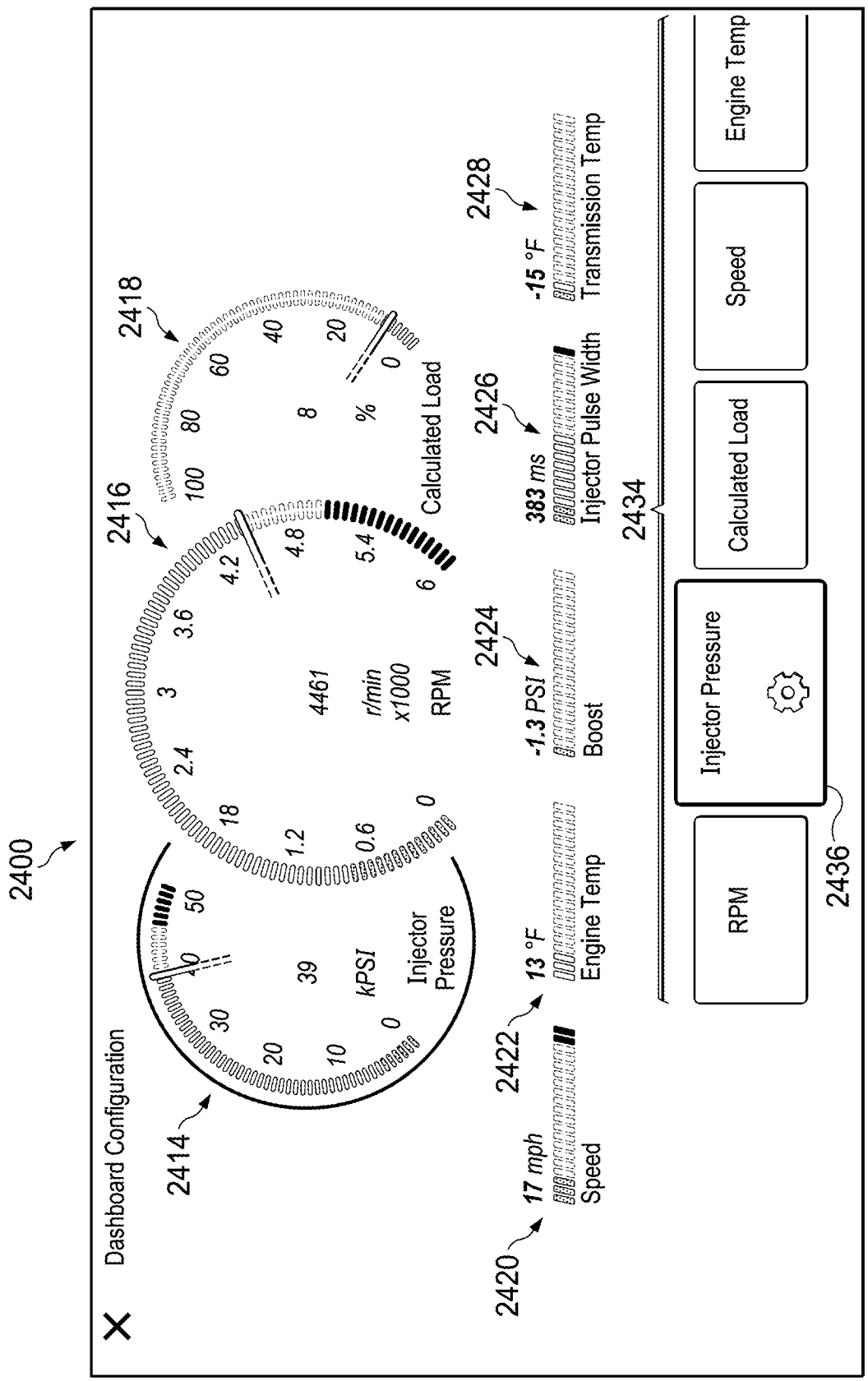

Referring to FIG. 24C, the orientation of the client device is changed from a portrait orientation to a landscape orientation and user interface 2400 is accordingly changed from a portrait display to landscape display. The placement and positioning of gauges 2414, 2416, 2418, 2420, 2422, 2424, 2426 and 2428 are changed so that gauges 2414, 2416, 2418, 2420, 2422, 2424, 2426 and 2428 are displayed in a horizontal alignment instead of a vertical alignment.

Figure 24D:
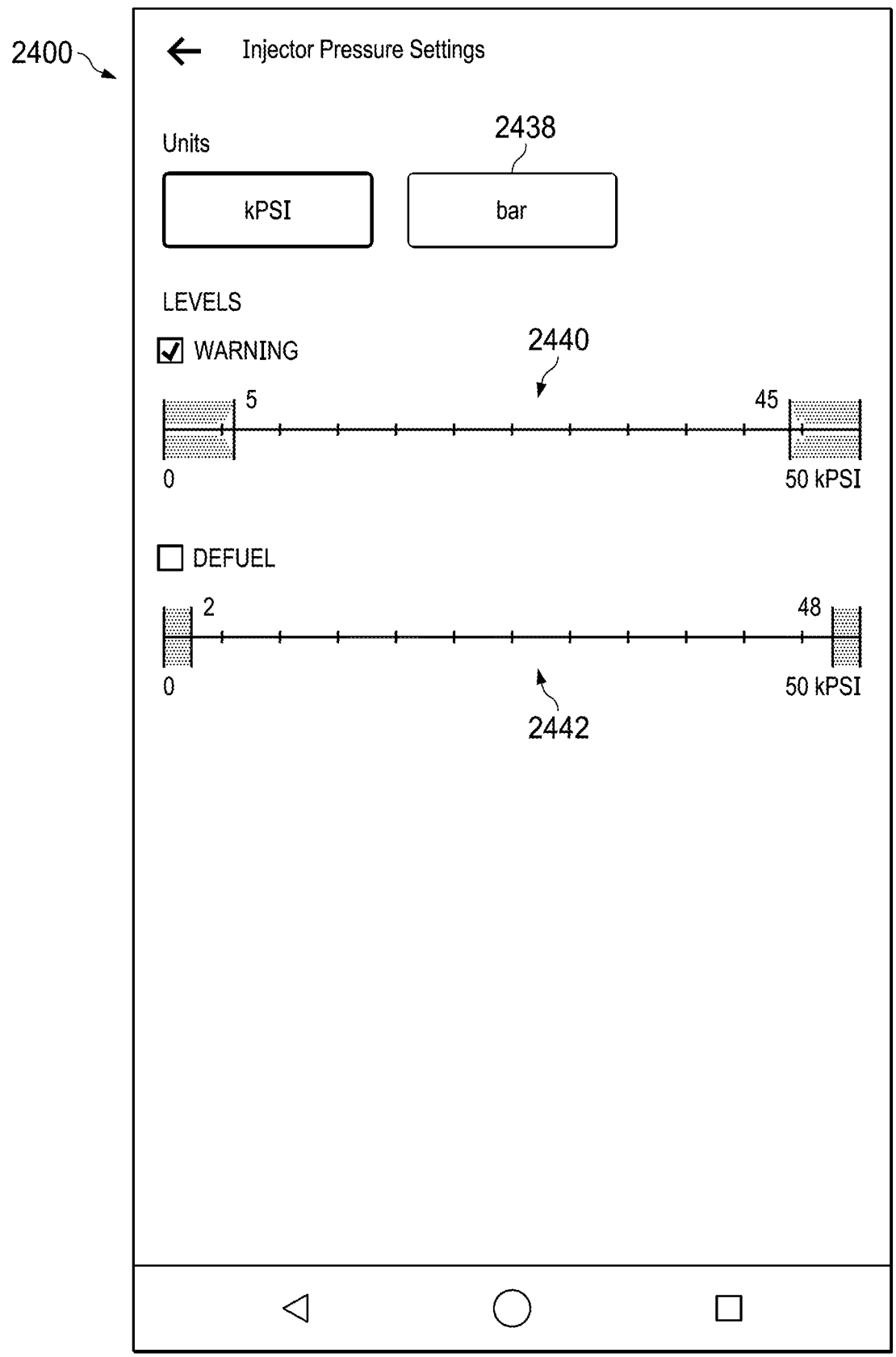

Referring to FIG. 24D, after selection of button 2436, user interface 2400 is updated to show a setting screen that is customized for each type of vehicle data. The settings for the injector pressure can be updated utilizing units selector 2438, warning level selector 2440, and defuel level selector 2442.

Unit selector 2438 allows for the selection of the units that are used to display injector pressure between thousand pounds per square inch (kPSI) and bars. Warning level selector 2440 and defuel level selector 2442 operate similar to what is described in FIG. 12.

Referring to FIGS. 25A through 25D, user interface 2400 is updated after graphs button 2408 is selected. Selection of graphs button 2408 triggers the display of live vehicle data using one or more live scrolling graphs. The latest vehicle data is displayed at the right most portion of each graph for each selected type of vehicle data. The rest of each graph that is being displayed is shifted to the left. This happens for each update to the live vehicle data that is received from the vehicle by the application running on the client device. In a preferred embodiment, up to eight different types of vehicle data can be displayed with a graph for each data on a single chart. Each of buttons 2502, 2504, 2506, 2508, 2510, 2512, 2514 and 2516 are respectively associated with graphs 2532, 2534, 2536, 2538, 2540, 2542, 2544 and 2546. One limit to the maximum data rate of system 22000 is the maximum speed of the communication channel between local device 22074 and vehicle device 22090, which in a preferred embodiment, is the speed of the CAN bus and is one megabit per second. The data from the CAN bus is consolidated into one or more TCP IP packets that are then propagated through networks 22002 and 22004 to pass the data through system 22000.

In order to zoom in on the chart, data is interpolated using at least one of a selected interpolation method, interpolation methods including piecewise constant interpolation, linear interpolation, polynomial interpolation, and spline interpolation. Piecewise constant interpolation uses the value of the nearest data value as the current data value. Linear interpolation generates straight lines (first degree polynomials) between adjacent data points to use as the values between data points. Polynomial interpolation creates linear functions of using polynomials of higher degrees using a plurality of data points. Spline interpolation uses plurality of low degree polynomials for the different intervals between the different data points. In a preferred embodiment, linear interpolation is the default interpolation.

Figure 25A:
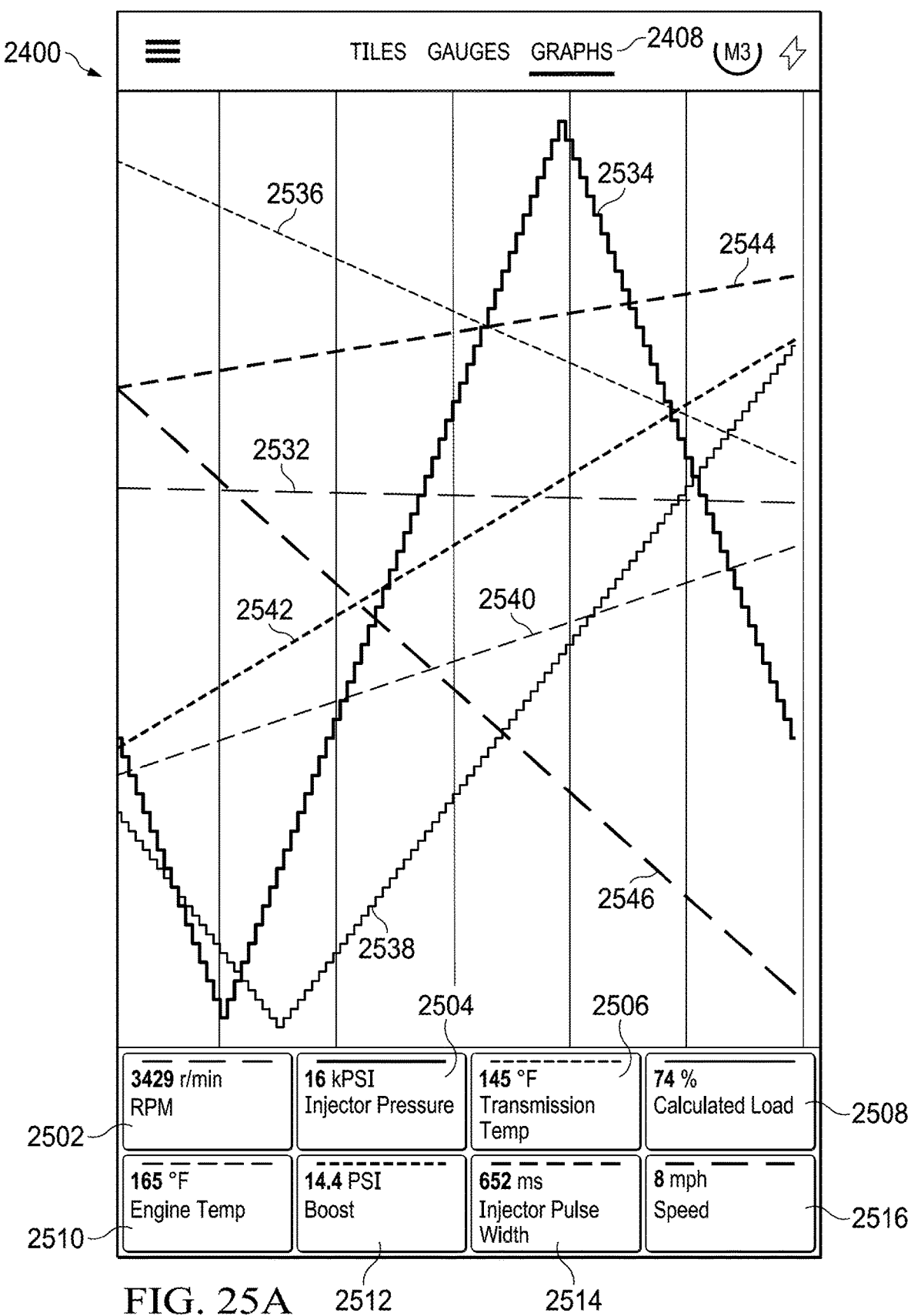
FIGS. 25A through 25D are diagrams of a user interface for displaying vehicle data in a graph on a client device.
Figure 25B:
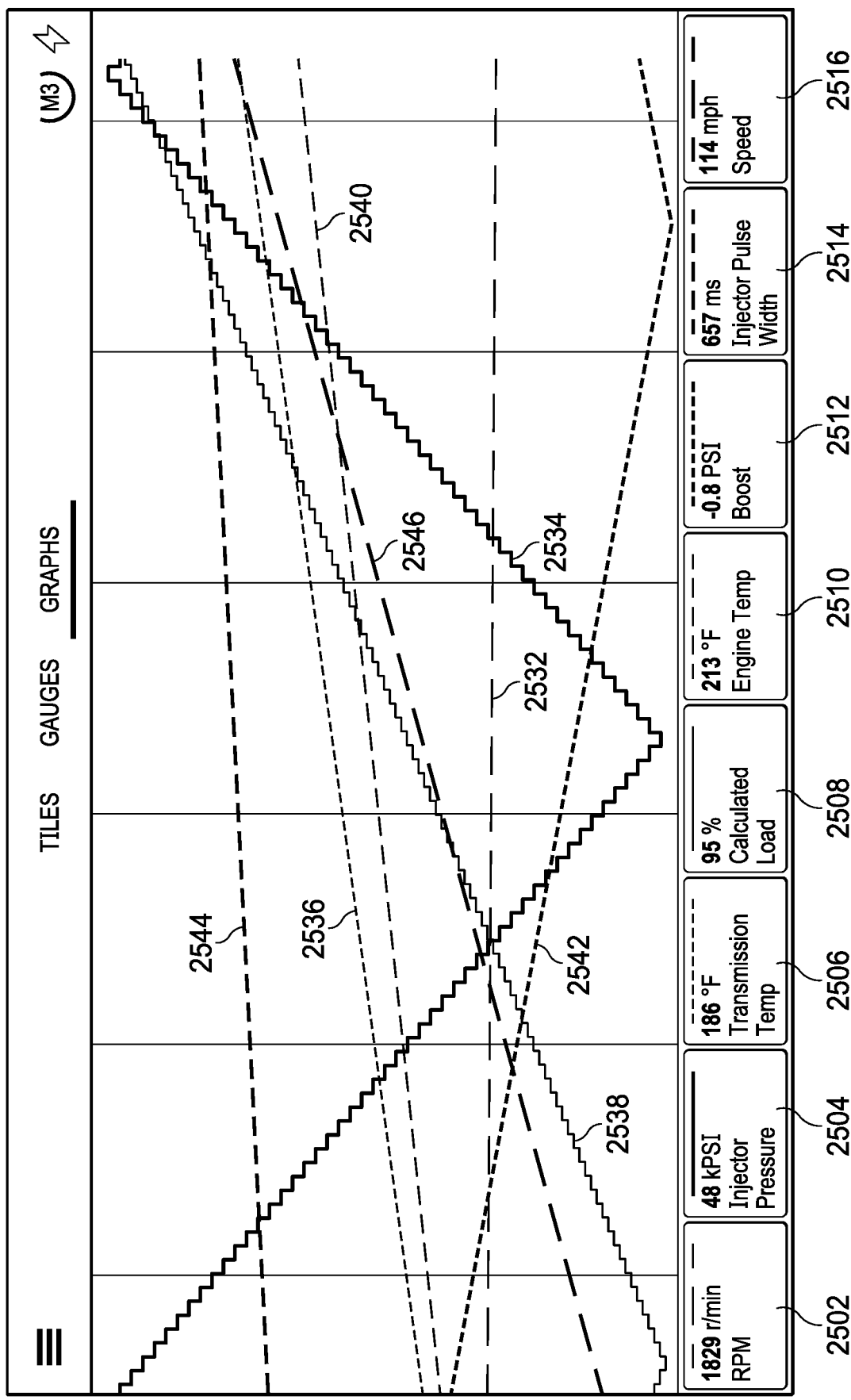

Referring to FIG. 25B, the device upon which the application is running has been rotated from a portrait orientation to a landscape orientation. The rotation of the device triggers an update to user interface 2400. The update to user interface 2400 rescales each of graphs 2532, 2534, 2536, 2538, 2540, 2542, 2544 and 2546 and realigns buttons 2502, 2504, 2506, 2508, 2510, 2512, 2514 and 2516 into a single horizontal bar. In a preferred embodiment, each of the graphs 2532, 2534, 2536, 2538, 2540, 2542, 2544 and 2546 are reset to show only data that has been received after the update has been triggered.

Figure 25C:
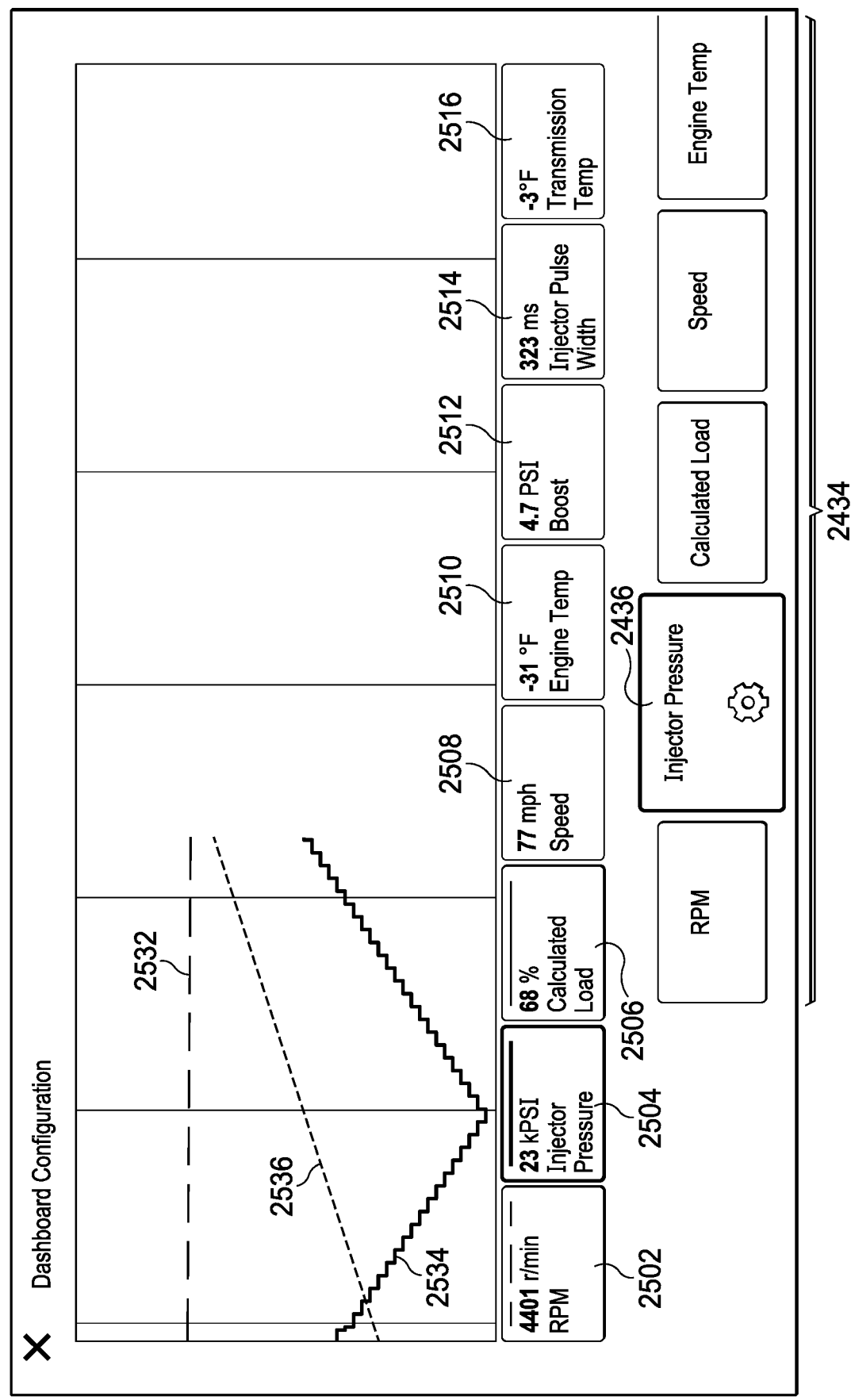

Referring to FIG. 25C, button 2504 has been selected. Selection of button 2504 brings up the dashboard configuration with selection bar 2434 with button 2436 being highlighted to show that button 2504 is currently associated with injector pressure. Additionally, each of buttons 2508, 2510, 2512, 2514 and 2516 have been interacted with using a long press to cause user interface 2400 to remove graphs 2538, 2540, 2542, 2544 and 2546 that are associated with buttons 2508, 2510, 2512, 2514 and 2516 from the display.

Figure 25D:
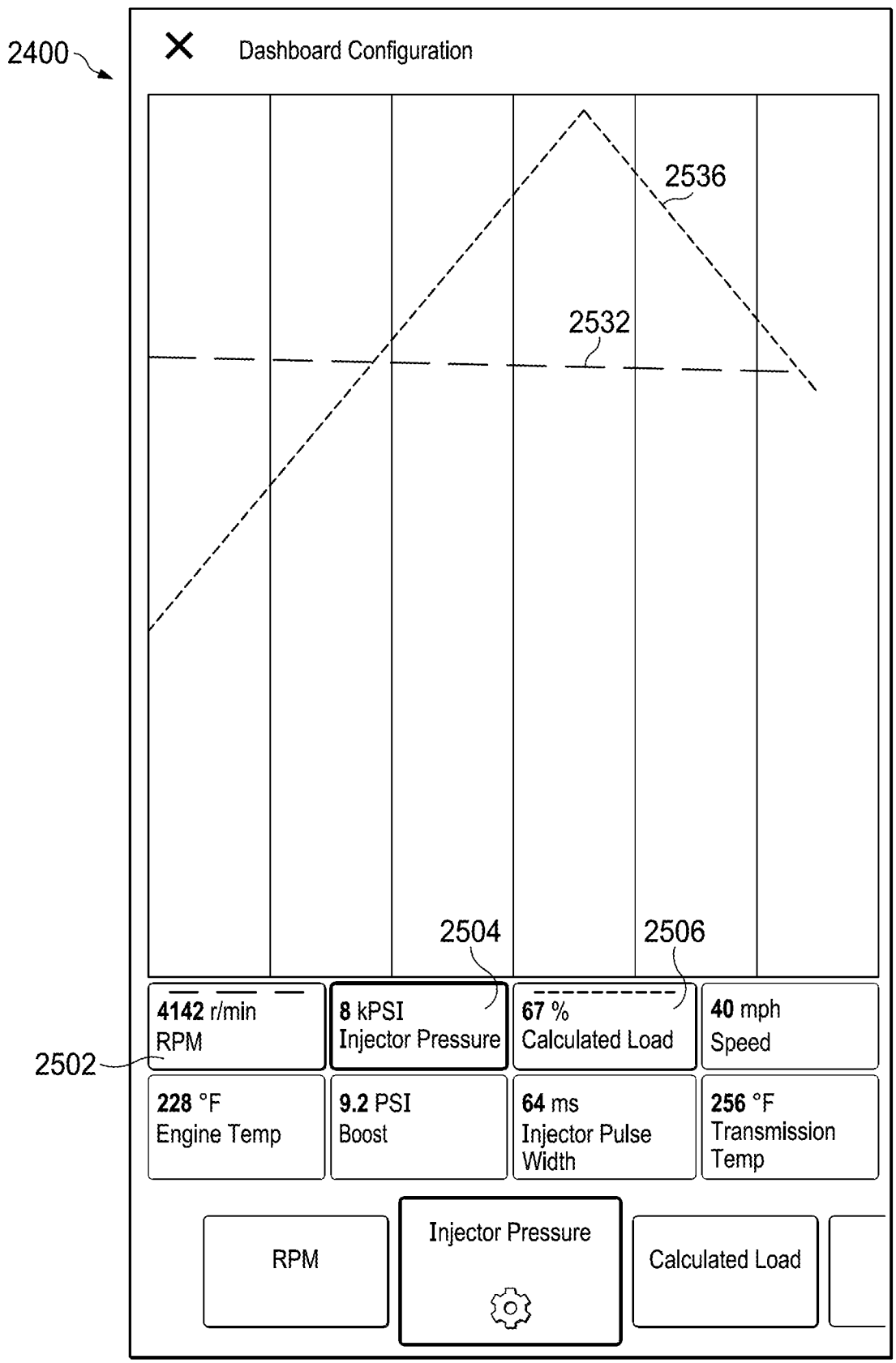

Referring to FIG. 25D, user interface 2400 is updated again after the device running the application is turned back to a portrait orientation. Graph 2534 is removed from the display.

Figure 26:
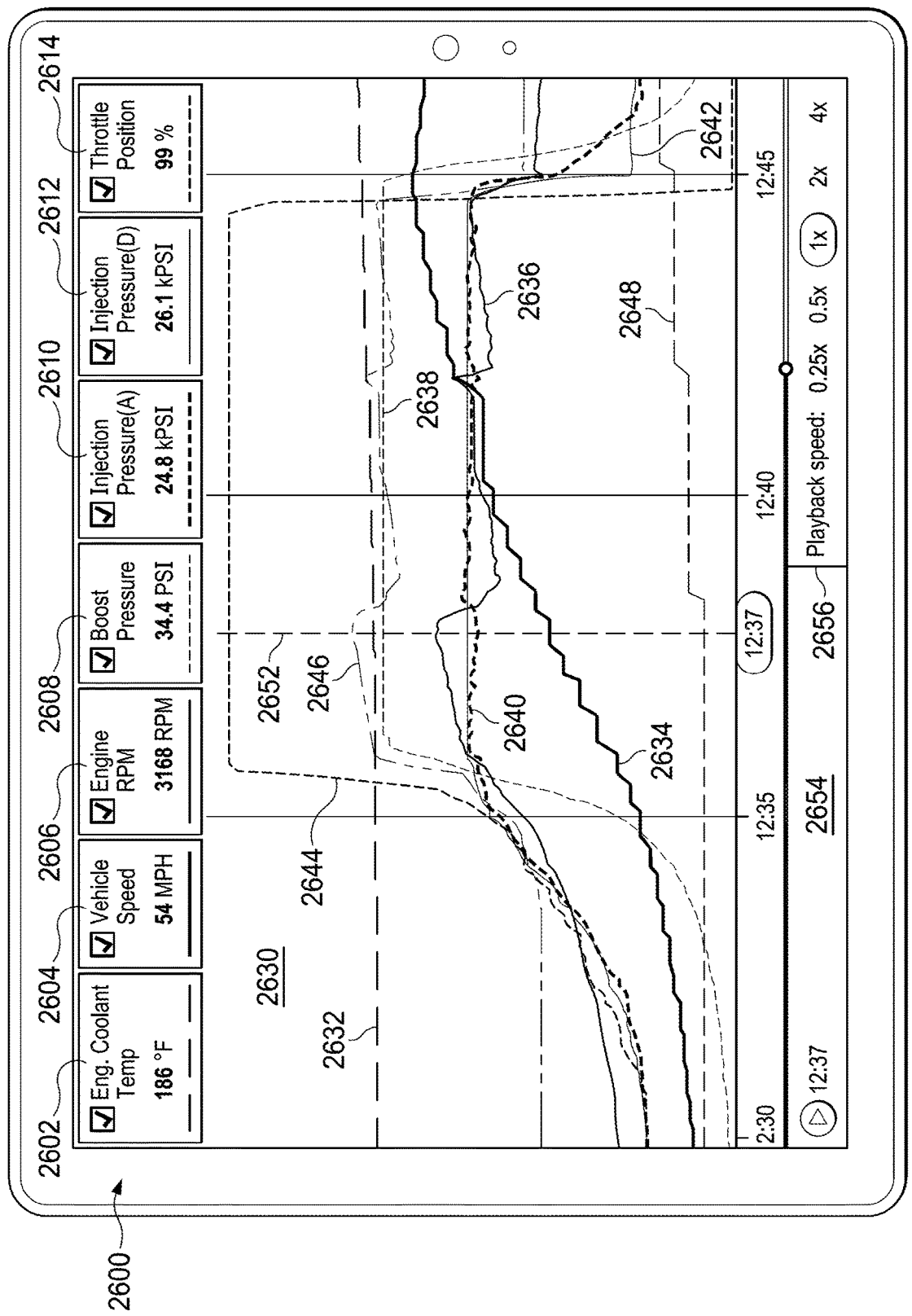
FIG. 26 is diagram of a user interface for cloud based display of vehicle data in a graph on a client device.

Referring to FIG. 26, user interface 2600 is displayed on a client device, such as a technician client device. User interface 2600 is used to view logged vehicle data or live vehicle data that was transmitted by a vehicle device. User interface 2600 includes a set of vehicle controls 2602, 2604, 2606, 2608, 2610, 2612 and 2614, playback chart 2630, and a set of playback controls 2652 and 2656. User interface 2600 displays one of the logged vehicle data and the live vehicle data as a scrolling display using the set of vehicle controls 2602, 2604, 2606, 2608, 2610, 2612 and 2614, the playback chart 2630, and the set of playback controls 2652. User interface 2600 displays a graph (2632, 2634, 2636, 2638, 2640, 2642, 2644, 2646 and 2648) for each vehicle control that is a linear plot of the information associated with the vehicle control.

Vehicle controls 2602, 2604, 2606, 2608, 2610, 2612 and 2614 each include a checkbox that is used to hide or display a graph associated with the vehicle control, a color for the graph, a text field that identifies the type of vehicle data, and another text field that identifies the units associated with the vehicle data. The set of vehicle controls can be scrolled left and right so that additional vehicle controls can be used without each of the vehicle controls being displayed at one time on user interface 2600. Vehicle controls 2602, 2604, 2606, 2608, 2610, 2612 and 2614 are respectively associated with graphs 2632, 2634, 2636, 2638, 2640, 2642 and 2644.

Playback chart 2630 displays graphs 2632, 2634, 2636, 2638, 2640, 2642, 2644, 2646 and 2648. Each of graphs 2632, 2634, 2636, 2638, 2640, 2642, 2644, 2646 and 2648 are displayed using a color to identify the vehicle data control associated with the graph.

The line for set of playback controls 2652 visually identifies a value for each graph on playback chart 2630 for the current playback time. The graph automatically scrolls to the left while being played. Playback chart 2630 can be scrolled independently of the current playback time. Playback control 2654 is used to control whether the logged vehicle data is being played or is paused. Playback control 2656 controls the speed at which the logged vehicle data is being played through playback chart 2630. Available speeds include 0.25, 0.5, 1.0, 2.0, and 4.0 times real time such that it respectively takes, 4 seconds, 2 seconds, 1 second, half a second, and a quarter of a second to play 1 second of vehicle data.

Figure 27A:
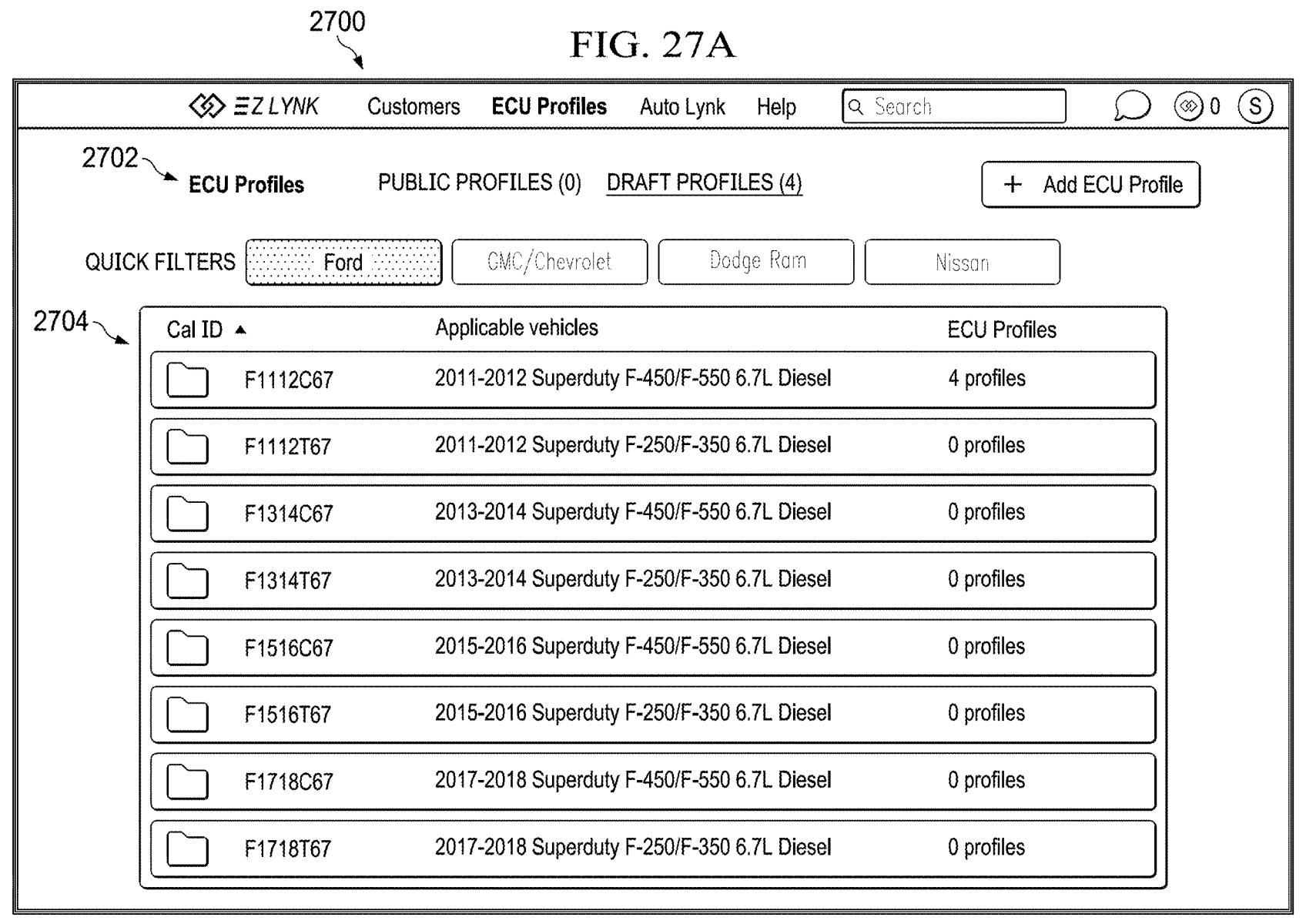

Turning to FIG. 27A, technician interface 2700 allows a technician using a technician client device to interact with system 22000. In a preferred embodiment, technician interface 2700 is a web page that is hosted by an administration server and that is displayed using a browser that is running on the technician client device.

Technician interface 2700 displays profile view 2702. Profile view 2702 includes profile list 2704. Each item in profile list 2704 is associated with an ECU profile and includes an identifier, a description, and a value. The identifier uniquely identifies the original or base profile. The description describes the vehicles for which the profile can be used, including the year, make, model, and engine type. The value identifies how many copies of the profile have been made by a technician.

Each profile displayed in profile list 2704 is selectable and can be edited after being selected. Each copy of a profile can be independently edited, stored, and saved.

Figure 27B:
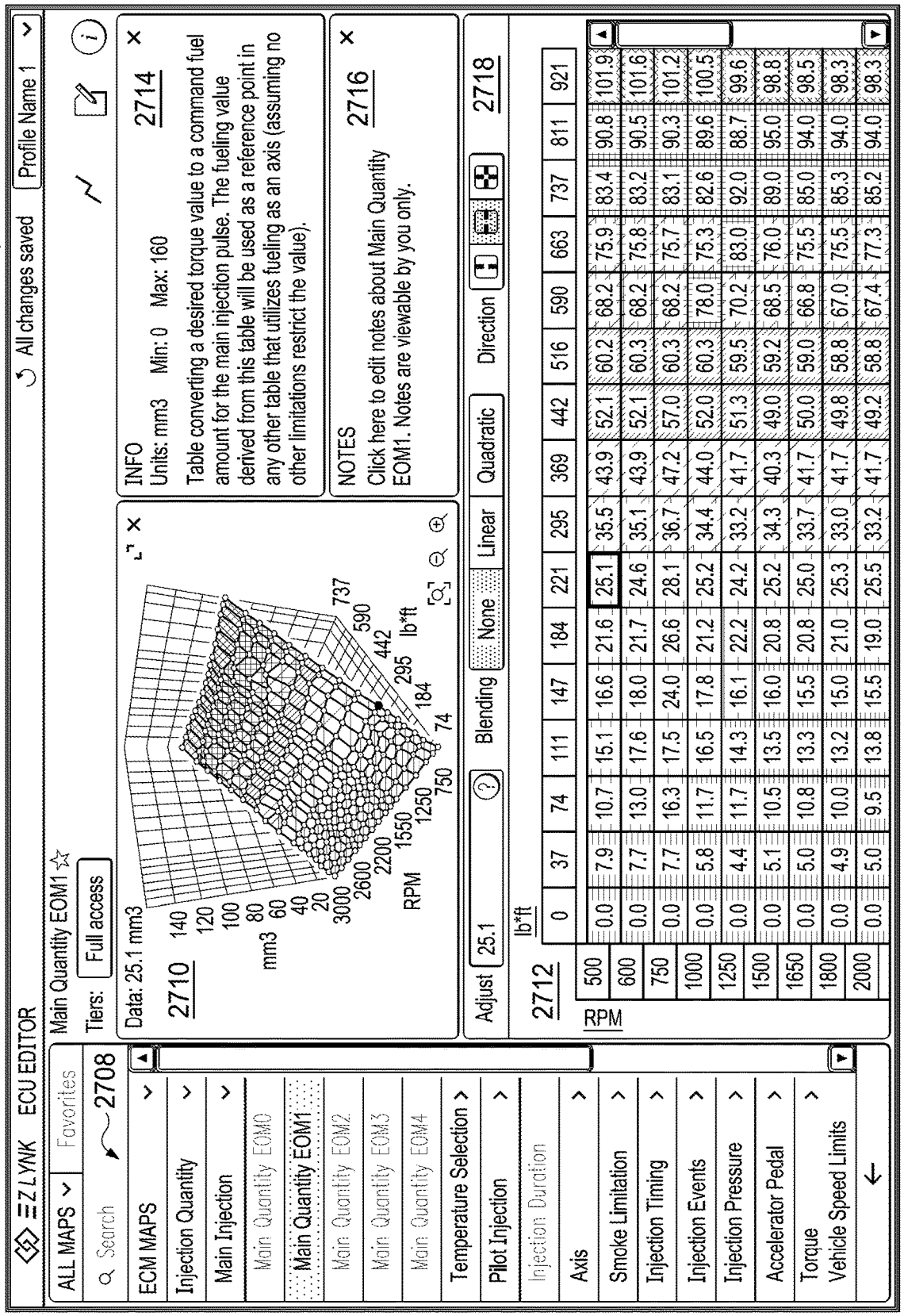

Turning to FIG. 27B, technician interface 2700 displays ECU editor view 2706. ECU editor view 2706 includes profile record list 2708, graph view 2710, chart view 2712, information view 2714, and notes view 2716. Profile record list 2708 displays a hierarchical list of the records of a selected ECU profile. Graph view 2710 displays a user editable graph of the data within a selected record of the selected ECU profile, which can be in either two or three dimensions based on the type of data. Chart view 2712 displays a user editable chart of the data within the selected record of the selected ECU profile. Information view 2714 displays information about the selected record of the selected ECU profile, which may not be edited. Notes view 2716 displays notes created by the technician for the selected record of the selected ECU profile.

Profile record list 2708 includes multiple hierarchical layers of categories and leaf nodes and, depending on the vehicle, may contain over a thousand categories and leaf nodes. The categories group collections of leaf nodes and other categories. Each leaf node is a record of the selected ECU profile. Data in the record of the leaf node can be edited. Selecting either a point on the graph or a cell in the chart highlights both the point on the graph and the cell in the chart and displays adjustment view 2718. Adjustment view 2718 provides controls for editing the value and identifying whether or not any edited value will affect neighboring values through linear or quadratic blending. The blending can be directed to one or both axes. A data point can be adjusted by dragging the point on graph view 2710 to a user selected value.

When the data of the selected record of the ECU profile is in three dimensions, graph view 2710 displays the data in three dimensions and chart view 2712 displays the data in two dimensions. The third axis for the data in chart view 2712 is represented by different shades of color. When the data of the selected record of the ECU profile is in two dimensions, graph view 2710 displays the data in two dimensions and chart view 2712 displays the data in one dimension. The second axis in this display mode is represented by different shades of color.

Graph view 2710 and chart view 2712 use colors to identify how close each data point is to the minimum or maximum value. In a preferred embodiment, minimum values are associated with color shades dominated by blue and maximum values are associated with shades of color dominated by red.

The categories of "ECM [engine control module] MAPS", "Injection Quantity", and "Main Injection" are opened with the leaf node "Main Quantity EOM1" being selected, which is associated with the Main Quantity EOM1 record in the selected ECU profile. The data is three dimensional and is displayed with three dimensions in graph view 2710 and is displayed in two dimensions in chart view 2712. Information view 2714 indicates that the Main Quantity EOM1 record includes data that is in units of cubic millimeters, has a minimum value of 0, and has a maximum value 160. The Main Quantity EOM1 record is a table that converts a desired torque value (in pound feet) and engine RPM to a commanded fuel amount in cubic millimeters. For example, when the amount of torque desired is 221 pound feet and the current engine RPM is 500, then the commanded fuel amount will be 25.1 cubic millimeters. Fuel amounts for torque and RPM values that do not appear in the table are interpolated using piecewise constant interpolation, linear interpolation, polynomial interpolation, and spline interpolation.

Figure 27C:
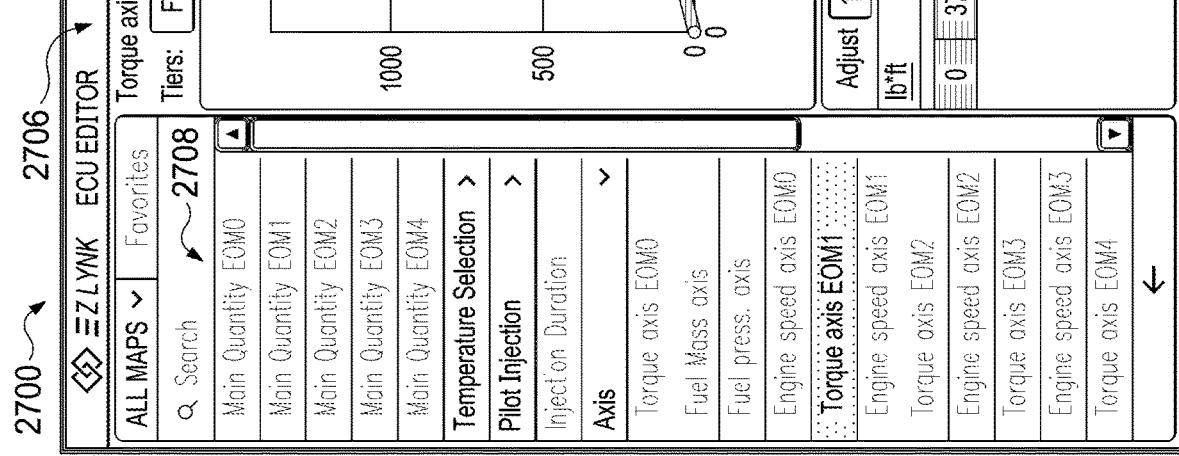

Turning to FIG. 27C, the categories of "ECM [engine control module] MAPS" and "Axis" are opened with the leaf node and record "Torque axis EOM1" being selected. The data is two dimensional and is displayed with two dimensions in graph view 2710 and is displayed in one dimension in chart view 2712. Information view 2714 indicates that the Torque axis EOM1 record is in units of pound feet, has a minimum value of 0, and has a maximum value 1400. The Torque axis EOM1 record is an axis that provides calculated engine torque used in torque to fuel conversion.

Figure 27D:
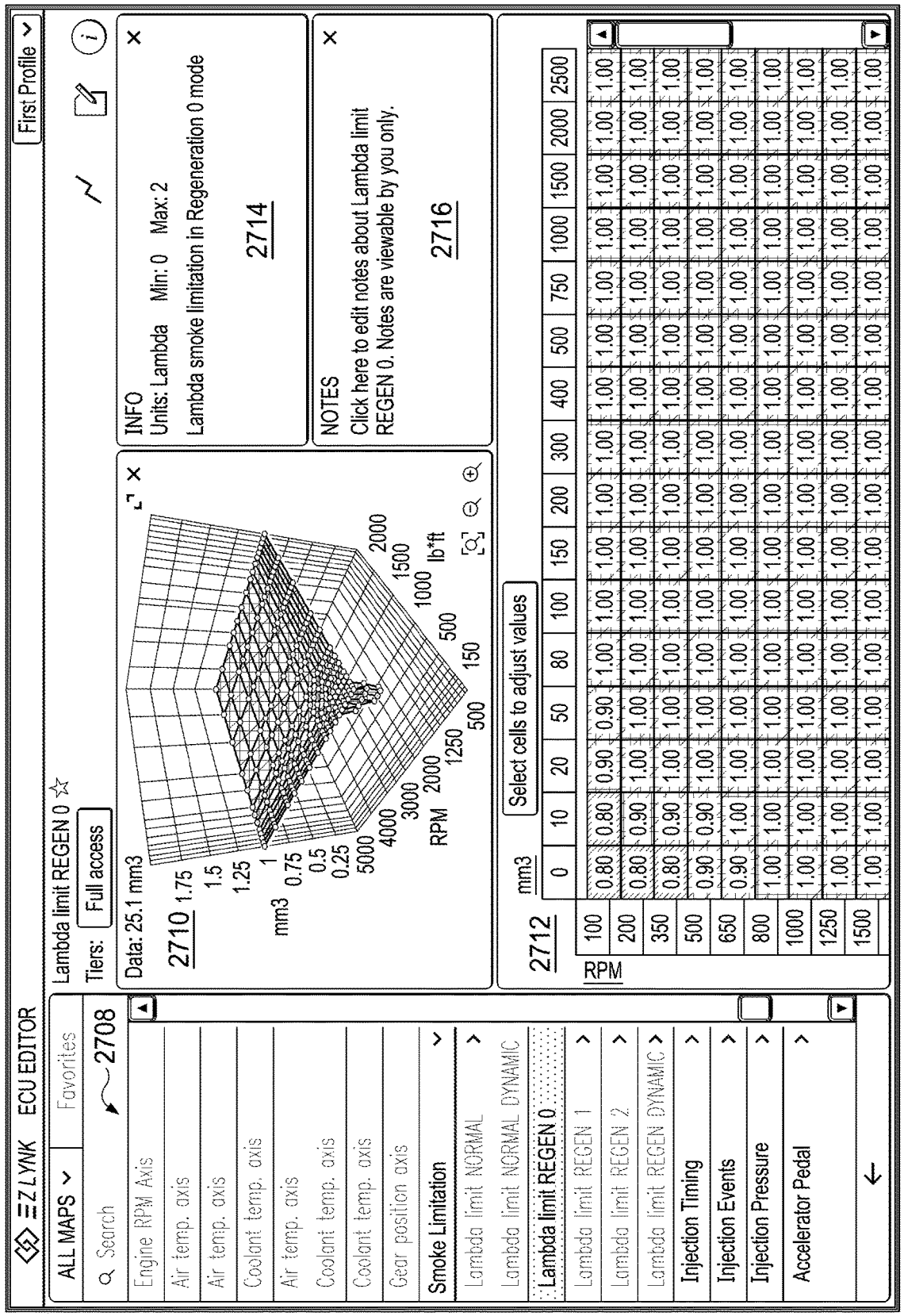

Turning to FIG. 27D, the categories of "ECM [engine control module] MAPS" and "Smoke Limitation" are opened with the leaf node and record "Lambda limit REGEN 0" being selected. Information view 2714 indicates that the Lambda limit REGEN 0 record includes data that has a minimum value of 0 and has a maximum value 2. The Lambda limit REGEN 0 record is a table that converts a cubic millimeter input and engine RPM to a lambda value. For example, when the cubic millimeter input is 50 and the current engine RPM is 100, then the lambda value is 0.90. Lambda values for cubic millimeter input and RPM values that do not appear in the table are interpolated using piecewise constant interpolation, linear interpolation, polynomial interpolation, and spline interpolation.

Figure 27E:
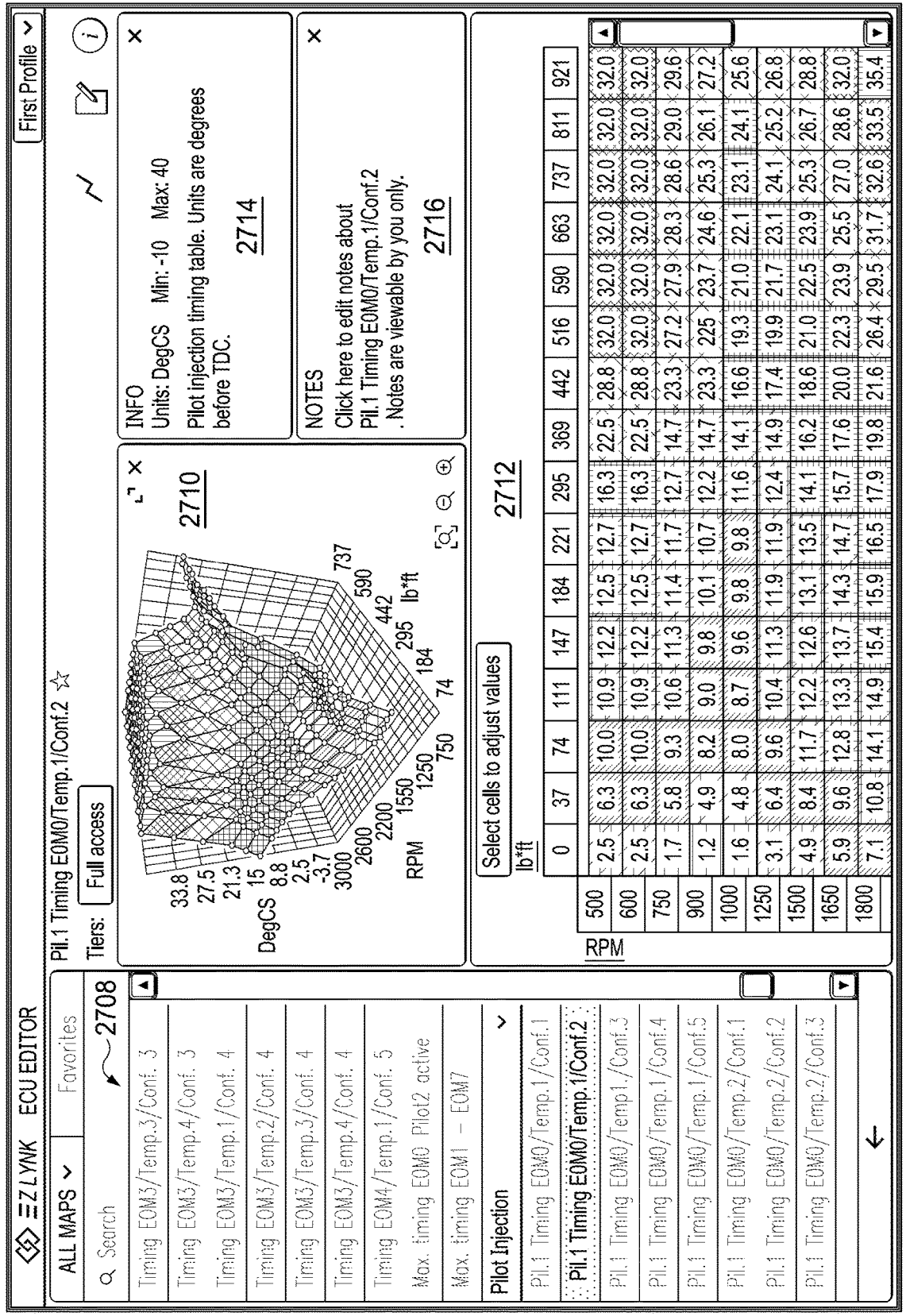

Turning to FIG. 27E, the categories of "ECM MAPS", "Injection Timing", and "Pilot Injection" are opened with the leaf node and record "Pil.1 Timing EOM0/Temp.1/Conf.2" being selected. Information view 2714 indicates that the Pil.1 Timing EOM0/Temp.1/Conf.2 record includes data that is in units of degrees before top dead center (TDC), has a minimum value of −10, and has a maximum value 40. The Pil.1 Timing EOM0/Temp.1/Conf.2 record is a table that converts a torque value (in pound feet) and engine RPM to an injection timing value. For example, when the amount of torque desired is 221 pound feet and the current engine RPM is 750, then the injection timing will be 11.7 degrees before top dead center.

Figure 27F:
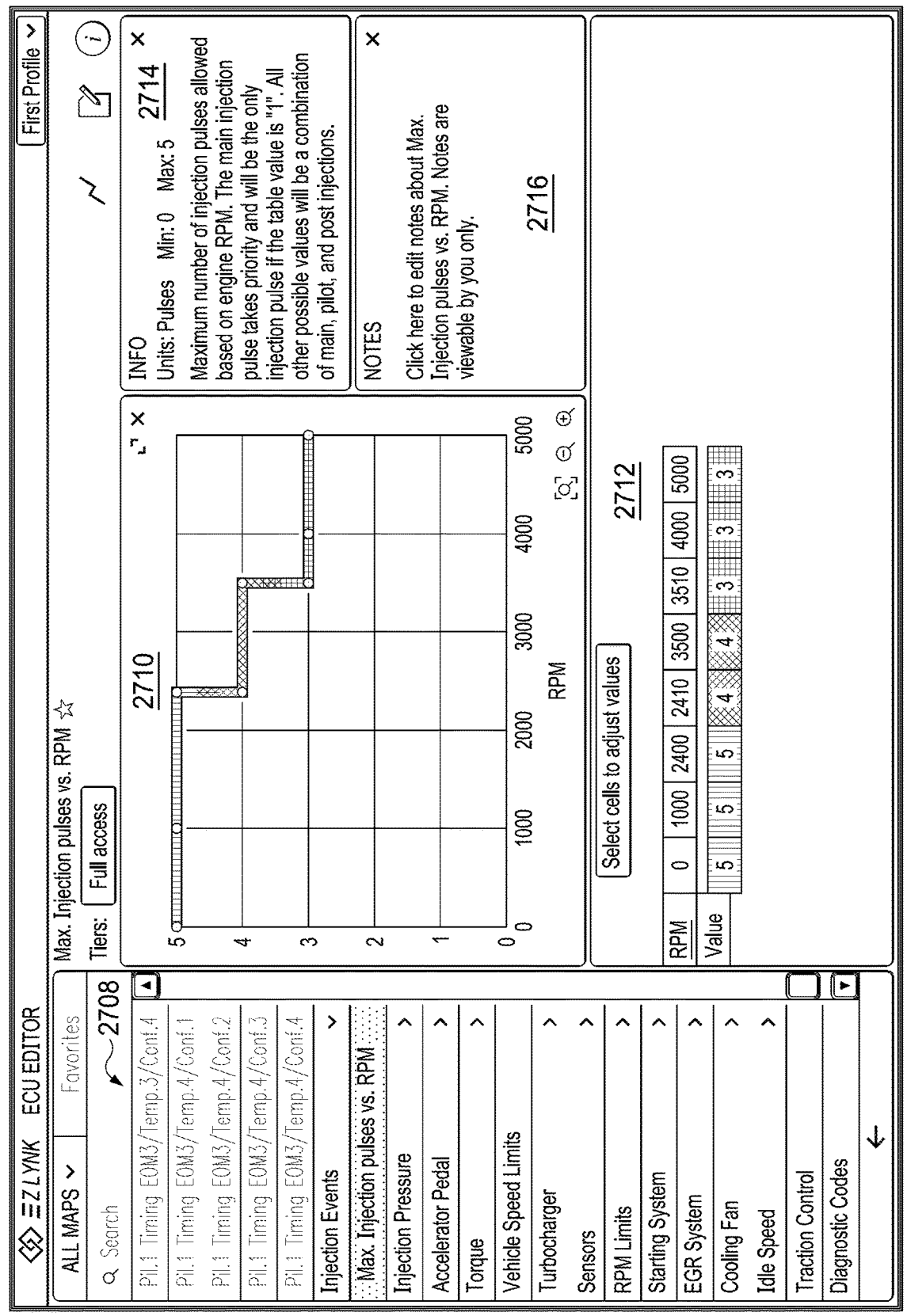

Turning to FIG. 27F, the categories of "ECM MAPS" and "Injection Events" are opened with the leaf node and record "Max. Injection pulses vs. RPM" being selected. Information view 2714 indicates that the Max. Injection pulses vs. RPM record is in units of pulses, has a minimum value of 0, and has a maximum value 5. The Max. Injection pulses vs. RPM record identifies the maximum number of injection pulses that are allowed based on a specific engine RPM.

Figure 27G:
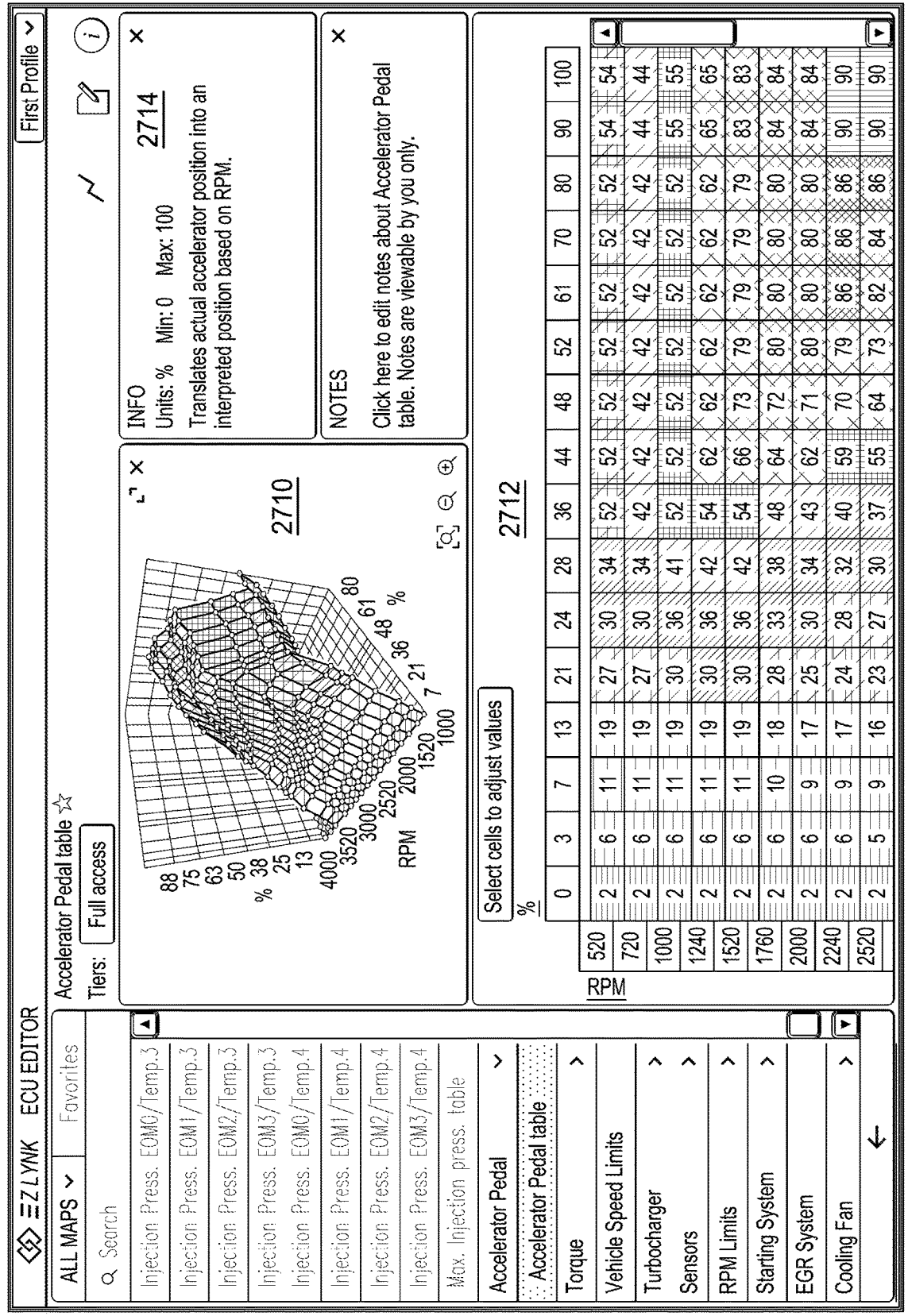

Turning to FIG. 27G, the categories of "ECM MAPS" and "Accelerator Pedal" are opened with the leaf node and record "Accelerator Pedal table" being selected. Information view 2714 indicates that the Accelerator Pedal table record includes data on the "y" axis that is indicative of percentage of pedal displacement, has a minimum value of 0, and has a maximum value 100. The Accelerator Pedal table record is a table that converts an actual accelerator pedal position (as a percentage) and engine RPM to an interpreted accelerator pedal position shown on the "z" axis. For example, when the actual position is 80 percent and the current engine RPM is 1000, then the interpreted position will be 52 percent.

Figure 27H:
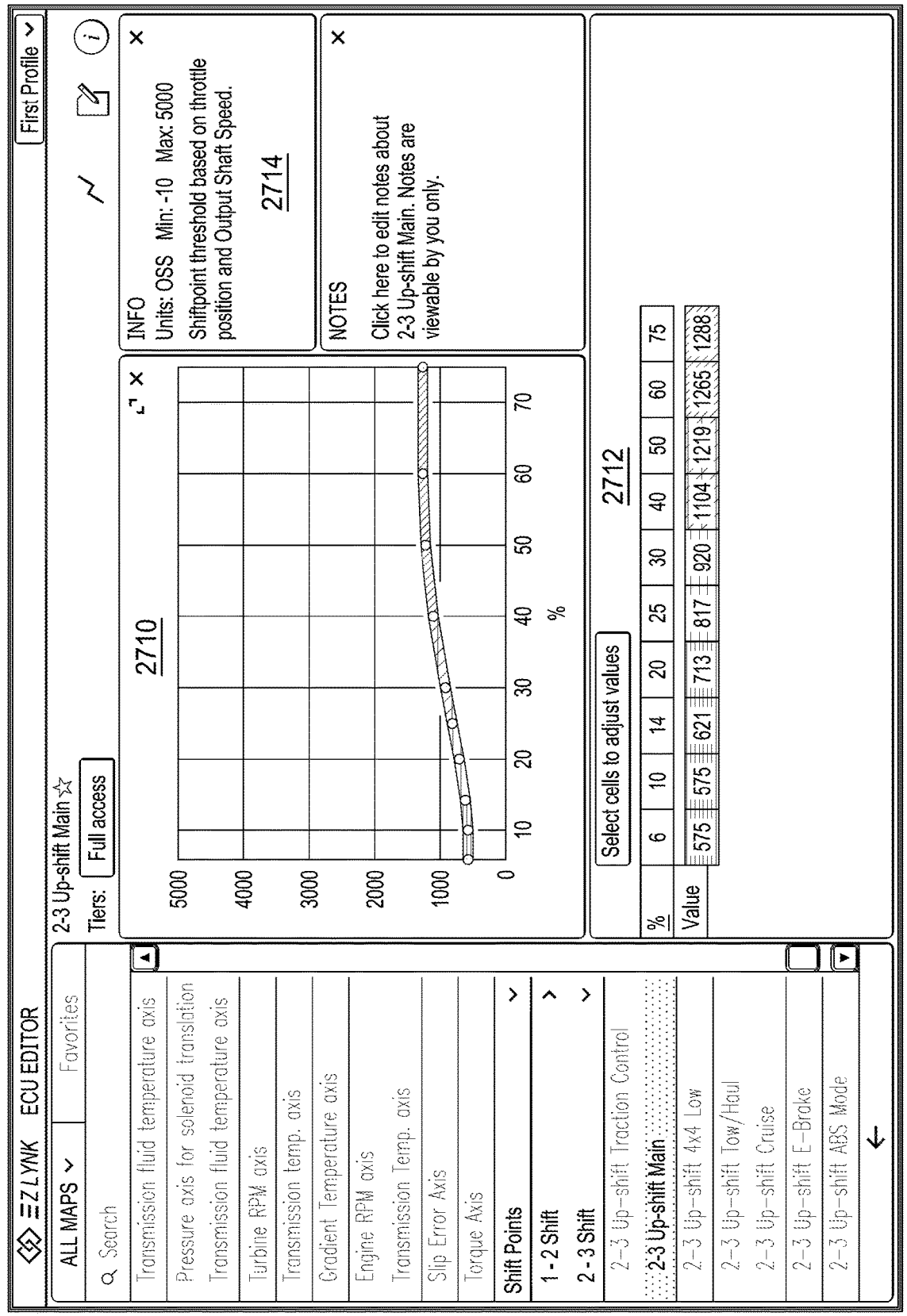

Turning to FIG. 27H, the categories of "TCM [transmission control module] MAPS", "Shift Points", and "2-3 Shift" are opened with the leaf node and record "2-3 Up-shift Main" being selected. Information view 2714 indicates that the 2-3 Up-shift Main record is in units of output shaft speed (OSS), has a minimum value of −10, and has a maximum value 5000. The 2-3 Up-shift Main record identifies the shift point threshold based on throttle position and shaft speed when shifting from 2nd gear to 3rd gear. The minimum shift point is with a shaft speed of 575 RPM and the throttle position at 6% and the maximum shift point is with a shaft speed of 1288 RPM and the throttle position at 75%. Outside of these constraints, up shifting from 2nd to 3rd gear will not be performed.

Figure 27I:
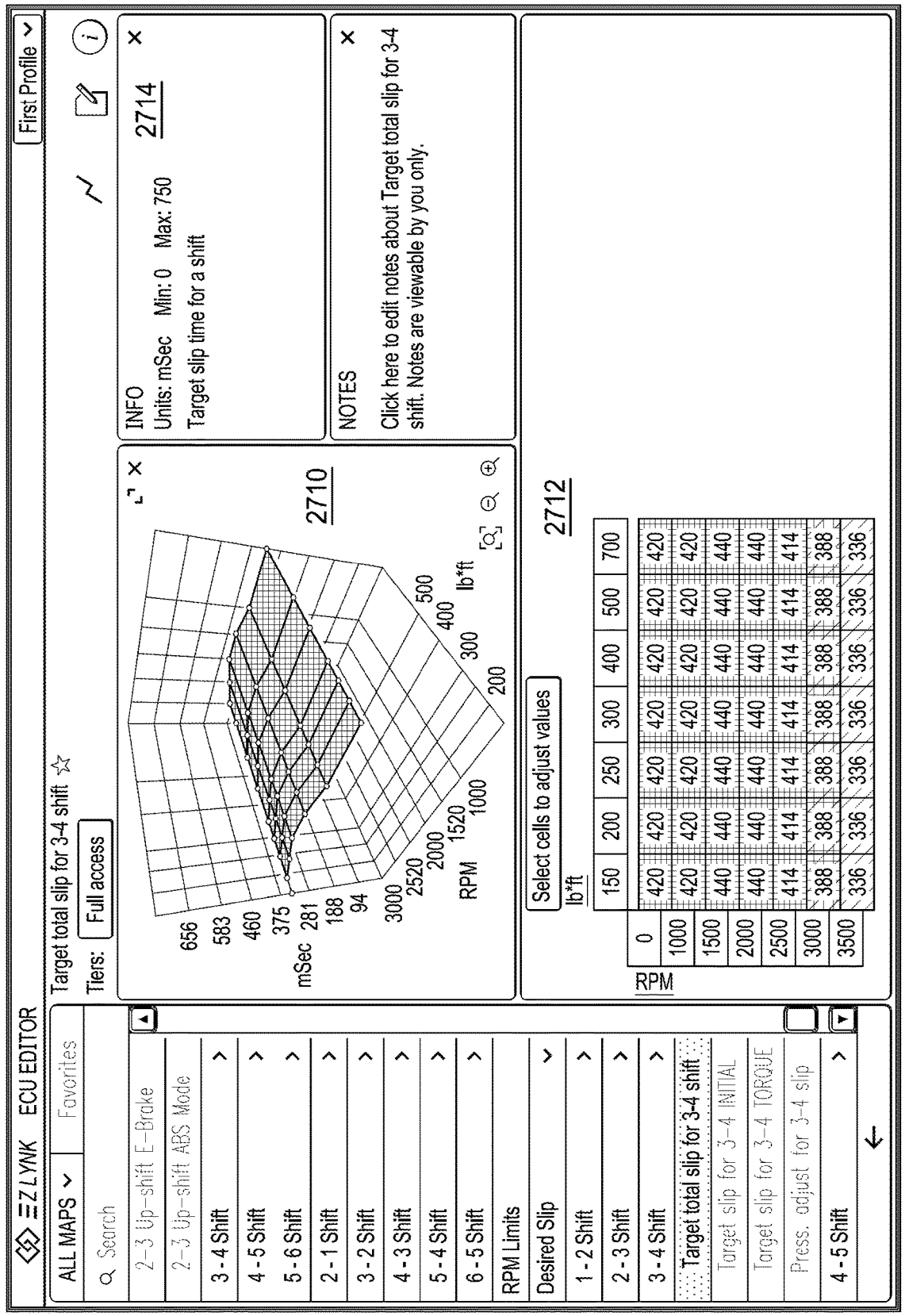

Turning to FIG. 27I, the categories of "TCM MAPS", "Desired Slip", and "3-4 Shift" are opened with the leaf node and record "Target total slip for 3-4 shift" being selected. Information view 2714 indicates that the Target total slip for 3-4 shift record includes data that is in milliseconds, has a minimum value of 0, and has a maximum value 750. The Target total slip for 3-4 shift record is a table that identifies a target slip time for a shift based on torque (in pound feet) and engine RPM. For example, when the torque is 300 percent and the current engine RPM is 2000, then the target desired slip is 440 milliseconds.

Figure 27J:
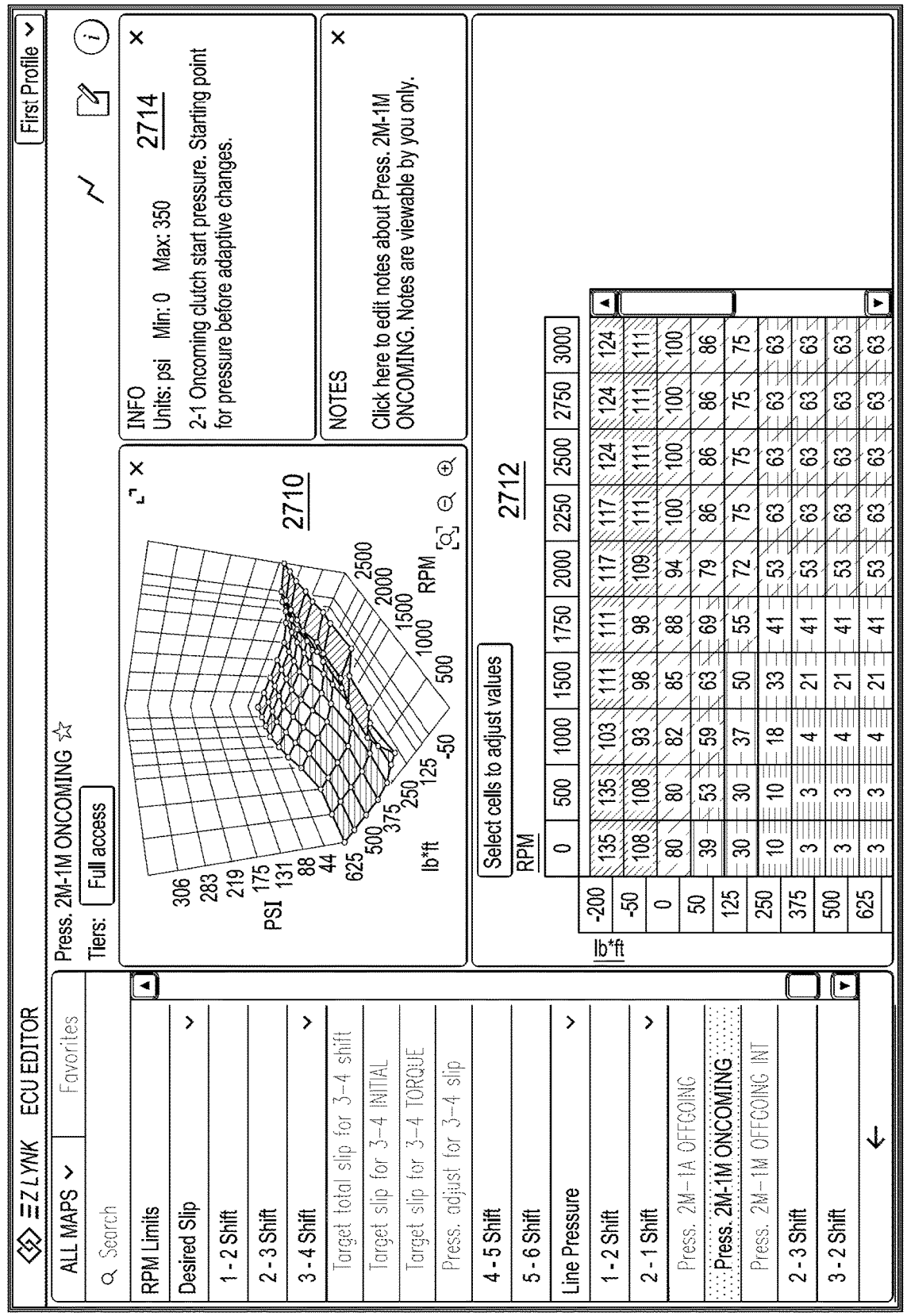

Turning to FIG. 27J, the categories of "TCM MAPS", "Line Pressure", and "2-1 Shift" are opened with the leaf node and record "Press. 2M-1M ONCOMING" being selected. Information view 2714 indicates that the Press. 2M-1M ONCOMING record includes data that is in pounds per square inch (PSI), has a minimum value of 0, and has a maximum value 350. The Press. 2M-1M ONCOMING record is a table that identifies the 2-1 on coming start pressure, which is the starting point for pressure before adaptive changes, and is based on engine RPM and torque (in pound feet). For example, when the RPM is 2250 and the torque is 50 pound feet, then the start pressure is 111 pounds per square inch.

Turning to FIG. 27K, the "TCM MAPS" category is opened with the leaf node and record of "Diagnostics" being selected. Information view 2714 indicates that the Diagnostics record allows for enabling or disabling diagnostic trouble codes (DTCs). Chart view 2712 includes a list of the diagnostic codes that can be enabled or disabled. In a preferred embodiment, selection of one of the diagnostic codes causes information view 2714 to display descriptive information about that diagnostic code.

Figure 28:
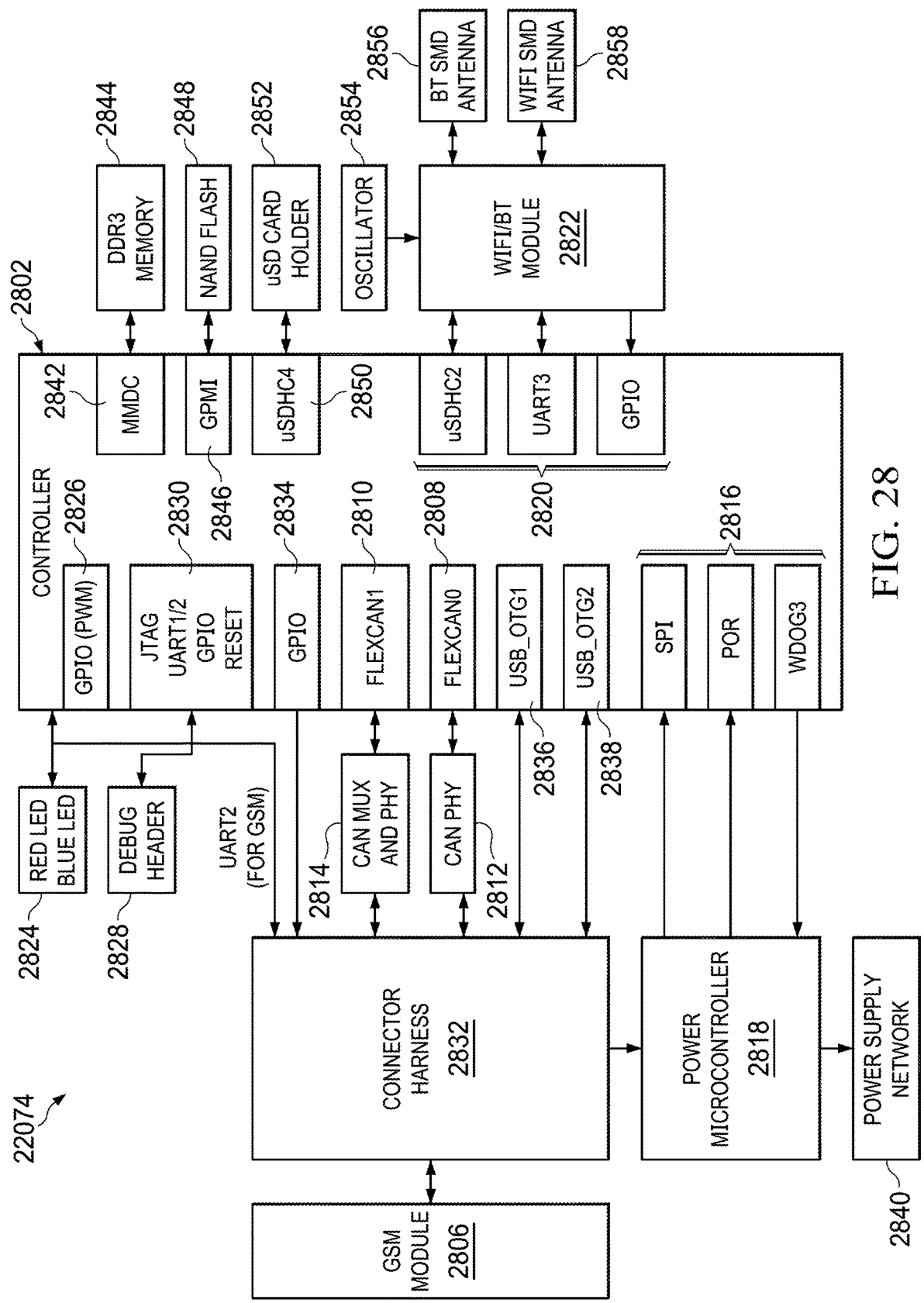
FIG. 28 is a schematic of a local device that connects to a mobile network.

Referring to FIG. 28, local device 22074 is a system that incorporates several systems, devices, controllers, boards, modules, and interfaces. Local device 22074 includes controller 2802 that runs one or more applications so that local device 22074 can interact with system 22000. In a preferred embodiment, controller 2802 is an i.MX 6 series microcontroller.

LEDs 2824 are connected to GPIO pins 2826. In a preferred embodiment, LEDs 2824 include a red LED to indicate and error condition and a blue LED to indicate short range wireless connectivity status. GPIO pins 2826 can be activated using pulse width modulation (PWM) to control the intensity of LEDs 2824.

Debug header 2828 provides the physical interface for several ports on controller 2802 that are used for debugging purposes. The debugging ports include the set of interfaces 2830, which includes a JTAG interface, serial port interfaces (UART1 and UART2), one or more general purpose input output (GPIO) pins, and a reset pin of controller 2802. The JTAG interface allows for connecting to external devices that are used to debug local device 22074. The serial port interfaces allow for connecting to external chips and peripherals including GSM module 2806, which is connected to UART2. The usage of the GPIO pins are programmatically defined to either read or write data to or from controller 2802. The reset pin is used to cause controller 2802 to reset itself.

Connector harness 2832 provides the physical connection for several of the interfaces provided by controller 2802, including the UART2 interface, one or more GPIO pins, the CAN bus interfaces, and the USB interfaces. Connector harness 2832 provides the connections to GSM module 2806 and power controller 2818 for controller 2802.

GPIO pins 2834 are programmatically controlled. GPIO pins 2834 allow controller 2802 to export data to or import data from other devices attached through connector harness 2832.

First USB port 2836 and second USB port 2838 allow for connectivity to devices and peripherals outside controller 2802. Second USB port 2838 is connected through connector harness 2832 to GSM module 2806 to allow for communication between and control of GSM module 2806 by controller 2802.

GSM module 2806 includes circuits, modules, and printed circuit boards that, when driven and operated by controller 2802, allow local device 22074 to connect to and exchange data with mobile network 22004.

Interfaces 2808 and 2810 respectively connect to CAN interface circuits 2812 and 2814, respectively. Interfaces 2808 and 2810 are used by controller 2802 to interact with one or more CAN buses through an OBD port of the vehicle to which local device 22074 is attached. CAN interface circuitry 2814 includes the analog multiplexer, as described in FIG. 21, to allow CAN interface 2810 of controller 2802 to operate with the vehicles of different manufacturers that use different pinouts for the location of the second can interface in the OBD port connector. CAN interface circuits 2812 includes the physical connectors between interface 2808 of controller 2802 and connector harness 2832.

Set of interfaces 2816 connects controller 2802 to power controller 2818. Power controller 2818 controls power supply network 2840 and the power on boot sequence for local device 22074. Power supply network 2840 includes several power rails of different voltages to provide Power to the devices and chips within local device 22074.

In a preferred embodiment, power controller 2818 is an over-the-air configurable power controller operating independent of the main processor. Power controller 2818 is updateable by controller 2802 through the use of a serial communication interface of the set of interfaces 2816, allowing cloud-based updates to the integrated circuit of power controller 2818. The integrated circuit of power controller 2818 is used for customizing multiple power sequencing, power saving, and security functions, including but not limited to, dynamic power throttling and disabling the local device if unauthorized or non-licensed use is detected.

Set of interfaces 2820 connects to one or more modules 2822 that provide one or more wireless network connections. In a preferred embodiment, module 2822 provides connectivity to wireless area networks using Wi-Fi protocols and to personal area networks using Bluetooth protocols. Oscillator 2854 is a reference oscillator for module 2822. Oscillator 2854, in a preferred embodiment provides about a 32 kilohertz reference signal to module 2822.

Module 2822 is connected to antenna 2856 and to antenna 2858. Antenna 2856 is a surface mount device (SMD) antenna that is used for Bluetooth protocol communications. Antenna 2858 is also an SMD antenna, but is used for Wi-Fi protocol communications. In a preferred embodiment, antenna 2856 and antenna 2858 are the same type of antenna mounted at different positions o the board on which module 2822 is mounted to reduce interference.

Multimode DDR controller (MMDC) 2842 of controller 2802 connects to memory 2844. In a preferred embodiment, memory 2844 is DDR3 memory and is the random access memory used by controller 2802 to execute programs and instructions for local device 22074.

General purpose media interface 2846 allows for connection of controller 2802 with external flash memory, such as memory 2848. In a preferred embodiment, memory 2848 is a NAND flash memory that provides persistent storage for the programs and data executed and used by controller 2802.

Secure digital (SD) interface 2850 of controller 2802 provides for connecting removable secure digital media to and from local device 22074 through SD card holder 2852.

Figure 29:
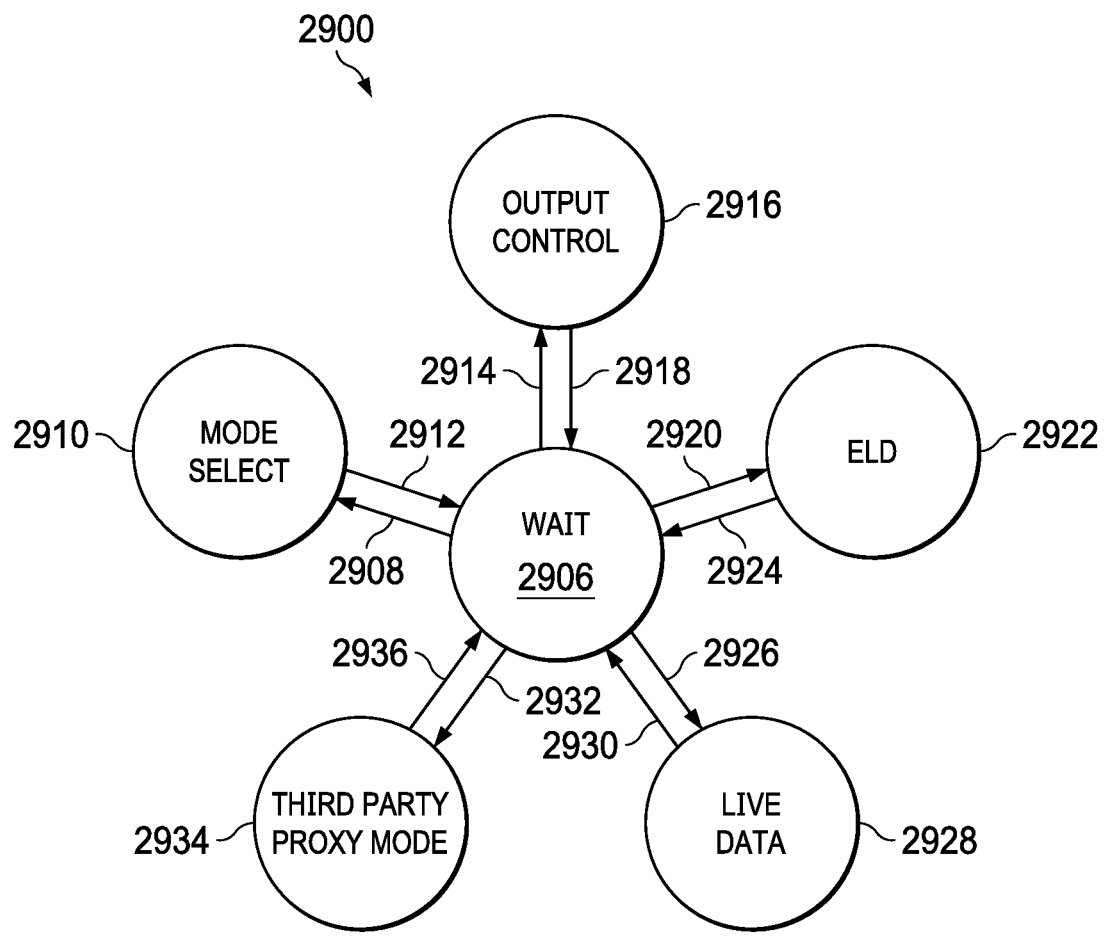
FIG. 29 is a state diagram of a preferred embodiment.

Referring to FIG. 29, a state diagram 2900 of different states of a preferred embodiment of the local device is depicted.

In wait state 2906, the local device is powered up and waits for further input.

Transition 2908 to mode select state 2910 occurs with a user selection of a mode of the local device from a GUI display. Mode select state 2910 includes a Tune Control Mode/function of the local device, as will be further described. Transition 2912 returns the local device to wait state 2906.

Transition 2914 to output control mode state 2916 includes an Output Control Mode/function of the local device, as will be further described. Transition 2918 returns the local device to wait state 2906.

Transition 2920 to ELD state 2922 includes an ELD Mode/function of the local device, as will be further described. Transition 2924 returns the local device to wait state 2906.

Transition 2926 to live data mode 2928 includes Live Data Mode/function of the local device, as will be further described. Transition 2930 returns the local device to wait state 2906.

Transition 2932 to third-party proxy control mode 2934 includes the third-party proxy functions of the local device, as will be further described. Transition 2936 returns the local device to wait state 2906.

Referring now to FIGS. 30A, 30B, 30C and 30D, mode select state 2910, is further described. At step 3002, mode select state 2910 is selected. At step 3004, the local device sends a message to the vehicle controller, confirming the vehicle type. At step 3006, a set time for receiving a response from the vehicle controller is monitored. If a response is not received within the set time, then the local device times out at step 3008 and returns to step 3002. If a response is timely received, then the method proceeds to step 3010. At step 3010, the message from the vehicle controller is masked, including message header, frame parameters, and Serial IDs (SIDs). The SIDs include, but are not limited to, RPMs, gear and transmission parameters (e.g., temperature), ignition key position, throttle position, and coolant temperature.

At step 3012, sufficient memory is reserved for performing the tune modifications. A buffer may be used, or an array of sufficient size is defined, for receiving a SOFT map. At step 3016, PID variables are defined in memory for performing tune modifications.

At step 3018, a CAN configuration file is retrieved from the vehicle controller, which include VIN, year, and ECU and TCU part and serial numbers.

At step 3020, a year of the vehicle is compared to a predetermined year. For example, if the predetermined year is 2012 and the vehicle year is greater than or equal to 2012, then the method moves to step 3022. At step 3022, one or more power levels are retrieved from a JSON message and are used to adjust the ECU and/or the TCU in the vehicle. The method then ends at step 3023. In this example, if the vehicle year is less than 2012, then the method moves to step 3024, as shown in FIG. 30B.

Figure 30A:
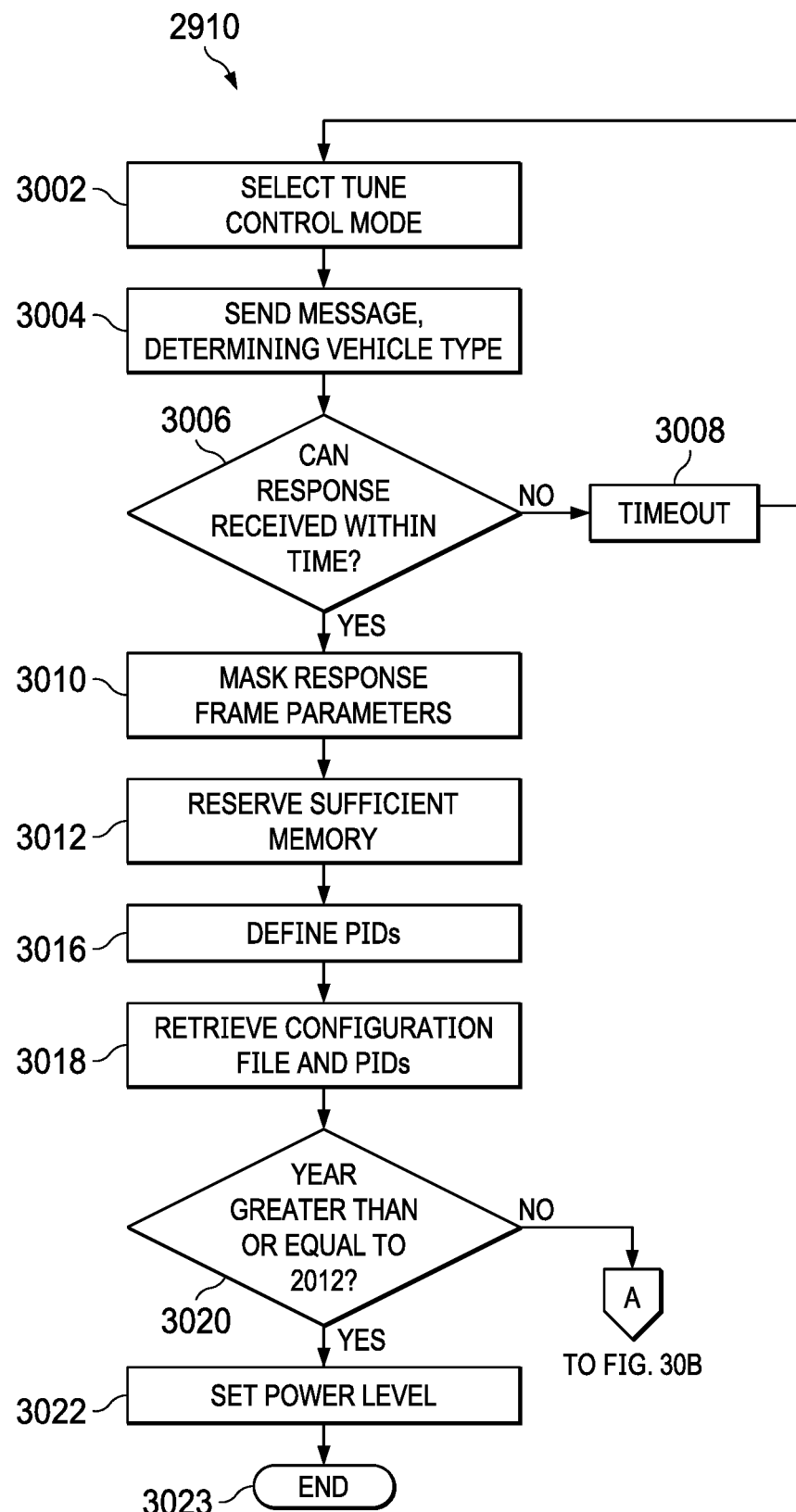
FIGS. 30A through 30D are flowcharts for a mode select state of a preferred embodiment.
Figure 30B:
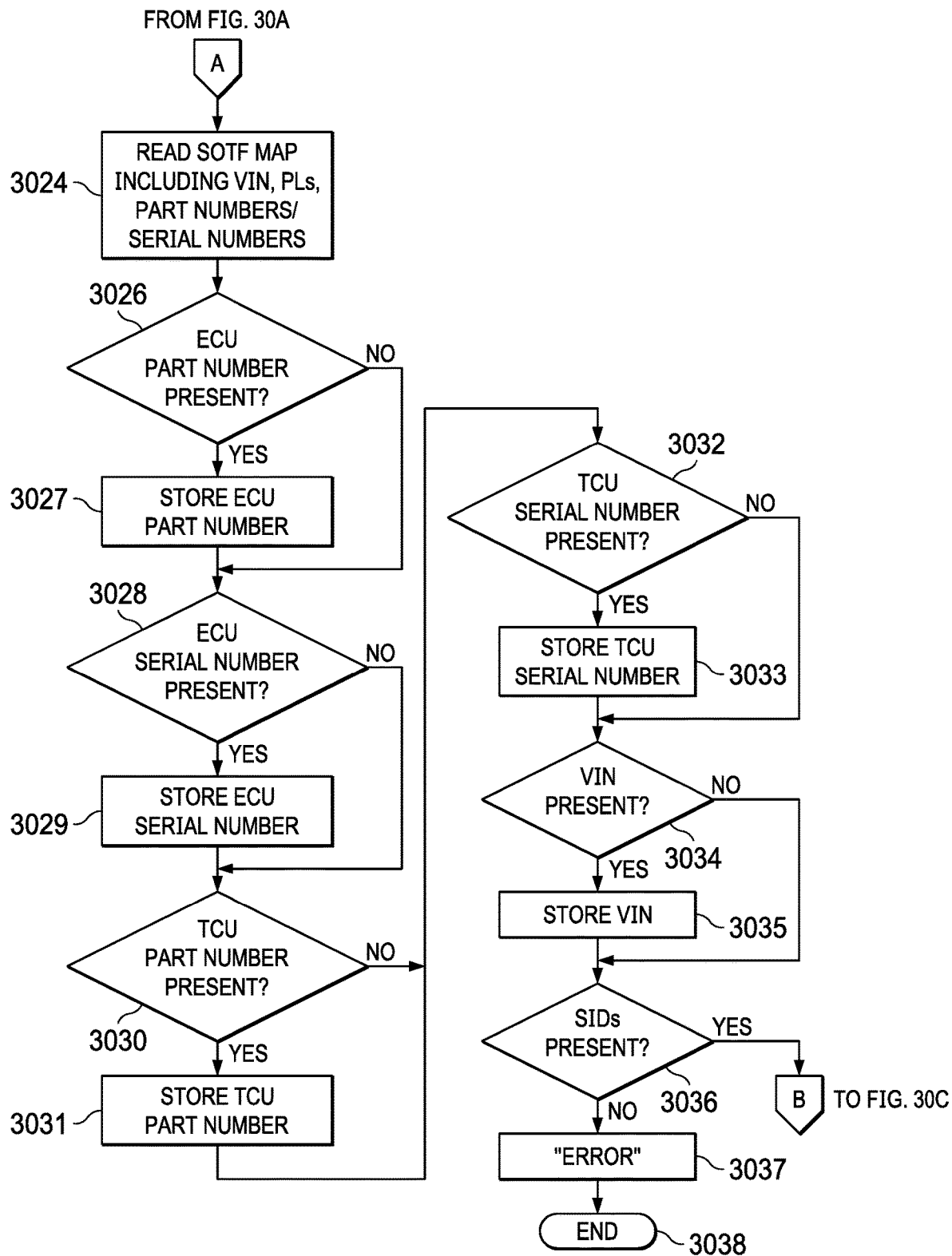

Referring then to FIG. 30B, at step 3024, a SOTF map is read from the calibration file included in the JSON message. Power levels, part numbers, VIN, and serial numbers are also read at step 3024. In a preferred embodiment, the data read at step 3024 is stored in the CPU register using a ring or FIFO buffer.

At step 3026, the data read at step 3024 is checked to ensure it includes an ECU part number. If so, then at step 3027, the ECU part number is stored and the method moves to step 3028. If not, then the method proceeds directly to step 3028.

At step 3028, the data read at step 3024 is checked to ensure it includes an ECU serial number. If so, then at step 3029, the ECU serial number is stored and the method moves to step 3030. If not, then the method proceeds to step 3030.

At step 3030, the data read at step 3024 is checked to ensure it includes a TCU part number. If so, then at step 3031, the TCU part number is stored and the method moves to step 3032. If not, then the method proceeds to step 3032.

At step 3032, the data read at step 3024 is checked to ensure it includes a TCU serial number. If so, then at step 3033, the TCU serial number is stored and the method moves to step 3034. If not, then the method proceeds to step 3034.

At step 3034, the data read at step 3024 is checked to ensure that a VIN is present. If so then at step 3035 the VIN is stored and the method moves to step 3036. If not, then the method moves to step 3036.

At step 3036, the data read at step 3024 is checked to ensure it includes an SID. If not, then at step 3037, an "Error" message is provided and the method ends at step 3038. If so, then the method proceeds to step 3039, as shown in FIG. 30C.

Figure 30C:
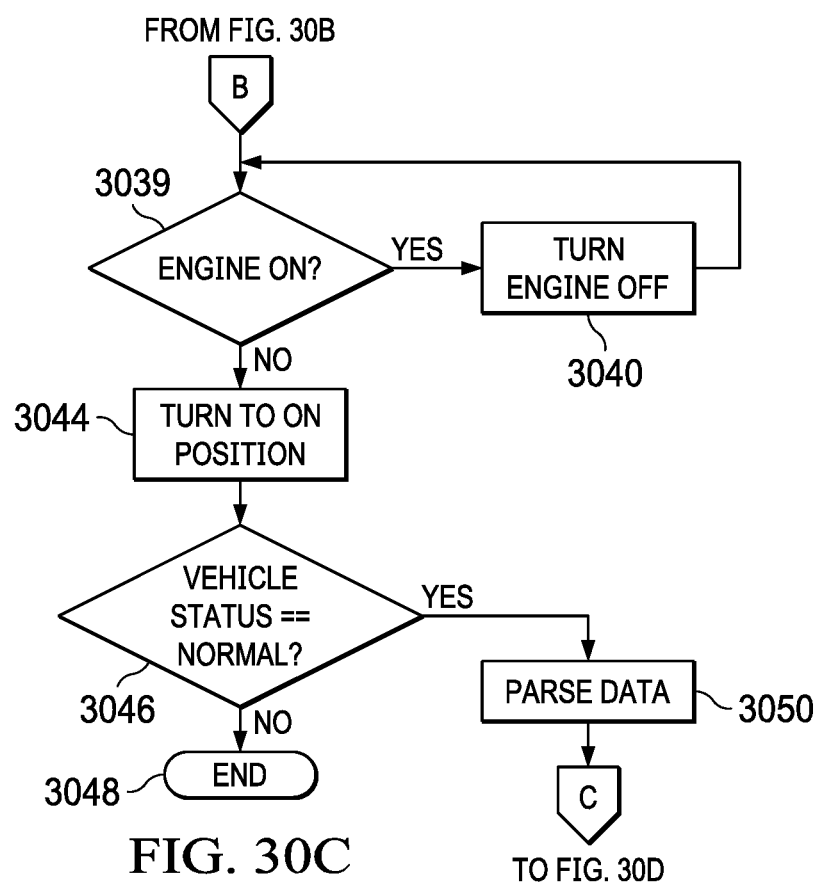

Referring then to FIG. 30C, at step 3039 the ignition status of the vehicle is checked. If it is "ON", then at step 3040 a "Turn engine off" message is sent to the display and the method returns to step 3039. If the ignition is "OFF", then at step 3044 a "Turn ignition to ON position" message is sent to the display and the method moves to step 3046.

At step 3046, the vehicle status is determined. The vehicle status indicates if the vehicle is running properly and whether or not there are any outstanding DTCs. If the vehicle is not running properly (i.e., status !=Normal), then at step 3048, the Tune Control mode ends (i.e., no modifications are made) and the system returns to a wait state. Step 3048 may also include sending an error message, to the display. If the vehicle is running properly then the method proceeds to step 3050.

At step 3050, the method parses the PIDs that were read at step 3018. The PIDs that are parsed include, but are not limited to, engine control module (ECM) voltage, ambient air temperature, engine oil temperature, intake air temperature, boost parameters, rail pressure desired, rail pressure actual, transmission line pressure desired, barometric pressure, variable geometry turbo position actual, variable geometry turbo position desired, exhaust gas recirculation valve position actual, exhaust gas recirculation valve position desired, mass air flow, diesel particulate filter soot load, exhaust pressure, main injector event timing, transmission shaft output speed, torque converter slip, exhaust gas temperature, and main injection quantity desired. If a value for the PID is not provided in the message, the parsing moves to the next PID (e.g., break). If the value for the PID is in the message, then the value is stored in a data structure (e.g., array, lookup table, defined variable, etc.). The method then moves to step 3052, shown in FIG. 30D.

Figure 30D:
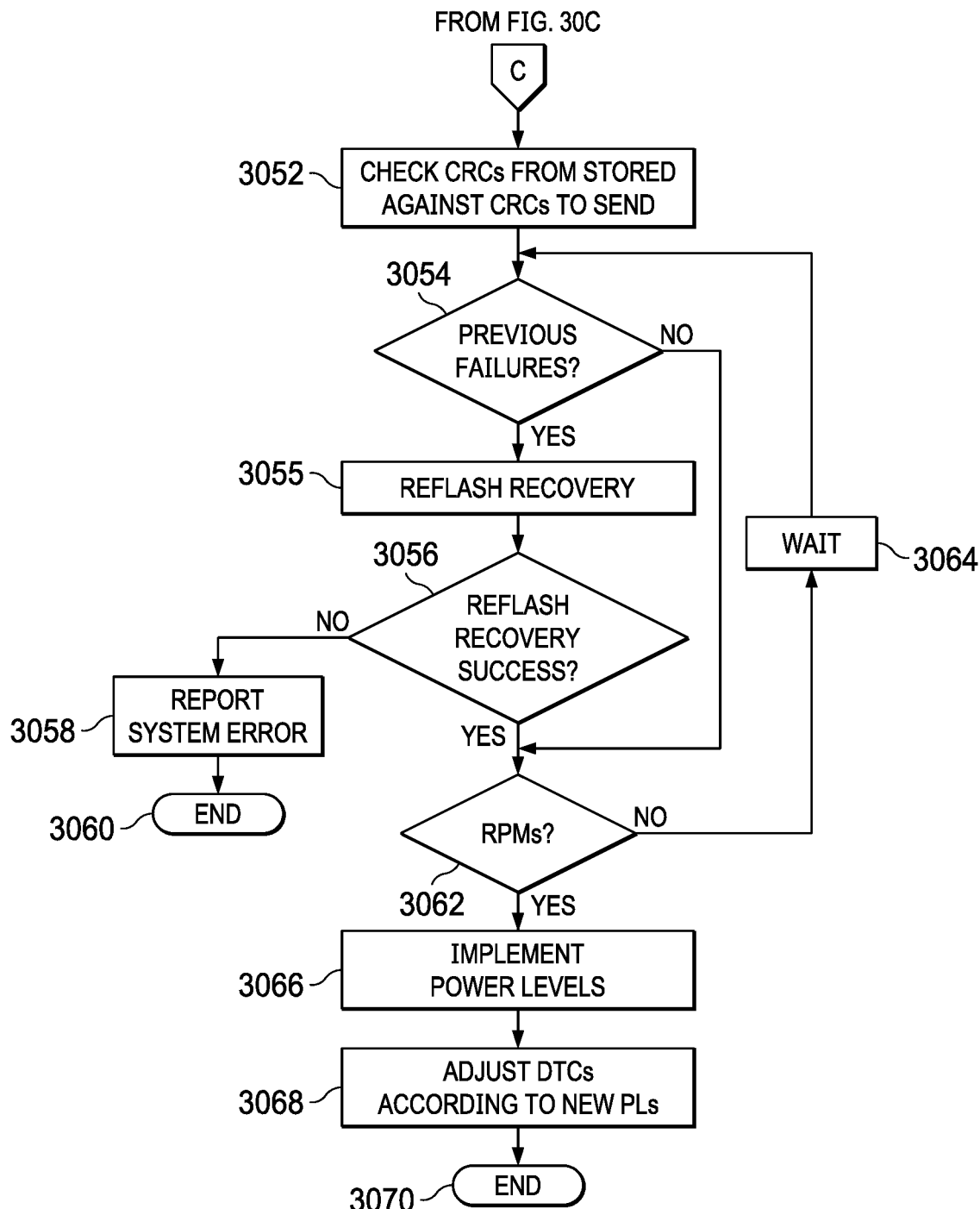

Referring then to FIG. 30D, at step 3052 a new CAN configuration file is created, including checking CRCs against stored CRCs (e.g., those initially received from the vehicle controller). Only the modified CRCs are updated in the new configuration file.

At step 3054, a determination is made as to whether or not prior system failures have occurred.

If so, then at step 3055, the method performs a reflash recovery operation. The reflash recovery operation may include obtaining an appropriate file for the recovery, reading data from the file, downloading and/or updating the bootfile, erasing a sector of the appropriate module, writing data to the sector (e.g., for ECM and/or TCM), performing necessary iterations for other sectors, and resetting the module. The method then moves to step 3056. If not, then the method moves to step 3062.

At step 3056, a determination is made as to whether or not the reflash was successful. If not, the method moves to step 3058. If so, the method moves to step 3062.

At step 3058, the method reports an unsuccessful refresh. Step 3058 may include providing a visual alert, audio alert, or other indication of an unsuccessful function, and an indication of where the error occurred. At step 3060, the method ends the operation of the Tune Control mode.

At step 3062, the RPM of the vehicle engine is checked. If the RPM value is zero, then the method moves to step 3064. At step 3064, the method waits a predefined short time period and then returns to step 3054. Step 3064 is only repeated a finite predetermined number of times before the method times out. If the RPM value is greater than zero, then at step 3066 the method implements the power level modifications in the SOTF map.

At step 3068, DTCs are adjusted according to the newly implemented power levels and SOTF map. At step 3070, the Tune Control mode ends and the system returns to a wait state. Step 3070 may further include providing a visual alert, audio alert, or other indication of a successful completion of tuning modifications.

Figure 31:
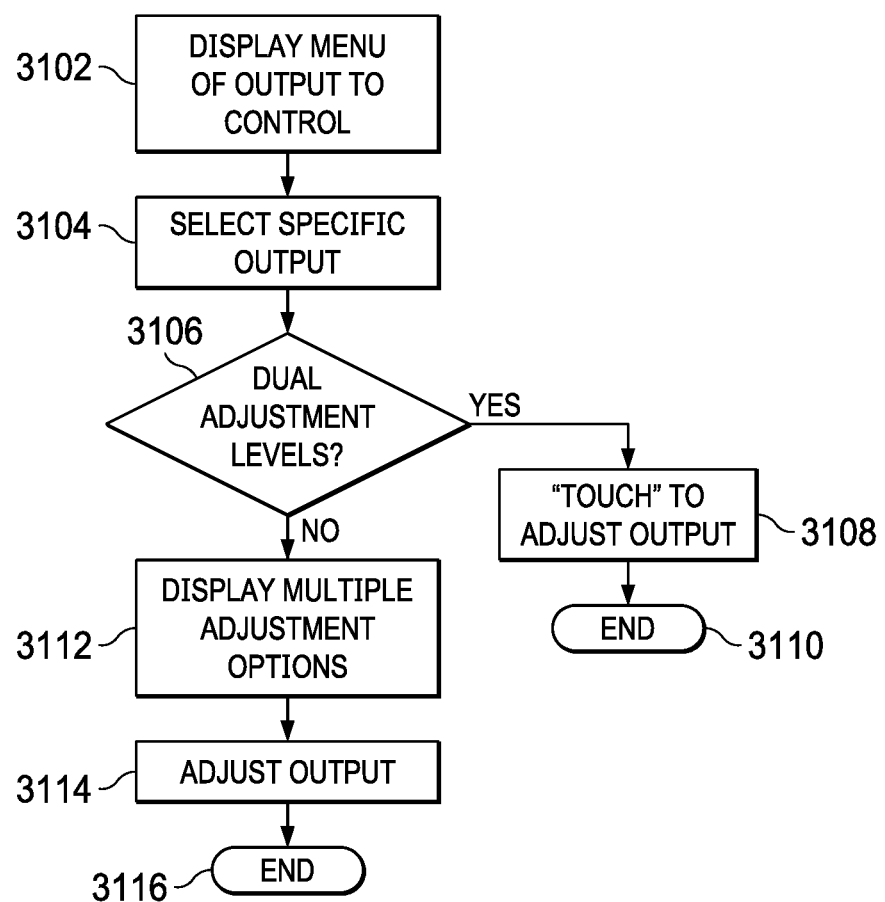
FIG. 31 is a flowchart of an output control mode state of a preferred embodiment.

Referring now to FIG. 31, Output Control Mode state 2916 is further described. Output Control Mode state 2916 includes volume control (e.g., increase, decrease, mute), communication output control (e.g., Wi-Fi output ceased, re-started, or paused; Bluetooth output ceased, re-started, or paused), device settings such as delay time between a beacon alert and beacon implementation, as will be further described. Alert control such as the form and type of alerts that will be displayed on the client device security prompt output, device output control (e.g., whether or not mobile devices will be allowed or restricted from using the local device as an internet access point), and combinations thereof.

At step 3102, the client device displays a menu of the output control options that are adjustable. At step 3104, the specific output is selected. At step 3106, a determination is made as to whether or not dual adjustment levels are present. If so, then at step 3108, the adjustment is made by way of the user touching the display. If not, then the method moves to step 3112. At step 3110, the output control mode ends. Step 3110 may further include a delay before the display of output control closes, enabling the user to see the selection that occurred.

At step 3112, if the output control selected from the menu at step 3104 has a multiple adjustment levels associated with it, then the client device displays the multiple adjustment levels. At step 3114, at least one of the multiple adjustment levels is selected. For example, if volume control is selected at step 3104, then a sliding GUI element may enable the user to slidingly adjust the volume level of alerts generated by the local device from multiple different volume levels. At step 3116, after making the adjustment to the desired level among the multi-level output control, the Output Control Mode ends.

Referring then to FIGS. 32, 33A-33E and 34, ELD state 2922, is further described. ELD mode includes a query for one or more of a routing code, an email address, or other additional input may be received from a safety officer or a motor authority representative. Additional input during the ELD mode may also include a report period request. For instance, the safety officer may be interested in RODS for the last 24 hours, the last week, the last six months, or another specified period of time. Receipt of the report period input may enable additional functions such as logged data retrieval from the local device, the system server, or a combination thereof. The additional input during ELD mode may also include acceptable operator annotations. For example, an operator may be able to add a comment for a specific RODS report or entry. For instance, the local device may prompt the operator, via client device, to enter waiting time information, break information, or unassigned driver information.

Figure 32:
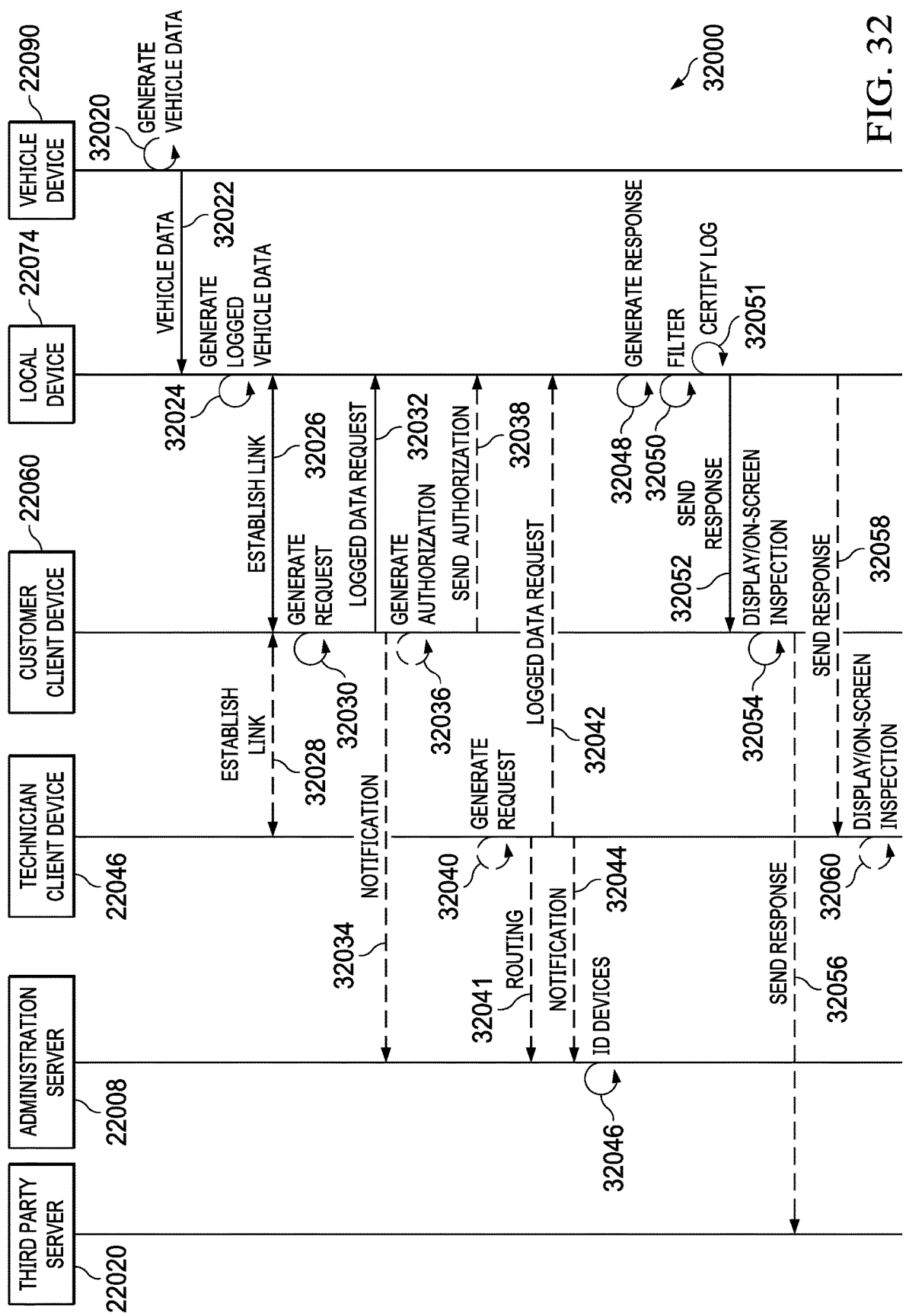
FIG. 32 is a network flow diagram of an ELD state of a preferred embodiment.

Referring first to FIG. 32, method 32000 shows several steps utilized by system 22000 to perform ELD mode of the local device. The system acquires logged data for, in a preferred embodiment, an administrative official such as a motor authority representative or safety officer, who uses the system with customer client device 22060 or with a motor authority client device, to display logged data, display live data, and send RODS or other vehicle/safety reports using cloud services provided by administration server 22008. For example, a motor authority official can ask an operator (i.e., customer) for vehicle data logs for a Department of Transportation (DOT) inspection. The operator uses customer client device 22060 to connect to vehicle device 22090 through system 22000. The motor authority official reviews logged vehicle data and/or live vehicle data that is provided through system 22000. System 22000 generates an on-screen inspection, based on the vehicle data and motor authority (e.g., Federal Motor Carrier Saftey Administration (FMCSA)) rules and regulations, including alerts for logs that may not be fully compliant with the rules and regulations. The motor authority official reviews the vehicle data and otherwise performs the on-screen inspection. The official then may instruct system 22000 to transfer the vehicle data to the motor authority client device or third-party server 22020. An example is a motor authority server.

At step 32020, vehicle data is generated by vehicle device 22090. The vehicle data includes data, information, and code from one or more sensors, systems, and devices that are connected to vehicle device 22090.

At step 32022, vehicle device 22090 sends vehicle data, to local device 22074.

At step 32024, local device 22074 generates logged vehicle data. The logged vehicle data is a set of the data that includes one or more of off duty time, sleeper berth time, driving time, on-duty not driving time, annotations, driver's location description and modifications, comments, commercial motor vehicle power unit number, mileage records, trailer number(s), shipping document number(s), driver hours of service (HOS) records, RODS, and combinations thereof. Step 32024 further includes encapsulating the logged vehicle data and forming packets for transmission. Step 32024 may further include filtering each section of a message frame, such as with an XOR operation, a parity check, or a delta operation, to determine if each of the required sections includes data. If the filter indicates that each of the required sections includes data, then the logged data may represent a certified log. The required sections include, but are not limited to, the calendar day for which vehicle data logs were created, a driver ID for the operator during creation of the ROD.

Step 32024 may further include sorting the data for the vehicle logs. The data may be sorted according to day, time frame (i.e., period), and transaction for the logged vehicle data. The timeframe identifies the length of a window of time for vehicle data, such as the previous 24 hours of vehicle data. The transaction identifies how the encapsulated, packetized, or logged data should be handled (e.g., displayed according to a display protocol, transmitted via email, transmitted via local connection such as Bluetooth, etc.) by local device 22074 before being discarded and includes, in a preferred embodiment, options for data compression, data transmission, and file transfer comments.

At step 32026, a link is established between local device 22074 and customer client device 22060. For example, local device 22074 may be established as a Wi-Fi access point, through which customer client device 22060 may access the internet as well as communicate with administration server 22008. By way of another example, the link may be a short-range, Bluetooth connection between local device 22074 and customer client device 22060.

At optional step 32028, a link may be established between customer client device 22060 and customer client device 22060. The optional link may allow for local, short-range transfers, such as Bluetooth or peer-to-peer (P2P) data transfers.

At step 32030, a logged vehicle data request is generated by customer client device 22060. Step 32030 may further include generating a period request or including additional information with the request such as the time frame for which the logged data is requested. Step 32030 may further include prompting the operator for a routing code (e.g., provided by a safety officer or motor authority representative), a destination IP address, and/or other transactional information.

At step 32032, customer client device 22060 sends the logged vehicle data request, which is received by the local device 22074. At optional step 32034, a notification is sent from customer client device 22060 to administration server 22008 of the logged data request.

At optional step 32036, customer client device 22060 generates authorization for local device 22074 to transfer logged data to a linked motor authority client device. At step 32038, the authorization is sent to local device 22074.

At optional step 32040, the logged vehicle data request may be generated by technician client device 22046. At step 32041 the technician client device may also include prompting the administrative server for a routing code or other transactional information.

At optional step 32042, technician client device 22046 sends the logged vehicle data request, which is received by local device 22074. At optional step 32044, a notification is sent to administration server 22008 of the logged data request.

At step 32046, administration server 22008 identifies the devices associated with the request. For example, administration server 22008 may identify customer client device 22060, local device 22074, and/or technician client device 22046 associated with the request.

At step 32048, the logged vehicle data response is generated. At step 32050, the logged vehicle data is filtered by local device 22074. The logged vehicle data is filtered based upon the contents of the logged vehicle data request that was initiated with either customer client device 22060 or technician client device 22046. For example, if the timeframe in the logged data request is the last 24 hours, then the local device filters the logged vehicle data such that only the last 24 hours of logged data is prepared to be sent in the response.

At step 32051, the local device provides a certified log of vehicle data, as will be further described.

At step 32052, local device 22074 sends the logged vehicle data response, which is received by customer client device 22060. At step 32054, customer client device 22060 stores and displays the logged vehicle data from the logged vehicle data response. At optional step 32056, customer client device 22060 sends the logged vehicle data response to third-party server 22020.

At optional step 32058, local device 22074 sends the logged vehicle data response to technician client device 22046. At optional step 32060, technician client device 22046 displays the logged vehicle data response for the on-screen inspection.

Referring to FIGS. 33A and 33B, after selection of the appropriate application from customer client device 33000, a user may select an ELD mode or function from a list of modes/functions of local device 33002. Upon selection of an ELD mode, user interface 33005 displays options for accessing logged vehicle data that is received from local device 33002. The data displayed with user interface 33005 can be directly from local device 33002, can be from customer client device 33000 and displayed on technician client device 33006, or it may be from an administration server that received the data after the data was transmitted from local device 33002. User interface 33005 includes several user interface elements.

Menu button 33007 (further described below) is a menu button that, once selected, brings up a main menu. The main menu allows the user to select different functions within the application.

User interface button 33008 (e.g., element/button of capacitive-touch display) has been selected to send logs to technician client device 33006 or a mobile authority server (e.g., FMCSA). GUI 33010 is configured to receive transaction information, such as a routing code, with user interface element 33012. In some embodiments, user interface button 33008 is a flat navigation element, meaning that upon selection, relatively few additional GUIs will be necessary to obtain the desired function (e.g., one GUI 33010 used to send logs with button 33013).

Figures 33C, 33D:
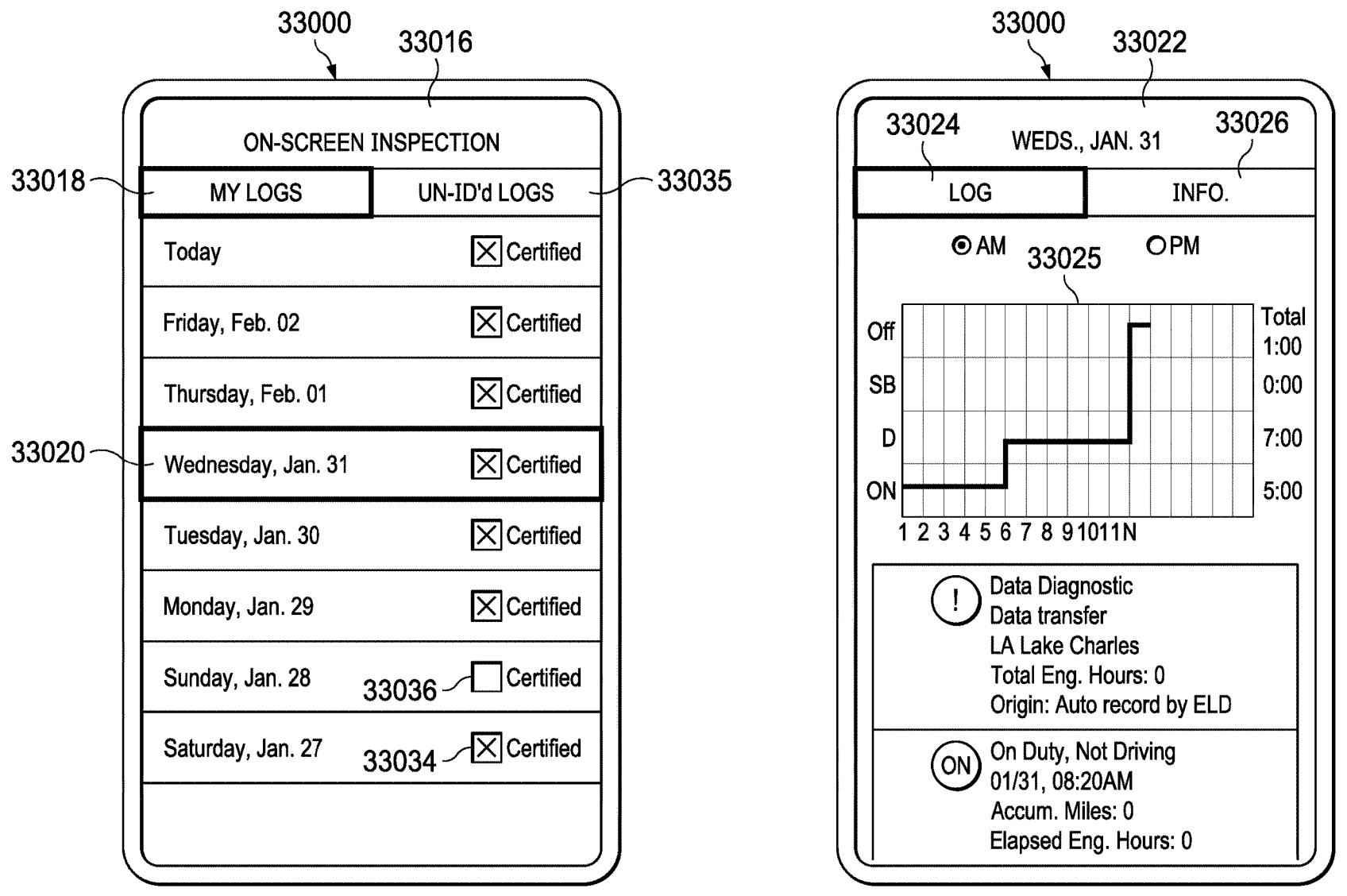

Referring to FIGS. 33A and 33C, user interface button 33014 has been selected to conduct a second function of the application (e.g., an on-screen inspection). GUI 33016 is configured with multiple menu buttons 33018. In some embodiments, multiple menu buttons 33018 are flat navigational elements to access a two- or three-level hierarchy of data related to the selected function, such as the on-screen inspection. For example, the selection of a first menu button of multiple menu buttons 33018 may result in a display of dates associated with certified logs. The user interface element Un-ID'd LOGS is shown at 33035. User interface element 33035 includes certified check boxes such as 33034 and 33036. If the boxes are checked, the logs are certified. If they are not checked, the logs are not certified.

Button 33020 is a user interface element that, upon being selected, shows vehicle data associated with a specific, certified log. For example, each of the dates displayed in GUI 33016, after selection of button 33018, may be an interactive user interface element providing access to respective, associated certified logs and related data. The dates of GUI 33016 may be displayed together as a scrollable GUI.

Referring to FIGS. 33C and 33D, upon selection of button 33020, GUI 33022 is displayed. GUI 33022 may include additional menu buttons. For example, a first menu button 33024 may be selected to display broad-level data and interpretations pertaining to a specific, certified log. The broad-level data and interpretations may include Records of Duty Status (RODS), graphical representations, playback charts (e.g., for live data creating current RODS or a current ELD log), changes in duty status, hours, associated mileage, name of the city/town, State abbreviations, driver ID, and combinations thereof. For example, a graph view 33025 may display RODS information and hours related thereto. A second menu button 33026 may be selected to obtain additional information for the specific, certified log. For example, the certified log for Wednesday, January 31, may include additional related information such as fuel receipts, toll receipts and records, trip reports, bills of lading, verification documents, and combinations thereof.

Figures 33E, 34:
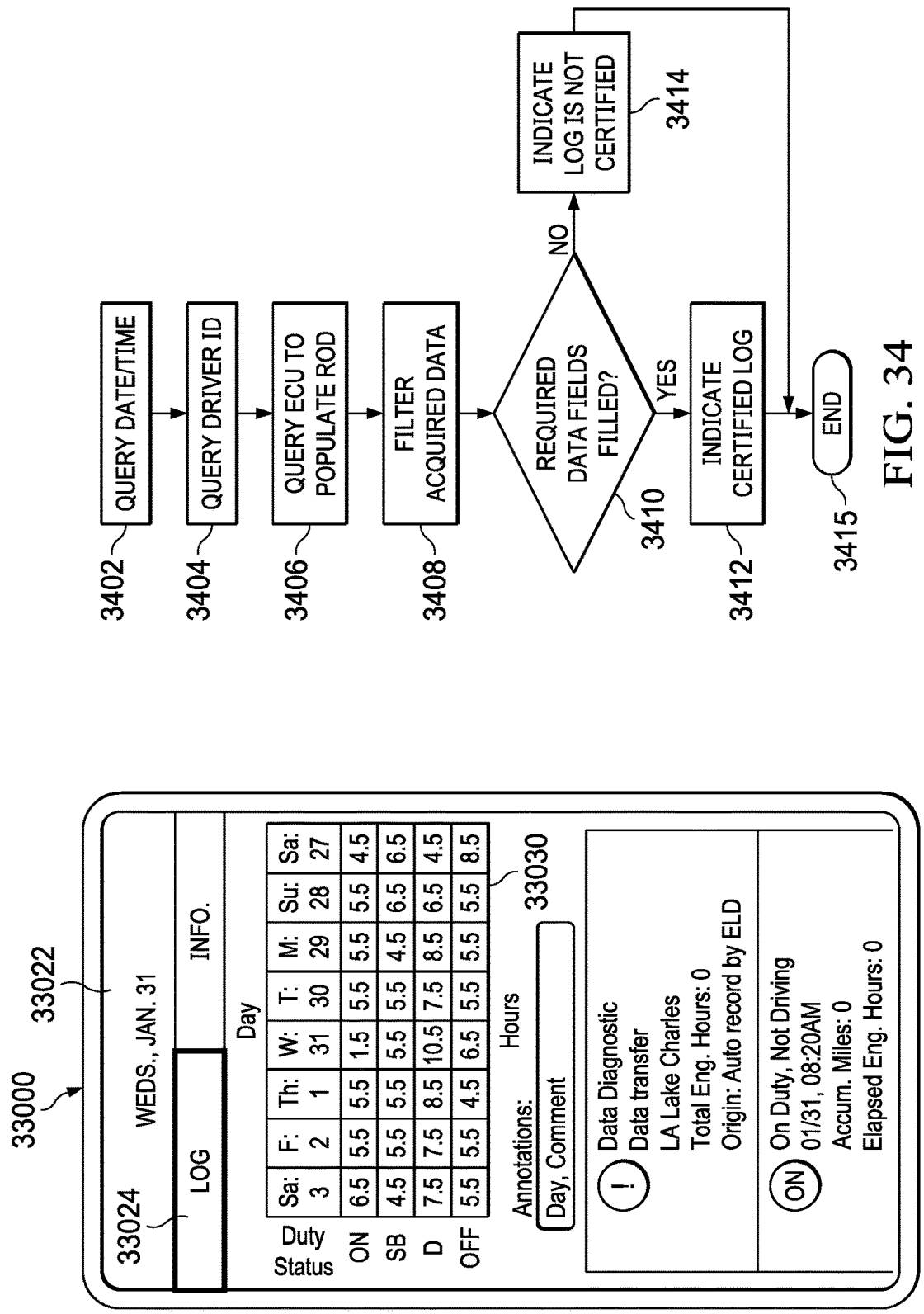

Referring to FIG. 33E, chart view 33030 of GUI 33022 may be used in place of, or together with, graph view 33025. For example, a toggle button (not shown) may be used to switch between graph view 33025 and chart view 33030. Each of graph view 33025 and chart view 33030 may be scrollable displays, which may be scrolled to obtain additional information about the displays or information presented therein. In some embodiments, GUI 33022 may include an input prompt for annotations, which are received according to a specified format (e.g., "Day, Comment").

A zoom feature may be associated with the graphical representation and other features of the GUIs discussed in FIGS. 33A-33E. In such cases, appropriate data interpolation may be used.

Referring to FIG. 34, a method of generation of a certified log as shown in step 32051, will be further described. The generation of the certified log may be processed based on format, content, or associated metadata. At step 3402, local device 22074 makes a query regarding date and time. The date and time is provided by a local clock within local device 22074, or a clock within vehicle device 22090, and stored in a first array. At step 3404, local device 22074 makes a query regarding a driver ID. If the driver ID is entered through a GUI of local device 22074, then the data is stored in a second array. If the driver ID is not entered, then the method proceeds to step 3406 and queries the ECU for any data required for at least one ROD. The data resulting from step 3406 includes, but is not limited to, RPMs greater than zero, period of time RPMs are greater than zero, RPMs greater than a specified idle value, period of time RPMs are greater than the specified idle value, gear value, and period of time associated with gear value.

At step 3408, local device filters and sorts the data according to date, time, and preprogrammed classifications. The preprogrammed classifications include, but are not limited to, 'vehicle driving', 'vehicle idling', and 'vehicle off'. Step 3408 further includes performing a data calculation or data check, such as a simple parity check or XOR operation, to determine if each required field has content within it.

At step 3410, the results of step 3408 are checked to determine if each required field is populated with data. At step 3412, if each required field is populated with data, then a "certified" log is generated. An indication is provided on user interface GUI 33016 that a log is "certified". At step 3415, the method then ends.

At step 3410, if each required field is not populated with data (e.g., driver ID is missing), then a log may be created by local device, but it is not "certified". At step 3414, an indication is provided on user interface GUI that a log is not certified. At the same time, if one or more entries are significantly different from expected value(s), such as by two or more parameters, e.g., driver ID is missing and the calendar day has been altered, then an alert is generated. The alert is communicated to the administrative server. At step 3415, the method then ends.

Referring again to FIGS. 5A-16A and the accompanying text, Live Data mode 2928 is described. For example, if Live Data Mode 2928 is selected, then the local device is configured to provide live data from any of the many vehicle computers, sensors, and detectors to a display of the client device.

Figure 35:
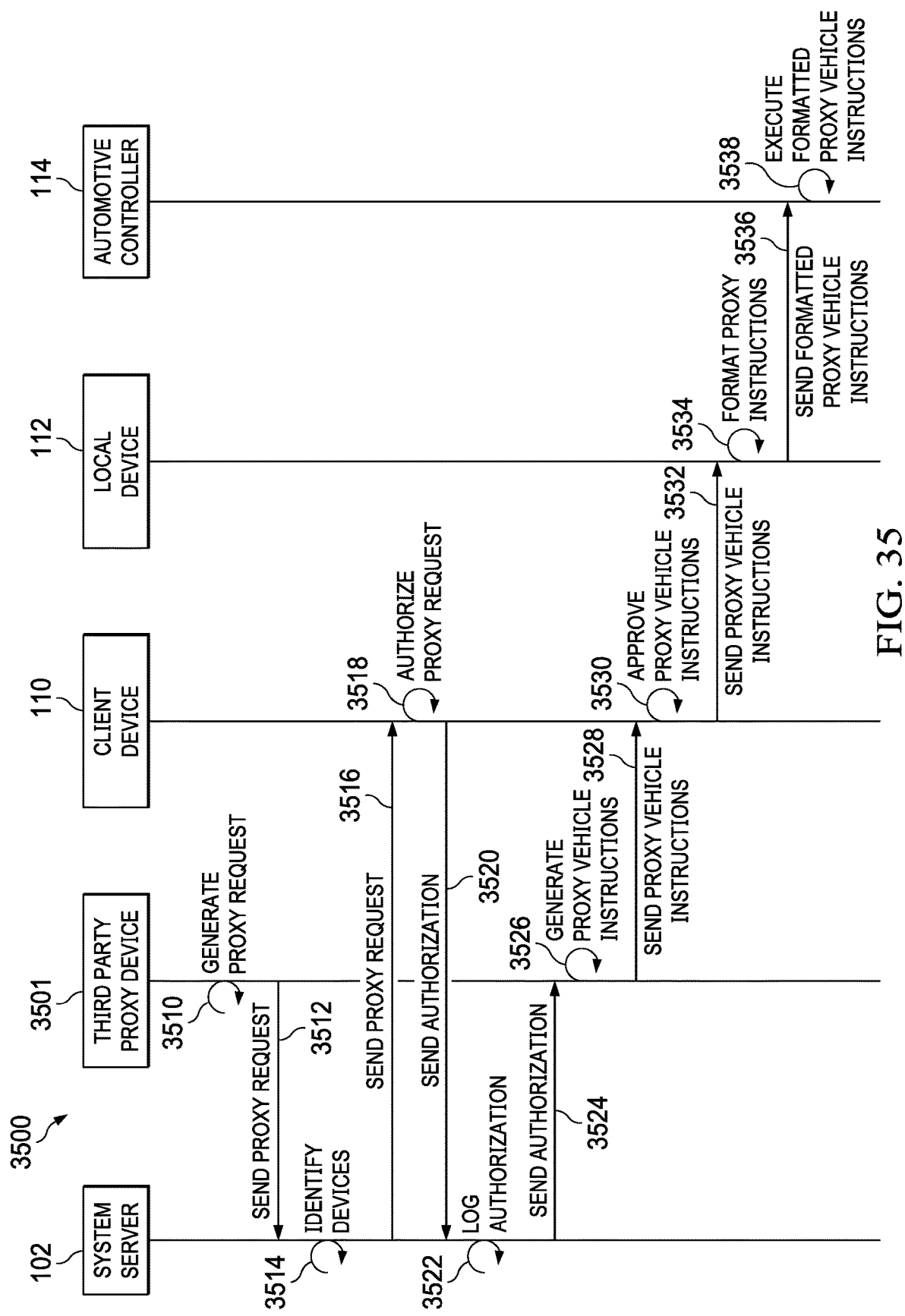
FIG. 35 is a network flow diagram of a third-party proxy mode of a preferred embodiment.

Referring then to FIG. 35, third-party proxy mode 2934 will be further described.

In third-party proxy device mode, the third-party proxy device can, upon executing method 3500, honk the horn, turn on the lights, set interior HVAC controls or execute other functions which alter the performance or appearance of the vehicle to which the vehicle controller is connected.

Method 3500 includes system server 102 in communication with third-party proxy device 3501. In a preferred embodiment, third-party proxy device 3501 includes smart phone running an appropriate application to generate the functions shown.

At step 3510, third-party proxy device 3501 generates a proxy request. A proxy request includes a set of vehicle functions which third-party proxy device 3501 wishes to execute on vehicle device 114. At step 3512, the proxy request is sent to system server 102. At step 3514, system server 102 logs the proxy request and identifies the appropriate vehicle device 114 and associated local device 112 and associated client device 110. At step 3516, system server 102 sends the proxy request to client device 110. At step 3518, client device 110 authorizes the proxy request. At step 3520, client device 110 sends a proxy authorization to system server 102. At step 3522, system server 102 logs the proxy authorization. At step 3524, system server 102 sends the proxy authorization to third-party proxy device 3501. At step 3526, third-party proxy device 3501 generates a set of proxy vehicle instructions. At step 3528, third-party proxy device 3501 sends the proxy vehicle instructions to client device 110. At step 3530, client device 110 approves the proxy vehicle instructions. At step 3532, client device 110 sends the proxy vehicle instructions to local device 112. At step 3534, local device 112 formats the proxy instructions for the vehicle device. At step 3536, local device 112 sends the formatted proxy vehicle instructions to vehicle device 114. At step 3538, vehicle device 114 executes the formatted proxy vehicle instructions.

Figure 36:
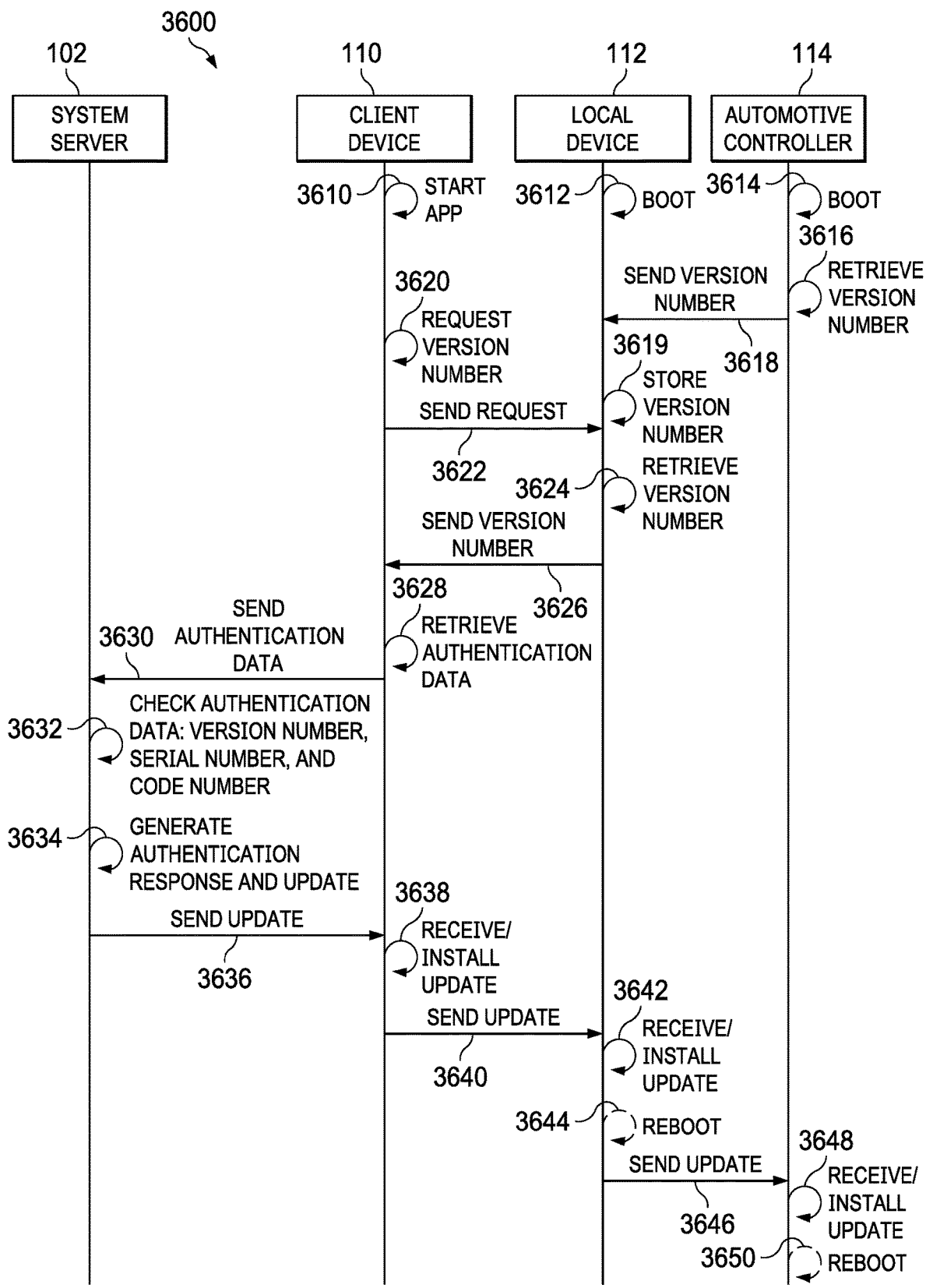
FIG. 36 is a network flow diagram of a system for updating software.

Referring to FIG. 36, implementation of a security function within local device 112 will be further described.

Method 3600 includes local device 112 in communication with power controller 2818. In a preferred embodiment, vehicle device 114 includes an over-the-air configurable power controller operating independently from the main processor of local device 112. An example is shown in FIG. 28.

At step 3610, client device 110 starts the mobile device application. At step 3612, local device 112 powers on and boots up. At step 3614, vehicle device 114 boots up. At step 3616, vehicle device 114 retrieves a version number from memory. At step 3618, the vehicle device sends the version number to local device 112. At step 3619 local device 112 stores the version number. At step 3620, the application on client device 110 generates a request for the version number. At step 3622, client device 110 sends the request for the version number to local device 112. At step 3624, local device 112 retrieves the version number from memory. At step 3626, local device 112 sends the version number to client device 110. At step 3628, client device 110 retrieves authentication data. The authentication retrieved includes the power controller version number, a code number, and a serial number of the local device. In a preferred embodiment, the code number is produced by an algorithm that provides independently repeatable results based on a seed number. In a preferred embodiment, the algorithm may be a cryptographic cypher based on chaos theory, a serial 256-bit function, or another non-linear function. At step 3630, client device 110 sends the authentication data to system server 102. At step 3632, system server 102 checks the authentication data against stored authentication data. In one embodiment, the authentication data is one or more of version number, serial number and code number. At step 3634, system server 102 generates an authentication response including an update. The authentication response includes an authorization response or a non-authorization response, and the update includes an update for one or more of the mobile application on client device 110, local device 112, and vehicle device 114. At step 3636, system server 102 sends the update to client device 110. At step 3638, client device 110 receives the update, and optionally installs the update for the mobile application. At step 3640, client device 110 sends the update to local device 112. At step 3642, local device 112 receives the update and optionally installs the update. At optional step 3644, local device 112 reboots. At step 3646, local device 112 sends the update to vehicle device 114. At step 3648, vehicle device 114 receives and installs the update. If the update includes an authorized authentication response, then vehicle device 114 receives and installs the update at step 3648. At optional step 3650, power controller 2818 reboots. However, if the update includes a non-authorized authentication response, vehicle device 114 receives and installs the update, but the update causes vehicle device 114 to generate one or more power control signals. The one or more power control signals cause at least one of vehicle device 114 and local device 112 to shut down or enter an insecure mode. In a preferred embodiment, the power control signals implement a power throttling or security function including, but not limited to, reducing power to one or more integrated circuits of local device 112, performing a hardware interrupt, a circuitry reset, accessing one or more fuses of an electrical fuse array, receiving a cold reset negative logic input, or a combination thereof.

Figures 1, 37:
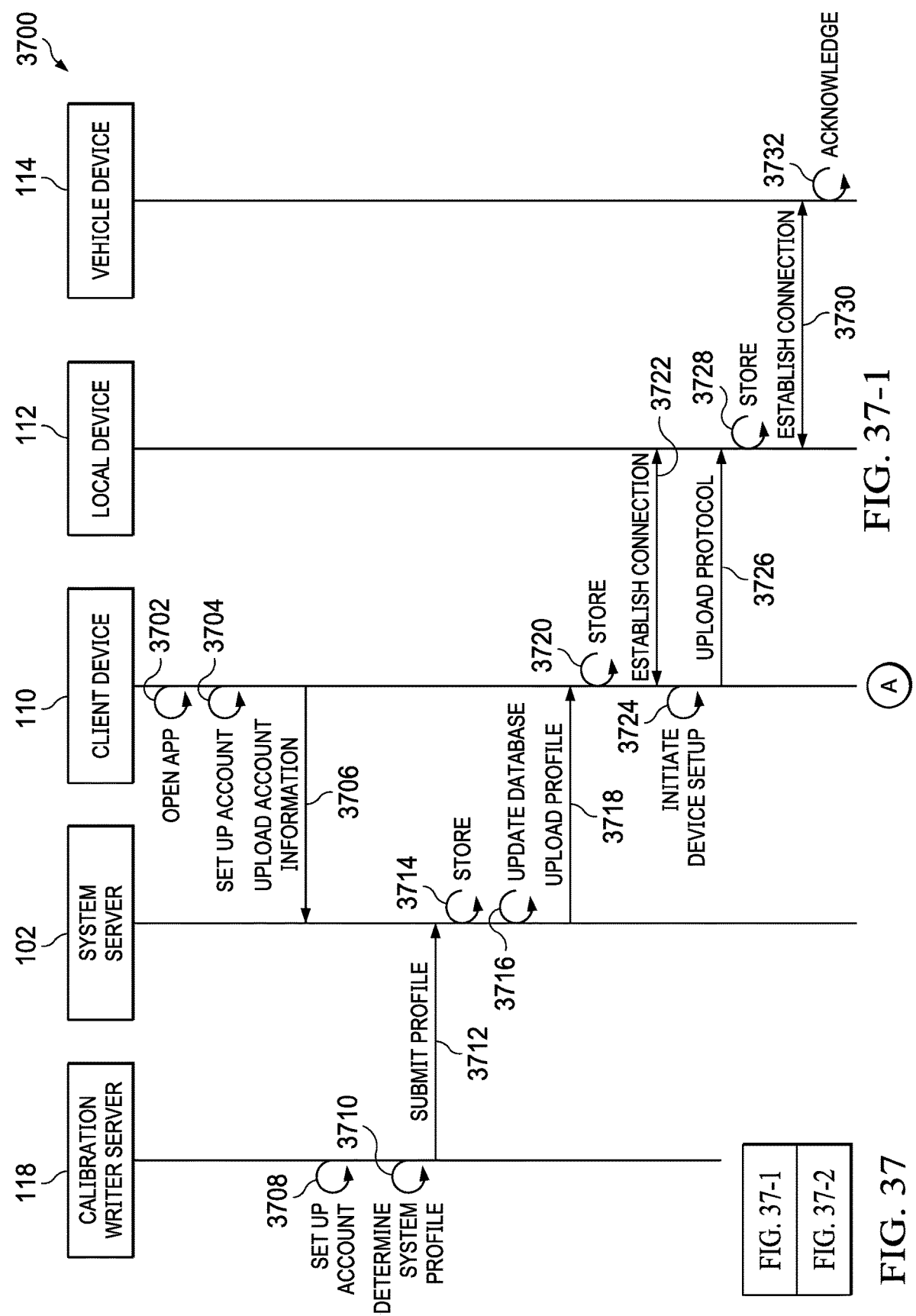
FIG. 37 is a network flow diagram for a method for interaction with various system nodes to enable J2534 compliance.
Figures 2, 37:
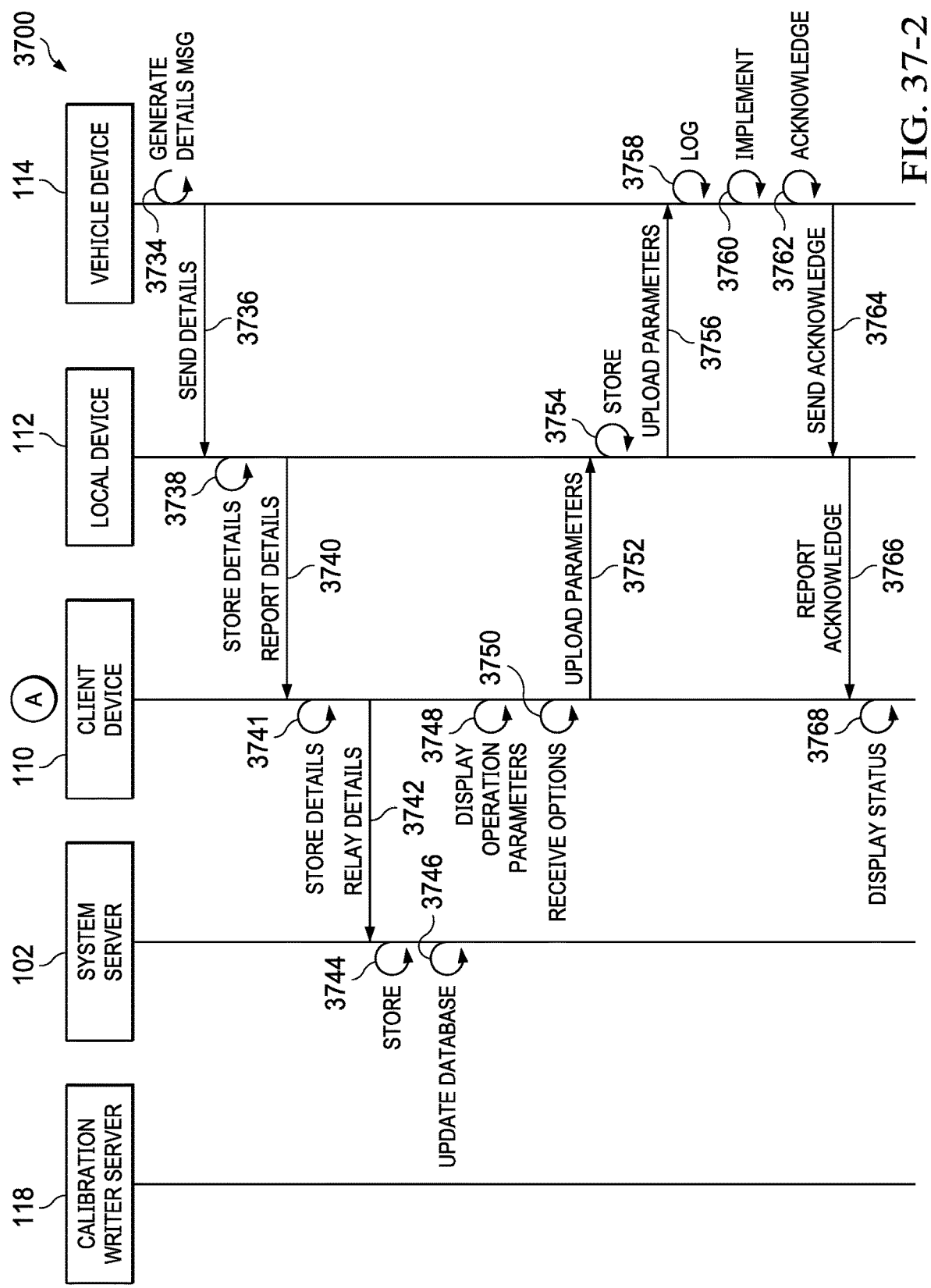

Referring to FIG. 37, setup of J2534 compliant local device 112 will be described as process 3700.

At step 3702, user opens application 111 on client device 110. At step 3704 a user account is created by entering personal information, such as name, email address and telephone number, and vehicle information, such as VIN, year, make, and model. At step 3708, the calibration writer server creates an account based on information from the system server. The calibration writer server includes account information such as name, address, email address, and submit computer Cal/Pid. At step 3710, calibration writer server determines a set of operating system parameters which includes programming information, such as communication protocol and look up tables for the onboard controller. At step 3712, the parameters are submitted to system server 102. At step 3714, system server 102 stores the parameters and the account implementation. At step 3716, the database is updated by the system server with the account information and system parameters. At step 3718, the system server uploads the system parameters to client device 110 via a wireless network.

At step 3720, client device 110 stores the system parameters. At step 3722, client device 110 establishes a wireless connection with local device 112 through Bluetooth or Wi-Fi. At step 3724, user initiates device setup. At step 3726, client device 110 uploads system parameters to local device 112. At step 3728, local device 112 stores system parameters. In step 3730, local device 112 establishes a communication connection with vehicle device 114 through an OBD II port utilizing the communication protocol determined from the system parameters. In a preferred embodiment OBD II port is a J1962 connector. At step 3732, vehicle device 114 acknowledges the connection. At step 3734, a message is generated containing vehicle device 114 details, such as software version numbers, automotive controller and engine control unit models and serial numbers.

At step 3736, acknowledgement and details are sent to local device 112. At step 3738, the details are stored in local device 112. At step 3740, details are transmitted to client device 110. At step 3741, client device stores details. In step 3742, the details are relayed to system server 102. At step 3744, the system server stores vehicle device 114 details. At step 3746, system server 102 updates database 106.

In step 3748, application 111 displays potential settings and system operation parameters for vehicle device 114 on client device 110. At step 3750, user selects desired options which are received by the client device. In step 3752, the selected parameters are uploaded to local device 112. At step 3754, the selected parameters are stored on local device 112. In step 3756, local device 112 uploads the parameters to vehicle device 114. In step 3758, vehicle device 114 logs the parameters. At step 3760, the parameters are implemented. At step 3762, the implementation of the parameters is acknowledged. At step 3764, acknowledgement is sent to local device 112. In step 3766, the acknowledgement is reported to client device 110. At step 3768, client device 110 displays the status of vehicle device according to the set parameters.

Figure 38:
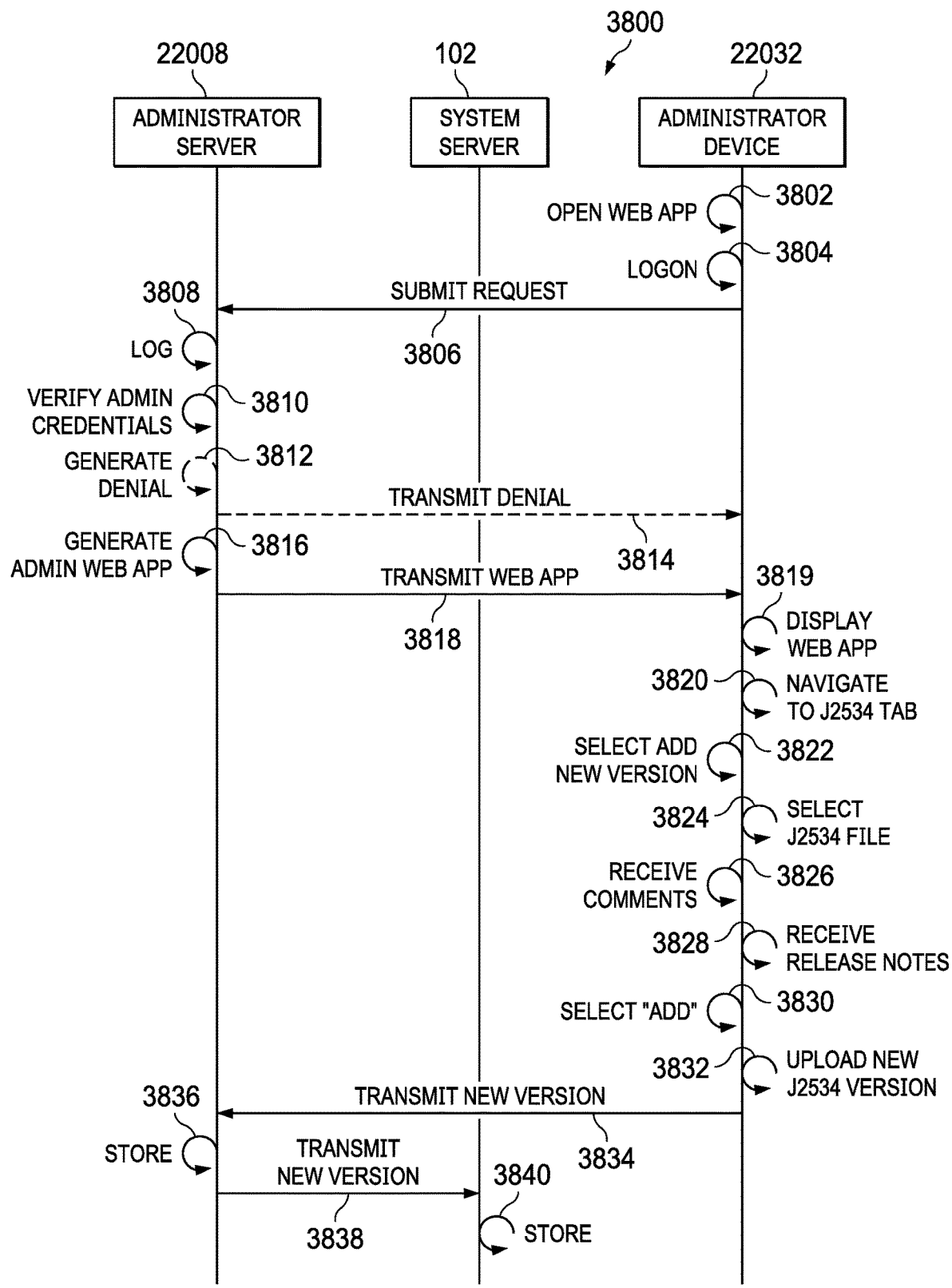
FIG. 38 is a network flow diagram of a system for updating software.

Referring to FIG. 38, administrative process 3800 for updating the J2534 application files is described.

At step 3802, administrator user opens cloud-based web application on administrator device 22032. In step 3804, logon credentials are received. At step 3806, administrator logon request is submitted to administration server 22008. At step 3808, administration server 22008 logs the request. At step 3810, the server verifies the administrator logon credentials. If the logon credentials are incorrect, then at step 3812, a denial is generated. At step 3814, the denial is then transmitted to administrator device 22032. If the logon credentials are correct, then at step 3816, administration server 22008 approves the logon request. At step 3818, administration server transmits the administrator web application to administrator device 22032.

Figure 42:
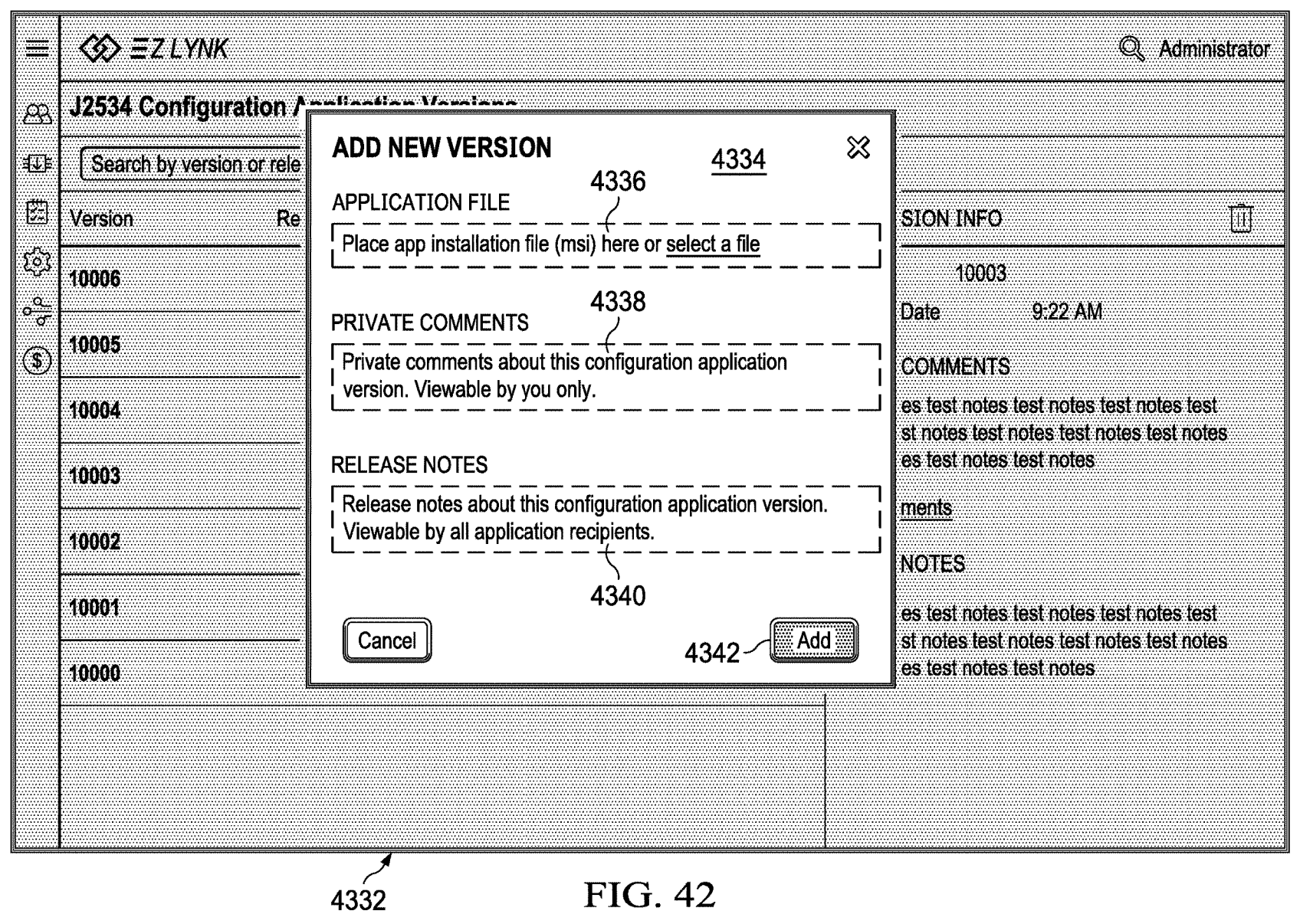

At step 3819, administrator web application is displayed. At step 3820, the J2534 Application tab is chosen. At step 3822, a selection to add a new version of J2534 Application 126 is received. An example of the GUI screen displayed is shown in FIG. 42. In step 3824, a selection of a desired application file to upload is received. The application file consists of an installation file for J2534 application 126 and the DLL file for the local device. At step 3826, private comments on the version being uploaded are entered. In step 3828, release notes on the application version are received and made viewable by technicians and third parties. In step 3830, administrator selects the "Add" graphical depiction of a button. At step 3832, administrator device 22032 uploads the new version of the J2534 Application. In step 3834, the new version of the J2534 Application is transmitted to administration server 22008. At step 3836, the new version is stored on administration server 22008. At step 3838, the new version of the J2534 Application is transmitted to system server 102. In step 3840, system server 102 stores the new version.

Figure 39:
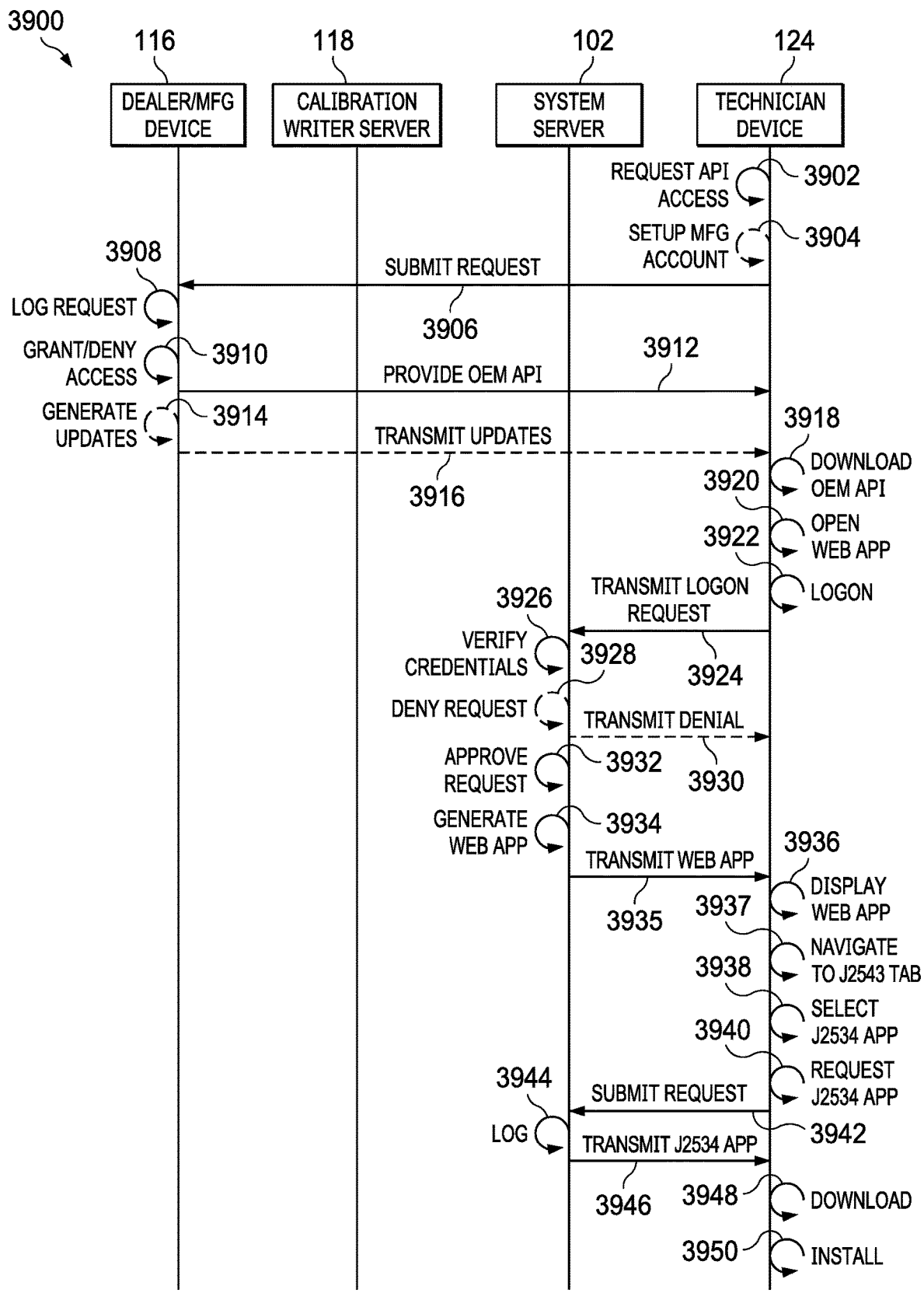
FIG. 39 is a sequence diagram of a method of updating a technician device.

Referring to FIG. 39, setup of a receiving device for the remote analysis and reprogramming of vehicle device 114 will be described as process 3900. While in this figure the receiving device is shown as technician device 124, in alternate embodiments, the receiving device can be either technician device 124, or third-party device 130.

At step 3902, a request is made for access to OEM API 128 for a vehicle manufacturer. At step 3904, an account is created with the manufacturer or dealer. At step 3906, the request for OEM API 128 is submitted to the appropriate dealer or vehicle manufacturer. At step 3908, the request is logged by dealer device 116. In step 3910, access is either granted or denied. If access is granted, then in step 3912, dealer device 116 provides technician device 124 with the application file for OEM API 128. If denied, the process terminates. At step 3914 OEM API is updated. In step 3916, the updates are transmitted to technician device 124. At step 3918, technician device 124 downloads OEM API 128 and any updates. In a preferred embodiment, OEM API 128 is accompanied with an OEM application program and both are downloaded and installed on the technician device.

At step 3920, technician device 124 opens cloud-based web application. At step 3922, logon credentials are entered. In step 3924, the login request is transmitted to system server 102. At step 3926, system server 102 verifies the credentials entered. If the credentials are incorrect, then in step 3928, the request is denied by system server 102. If the request is denied, then in step 3930, a denial message is transmitted to technician device 124. If the credentials entered are correct, then in step 3932, the logon request is approved. In step 3934, a cloud-based web application program is generated. At step 3935, the web application program is transmitted to technician device 124. At step 3936, the web application program is displayed. In step 3937, the J2534 Application tab is selected. An example of the J2534 Application tab of the web application screen is shown in FIG. 41B. In step 3938, a version of J2534 application 126 is selected. In step 3940, a request to download the selected version of J2534 application 126 is submitted. At step 3942, the download request is transmitted to system server 102. In step 3944, system server 102 logs the request. At step 3946, the selected version of J2534 application 126 program file is transmitted to technician device 124. In step 3948, technician device downloads J2534 application 126. The J2534 DLL file may be required for communication between the manufacturer OEM application, client device, and local device. If so, the J2534 DLL is included in the J2534 application download. At step 3950, J2534 application 126 is installed on technician device 124. In a preferred embodiment, installation of the application includes installing the J2534 DLL file in the windows registry key
[HKEY_LOCAL_MACHINE\
SOFTWARE\PassThruSupport.04.04].

Referring to FIG. 40A, a preferred embodiment of a system for remote J2534 reprograming of vehicle device 114 is described.

At step 4002, the cloud-based web application is opened on technician device 124. At step 4004, logon credentials are entered. In step 4006, the login request is transmitted to system server 102. At step 4008, system server 102 verifies the credentials entered. If the credentials are incorrect, then in step 4010, the request is denied by system server 102. If the request is denied, then in step 4012, a denial message is transmitted to technician device 124. If the credentials entered are correct, then in step 4014, the cloud-based web application is generated. At step 4016, the web application program is transmitted to technician device 124.

In step 4018, technician device 124 displays web application. In step 4020, a client is selected and client profile details, such as email, and details of local device 112 and vehicle device 114 are shown. In step 4022, a specific vehicle from a list of multiple vehicles is selected. In an alternate embodiment, an ECU profile configuration may be selected from a list of optional configurations and downloaded to the technician device as follows. In step 4024, an ECU profile configuration for a vehicle is selected from a list of potential ECU profiles. An example of a technician view of available ECU profile configurations is shown in FIG. 41C. At step 4026, the selected ECU profile configuration is requested.

At step 4028, the ECU profile configuration request is transmitted to system server 102. In step 4030, system server 102 will log the request. In step 4032, system server 102 will forward the request to calibration writer server 118. At step 4034, the request is logged. In step 4036, calibration writer server 118 will determine parameters for the requested profile based on selected client, selected vehicle, and selected ECU profile. For instance, when the ECU has a custom configuration it may require different parameters for an ECU re-flash then when the ECU has a standard OEM profile. At step 4038, the selected profile is transmitted to the system server. In step 4040, system server 102 logs the profile. In step 4042, the profile is forwarded to technician device 124. At step 4044, technician device 124 stores the profile.

Figure 43A:
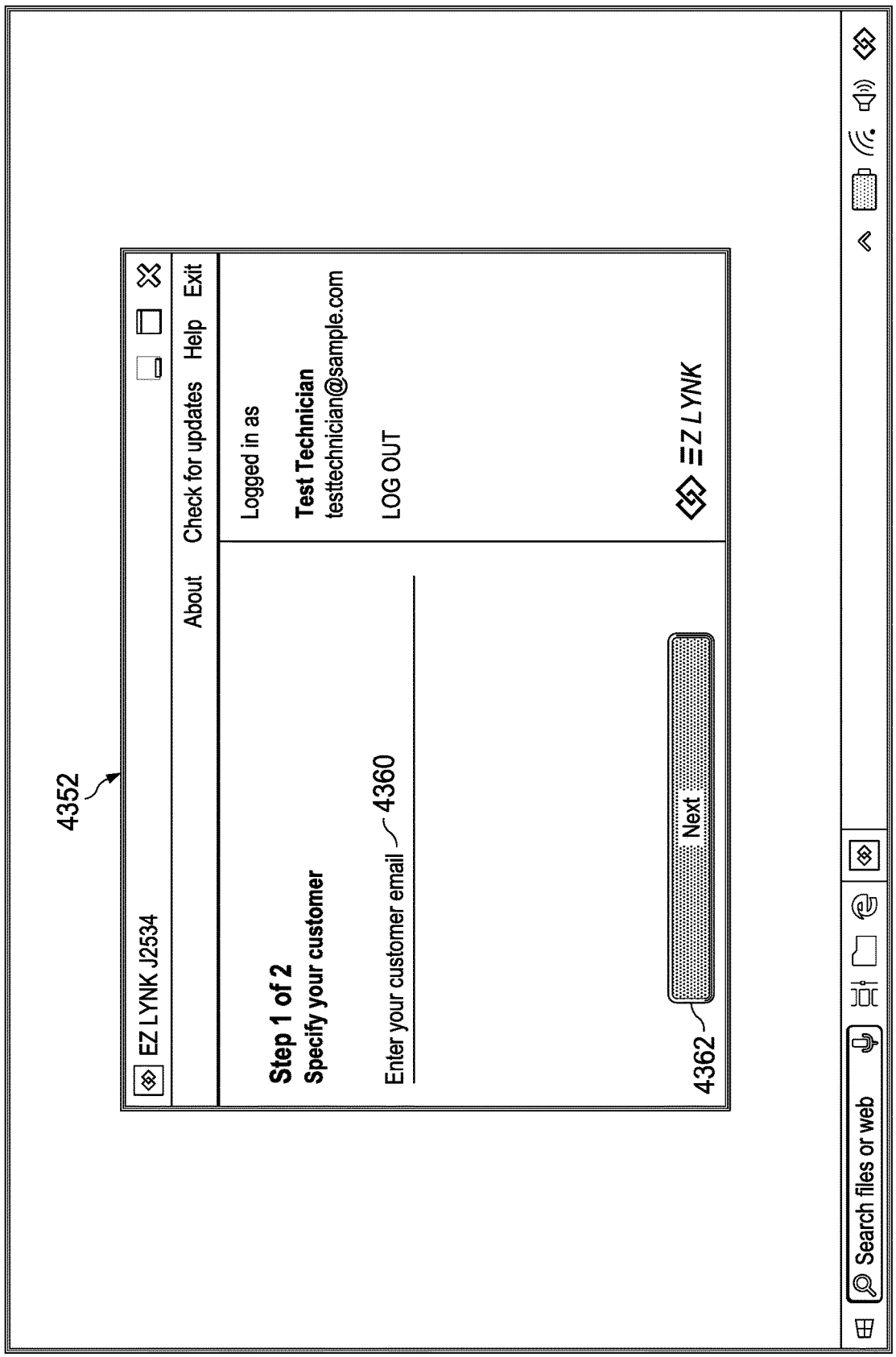
FIGS. 43A through 43D are screenshots of a user interface for a preferred embodiment of a system for updating an automotive controller.

At step 4046, the current version of J2534 application 126 is opened on technician device 124. In step 4048, logon credentials are entered. At step 4050, the logon request is transmitted to system server 102. At step 4052, system server 102 verifies the credentials entered. If the credentials are incorrect, then in step 4054, the request is denied by system server 102. If the request is denied, then in step 4056, a denial message is transmitted to technician device 124. If the credentials entered are correct, then in step 4058, an approval message is generated. At step 4060, the approval is transmitted to technician device 124. In step 4061, J2534 application 126 will display customer selection screen where a customer's email address is entered. An example of the customer selection screen is shown in FIG. 43A.

Figure 43B:
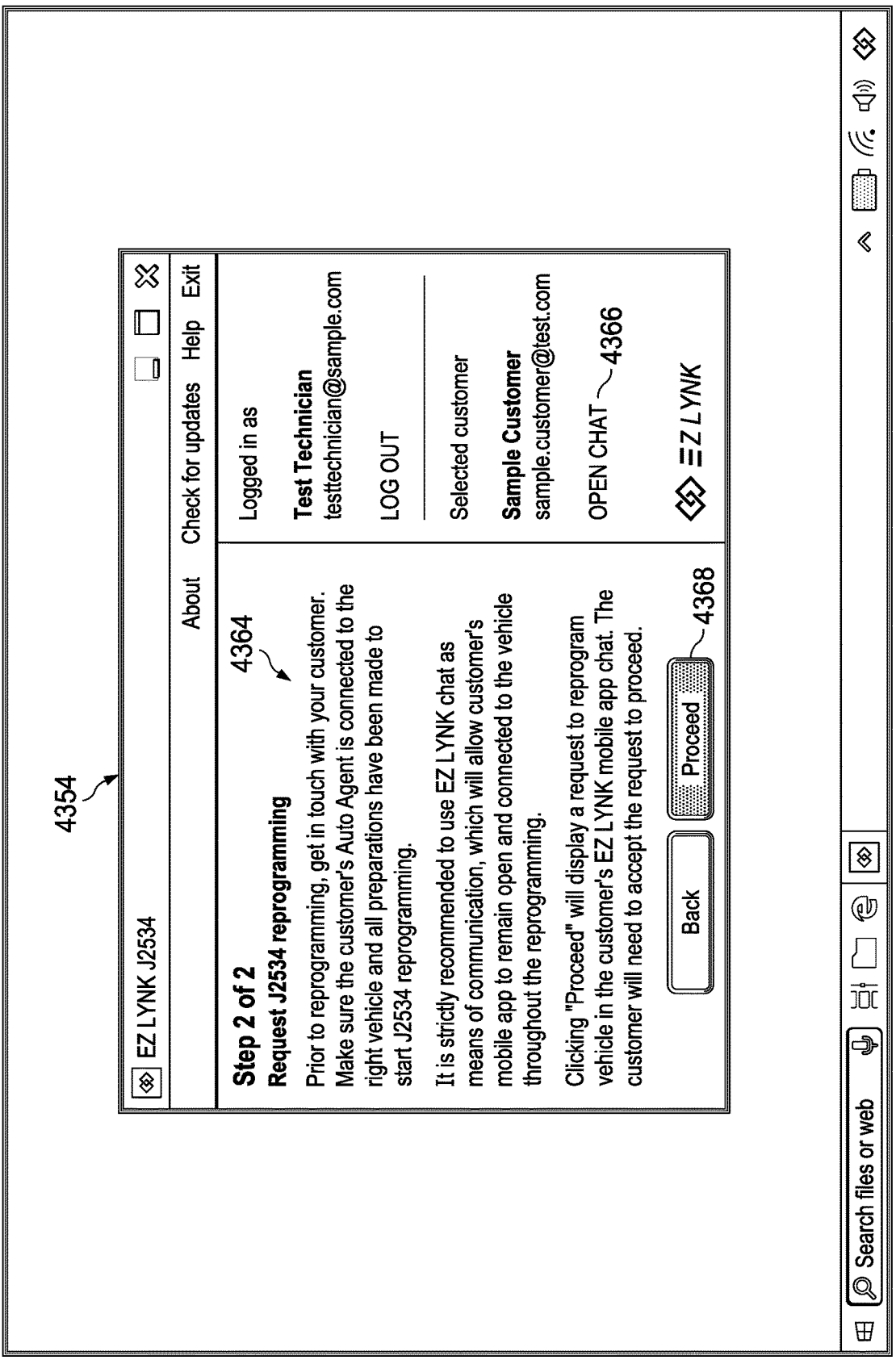

In step 4062, the customer email address is entered. At step 4064, the customer email address is transmitted to system server 102. In step 4066, system server will verify whether or not the customer email address is correct. If customer email is incorrect or not permitted for service, then in step 4068, system server 102 will generate a denial. At step 4070, the denial will be sent to technician device 124. If the customer email is correct, then at step 4072 the request is approved. If the request is approved, then in step 4074, the approval is transmitted to technician device 124. In step 4075, J2534 application 126 will display J2534 reprogramming screen and instructions as shown in FIG. 43B.

Figure 41A:
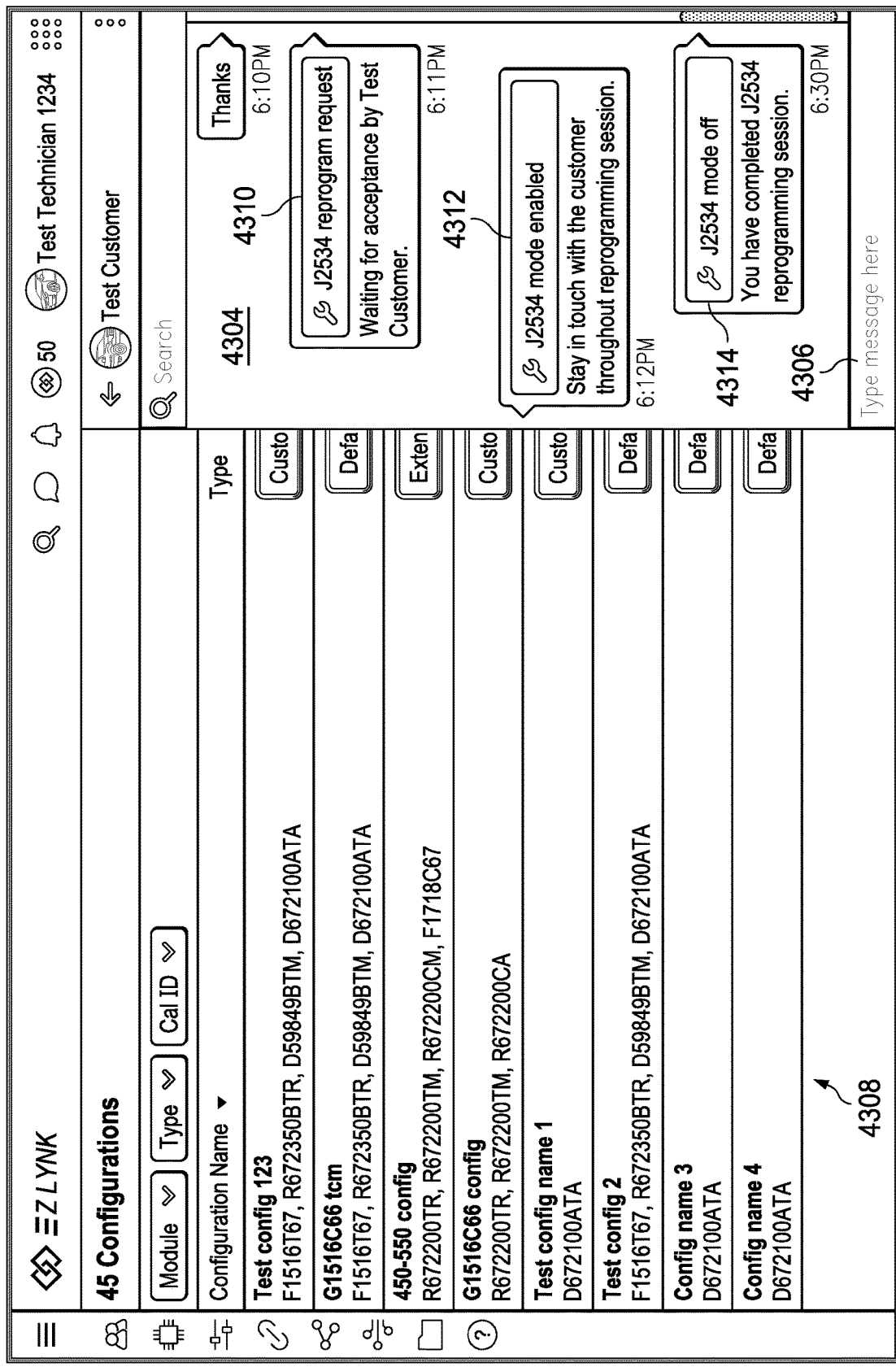
FIG. 41A is a screenshot of a user interface for cloud based technician communication with client device.
Figure 41B:
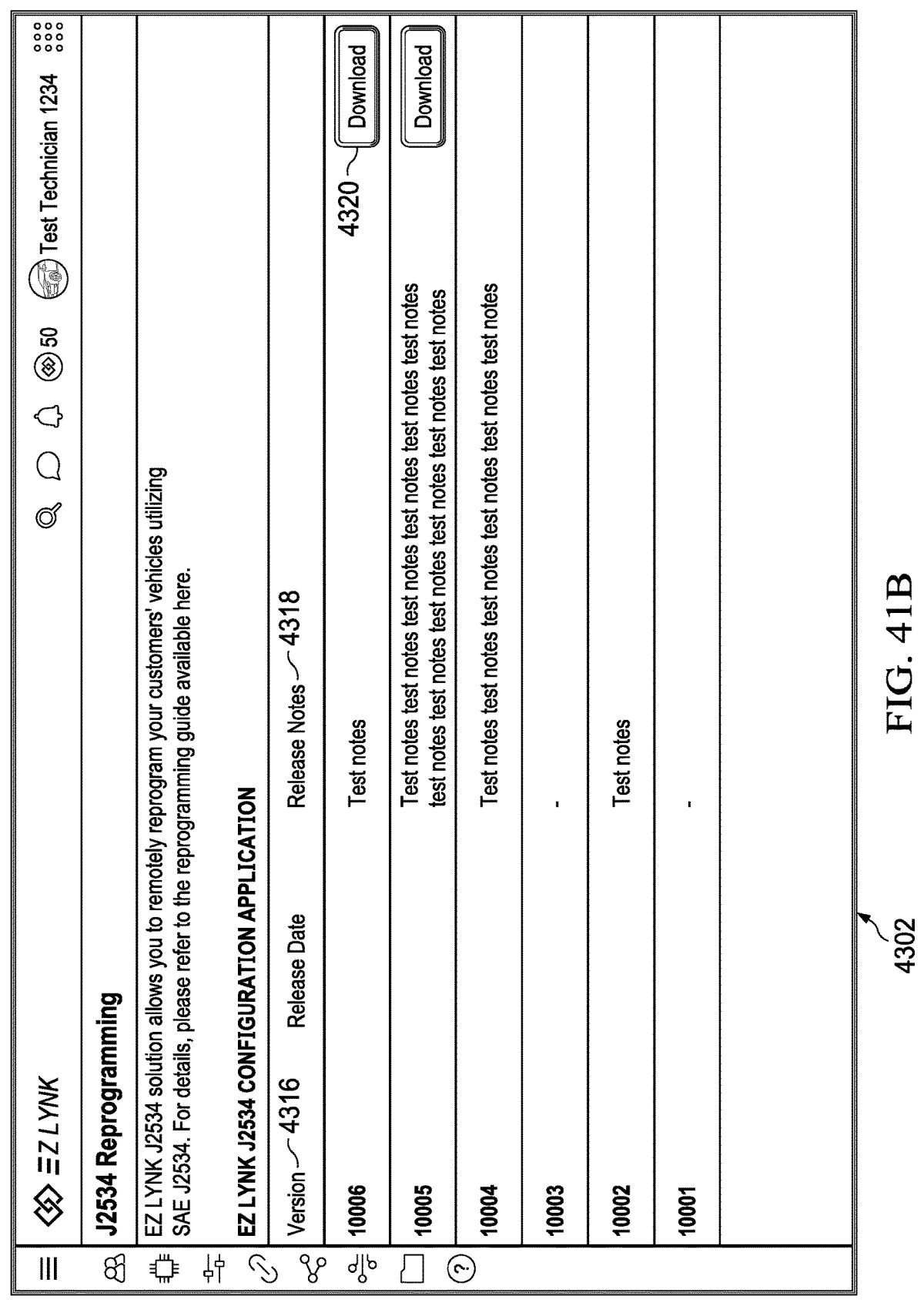
Figure 44B:
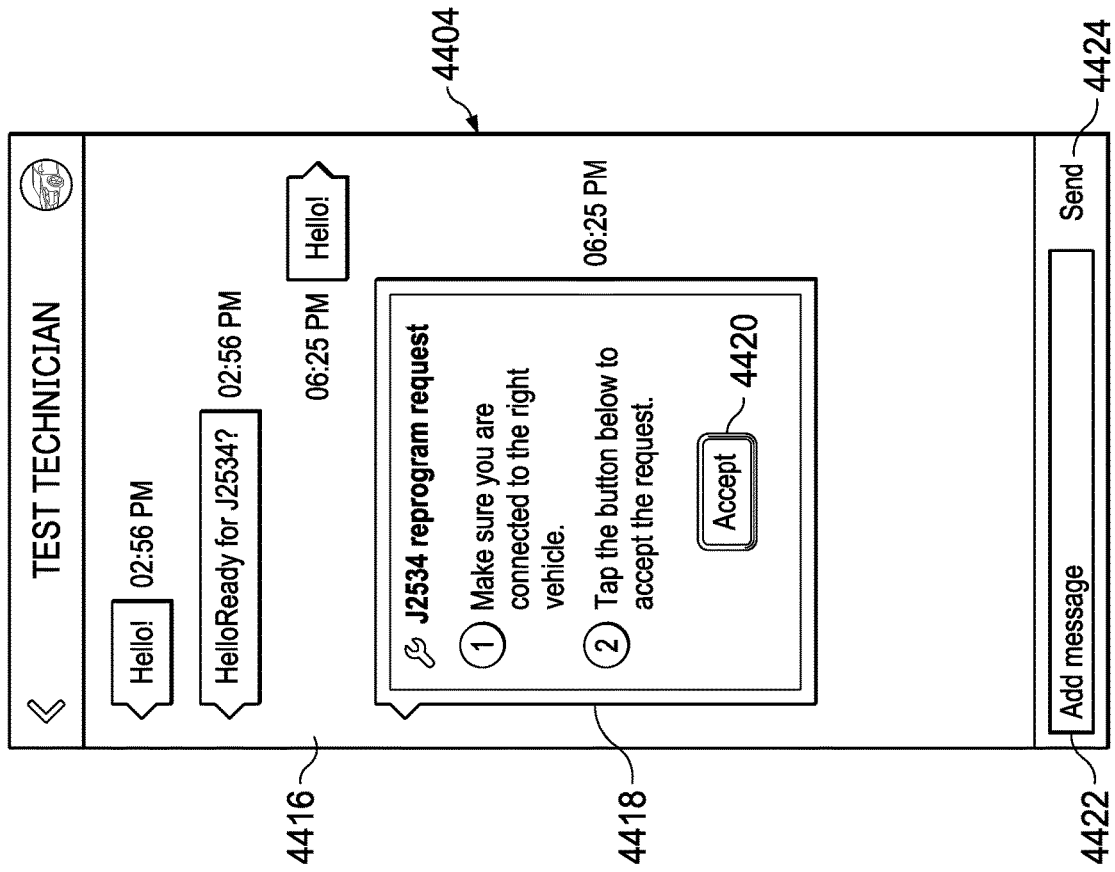
Figure 44A:
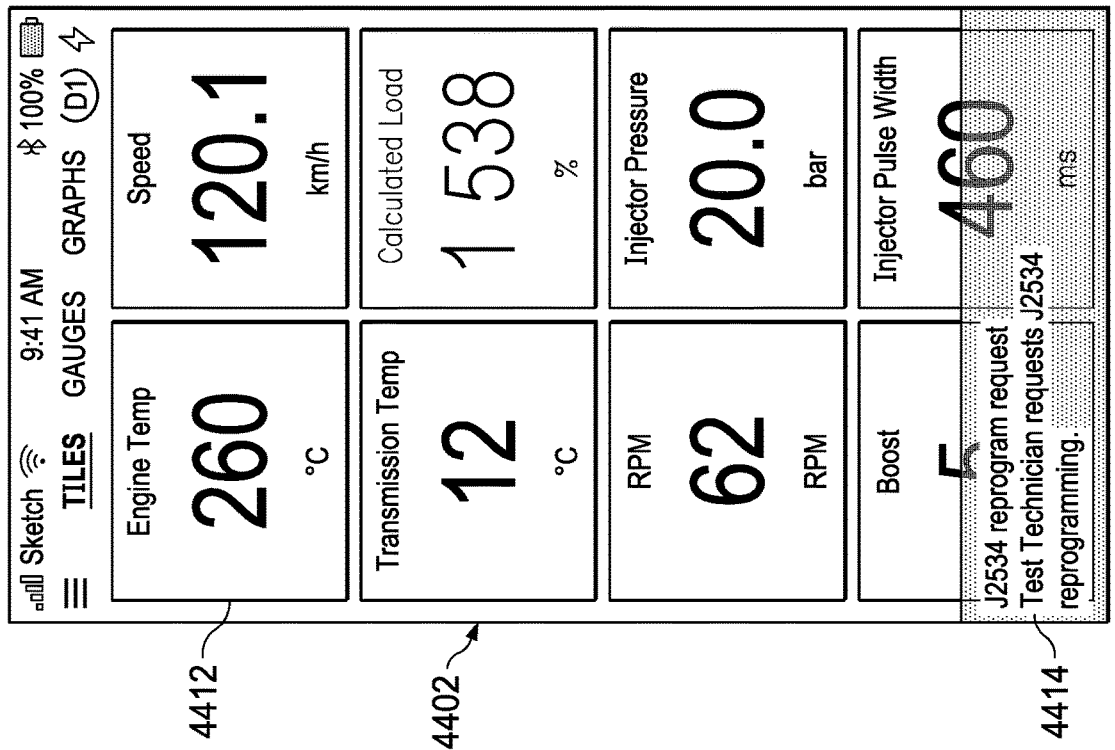

In step 4076, customer chat option in J2534 application 126 may be selected on technician device 124 for communication prior to a reprogramming request. While it is preferential that a technician utilizes the chat function prior to initiating a reprogramming request, it is not required. If customer chat option is selected, then in step 4078, the web application program opens and a request for access is generated. At step 4080, a request for access to the web application is transmitted to system server 102. At step 4082, the request is processed by system server 102. At step 4084, the web application is transmitted to technician device 124. In step 4086, web application is displayed. The web application will have a communication bar for communication with clients, as shown in FIG. 41A. In step 4088, text is input into the client chat communication bar and is received by the technician device. At step 4090, the "send" option next to the text input is selected. At step 4092, the text is transmitted to system server. In step 4094, system server logs the text. At step 4096, system server 102 forwards the text to client device 110 that is associated with the client selected. At step 4098, client device 110 receives an application notification. In step 4099, application 111 is opened on client device 110. In step 4100, chat notification is displayed within application 111. An example of a chat notification is shown in FIG. 44A. In step 4101, the chat option is selected in application 111 and the text from technician device 124 is displayed. At step 4104, response text is received. If response text is entered, then in step 4106, the response text is transmitted to system server 102. In step 4108, system server 102 logs the response text. At step 4110, system server 102 forwards the response text to technician device 124. In step 4112, response text is displayed and the communication process may repeat as necessary.

In step 4114, the web application is minimized and J2534 application 126 is reopened on technician device 124. In step 4116, the graphical representation of a button for the option to "proceed" with J2534 reprogramming is selected. In step 4118, J2534 application 126 will generate a reprogramming request. At step 4120, the reprogramming request is transmitted to system server 102. In step 4122, the request is logged and analyzed. In step 4124, a denial message is generated if the request does not meet system requirements, or if there is an error. At step 4126, a denial is transmitted to technician device 124. At step 4128, system server 102 generates a request notification message for the client, if the request meets requirements. At step 4130, a reprogramming request notification is forwarded to client device 110. In step 4132, client device 110 receives the reprogramming request notification. In step 4134, the reprogramming request is displayed. An example of the reprogramming request screen is shown in FIG. 44B.

Figure 43C:
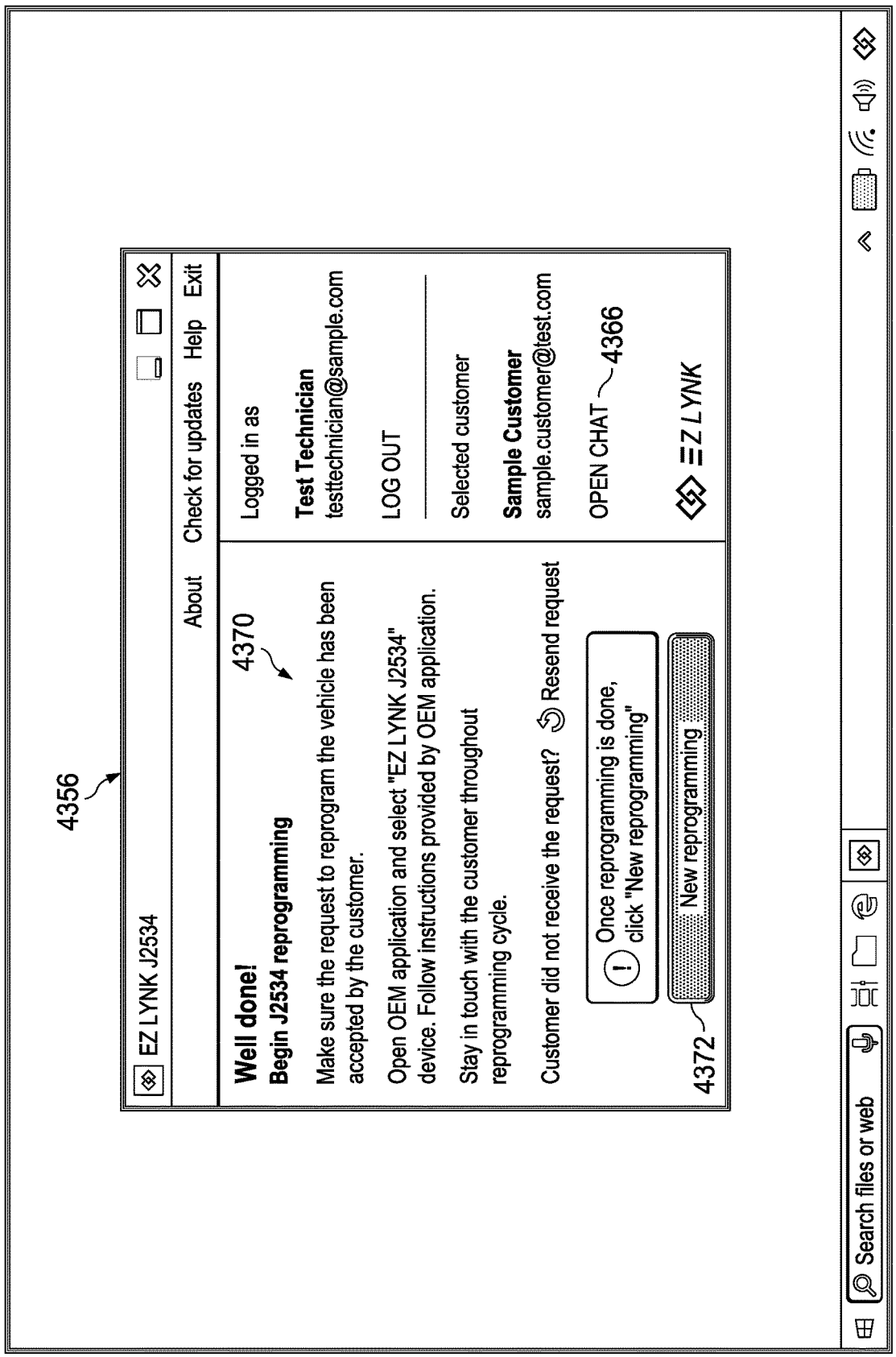

In step 4136, the graphical depiction of a button for "Accept" is selected in application 111. In step 4138, client device 110 generates an accept message. At step 4140, the message is transmitted to system server 102. At step 4142, system server 102 logs the message. In step 4144, system server 102 forwards the message to technician device 124. In step 4146, J2534 application 126 logs the acceptance. At step 4148, J2534 application 126 displays J2534 reprogramming screen with directions on technician device 124. An example of the reprogramming screen is shown in FIG. 43C.

In step 4150, the OEM application is opened on technician device 124. The OEM application uses OEM API 128 to communicate with the local device through the system server and client device. In a preferred embodiment, the J2534 DLL file downloaded on the technician device with J2534 application 126 is automatically recognized by the OEM application. In step 4152, local device 112 and ECU profile are selected in the OEM application. In a preferred embodiment, the OEM application is directed to the system server for the data file of the ECU profile selected. At step 4154, the reprograming is initiated. In a preferred embodiment, this step consists of the OEM API using the J2534 DLL to serialize a reprogramming request for transmission to the system server.

In step 4156, a reprogramming command is sent to system server 102. In a preferred embodiment, the reprogramming command includes the ECU profile choice and the OEM J2534 communication functions. At step 4158, the command is logged. At step 4159, system server 102 assembles a reprogramming request file. In a preferred embodiment, the reprogramming file includes the chosen ECU profile data file and the OEM API functions. In another embodiment this step is performed on the technician device. In step 4160, system server 102 transmits the reprogramming request file to client device 110. At step 4162, client device 110 downloads the reprogramming request file. In step 4164, application 111 enables J2534 mode. J2534 mode disables use of other features of the phone while reprogramming is performed. An example of the screen displayed in application 111 is shown in FIG. 44C. In step 4176, the graphical depiction of "Stop" may be selected to end the reprogramming after it has been initiated. In step 4178, application 111 will a display warning screen if "Stop" is selected after J2534 mode is enabled. An example of the warning screen is shown in FIG. 44D. In step 4180, the graphical depiction of a button to "proceed" may be selected to disable J2534 mode and stop reprogramming. If the reprogramming is stopped, then in step 4182, the cancellation of reprogramming is transmitted to the system server 102. In step 4184, system server 102 will log the cancellation. At step 4186, system server 102 will forward the cancellation notification to technician device 124.

In step 4166, client device 110 will establish a connection with local device 112 via a local area network, Wi-Fi or Bluetooth, or wide area network, GSM, once J2534 Mode is enabled. Both the local area network and the wide area network can be connected simultaneously, as previously described. In step 4168, client device will transfer the reprogramming file to local device 112 once communication is established. In step 4170, local device 112 will download the reprogramming request file. In step 4172, local device will deserialize the reprogramming request and use the OEM J2534 communications functions to initiate the reprogramming process. In step 4174, local device 112 will initiate a communication connection with vehicle device 114 through the OBD II port utilizing the J2534 compliant OEM communications functions, such as those shown in Table 2.

TABLE 2

| Function | Description |
| --- | --- |
| PassThruOpen | Establish a connection with a device |
| PassThruClose | Terminate a connection with a device |
| PassThruConnect | Establish a connection with a protocol channel |
| PassThruDisconnect | Terminate a connection with a protocol channel |
| PassThruReadMsgs | Read messages form a protocol channel |
| PassThruWriteMsgs | Write messages to a protocol channel |
| PassThruStartPeriodicMsg | Start sending messages at a specified time interval on a protocol channel |
| PassThruStopPeriodicMsg | Stop a periodic message |
| PassThruStartMsgFilter | Start filtering incoming messages |
| PassThuStopMsgFilter | Stop filtering incoming messages |
| PassThuSetProgrammingVoltage | Set programming voltage on a specific pin |
| PassThruReadVersion | Read version information for the DLL and API |
| PassThruGetLastError | Get text description of the last error |
| PassThruIoctl | General I/O control functions for reading and writing protocol configuration parameters |

The communication protocols which can be used at this step and are currently supported by the J2534 standard are: ISO9141, ISO14230 (KWP2000), J1850, CAN (ISO11898), ISO15765, SAE J2610, and J1939.

Once the communication connection is established, then in step 4188, local device will transmit the ECU profile data selected for reprogramming. In step 4190, vehicle device 114 will acknowledge the connection and transmittal. At step 4192, vehicle device 114 will initialize reprogramming according to the new ECU profile parameters. At step 4194, vehicle device will complete all reprogramming.

Figure 43D:
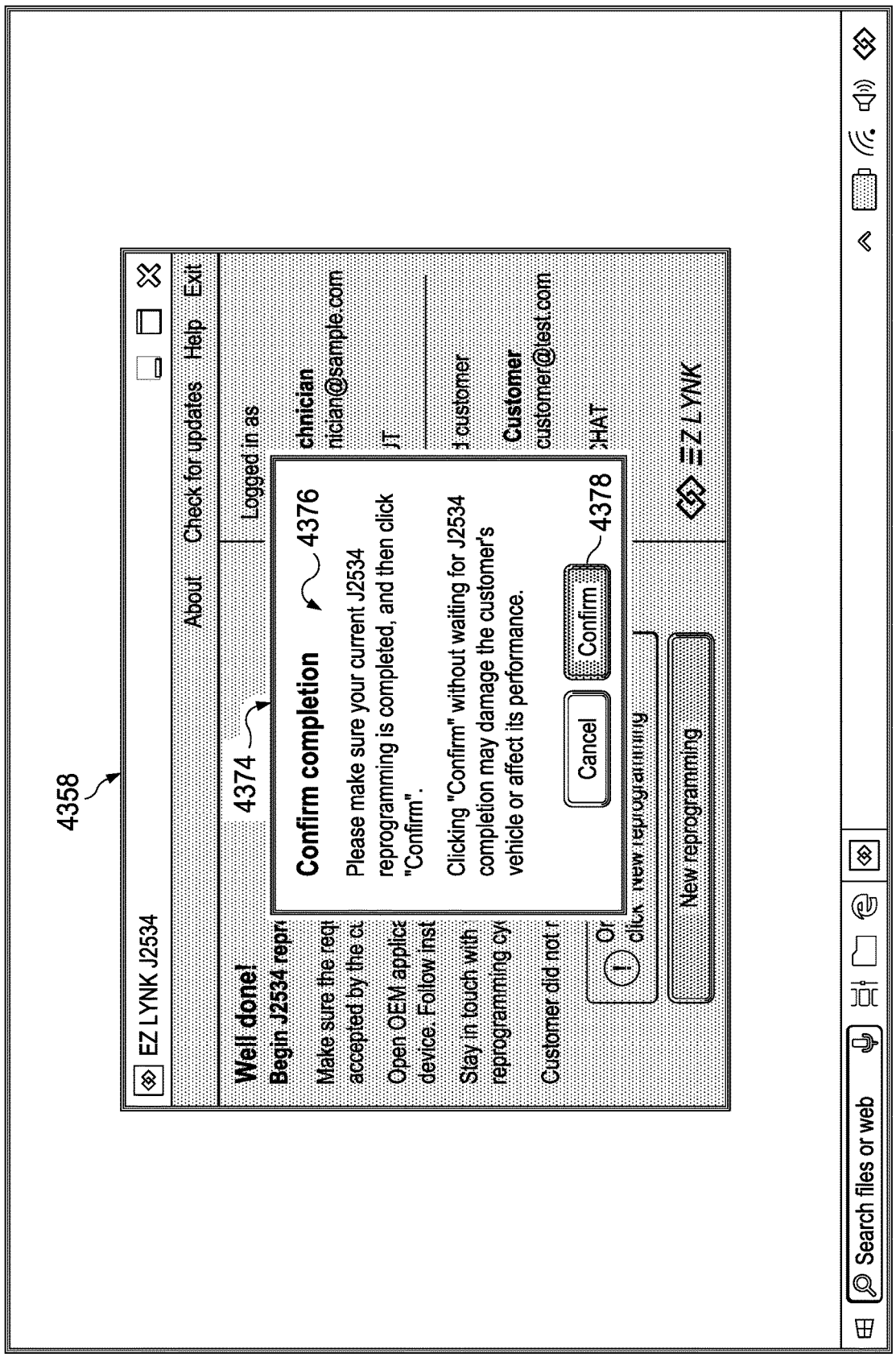

In step 4196, the vehicle device will transmit a completion message. In step 4198, local device 112 will log completion and serialize the message. At step 4200, local device 112 will transmit a completion message to client device 110. In step 4202, client device logs the completion. Then in step 4204, the completion message is forwarded to system server 102. At step 4206, system server logs the completion. At step 4208, system server will update the database. At step 4210, a completion message is forwarded to technician device 124. In step 4212, technician device 124 receives a notification of reprogramming completion and the OEM API will deserialize the message for the OEM Application using the J2534 DLL file. At step 4214, the reprogramming completion screen is displayed. An example of the reprogramming completion screen is shown in FIG. 43D.

Figure 44E:
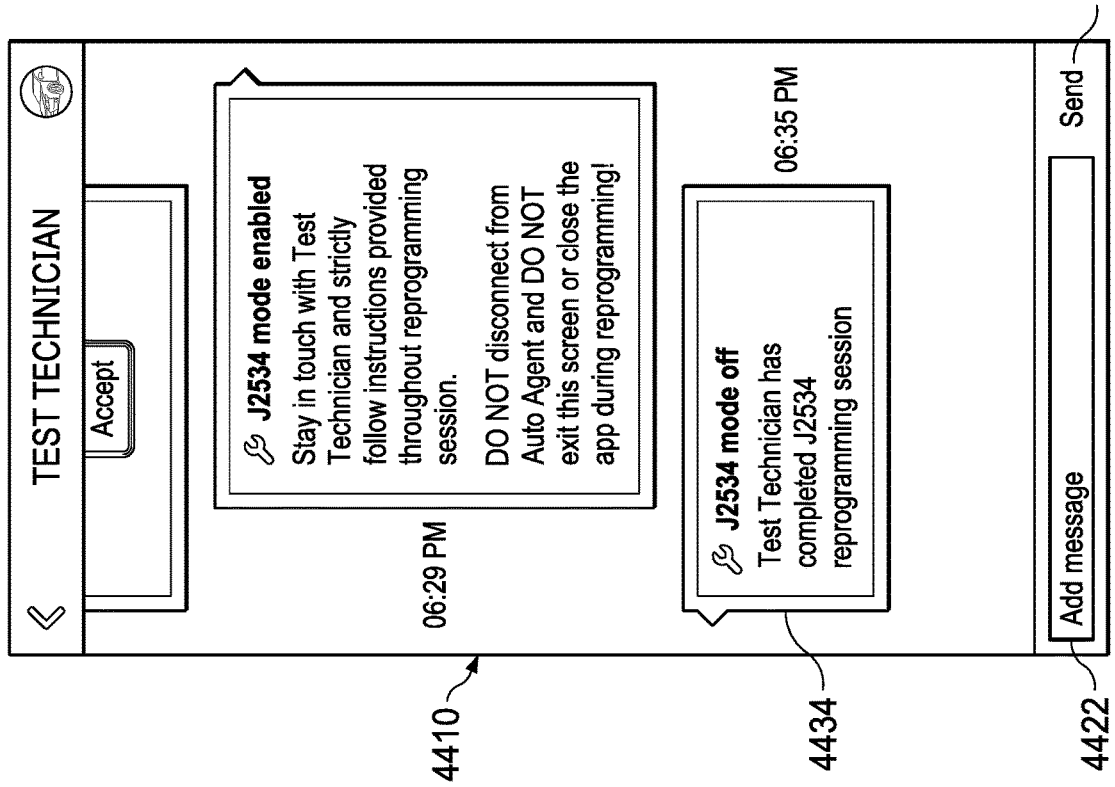

At step 4216, the completion of J2534 reprogramming of vehicle device 114 is confirmed. In step 4218, technician device 124 transmits a confirmation message to system server 102. In step 4220, system server 102 will log confirmation. In step 4222, system server 102 will generate a complete notification. In step 4224, the complete notification is transmitted to client device 110. In step 4226, client device 110 receives the completion notification. At step 4228, application 111 will disable J2534 mode. At step 4230, application 111 will display a message which indicates that J2534 mode is now disabled and reprogramming is complete. An example of this screen is shown in FIG. 44E.

Figure 40B:
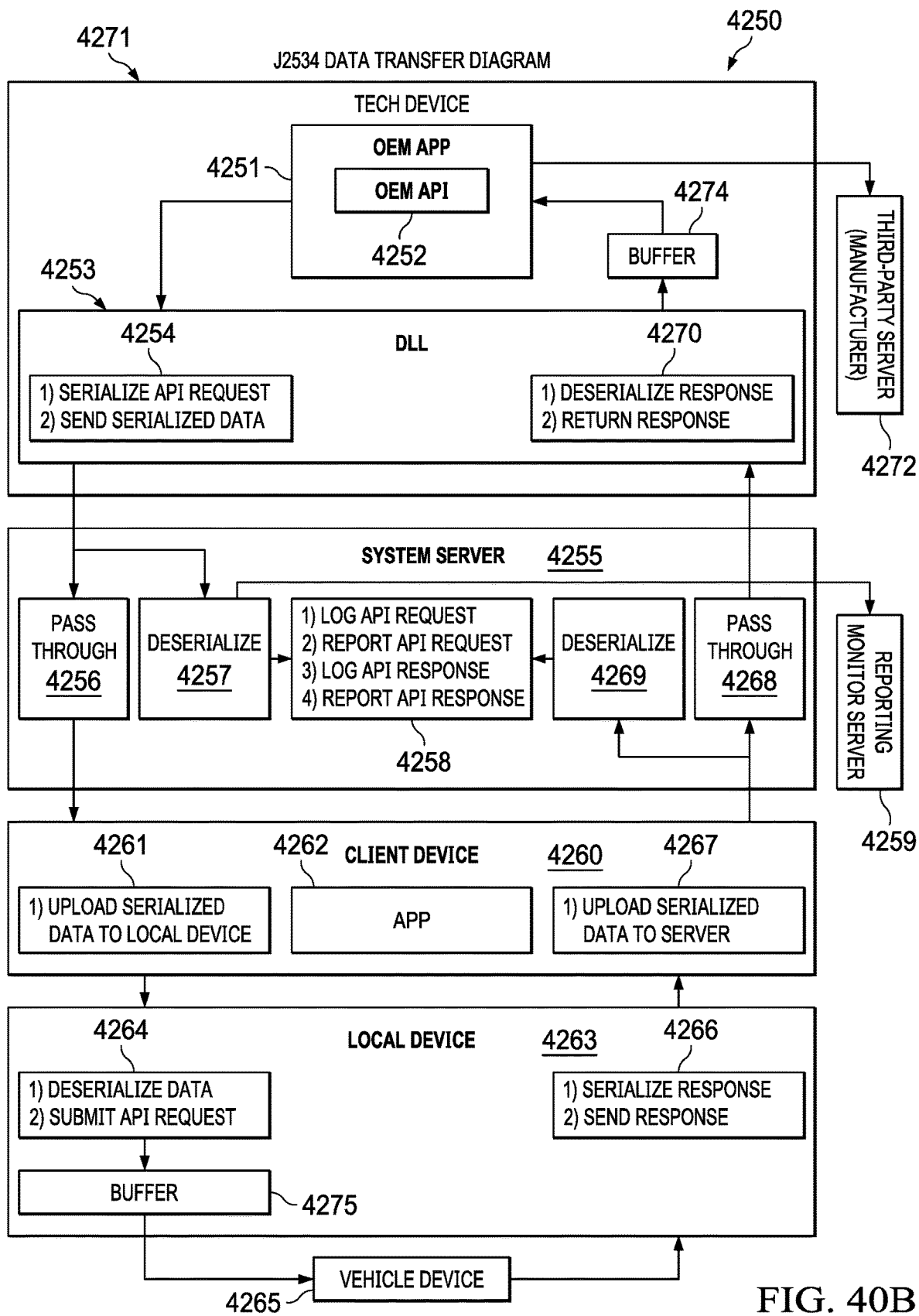
FIG. 40B is a method diagram of a communications system for updating an automotive controller in a preferred embodiment.

Referring then to FIG. 40B, method 4250 of communications between an OEM application and vehicle device is described.

In a preferred embodiment, method 4250 requires a PC, or other smart device, such as technician device 4271, with OEM application 4251, J2534 compliant OEM API 4252, and J2534 DLL 4253. Method 4250 also uses a system server 4255, client device 4260, local device 4263, and a vehicle ECU, such as vehicle device 4265, networked together as previously described. Method 4250 also includes third-party server 4272 and reporting monitor server 4259 connected to the system server through a wide area network, such as the internet (not shown). In one embodiment, third-party server 4272 is controlled by a vehicle manufacturer and also communicates with the technician device through the wide-area network. Third-party server 4272 is accessible from an OEM application provided by the vehicle manufacturer, such as OEM application 4251. The OEM application may receive updates and ECU data files from the third-party server in response to requests from the OEM application.

In method 4250, the system server, client device, and local device can each operate in a "pass-through" mode. In pass-through mode, the devices collectively act as an interface between an OEM application, located on the technician device, and the vehicle device. The OEM application controls the J2534 reprogramming of a vehicle device, while the system server, client device, and local device relay the OEM commands from the OEM application to the vehicle device. In this embodiment, the system server neither interprets an OEM reprogramming command, nor compiles a reprogramming request file.

Module 4251 comprises the OEM application. The OEM application typically is provided by a vehicle manufacturer and enables ECU reprogramming through a direct connection to the OBD II port. The OEM application includes J2534 compliant OEM API 4252, the software and calibration data for a vehicle device, the security mechanism that controls access to program a vehicle device, and the steps and sequence required to program a vehicle device as will be further described. OEM application 4251 may retrieve new software and calibration data for a vehicle device or updated security mechanisms from the vehicle manufacturer through third-party server 4272.

In a preferred embodiment, the OEM application utilizes the J2534 communications functions shown in Table 2. The programming sequences used to reprogram the ECU correspond with the J2534 communications functions required by the J2534 Protocol. The OEM application also provides a user interface to select a vehicle device for reprogramming, as well as the calibration data, or ECU profile. In a preferred embodiment, once a vehicle device and ECU profile are selected, the OEM application uses the OEM API to call the J2534 DLL file for the local device connected to the vehicle device, as will be further described.

J2534 DLL 4253 comprises modules 4254, and 4270. In a preferred embodiment the DLL is located in the following registry key in the technician device registry:
[HKEY_LOCAL_MACHINE\SOFTWARE\PassThru-Support.04.04].

Module 4254, in step 1, makes an OEM API call to the J2534 DLL file in order to serialize the reprogramming command request. The serialized reprogramming request contains the J2534 OEM communications functions, and data, or programming sequence, required to install the ECU profile selected from the manufacturer. In a preferred embodiment, the process of serialization consists of converting the reprogramming request from half-duplex to binary array for full-duplex transmission through WebSocket. In step 2, module 4254 sends the serialized data to modules 5256 and 5257 resident on system server 4255 by virtue of the wide area network.

System server 4255 comprises modules 4256, 4257, 4258, 4268, and 4269. In module 4256, the system server operates in pass-through mode. In pass-through mode, the system server simply relays data from one device to another. In module 4256, the system server then relays the serialized command to client device 4260.

In module 4257, system server 4255 deserializes the data so that it can be interpreted and packaged for further transmission. Module 4258, in step 1 logs the API request and in step 2 reports the API request to reporting monitor server 4259. In one embodiment reporting monitor server 4259 is operated by a third-party, such as a fleet manager. This function monitors and reports ECU changes in order to verify that the emissions controls operate within applicable emmissions regulations. This function is important because it enables automatic compliance with reporting regulations.

Client device 4260 contains mobile application 4262 for communicating with the local device and system server, such as application 111, as previously described. Client device 4260 also comprises modules 4261 and 4266. Module 4261 receives the serialized reprogramming command from the system server and retransmits it to local device 4263. At this step, application 4262 may display a notification to the user that emissions reprogramming is underway or has been requested. At this step, the application also establishes a wireless connection by Wi-Fi or Bluetooth (or both) with the local device in order to transfer the reprogramming command request. The reprogramming request is then uploaded to the local device.

Local device 4263 comprises modules 4264, 4266 and buffer 4275. Local device 4263 is operatively connected to a vehicle device through an OBD II port, as previously described. Module 4264, in step 1, deserializes the reprogramming request and submits it to the vehicle device. In a preferred embodiment, deserialization consists of converting the reprogramming command from a full-duplex binary array to half-duplex for transmission to the vehicle device. The half-duplex communication system used to communicate with a vehicle device varies, however, the communication protocols currently supported by the J2534 protocol are ISO9141, ISO14230 (KWP2000), J1850, CAN (ISO11898), ISO15765, SAE J2610, and J1939. The deserialized data consists of the J2534 OEM communication function request and data sent from the technician device. The functions are used to communicate with a vehicle device to initiate and execute the ECU reprogramming. In step 2, module 4264 submits the function request and data for transfer to buffer 4275.

The vehicle device may receive communication in either a single frame or segmented messages in multiple frames. For instance, the J2534 OEM communications functions are single frame requests. Whereas, data messages, such as those containing reprogramming parameters, must be segmented to comply with the size restrictions of the communication protocol used by a vehicle device, such as those listed in Table 3.

TABLE 3

| Protocol | Minimum bytes | Maximum bytes |
| --- | --- | --- |
| CAN (ISO11898) | 4 | 12 |
| ISO15765 | 4 | 4099 |
| ISO15765 (Extended Address) | 5 | 4100 |
| J1850PWM | 3 | 10 |
| J1850VPW | 1 | 4128 |
| ISO9141 | 1 | 4128 |
| ISO14230 | 1 | 259 |
| ISO14230 (Manual Checksum) | 1 | 260 |
| SCI | 1 | 4128 |

The J2534 OEM communication functions are sent in single frame transfers to the vehicle device and cannot be segmented. However, these functions must be received in a certain order. Specifically, communication with the vehicle device must always begin with the function PassThruOpen, with one exception, the function PassThruGetLastError. If any other function or message is received prior to PassThruOpen, an error results. A successful result of PassThruOpen returns a device ID which is then used as a handle for subsequent functions and messages. Generally, PassThruConnect must be the first function to follow PassThruOpen, and a successful result will return a protocol ID. Together the device ID and protocol ID form a pChannelID, which the local device thereafter will be able to use to communicate with the vehicle device.

Similarly, segmented messages must be received in the correct order, and must follow a read/write function, such as PassThruReadMsg or PassThruWriteMsg. The first message in the series will have a "start" indicator. When a start indicator is received it is matched to a flow control filter, or pPatternMsg, with the same CAN ID. The flow control status is then set to ContinueToSend, and the vehicle device will wait for the consecutive frames. The final segmented message will have an "end" indicator. All of the segmented messages must be received before the vehicle device can read the data. If the separation time parameters are too long, or any messages are delayed the process will time out and produce an error. Transmission over wide-area networks is prone to delays and interference. Therefore, it is important to buffer and queue messages and functions in order to reduce the likelihood that an error will occur transmitting sequential and segmented messages to the vehicle device over a wide area network.

Buffer 4275 is a data buffer for the J2534 OEM communication functions and data messages submitted for transfer to the vehicle device. In buffer 4275, functions and messages are queued and ordered to reduce the possibility of receiving an error from the vehicle device. The buffer is capable of receiving at minimum 8 simultaneous messages and 4128 bytes per message. This is important because J2534 OEM communication functions and data messages must be sent to and received by the vehicle device in the correct order and within a specified time period otherwise errors may occur. An example is ERR_TIMEOUT where the timeout period is 35 seconds, or ERR_INVALID_CHANNEL_ID where the functions are received out of order.

Vehicle device 4265 comprises an ECU and various controllers and memories, such as vehicle device 114, as previously described. Vehicle device 4265 interprets and executes the reprogramming commands sent via the J2534 OEM communication functions and installs the parameters of the new ECU profile. The vehicle device either returns an "error" or a confirmation code to the local device using the J2534 OEM communications functions. An error is returned where the J2534 OEM communications functions are wrong or out of sequence, or if the reprogramming cannot otherwise be completed. A confirmation is returned when the reprogramming functions are performed successfully. The error or confirmation message is reported to module 4266 of the local device through the OBD II port. The vehicle device may send responses in single frame messages or segmented messages. However, unlike the communication functions and data sent to the vehicle device, the responses received from the vehicle device do not need to be received in sequential order.

In module 4266, local device 4263, in step 1, serializes the response returned from the vehicle device. In a preferred embodiment, the serialization of the response consists of the local device converting from half-duplex to full-duplex, as previously described. In step 2, module 4266 then transmits the serialized response to module 4267 of the client device.

In module 4267, client device 4260 uploads the serialized response to modules 4268 and 4269 of the system server. At this step application 4262 may send or display a message to the user as to the status of the ECU reprogramming.

Module 4268 relays the serialized response from the client device to module 4270 of the technician device in pass through mode using a full-duplex communication system, such as Web Socket, as previously described.

Module 4269 deserializes the response and sends it to module 4258. Module 4258, then in step 3, logs the API response. In step 4, module 4258 reports the API response to reporting monitor server 4259.

In module 4270, OEM API 4252 uses J2534 DLL 4253 in step 1 to deserialize the vehicle response and in step 2, in one embodiment, provides it to buffer 4274. Buffer 4274 acts as a queue for incoming J2534 responses to the original J2534 OEM requests. The buffer is capable of receiving a least 8 messages of 4128 bytes in length. The buffer is also capable of arranging the messages into the correct order. Once the messages are complete, and in the correct order, the buffer is dumped to OEM application 4251.

In another embodiment, the responses are not required to be received in order or within a predetermined period. In this case, the buffer is bypassed or is omitted from technician device 4271.

The OEM application then typically displays the status of the reprogramming command to the technician user.

Referring to FIGS. 41A through 41C, graphic displays of a cloud-based web application generated for technician device 124 are shown. In FIG. 41A, a screenshot of the cloud-based web application is shown displaying technician web app view 4301. Technician web app view 4301 consists of customer chat panel 4304, text input bar 4306, and ECU configuration option column 4308. Customer chat panel 4304 displays any text exchanged between a technician device and a client device, as well as reprogram request message 4310, J2534 mode enabled message 4312, and completion message 4314. ECU configuration option column 4308 contains a list of preconfigured ECU profiles.

In FIG. 41B, a screenshot of the cloud-based web application is shown displaying technician web app view 4302. Technician web app view 4302 shows the J2543 tab of the cloud-based application, which consists of J2534 application version numbers 4316, application release notes 4318, and download option 4320. J2534 application 126 is downloaded to technician device 124 using download option 4320. Release notes 4318 are input from administrator device 22032 when J2534 application 126 is uploaded to system server 102.

In FIG. 41C, a screenshot of the cloud-based web application is shown displaying technician web app view 4303. Technician web app view 4303 shows the ECU profile tab view of the cloud-based web application. The ECU profile tab contains calibration ID folder column 4322, vehicle column 4324, ECU profiles column 4326, filter options 4328, and help menu pull out 4330. Calibration ID folder column 4322 consists of a list of calibration ID folders, each folder contains a specific number of pre-configured ECU profiles, the total number of ECU profiles is listed in ECU profiles column 4326. The ECU profiles are preconfigured for specific vehicles listed in vehicle column 4324. Calibration ID folder column 4322 may be limited by a selection of specific vehicle filters listed in filter options 4328. Help menu pull out 4330 shows shortcuts to a list of supported vehicles, and instructions as to how to use custom ECU profiles, and how to perform J2534 reprogramming. Specific vehicle calibrations may be selected from the list of available configuration ID folders and profiles.

Referring to FIG. 42, a graphic display of the administrator web application is shown displaying admin view 4332. Admin view 4332 is a view of J2534 configuration page with upload window 4334. Upload window 4334 contains file select option 4336, private comment box 4338, release notes box 4340, and add button 4342. New J2534 application versions are selected from local memory of administrator device 22032 and uploaded to system server 102 using upload window 4334.

Referring to FIGS. 43A through 43D, graphic displays of J2534 application 126 on technician device 124 are shown. In FIG. 43A, a screenshot of J2534 application 126 is shown displaying J2534 application screen 4352. J2534 application screen 4352 consists of customer input box 4360, and next option 4362. The email submitted through the application must be a valid customer email registered on system server 102.

In FIG. 43B, a screenshot of J2534 application 126 is shown displaying J2534 application screen 4354. J2534 application screen 4354 consists of reprogramming initiation instructions 4364, customer chat option 4366, and proceed option 4368. Selection of customer chat option 4366 opens up a web browser with technician view cloud-based web application as shown in FIG. 41A.

In FIG. 43C, a screenshot of application 126 is shown displaying J2534 application screen 4356. J2534 application screen 4356 consists of reprogramming instructions 4370, customer chat option 4366, and new reprogramming option 4372. Selecting new reprogramming option 4372 will complete the current reprogramming process.

In FIG. 43D, a screenshot of technician device 124 with J2534 application 126 open is shown displaying J2534 application screen 4358. J2534 application screen 4358 consists of J2534 application screen 4356, as shown in FIG. 43C, with confirmation window 4374. Confirmation window 4374 consists of confirm instructions 4376, and confirm option 4378.

Referring then to FIGS. 44A through 44E, a graphic display of client device 110 is shown. In FIG. 44A, a mobile phone screenshot of application 111 is shown displaying mobile application screen 4402. Mobile application screen 4402 consists of tile panel 4412, and reprogramming request notification 4414. Tile panel 4412 consists of various tiles that give the status of a vehicle's systems, such as the engine temperature, current speed, and rpm. Reprogramming request notification 4414 is selected to view the reprogramming request in the mobile chat panel.

In FIG. 44B, a mobile phone screenshot of application 111 is shown displaying mobile application screen 4404. Mobile application screen 4404 consists of mobile chat panel 4416, text input box 4422, and send option 4424. Mobile chat panel 4416 displays text exchanged between technician device 124 and client device 110, and reprogram request 4418. Reprogram request 4418 contains accept option 4420. Reprogramming will not initiate unless accept option 4420 is selected.

In FIG. 44C, a mobile phone screenshot of application 111 is shown displaying mobile application screen 4406. Mobile application screen 4406 is a view of mobile chat panel 4416 which contains J2534 mode enabled message 4426, and stop option 4428.

In FIG. 44D a mobile phone screenshot of application 111 is shown displaying mobile application screen 4408. Mobile application screen 4408 consists of warning window 4430. Warning window 4430 consists of warning message 4432, cancel option 4433, and proceed option 4436.

In FIG. 44E, a mobile phone screenshot of application 111 is shown displaying mobile application screen 4410. Mobile application screen consists of chat panel 4416 with complete message 4434 indicating the reprogramming was conducted successfully.

Figure 45:
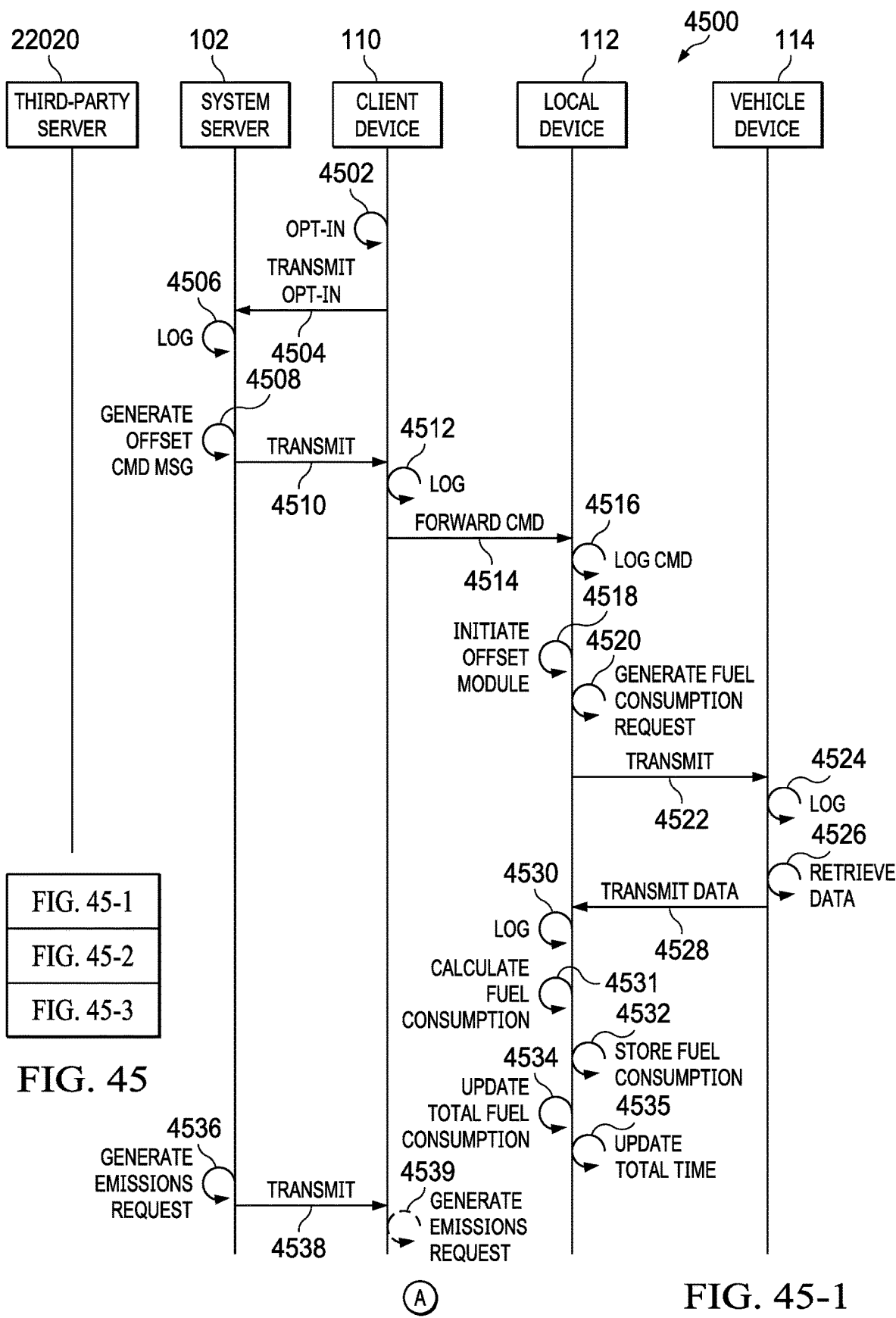
FIG. 45 is a network flow diagram of a system for determining and certifying carbon offsets.
Figures 2, 45:
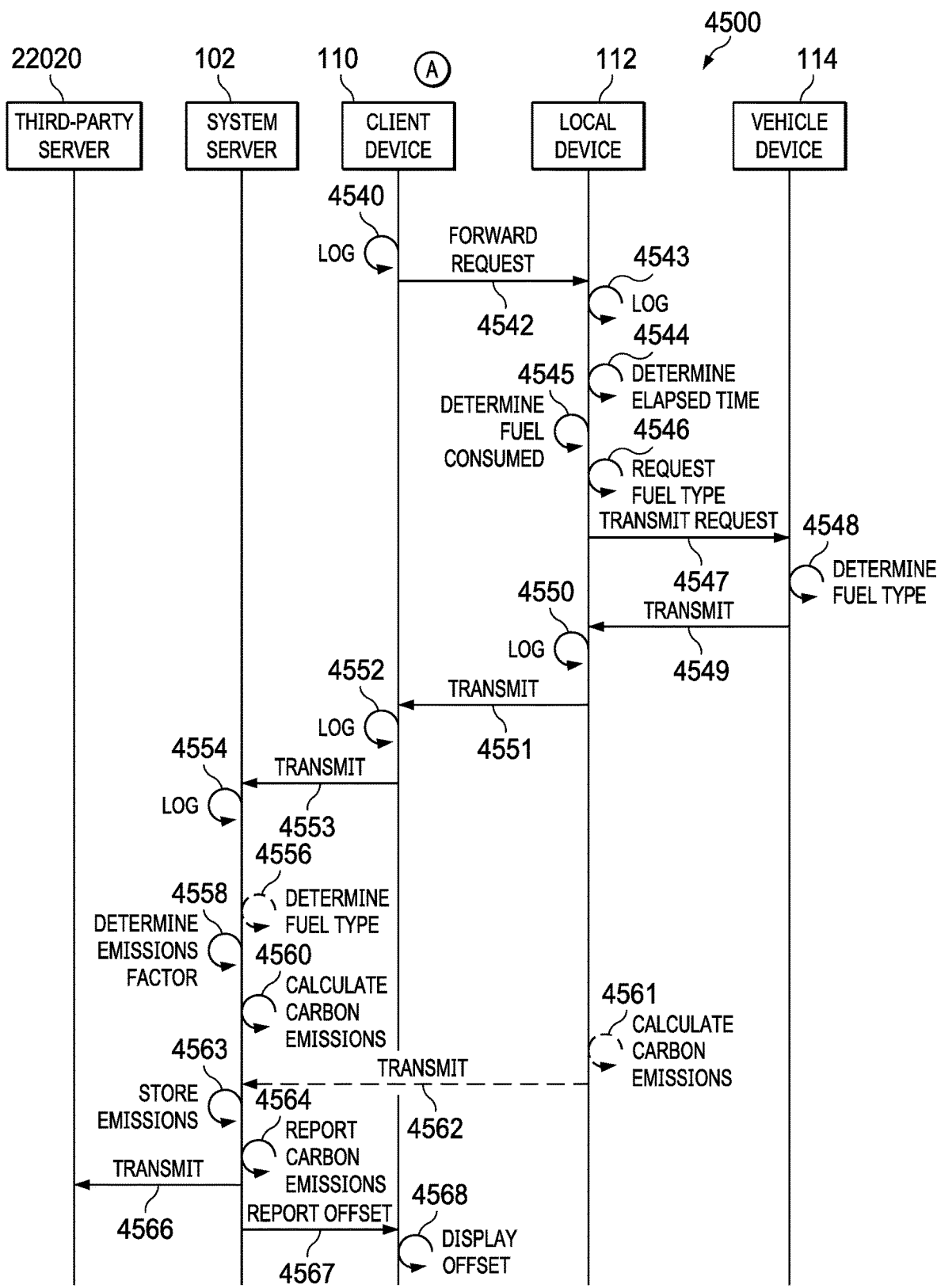
Figures 3, 45:
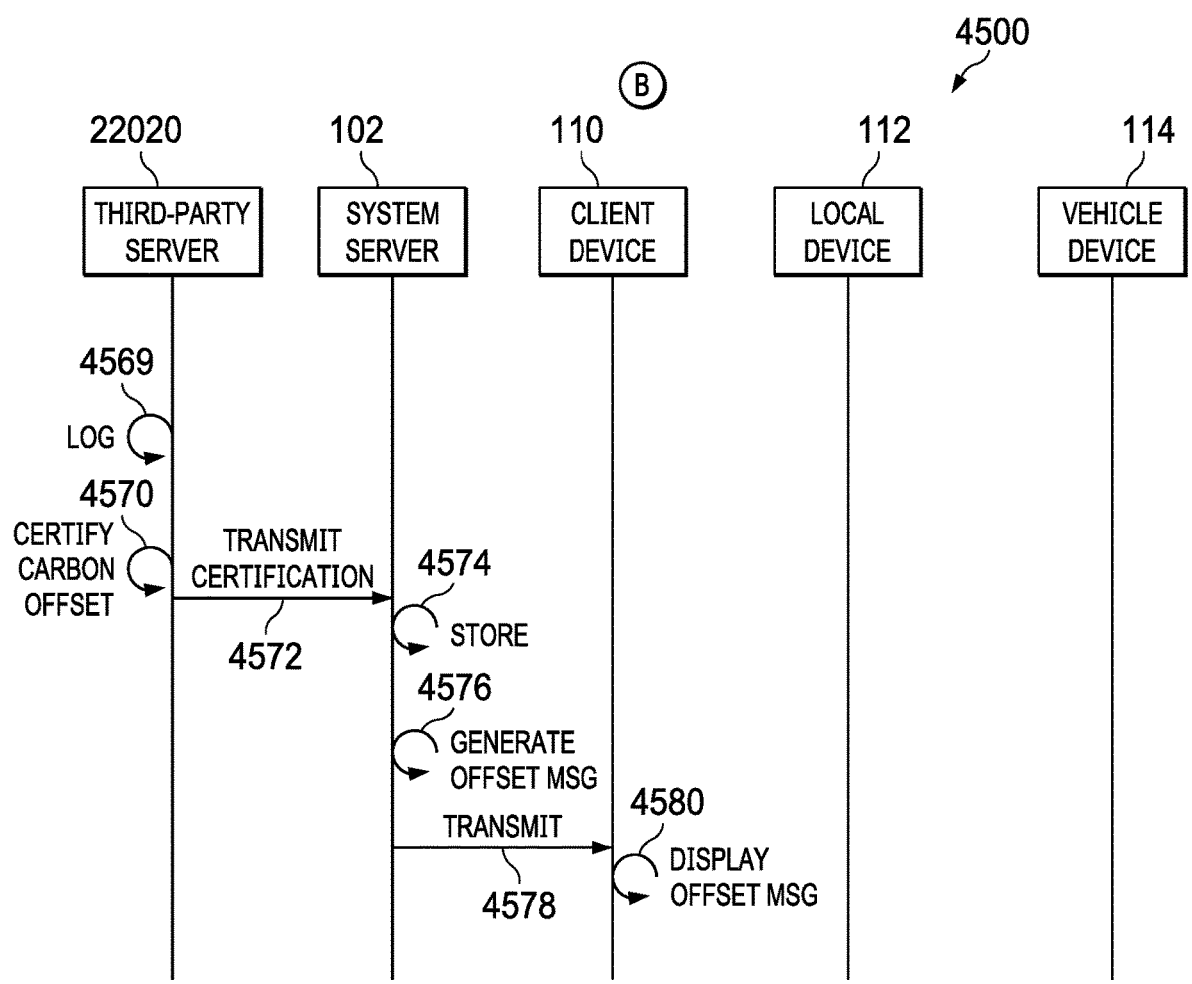

Referring then to FIG. 45, the system for determining the carbon emissions of a vehicle is described. In many states in the United States, carbon emissions and offsets are subsidized upon certification by a third-party certification agency.

At step 4502, client device 110 receives a signal choosing the carbon emissions offset program. In step 4504, the opt-in is transmitted to system server 102. In step 4506, system server 102 records the signal. At step 4508, system server 102 generates an offset command message for local device 112 to initiate an onboard carbon offset module. In step 4510, offset command message is transmitted to client device 110. At step 4512, client device 110 logs the command message. In step 4514, client device 110 forwards the command message to local device 112. In step 4516, local device 112 logs the command message.

At step 4518, local device 112 initiates the onboard carbon offset module. The onboard carbon offset module determines and stores the volume of fuel consumed by a vehicle. At step 4520, local device 112 generates and repeats a fuel consumption request once every preset time period. In a preferred embodiment the preset time period is about one second. Other preset time periods can be used. A lower preset time limit results in greater accuracy of the amount of fuel used, but requires higher processor usage. A higher preset time limit results in less accuracy of the amount of fuel used, but also lower processor usage.

In step 4522, the fuel consumption request is transmitted to vehicle device 114. The fuel consumption request is sent using either a single Parameter ID (PID) or any combination of PIDs. For instance, in one embodiment the fuel consumption request uses one or more J1979 Standard OBD II PIDs, such as RPM 0xOC, Speed 0x0D, MAF rate 0x10, Throttle Pos 0x11, 02 Sensor 0x34, Fuel injection timing 0x5D, and Engine Fuel Rate 0x5E. In other embodiments, the fuel consumption request uses non-standard manufacturer specific PIDs.

In step 4524, vehicle device 114 logs the fuel consumption request. At step 4526, vehicle device 114 retrieves the data requested. At step 4528, the data is sent to the local device. At step 4530, the data is stored in memory. At step 4531, the local device calculates fuel consumption.

In one embodiment, fuel consumption is determined by using the Mass Air Flow Rate (MAF), and the Air/Fuel Ratio (AFR) at a specific time interval. MAF and AFR values may be requested directly from the vehicle device using J1979 Standard OBD-II PIDs, such as 0x10 and 0x34, respectively.

Fuel consumption, $M_x$, is calculated by the formula:

$$M_x = \frac{Grams_{Fuel}}{second} \times t \qquad \text{Eq. 1}$$

where:

$$\frac{Grams_{Fuel}}{second} = \frac{\text{Mass Airflow } (MAF)}{\text{Air Fuel Ratio } (AFR)} \qquad \text{Eq. 2}$$

$$MAF = \frac{Grams_{Air}}{second} \qquad \text{Eq. 3}$$

$$AFR = \frac{Grams_{Air}}{Grams_{Fuel}} \qquad \text{Eq. 4}$$

t=time interval in seconds.

AFR can be determined by the formula:

$$AFR = \lambda \times S_r \qquad \text{Eq. 5}$$

where $S_r$ is the stoichiometric ratio of fuel, typically 14.7 grams air per one (1) gram of fuel, and, λ is the Equivalence Ratio, which is the ratio of actual AFR to ideal stoichiometric ratio determined by the formula:

$$\lambda = \frac{AFR}{14.7} \qquad \text{Eq. 6}$$

In another embodiment, fuel consumption, $M_x$, is determined by using non-standard PIDs for fuel consumption, where a manufacturer has programed an ECU to monitor fuel consumption.

In yet another embodiment, fuel consumption, $M_x$, may be determined by using injector timing, injector pulse width and injection amount as follows.

$$M_x = m \times S \qquad \text{Eq. 7}$$

where:
S is the number of piston strokes during time interval t; and
m is the mass of fuel injected per stroke in kg, found using the following formula;

$$m = \frac{A}{a} \times P \times pw \qquad \text{Eq. 8}$$

where:
A is the cross-sectional area of an engine fuel cylinder in m²;
a is the speed of sound in the fluid in $$\frac{m}{s};$$

P is the pressure in the cylinder in Pascals, or kg/m*s²; and
pw is the pulse width, or the change in time from the start of injection (SOI) to the end of injection (EOI) in seconds. $M_x$, is converted to gallons according to the following formulas:

$$Fuel_{grams} = \frac{Fuel_{kg}}{1000} \qquad \text{Eq. 9}$$

$$Fuel_{Lbs} = \frac{Fuel_{grams}}{454} \qquad \text{Eq. 10}$$

$$Fuel_{Gallons} = \frac{Fuel_{Lbs}}{6.701} \qquad \text{Eq. 11}$$

At step 4532, local device 112 stores the value of fuel consumed as calculated. In step 4534, local device 112 adds the amount of fuel consumed to a cumulative total of fuel consumed stored in memory. At step 4535, local device 112 adds the value of time elapsed during which fuel has been consumed to a cumulative total.

At step 4536, system server 102 generates an emissions request. In step 4538, the emissions request is transmitted to client device 110. In another embodiment, an emission request may be initiated by the user. At step 4539, client device 110 generates an emissions request. In step 4540, client device 110 logs the emissions request. At step 4542, the request is forwarded to local device 112.

At step 4543, local device 112 logs the request. In step 4544, the local device determines the cumulative elapsed time. In step 4545, local device retrieves the cumulative total of fuel consumed. At step 4546, local device 112 requests fuel type used. In a preferred embodiment fuel type can be determined using J1979 Standard OBD II PID, Fuel Type 0x51, or non-standard manufacturer specific PIDs.

In step 4547, the fuel type request is transmitted to vehicle device 114. In step 4548, vehicle device 114 determines fuel type used. At step 4549, fuel type is transmitted to local device 112. In step 4550, fuel type is logged in the local device's memory. At step 4551, local device 112 transmits fuel type, cumulative total of fuel consumed, and the cumulative elapsed time to client device 110. In step 4552, client device 110 logs the data. In step 4552, client device 110 transmits fuel type, cumulative total of fuel consumed, and the cumulative elapsed time to system server 102.

At step 4554, system server 102 logs the cumulative total of fuel consumed, the cumulative elapsed time and the fuel type. In an alternate embodiment, fuel type can be determined independently by system server 102. In step 4556, optionally, system server 102 determines the type of fuel used by the vehicle associated with local device 112 by using the VIN and consulting a loop-up table.

At step 4558, system server 102 determines the fuel type's emissions factor, $E_f$. In a preferred embodiment, emissions factors are stored locally at the server in a table.

In another embodiment, the emissions factor, $E_f$, is calculated by the server. Emissions factors represent kg $CO_2$ emitted per gallon of fuel combusted. Emissions factors are calculated by the following equation:

$$E_f \frac{\text{kg } CO_2}{\text{Gallon}} = Fuel_{HeatContent} \times Fuel_{CO_2 Factor} \qquad \text{Eq. 12}$$

where:

$$\text{Heat Content} = \frac{\text{mm Btu}}{\text{Gallon}} \qquad \text{Eq. 13}$$

and $$CO_2 \text{ Factor} = \frac{\text{kg } CO_2}{\text{mm Btu}} \qquad \text{Eq. 14}$$

At step 4560, system server 102 calculates carbon emissions, $C_e$, for a vehicle. The $C_e$ is calculated by the following equation:

$$C_e = Fuel_{Gallons} \times E_f \frac{\text{kg } CO_2}{\text{Gallon}} \qquad \text{Eq. 15}$$

where:
$Fuel_{Gallons}$=fuel consumption,
assuming all carbon is converted to $CO_2$ during combustion.

In an alternate embodiment, local device 112 calculates $C_e$ at step 4561. At step 4562 the local device sends it to client device 110 for display and transmission to system server 102.

At step 4563, system server 102 stores the value of $C_e$. At step 4564, system server 102 generates a carbon emissions report. The emissions report comprises the value of $C_e$, the identity of the vehicle, preferably by VIN, and the identity of the owner.

In step 4566, the carbon emissions report is transmitted to a third-party for certification. At step 4567, the carbon emissions report is transmitted to client device 110. In step 4568, the carbon emissions report is displayed.

In step 4569, third-party server 22020 logs the emissions report. At step 4570, the carbon offset is determined and certified. In a preferred embodiment a unique certification number is generated and provided as evidence of the certification. In step 4572, the certification is transmitted to system server 102. In step 4574, system server 102 stores the certification. At step 4576, system server generates a carbon offset message. In step 4578, the carbon offset message is transmitted to client device 110. At step 4580, client device 110 displays the carbon offset message.

Figure 46:
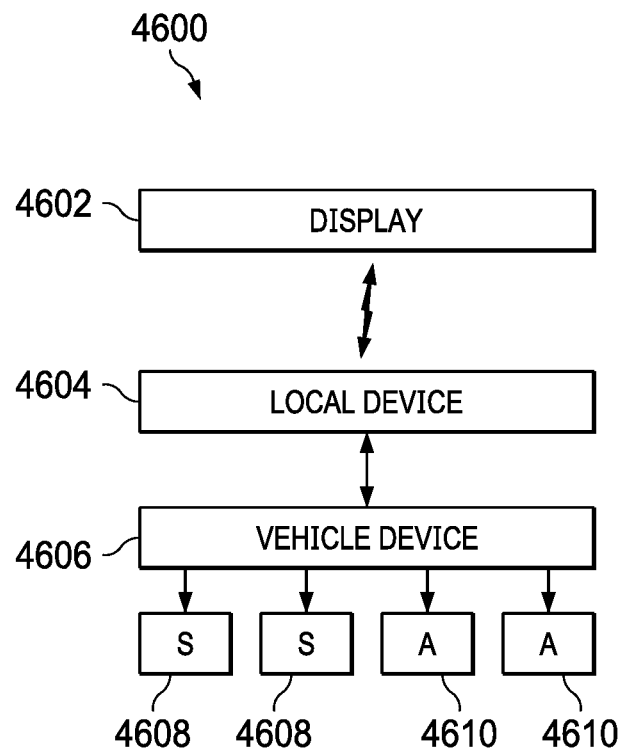
FIG. 46 is a system diagram of a vehicle display network.

Referring then to FIG. 46, system 4600 is provided. System 4600 includes display device 4602, local device 4604, and vehicle device 4606.

In a preferred embodiment, display device 4602 is connected to local device 4604 using a USB connection and/or a local wireless network, such as Wi-Fi or Bluetooth. Local device 4604 is hardwired to an automotive controller, such as vehicle device 4606. The local device communicates to the vehicle device through a dedicated local area network. Vehicle device 4606 is connected to sensors 4608 and actuators 4610, resident on the vehicle, as previously described.

Figure 47:
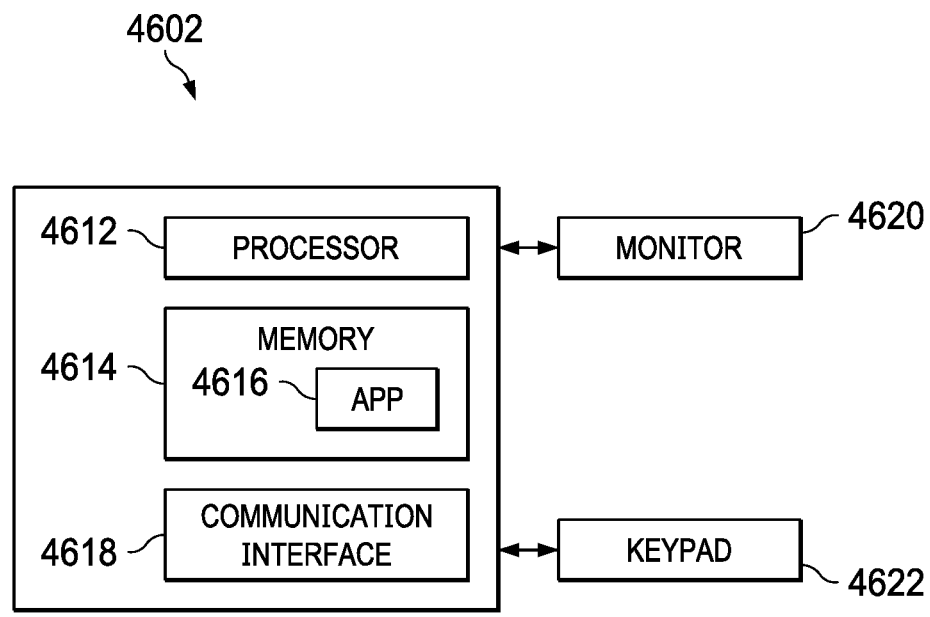
FIG. 47 is a schematic of a display device that is connected to a local device. device.

Referring then to FIG. 47, an architecture drawing of a preferred embodiment of display device 4602 is described.

Display device 4602, contains processor 4612, memory 4614, and communication interface 4618. Memory 4614 may be any combination of RAM, ROM, or secondary memory, such as a removable memory card, as previously described. Memory 4614 contains application 4616 which provides the user interface and instructions for communicating with the local device. In a preferred embodiment, communication interface 4618, includes a USB interface and local area network connectivity, such as Wi-Fi or Bluetooth. Optionally, communication interface may also include wide area network connectivity, such as cellular. The communication interface can also include a data buffer for temporary storage and metering of live feed data from the local device.

Display device 4602 is operatively connected to keypad 4622 and monitor 4620. In a preferred embodiment, keypad 4622 is a touchscreen.

Figure 48:
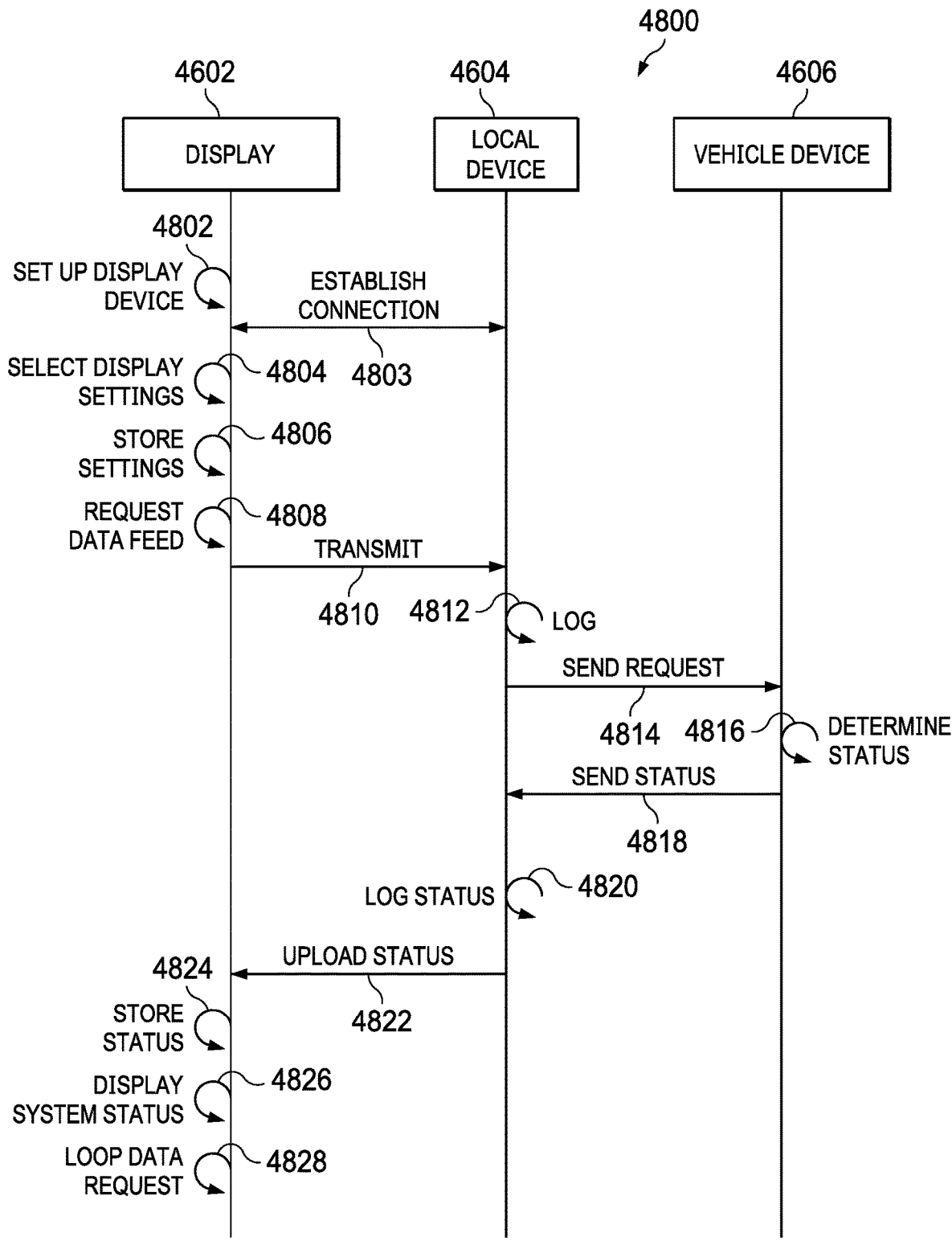
FIG. 48 is a sequence diagram of a method for interaction between an automotive controller and a display.

Referring then to FIG. 48, operation of a preferred embodiment of system 4600 will be described as method 4800. In use, the display device allows the viewing of vehicle information, such as speed, RPM, and coolant temperature, without the use of a client device, such as a cellphone or other smart device.

At step 4802, the display device is setup. Setup of display device 4602 includes providing power to the display, powering up the device, entering demographic information, such as location and time, and searching for a local device to connect to via Wi-Fi or Bluetooth, or plugging in the USB cable, as previously described. In step 4803, a connection is established between local device and display device.

In step 4804, display settings are selected. In a preferred embodiment, in this step a user can select which gauges to view and monitor, and at what refresh rate. A user may select one or more gauges to view on the display in a tile format, such as the carbon emissions, speed, engine coolant temperature or RPMs, as previously described. The display will update the gauges selected at a refresh rate selected by the user. For instance, a user may wish to see his RPM at a refresh rate of $1/4^{th}$ of a second. Additional functions for commercial motor vehicles may also be selected, as will be further described below. At step 4806, display device 4602 stores gauge and refresh rate selections.

In step 4808, the display device requests a live data feed. In a preferred embodiment, the display device will only request a live data feed of the gauges selected. In an alternate embodiment, the display may request a data feed of all available gauges. At step 4810, the display device transmits the data request to local device 4604.

At step 4812, the local device logs the request. At step 4814, local device transmits the PIDs for the specified gauges, such as those previously described and listed in Table 1. In step 4816, the vehicle device determines the status of the gauges requested. At step 4818, the PID values are transmitted to the local device. At step 4820, the local device stores the status.

In step 4822, local device 4604 uploads the status of the gauges to display device 4602. In step 4824, the display device will store the status. In a preferred embodiment the display device will store the status in temporary memory, such as RAM, and eventually discard the values. In another embodiment, the display device may contain an ongoing FIFO record of the values in a local secondary memory, such as a memory card or SSD.

At step 4826, the status of the selected gauges is displayed. At step 4828, the display device loops the data request as frequently as the selected refresh rate requires.

Figure 49:
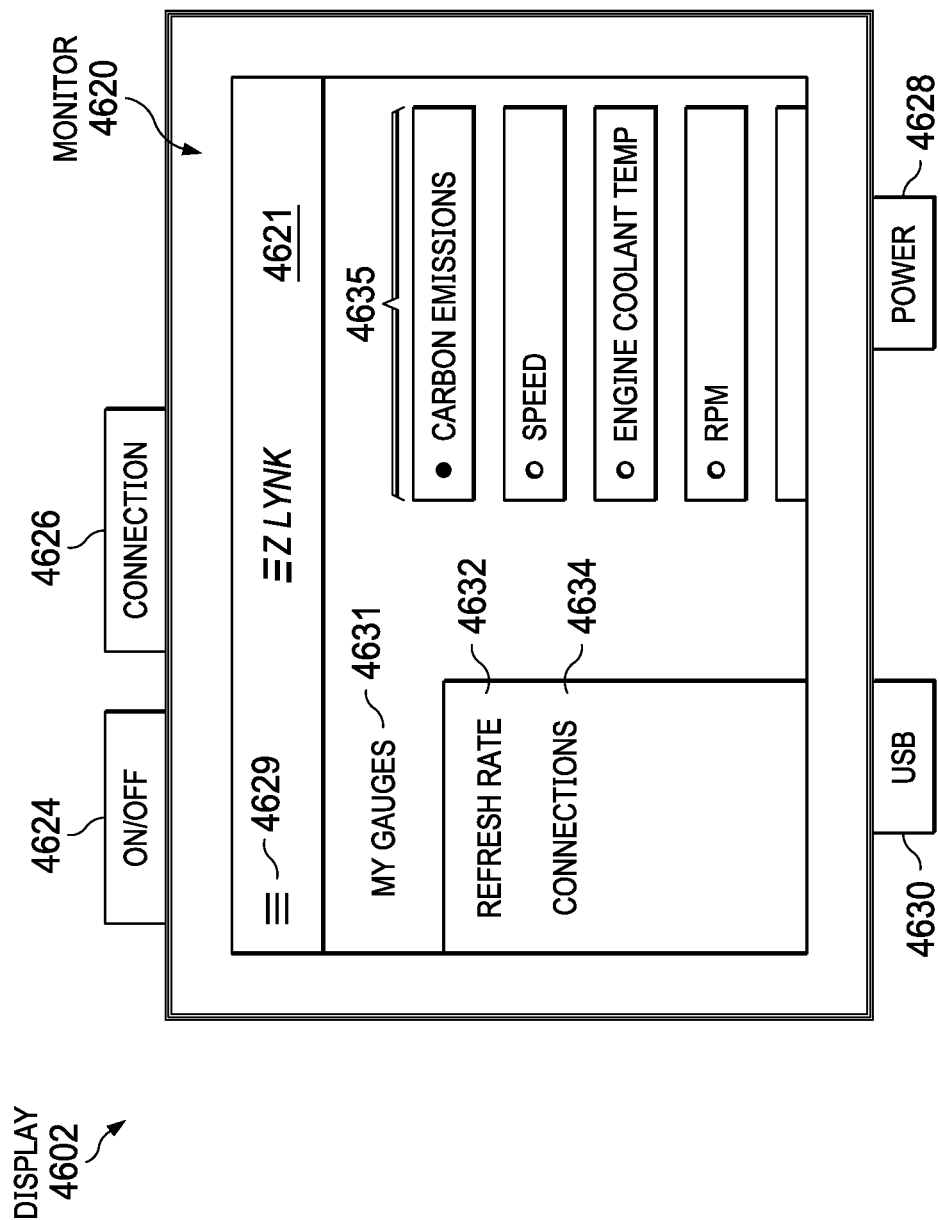
FIG. 49 is a diagram of a display device showing a user interface displaying vehicle data.

Referring then to FIG. 49, a diagram of an exemplary embodiment of a display device and a user interface of application 4616 is described.

Display device 4602 includes on/off button 4624, USB port 4630, and power port 4628. Optionally, USB port 4630 and power port 4628 are combined to accommodate USB for both connectivity and power. The display device may optionally have connection button 4626. The connection button may reset the device's wireless connection with a local device or initiate Wi-Fi protected setup (WPS) to establish a quick connection with a local device equipped with WPS technology.

Monitor 4620 is shown displaying screen 4621, which is an exemplary user interface of application 4616. Screen 4621 contains settings option 4629, which would display available options such as gauge selection tab 4631, refresh rate tab 4632, and connections tab 4634. In a preferred embodiment, gauge selection tab 4631 will contain gauge list 4635 displaying a multitude of options available for a user to select, such as carbon emissions, speed, engine coolant temp, RPM, etc.

Figure 50:
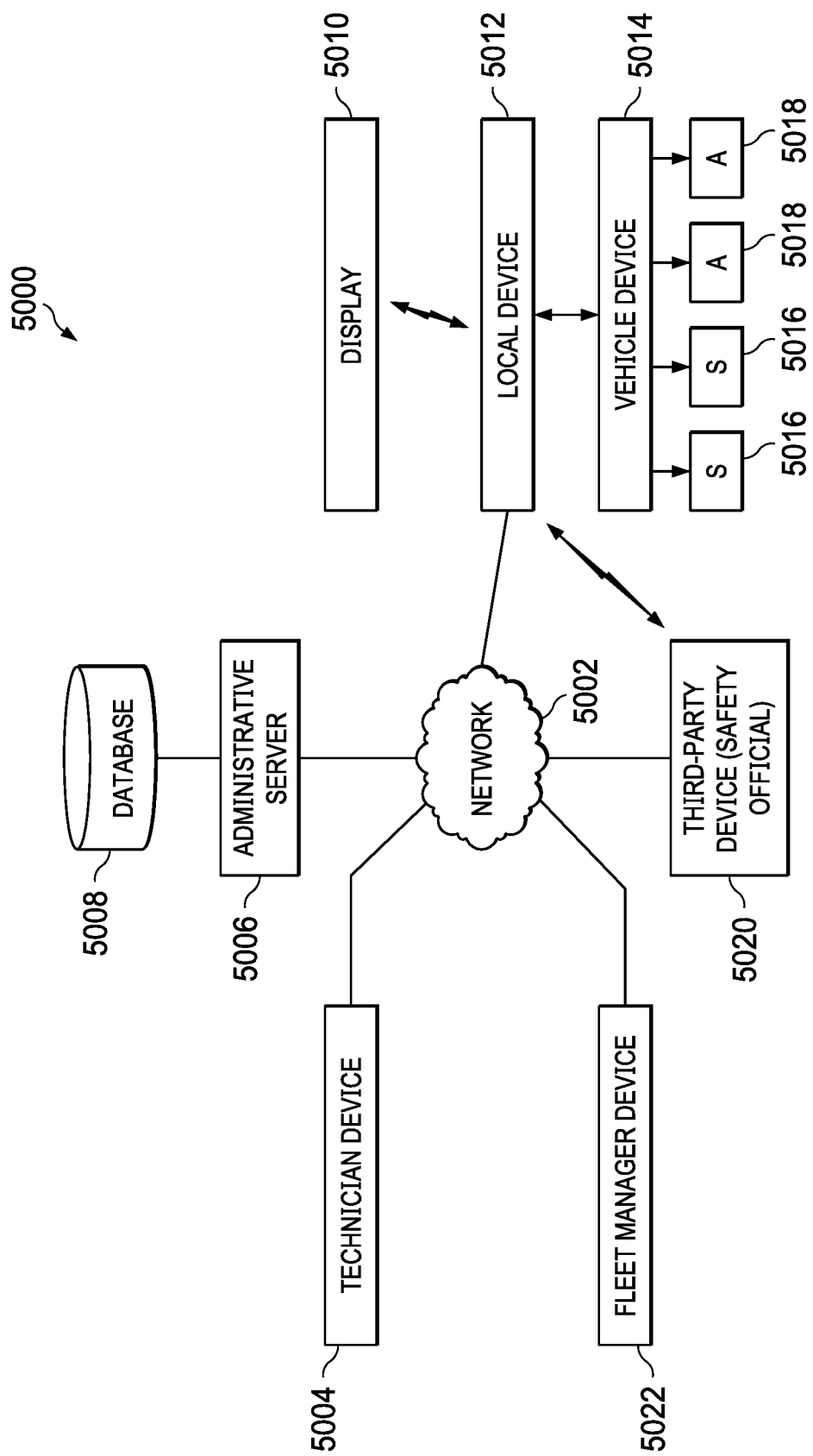
FIG. 50 is a system diagram of a fleet management system for monitoring a vehicle device.

Referring then to FIG. 50, system 5000 is provided for commercial motor vehicle fleet management. Commercial motor carriers are typically responsible for compliance with federal and state regulations. For instance, FMCSA requires that each vehicle must be equipped with an electronic logging device ("ELD") which records vehicle data, such as engine power status, vehicle motion status, miles driven, and engine hours. The ELD must maintain a record of duty ("ROD") including various types of vehicle data and driver hours of service ("HOS"). Compliance requires that the RODs and HOS stored on the ELD must be accessible by third-party safety officials for safety audits. Motor carriers are ultimately responsible for drivers that are not compliant. As another example, CMVs must remain compliant with the Federal carbon emissions regulations, so the functionality of a vehicles emission control systems needs to be monitored to maintain compliance. As yet another example of Federal regulations, under the International Fuel Tax Agreement (IFTA), interstate CMVs must file a motor fuel tax report quarterly.

System 5000 provides additional functionality for a commercial motor vehicle to monitor and record data as needed to comply with various regulations, such as those previously described. Motor carriers are similarly responsible for the efficiency of their fleet. If a vehicle is not running efficiently, has a sensor fault, or other error, a fleet manager needs to be aware that the vehicle may need to be decommissioned for service. Thus, the ability of a motor carrier, or fleet manager, to monitor an individual vehicle and driver record is crucial for overall fleet performance.

System 5000 includes technician device 5004, administrative server 5006, local device 5012, third-party device 5020, and fleet manager device 5022 all connected through network 5002. Network 5002 is a wide-area network such as the internet. Administrative server 5006 is operatively connected to database 5008. Local device 5012, as previously described, is operatively connected to vehicle device 5014 and connected to display device 5010 wirelessly or via USB, as previously described. Vehicle device 5014 is connected to sensors 5016 and actuators 5018 resident on the vehicle, as previously described. In an alternate embodiment, display device 5010 may also be connected to network 5002 when equipped with a GSM module on communication interface 4618.

Referring to FIGS. 51A through 51E, network flow diagrams of system 5000 for fleet management will be described.

Figures 1, 51A:
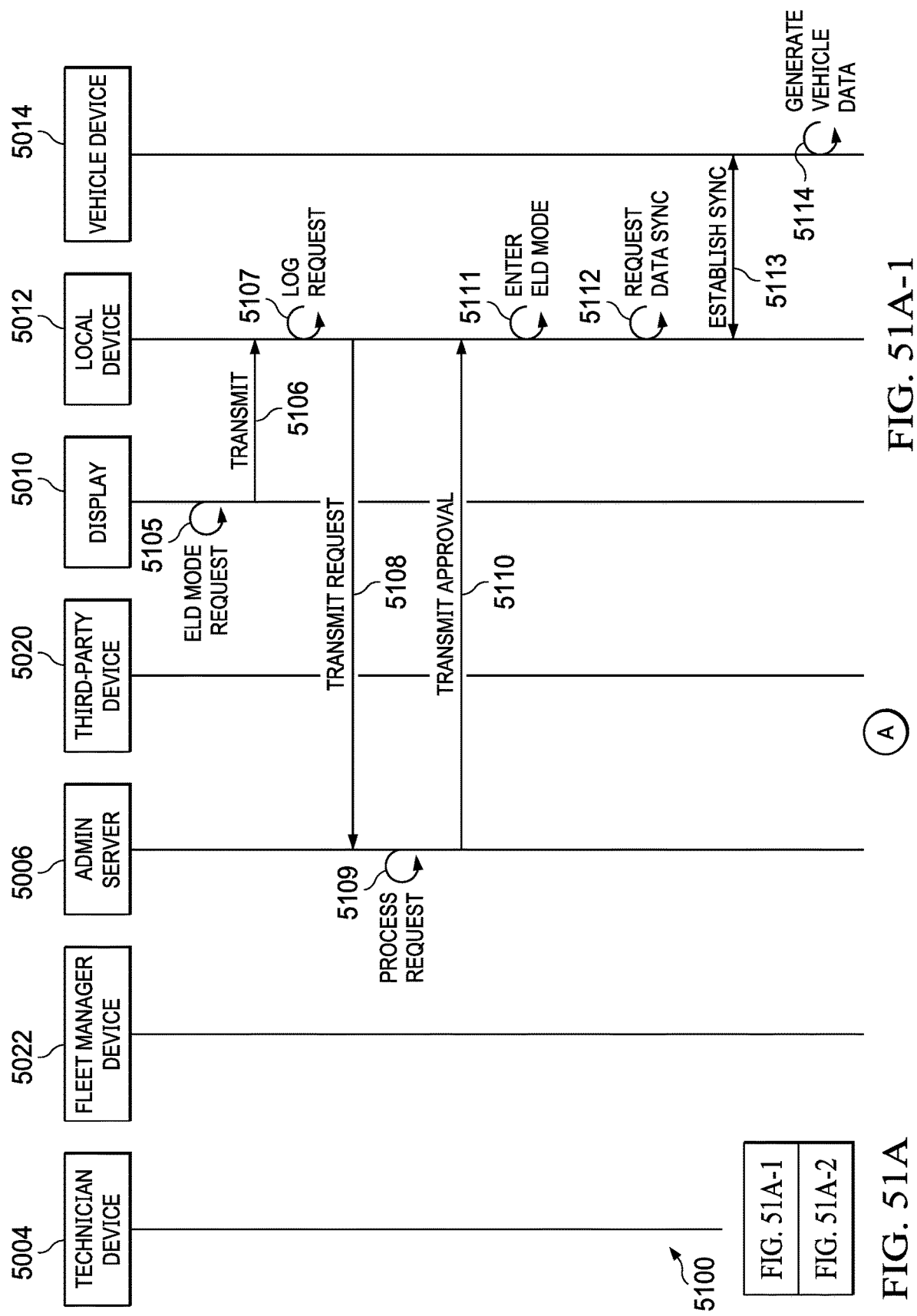
FIG. 51A is a sequence diagram of a method for enabling electronic logging of vehicle and driver data from a display device.
Figures 2, 51A:
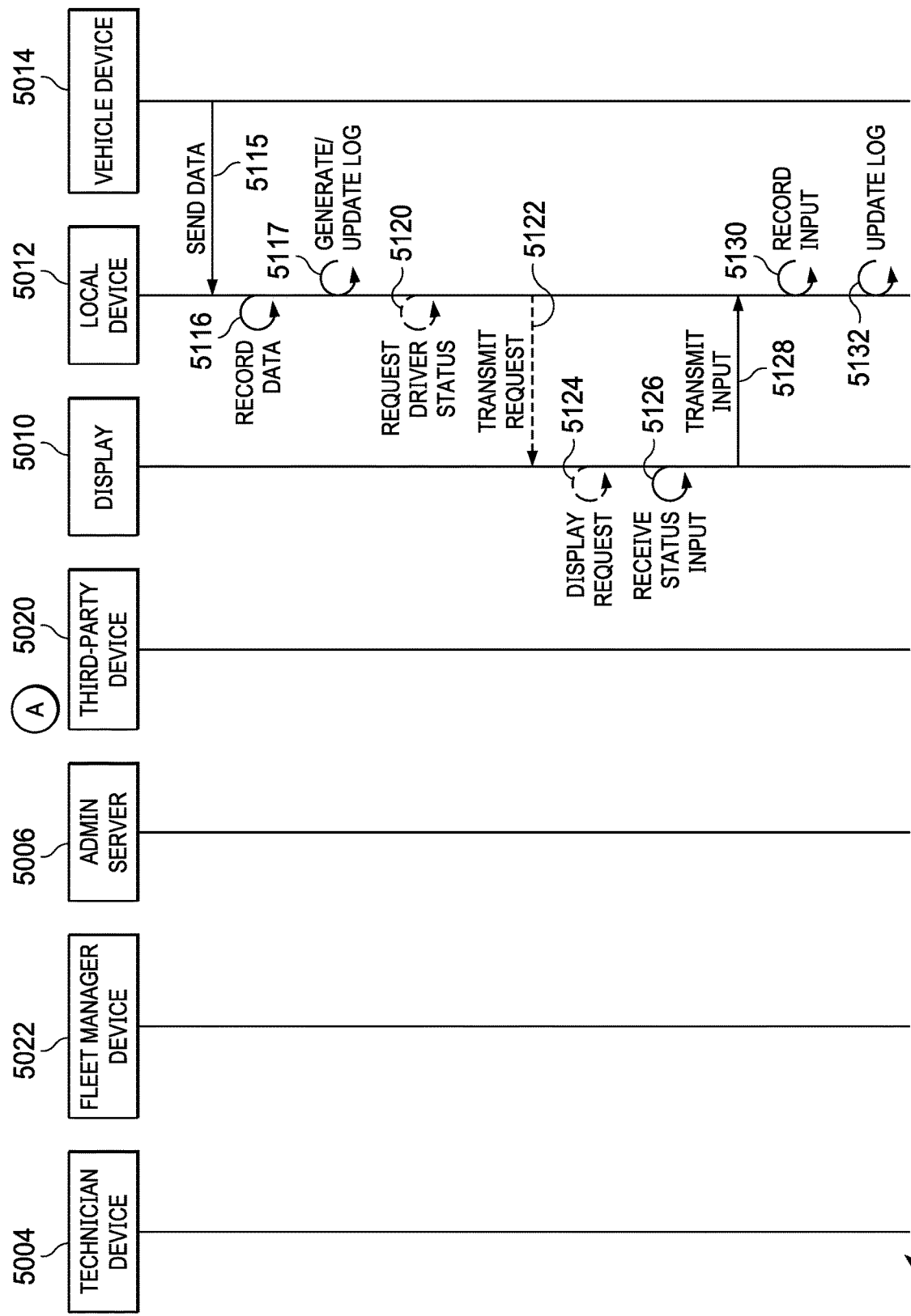

Referring then to FIG. 51A, method 5100 for enabling ELD mode on a local device using a display device, such as display device 5010, is described. The method described in reference to FIG. 51A may be used when any advanced commercial motor vehicle functions are selected for use, such as ELD mode, carbon emissions monitoring, or fuel tax reporting. At step 5105, the display device receives an ELD mode selection. In a preferred embodiment, when this feature is selected a unique identifier for the local device is used to identify the vehicle. This unique identifier may be issued to the local device at the time of manufacture, such as a serial number. Alternatively, this unique identifier may be issued when ELD mode is selected. In another embodiment, a commercial motor carrier, vehicle, or driver may have a unique identifier, issued by the administrative server, which is input at step 5105 to automatically link the vehicle to a fleet.

At step 5106, the ELD mode selection is transmitted to local device 5012. In step 5107, the local device logs the request. At step 5108, the request is transmitted to administrative server 5006. In a preferred embodiment, the request includes the CMV function selected in step 5105 and the unique identifier associated with the device.

At step 5109, the request is processed by the administrative server. In a preferred embodiment, this process includes a review of account history and payment through receipt of existing tokens, as previously described. Optionally, the process may verify the request accuracy and process the receipt of funds from a bank via wire transfer or a credit card transaction. If existing tokens are utilized to activate the requested functionality, the token status is updated to "used".

At step 5110, an approval is transmitted to local device 5012. At step 5111, an ELD mode module on the local device is switched on. This module will monitor and log vehicle data and driver data. In step 5112, the local device will request a data sync for the required vehicle data. At 5113, local device establishes a data sync with vehicle device 5014 via a direct connection through an OBD II port.

At step 5114, the vehicle device continuously generates data, such as power status, motion, miles driven, and engine hours, through use. At step 5115, vehicle device 5014 will transmit the vehicle data to the local device. At step 5116, local device 5012 records the data. In step 5117, the local device will generate and continuously update a log of vehicle and driver data (i.e. RODS and HOS).

Driver input is required to maintain an accurate record of a driver's HOS. For instance, a driver must indicate when they are on duty while driving (i.e. on route to deliver inventory), or if they are driving off-duty (i.e. driving to lunch). Optionally, in step 5120, the local device will request driver status input every preset period of time. For instance, in a preferred embodiment, if the local device registers the engine is on for more than 1 hour then the device may request driver verification that they are "on-duty" once every hour. At step 5122, the driver status request is transmitted to display device. In step 5124, the status verification is displayed.

At step 5126, display device will receive status input, such as duty status. At step 5128, status input is then transmitted to local device 5012. In step 5130, the local device records the input. At step 5132, the local device then updates the log with the driver status.

In another embodiment, where display device 5010 is not present in the system, the method used to enable advanced commercial motor vehicle functions may be similarly completed using a mobile device, such as client device 110, in place of the display device. In this embodiment the client device has cellular capabilities and is connected to the local device, as previously described.

Figures 2, 51B:
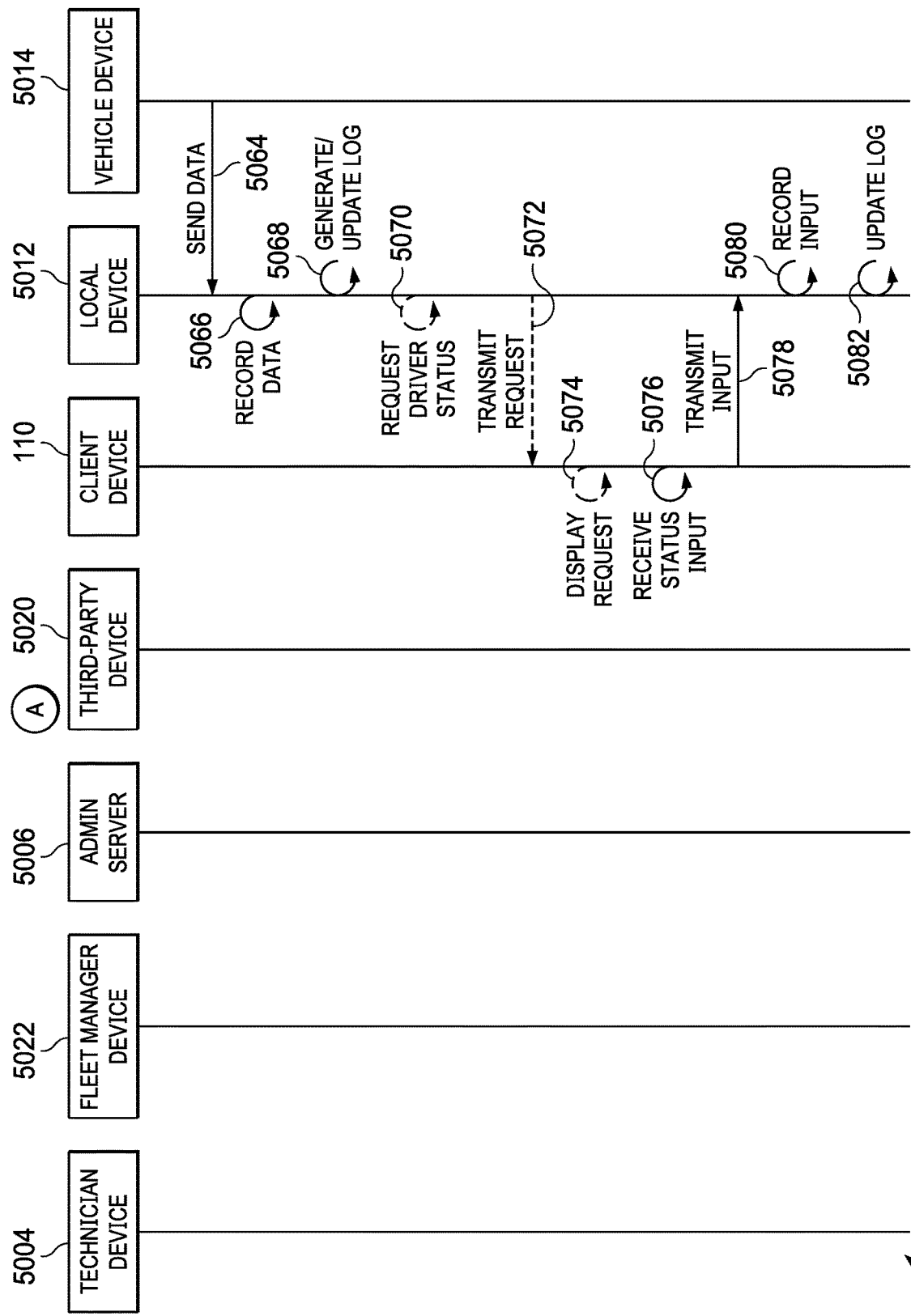
FIG. 51B is a sequence diagram of a method for enabling electronic logging of vehicle and driver data from a client device.

Referring then to FIG. 51B, method 5101 for enabling ELD mode on a local device using client device 110 is described. At step 5051, the client device receives an ELD mode selection. In a preferred embodiment, at this step a unique identifier is used to connect the vehicle to a fleet, as previously described.

At step 5052, the ELD mode selection is transmitted to local device 5012. In step 5053, the local device logs the request. At step 5054, the request is transmitted to administrative server 5006. In a preferred embodiment, the request includes the CMV function selected in step 5051 and the unique identifier associated with the device.

At step 5055, the request is processed by the administrative server. In a preferred embodiment, this process includes reviewing account history and processing payment through receipt of existing tokens, as previously described.

At step 5056, an approval is transmitted to client device 110. In step 5057, the client device logs the request approval. In step 5058, the approval is forwarded to the local device. At step 5059, an ELD mode module on the local device is switched on. This module will monitor and log vehicle data and driver data. In step 5060, the local device will request a data sync for the required vehicle data. At 5061, local device establishes a data sync with vehicle device 5014 via a direct connection through an OBD II port.

At step 5062, the vehicle device continuously generates data, such as power status, motion, miles driven, and engine hours, through use. At step 5064, vehicle device 5014 will transmit the vehicle data to the local device. At step 5066, local device 5012 records the data. In step 5068, the local device will generate and continuously update a log of vehicle and driver data (i.e. RODS and HOS).

Optionally, in step 5070, the local device will request driver status input every preset period of time, as previously described. At step 5072, the driver status request is transmitted to the client device. In step 5074, the status verification is displayed.

At step 5076, the client device will receive status input, such as duty status. At step 5078, status input is then transmitted to local device 5012. In step 5080, the local device records the input. At step 5082, the local device then updates the log with the driver status.

Figure 51C:
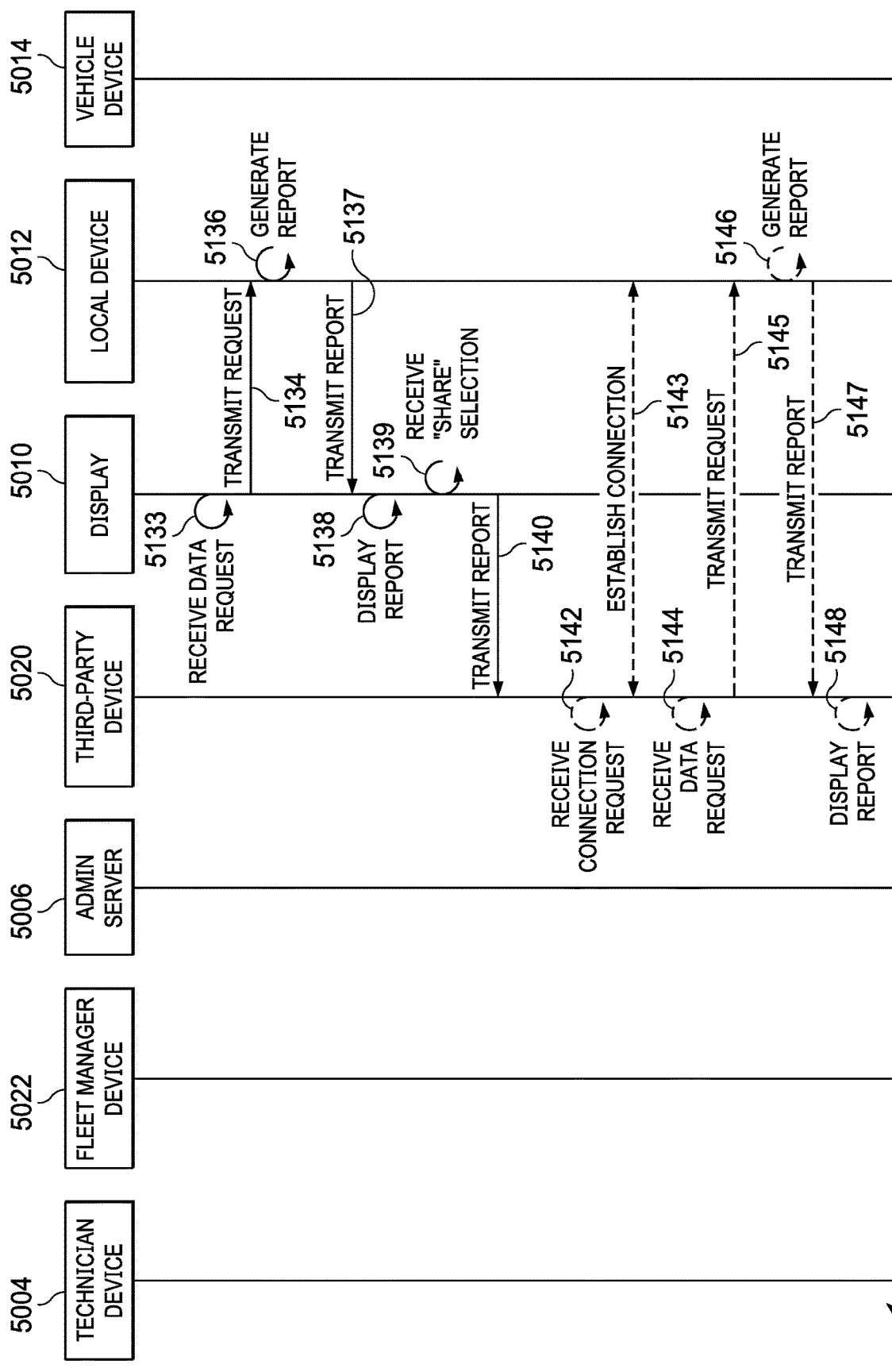
FIG. 51C is a sequence diagram of a method for providing third-party access to vehicle and driver data.

Referring then to FIG. 51C, third-party retrieval of vehicle data from a local device is described as method 5102. This feature is important because a FMCSA, or other agency, safety official may perform safety audits on an individual vehicle. To comply with FMCSA regulations, the ELD device must have the ability to display and send vehicle and driver data, such as HOS and RODs, during a safety audit.

At step 5133, display device 5010 will receive a data request. In a preferred embodiment, the display device will have different options of ELD data to display for a specified time frame, such as an HOS log, or ROD. In step 5134, the data request is transmitted to local device 5012.

At step 5136, local device will generate a report. In a preferred embodiment, the report comprises the requested data over the specified time period and is generated using the log of vehicle and driver data. In step 5137, the report is transmitted to the display device. At step 5138, the report is displayed.

In a preferred embodiment, the application loaded on display device 5010 will have a "share" feature to transmit the generated reports to another device wirelessly, such as through email, Bluetooth, or SMS messaging. In step 5139, the display device receives a selection to share the report. At step 5140, the report is then transmitted to a third-party device, such as a FMCSA auditor's mobile phone, or laptop.

Optionally, third-party device 5020 requests the data directly from local device 5012. While the preferred method for establishing a connection with the local device is via Bluetooth or Wi-Fi, as previously described, it should be appreciated that a direct wired connection could also be utilized via USB or ethernet.

At step 5142, the third-party device receives a request to establish a connection with local device. In step 5143, a connection is established. At step 5144, the third-party device then receives a data request (i.e. for HOS or RODS). In step 5145, the request is transmitted to local device 5012.

At step 5146, the local device generates a report for the data requested from the vehicle and driver data log. At step 5147, the local device transmits the report to the third-party device. At step 5148, the report is recorded, logged and displayed on third-party device 5020.

Figures 2, 51D:
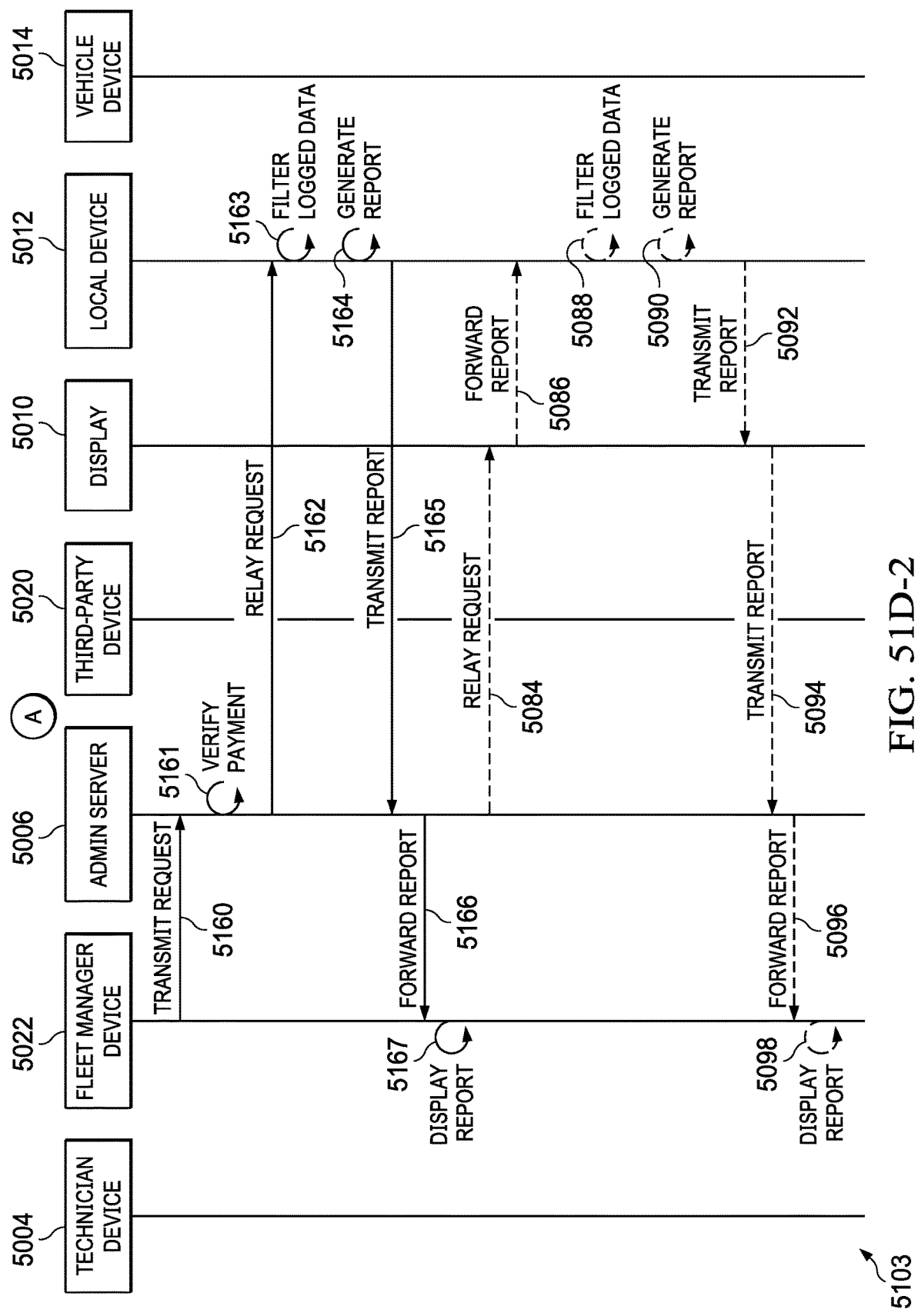
FIG. 51D is a sequence diagram of a method for remote fleet management vehicle and driver data.

Referring then to FIG. 51D, a preferred embodiment of a system for communication between a fleet manager device and a local device is described as method 5103.

In step 5149, fleet manager device 5022 receives a request for access. Access is used to enable functionality. Access may be required to receive detailed vehicle data, such as error codes or diagnostic trouble codes (DTC), carbon emissions, average MPG, average MPH and RODs or HOS or any other vehicle data available from the vehicle device. Each request for access is serialized, and includes a status indicator, and is hashed and compressed, as previously described.

At step 5150, the access request is transmitted to administrative server 5006. At step 5151, the administrative server approves and processes the request. The processing may include a review of account history, request accuracy and receipt of funds from a bank via wire transfer or a credit card transaction. Optionally, a payment through receipt of tokens may be used, as previously described.

At step 5152, approval is transmitted to the fleet manager device. In step 5153, the approval is displayed on fleet manager device 5022.

In step 5154, fleet information is input into fleet manager device. In a preferred embodiment, this consists of vehicle and driver details for each vehicle and driver in the motor carrier's fleet. In one embodiment, local device 5012 is linked to a fleet, vehicle, and driver using a unique identifier for the local device, as previously described. In one embodiment, the motor carrier is issued a unique identifier to be input at the local device. The fleet manager would then provide additional details regarding the devices linked. In step 5155, the fleet data is transmitted to administrative server 5006.

In step 5156, the administrative server will generate a fleet and function list. This list will include the vehicles with a local device linked to the fleet, drivers, and functions available. The functions available are determined by the kind and number of tokens issued. Functions may include: displaying live vehicle data, displaying vehicle ECU profiles, displaying logged vehicle data, and displaying a driver's HOS or RODs. At step 5157, the list is transmitted to fleet manager device 5022. At step 5158, the list is displayed on the fleet manager device.

In step 5159, a data request is received by the fleet manager device. In this step the request may be for a specific driver's HOS or RODs, or local device 5012 data, such as miles driven or PID error codes. In step 5160, the data request is transmitted to the administrative server. At step 5161, the administrative server will verify the account has the appropriate tokens to fulfill the request. In this step, the administrative server will also update the status of the token/s to "used".

At step 5162, the data request is relayed to local device 5012. In step 5163, the local device will filter the logged data for the data requested. At step 5164, local device 5012 generates a report with the requested data. At step 5165, the report is transmitted to administrative server 5006. In step 5166, the administrative server forwards the report to fleet manager device 5022. At step 5167, the report generated by the local device is displayed on the fleet manager device.

Optionally, the request is sent to the display device, or alternatively a client device, and then forwarded to the local device. At step 5084, the data request is relayed to display device 5010. In step 5086, the display device forwards the request to the local device. At step 5088, the local device filters the logged data. At step 5090, local device 5012 generates a report with the requested data. At step 5092, the report is transmitted to the display device. In step 5094, the report is sent to administrative server 5006. In step 5096, the administrative server forwards the report to fleet manager device 5022. At step 5098, the report generated by the local device is displayed on the fleet manager device.

Figures 2, 51E:
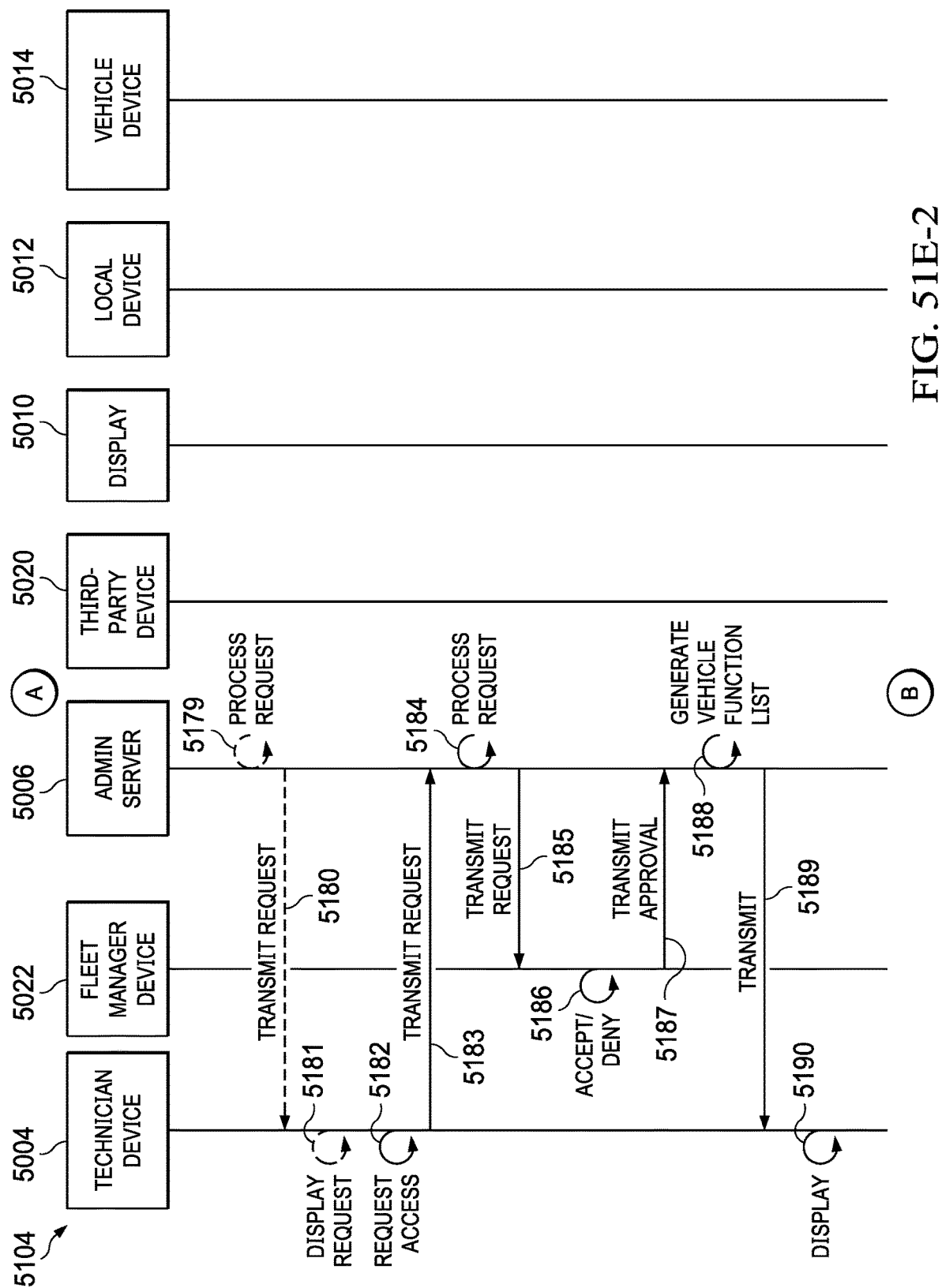
FIG. 51E is a sequence diagram of a method for providing remote technician access to vehicle and driver data.
Figures 3, 51E:
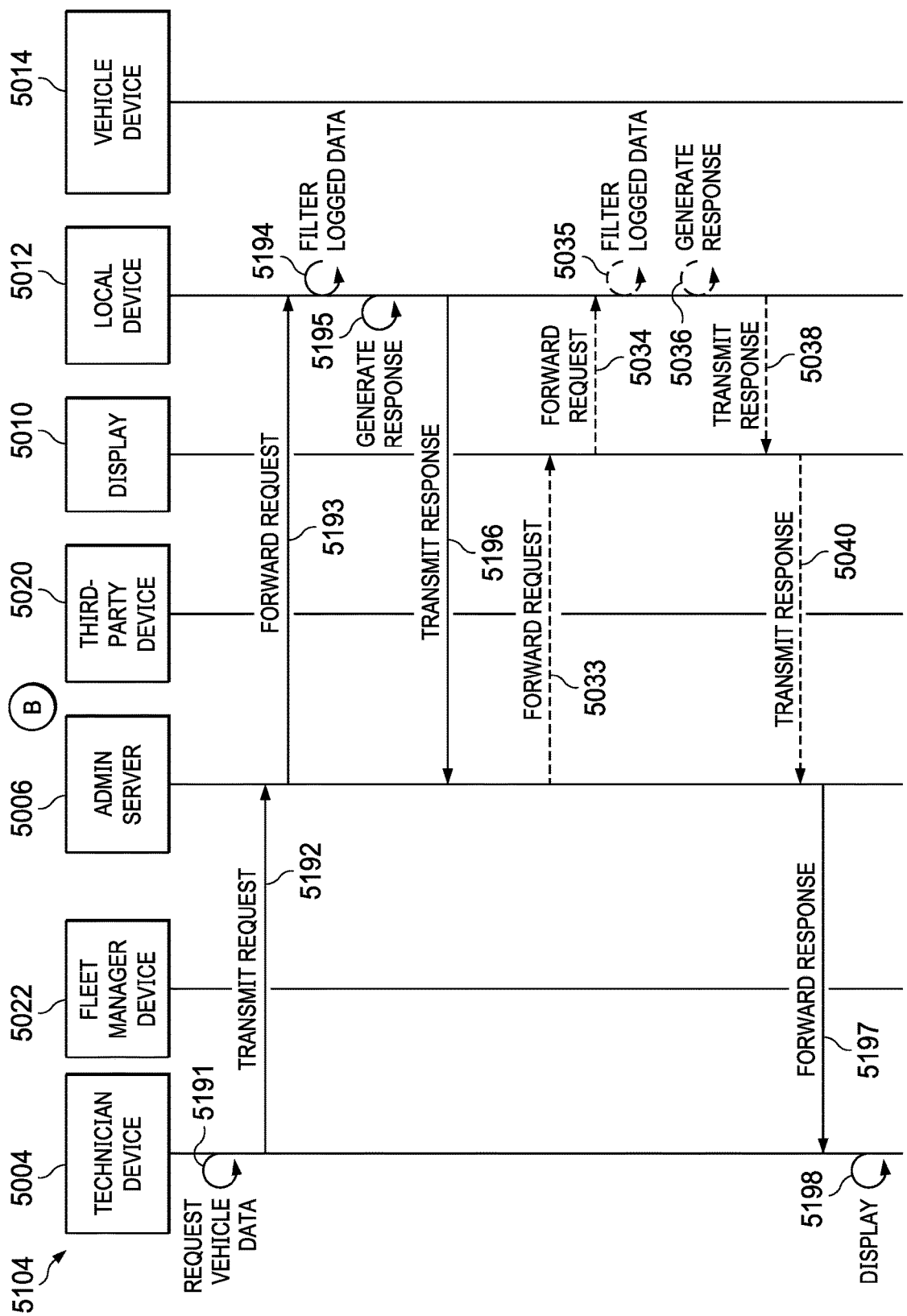

Referring then to FIG. 51E, communication between a technician device and a fleet vehicle device is described as method 5104. This functionality is important because a commercial motor carrier is responsible for each vehicle's compliance with state and federal regulations, such as carbon emissions regulations. This feature allows a commercial motor carrier to monitor fleet vehicles remotely and have the vehicles assessed and repaired by a remote technician device.

In one embodiment, payment may be requested which will allow passive monitoring of a vehicle device. In this embodiment, when a vehicle device produces an error or sensor fault, the DTC is sent to the administrative server and then a notification is sent to the fleet manager device. In an alternate embodiment, active monitoring is utilized. In this embodiment, tokens are used to determine a vehicle device status at a particular time, then a fleet manager device receives the status, which may include a DTC. A preferred method of passive monitoring is described below.

At step 5168, vehicle device 5014 generates an error. In step 5169, the DTC is transmitted to local device 5012. At step 5170, the local device updates the log of vehicle data. At step 5171, the error is transmitted to administrative server 5006.

Optionally, in step 5030, local device transmits the error to display device 5010. At step 5031, the error is then displayed. In step 5032, the error is transmitted to the administrative server.

At step 5174, the administrative server processes the notification. At this step, the administrative server may verify the account has the required access clearance for passive monitoring and generate a notification. In step 5175, the error is transmitted to fleet manager device 5022. At step 5176, the error notification is displayed on the fleet manager device.

In a preferred embodiment the error notification comprises the DTC, identifying the error. Optionally, the error notification may also include a list of technicians. In one embodiment, at step 5177, a technician may be requested from the list in the error notification. In this embodiment, a request for additional payment, for example by tokens, may be included in the tech request. The token request will be included if additional tokens are required to execute the tech request. The additional tokens may be required based on the account's existing balance, the type of error or service required, or tech requested.

At step 5178, a request for technician assistance or repair is transmitted to the administrative server. At step 5179, the server will process the request. At this step the server will determine if any additional tokens are requested or required, and then generate a tech notification. At step 5180, the tech request notification is transmitted to technician device 5004. At step 5181, the request is displayed on the technician device.

Alternatively, the tech may not be selected from the error notification, or notified through the administrative server. In this alternate embodiment the technician may be selected from an alternate list and notified through separate means. In either event, once a tech is notified of the request, the tech must request access to the fleet vehicle devices.

In step 5182, technician device requests access to the fleet vehicle. At step 5183, the access request is transmitted to administrative server 5006. In step 5184, the server processes the request. At step 5185, the request is sent to the fleet manager device. At step 5186, the fleet manager device receives a selection to approve or deny the technician access. If a selection to deny is received, then a denial is returned to the administrative server, and forwarded to the technician device. If approved, then at step 5187, the approval is transmitted to administrative server 5006.

At step 5188, administrative server will generate a vehicle function list. In a preferred embodiment, a vehicle function list will comprise options to request vehicle data, as well as options to perform maintenance and repair, such as ECU reprogramming as previously described. The available functions may be more or less expansive depending upon available tokens. At step 5189, the vehicle functions list is transmitted to technician device 5004. In step 5190, the vehicle functions list is displayed on the technician device.

At step 5191, the technician device receives a selection to request vehicle data. At step 5192, the request is transmitted to the administrative server. In step 5193, administrative server 5006 forwards the data request to the local device.

At step 5194, local device 5012 filers logged data for the data requested. At this step, the local device may also determine to request additional data from vehicle device 5014. At step 5195, the local device will generate a response to the data request. At step 5196, the response is transmitted to the administrative server.

Optionally, administrative server 5006 forwards the request generated in step 5191 to display device 5010. In step 5033, administrative server 5006 forwards the data request to the display device. At step 5034, the display device forwards the request to local device 5012. At this step 5035, the local device filters the logged data and may also determine to request additional data from vehicle device 5014. At step 5036, the local device will generate a response to the data request. At step 5038, the response is transmitted to the display device. In step 5040, the response is forwarded to the administrative server.

At step 5197, the response is forwarded to the technician device. At step 5198, the requested data is displayed on the technician device. The process may end here or proceed to ECU reprogramming, as previously described.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

The invention claimed is:

1. A system for reprogramming an emissions control unit of a vehicle comprising:
   a technician device, connected to a first network;
   a system server, connected to the technician device through the first network;
   a client device, connected to the system server through the first network;
   a local device, connected to the client device through a second network;
   a vehicle device, including the emissions control unit, connected to the local device through a third network;
   a set of processors in the system server, the client device, the technician device, the local device and the vehicle device;
   a set of memories, each memory of the set of memories operably connected to at least one processor in the set of processors;
   the set of memories, including a set of instructions that, when executed causes the system to perform the steps of:
   receiving, at the technician device, a J2534 compliant OEM API, an OEM application and a J2354 compliant DLL;
   choosing, at the technician device, an API request from the OEM application;
   converting, at the technician device, by the J2354 compliant DLL, the API request into a serialized API request;
   sending, from the technician device to the system server, by the J2354 compliant DLL, the serialized API request;
   transmitting, in a pass through mode, from the system server to the client device, the serialized API request;
   transmitting, in pass through mode, from the client device to the local device, the serialized API request;
   converting, at the local device, the serialized API request into a first deserialized API request;
   sending, by the local device, the first deserialized API request to the vehicle device;
   implementing, at the vehicle device, the first deserialized API request to reprogram the emissions control unit;

generating, at the vehicle device, an API response;
sending, by the vehicle device to the local device, the API response;
converting, by the local device, the API response into a serialized API response;
sending, by the local device to the system server, the serialized API response;
transmitting, in pass through mode, from the server to the technician device, the serialized API response;
converting, by the technician device, by the J2354 complaint DLL, the serialized API response into a first deserialized API response; and,
receiving, at the OEM application, the first deserialized API response.

2. The system of claim 1 wherein:
the system server is connected to the technician device through a first wireless connection;
the client device is connected to the system server through a second wireless connection;
the local device is connected to the client device through a third wireless connection; and,
the vehicle device is connected to the local device through a hardwired connection.

3. The system of claim 1 further comprising a reporting monitor server connected to the system server through the first network, and wherein the set of instructions further comprise instructions that when executed causes the system to perform the steps of:
converting, by the system server, the serialized API request into a second deserialized API request;
logging, at the system server, the second deserialized API request; and,
transmitting, by the system server to the reporting monitor server, a report related to the second deserialized API request.

4. The system of claim 1 further comprising a reporting monitor server connected to the system server through the first network, and wherein the set of instructions further comprise instructions that when executed causes the system to perform the steps of:
converting, at the system server, the serialized API response into a second deserialized API response;
logging, at the system server, the second deserialized API response; and,
transmitting, by the system server to the reporting monitor server, a report related to the second deserialized API response.

5. The system of claim 1 wherein the API request is an emissions ECU reprogramming request.

6. The system of claim 1 wherein the step of sending, from the technician device, by the J2354 compliant DLL, the serialized API request further comprises sending a data transmission in full duplex mode.

7. The system of claim 6 wherein the data transmission in full duplex mode is made by a Web Socket.

8. The system of claim 1 wherein the step of sending, from the local device to the system server, the serialized API response further comprise sending a data transmission in full duplex mode.

9. The system of claim 8 wherein the data transmission in full duplex mode is made by a Web Socket.

10. The system of claim 1 wherein the step of generating an API response further comprises the step of generating an error message.

11. The system of claim 1 wherein the step of generating an API response further comprises the step of generating a reprogramming complete message.

12. A method of reprogramming an emissions control unit of a vehicle comprising:
providing a technician device, connected to a first network;
providing a system server, connected to the technician device through the first network;
providing a client device, connected to the system server through the first network;
providing a local device, connected to the client device through a second network;
providing a vehicle device, including the emissions control unit, connected to the local device through a third network;
providing a set of processors in the system server, the client device, the technician device, the local device and the vehicle device;
providing a set of memories, each memory of the set of memories operably connected to at least one processor in the set of processors;
the set of memories, including a set of instructions that, when executed causes the system to perform the steps of:
receiving, at the technician device, a J2534 compliant OEM API, an OEM application and a J2354 compliant DLL;
choosing, at the technician device, an API request from the OEM application;
converting, at the technician device, by the J2354 compliant DLL, the API request into a serialized API request;
sending, from the technician device to the system server, by the J2354 compliant DLL, the serialized API request;
transmitting, in a pass through mode, from the server to the client device, the serialized API request;
transmitting, in pass through mode, from the client device to the local device, the serialized API request;
converting, at the local device, the serialized API request into a first deserialized API request;
sending, by the local device, the first deserialized API request to the vehicle device;
implementing, at the vehicle device, the first deserialized API request to reprogram the emissions control unit;
generating, at the vehicle device, an API response;
sending, by the vehicle device to the local device, the API response;
converting, by the local device, the API response into a serialized API response;
sending, by the local device to the system server, the serialized API response;
transmitting, in pass through mode, from the system server to the technician device, the serialized API response;
converting, by the technician device, by the J2354 complaint DLL, the serialized API response into a first deserialized API response; and,
receiving, at the OEM application, the first deserialized API response.

13. The method of claim 12 wherein the step of providing a system server further comprises providing a first wireless connection to the technician device;
wherein the step of providing a client device further comprises providing a second wireless connection to the system server;

wherein the step of providing a local device further comprises providing a third wireless connection to the client device; and, wherein the step of providing a vehicle device further comprises providing a hard wired connection to the local device.

14. The method of claim 12 further comprising providing a reporting monitor server connected to the system server through the first network, and wherein the set of instructions further comprise instructions that when executed causes the system to perform the steps of:

converting, by the system server, the serialized API request into a second deserialized API request;

logging, at the system server, the second deserialized API request; and, transmitting, by the system server to the reporting monitor server, a report related to the second deserialized API request.

15. The system of claim 12 further comprising providing a reporting monitor server connected to the system server through the first network, and wherein the set of instructions further comprise instructions that when executed causes the system to perform the steps of:

converting, at the system server, the serialized API response into a second deserialized response;

logging, at the system server, the second deserialized API response; and, transmitting, by the system server to the reporting monitor server, a report related to the second deserialized API response.

16. The system of claim 12 wherein the API request is an emissions ECU reprogramming request.

17. The system of claim 12 wherein the step of sending, from the technician device, by the J2354 compliant DLL, the serialized API request further comprises sending a data transmission in full duplex mode.

18. The system of claim 17 wherein the data transmission in full duplex mode is made by a Web Socket.

19. The system of claim 12 wherein the step of sending, from the local device to the system server, the serialized API response further comprise sending a data transmission in full duplex mode.

20. The system of claim 19 wherein the data transmission in full duplex mode is made by a Web Socket.

21. The system of claim 12 wherein the step of generating an API response further comprises the step of generating an error message.

22. The system of claim 12 wherein the step of generating an API response further comprises the step of generating a reprogramming complete message.

* * * * *